(12) United States Patent
Wakai et al.

(10) Patent No.: US 9,158,402 B2
(45) Date of Patent: Oct. 13, 2015

(54) METHOD AND APPARATUS FOR DETECTING AND INTERPRETING PATH OF DESIGNATED POSITION

(71) Applicant: Canon Kabushiki Kaisha, Tokyo (JP)

(72) Inventors: Masanori Wakai, Kanagawa (JP); Satomi Kayano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 13/972,240

(22) Filed: Aug. 21, 2013

(65) Prior Publication Data

US 2014/0062924 A1   Mar. 6, 2014

Related U.S. Application Data

(60) Continuation of application No. 13/184,470, filed on Jul. 15, 2011, now Pat. No. 8,531,421, which is a division of application No. 11/590,826, filed on Nov. 1, 2006, now Pat. No. 7,986,308, which is a division of application No. 09/769,451, filed on Jan. 26, 2001, now Pat. No. 7,138,983.

(30) Foreign Application Priority Data

Jan. 31, 2000   (JP) ................ 2000-021427

(51) Int. Cl.
*G06F 3/041* (2006.01)
*G06F 3/01* (2006.01)
(Continued)

(52) U.S. Cl.
CPC ............ *G06F 3/041* (2013.01); *G06F 3/017* (2013.01); *G06F 3/0483* (2013.01);
(Continued)

(58) Field of Classification Search
CPC ....... G06F 3/017; G06F 3/041; G06F 3/0483; G06F 3/04845; G06F 3/0488; G06F 3/04883; G06F 2203/04806; G06F 2203/04808
USPC .................... 345/173–178; 178/18.01–20.04; 715/863
See application file for complete search history.

(56) References Cited

U.S. PATENT DOCUMENTS 5,442,742 A   8/1995  Greyson et al.
5,483,261 A   1/1996  Yasutake
(Continued)

FOREIGN PATENT DOCUMENTS

JP   07-230532 A   8/1995
JP   11-038949 A   2/1999
(Continued)

*Primary Examiner* — Amare Mengistu
*Assistant Examiner* — Jennifer Zubajlo
(74) *Attorney, Agent, or Firm* — Fitzpatrick, Cella, Harper & Scinto

(57) ABSTRACT

A method of detecting and interpreting a path of designated positions is disclosed. The method concurrently detects a plurality of designated positions on a touch panel, again detects the plurality of designated positions subsequent to a travel of the designated positions, determines the distances between each of the current designated positions and the respective immediately preceding designated positions, treats an immediately preceding designated position, closest to the current designated position of interest, as the immediately preceding designated position of the current designated position of interest, and acquires the path of each designated position, thereby recognizing the paths of the plurality of designated positions that move concurrently. A combination of the paths of the plurality of designated positions is interpreted to identify a designation input by a user, and an operation thus designated is executed.

8 Claims, 156 Drawing Sheets

(51) Int. Cl.
  *G06F 3/0483* (2013.01)
  *G06F 3/0484* (2013.01)
  *G06F 3/0488* (2013.01)
(52) U.S. Cl.
  CPC ......... *G06F 3/0488* (2013.01); *G06F 3/04845* (2013.01); *G06F 3/04883* (2013.01); *G06F 2203/04806* (2013.01); *G06F 2203/04808* (2013.01)

(56) References Cited

U.S. PATENT DOCUMENTS

| | | | |
|---|---|---|---|
| 5,867,158 A | 2/1999 | Murasaki et al. | |
| 6,008,800 A | 12/1999 | Pryor | |
| 6,414,672 B2 | 7/2002 | Rekimoto et al. | |
| 6,597,347 B1 | 7/2003 | Yasutake | |
| 7,138,983 B2 | 11/2006 | Wakai et al. | |
| 7,339,580 B2 | 3/2008 | Westerman et al. | |
| 8,531,421 B2 * | 9/2013 | Wakai et al. | 345/173 |
| 2010/0194701 A1 * | 8/2010 | Hill | 345/173 |

FOREIGN PATENT DOCUMENTS

| | | | |
|---|---|---|---|
| JP | 11038949 A * | 2/1999 |
| JP | 11-073271 A | 3/1999 |
| JP | 11-119911 A | 4/1999 |
| JP | 2000-163031 A | 6/2000 |
| JP | 2001-290585 A | 10/2001 |

* cited by examiner

EXAMPLE 1 (PARALLEL DIRECTION)

EXAMPLE 2 (INWARD DIRECTION)

EXAMPLE 3 (OUTWARD DIRECTION)

TABLE STORING POSITION DATA

POSITION COORDINATE DATA AT POINT A

| | X | Y |
|---|---|---|
| $t_1$ | 3 | 3 |
| $t_2$ | 4 | 3.5 |
| $t_3$ | 5 | 4 |
| $t_4$ | 6 | 4.5 |
| $t_5$ | 7 | 5 |

POSITION COORDINATE DATA AT POINT B

| | X | Y |
|---|---|---|
| $t_1$ | 12 | 14 |
| $t_2$ | 11 | 12.5 |
| $t_3$ | 10 | 11 |
| $t_4$ | 9 | 10 |
| $t_5$ | 8 | 9 |

CURRENT DESIGNATED
POSITION DATA (AT $t_6$)

|   | X | Y |
|---|---|---|
| a | 8 | 6 |
| b | 8 | 8 |

CURRENT DESIGNATED POSITION DATA
| | X | Y |
|---|---|---|
| a | 8 | 6 |
| b | 8 | 8 |
901
FIG. 9A
DISTANCE TO IMMEDIATELY PRECEDING DESIGNATED POSITION  902
| | X | Y | DISTANCE TO DESIGNATED POSITION A | DISTANCE TO DESIGNATED POSITION B |
|---|---|---|---|---|
| a | 8 | 6 | 1.414 | 4.123 |
| b | 8 | 8 | 3.601 | 1.000 |
FIG. 9B
DESIGNATED POSITION DATA AT EACH TIME POINT
903
| | X | Y |
|---|---|---|
| $t_1$ | 3 | 3 |
| $t_2$ | 4 | 3.5 |
| $t_3$ | 5 | 4 |
| $t_4$ | 6 | 4.5 |
| $t_5$ | 7 | 5 |
| $t_6$ | 8 | 6 |
904
| | X | Y |
|---|---|---|
| $t_1$ | 12 | 14 |
| $t_2$ | 11 | 12.5 |
| $t_3$ | 10 | 11 |
| $t_4$ | 9 | 10 |
| $t_5$ | 8 | 9 |
| $t_6$ | 8 | 8 |
FIG. 9C      FIG. 9D

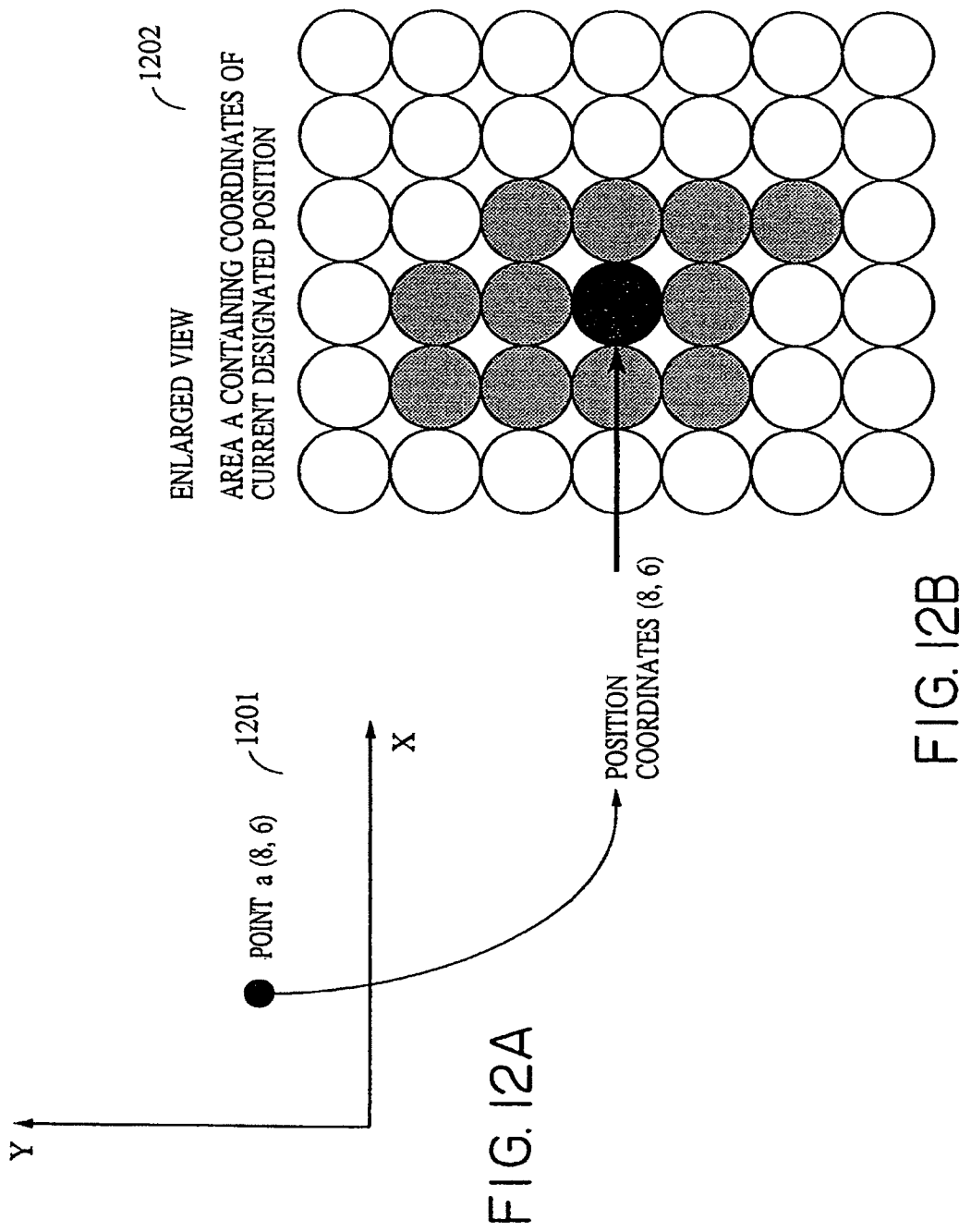

TABLES STORING DESIGNATED AREA DATA

AREA DATA AT POINT A — 1302

|  | X | Y | AREA |
|---|---|---|---|
| $t_1$ | 3 | 3 | 12.5 |
| $t_2$ | 4 | 3.5 | 12.2 |
| $t_3$ | 5 | 4 | 12.5 |
| $t_4$ | 6 | 4.5 | 12.0 |
| $t_5$ | 7 | 5 | 11.0 |

AREA DATA AT POINT B — 1303

|  | X | Y | AREA |
|---|---|---|---|
| $t_1$ | 12 | 14 | 19.5 |
| $t_2$ | 11 | 12.5 | 19.5 |
| $t_3$ | 10 | 11 | 20.0 |
| $t_4$ | 9 | 10 | 20.0 |
| $t_5$ | 8 | 9 | 20.0 |

CURRENT DESIGNATED AREA DATA (AT $t_6$)

— 1304

|  | X | Y | AREA |
|---|---|---|---|
| a | 8 | 6 | 11.5 |
| b | 8 | 8 | 20.0 |

CURRENT AREA DATA (AT $t_6$) — 1401
|   | X | Y | AREA |
|---|---|---|------|
| a | 8 | 6 | 11.5 |
| b | 8 | 8 | 20.0 |
FIG. 14A
DIFFERENCE BETWEEN CURRENT AND IMMEDIATELY
PRECEDING DESIGNATED AREAS — 1402
|   | X | Y | AREA | DIFFERENCE FROM DESIGNATED AREA A | DIFFERENCE FROM DESIGNATED AREA B |
|---|---|---|------|-----------------------------------|-----------------------------------|
| a | 8 | 6 | 11.5 | 0.5 | 9.0 |
| b | 8 | 8 | 20.0 | 9.0 | 0.5 |
FIG. 14B
TABLES STORING DESIGNATED AREA DATA
1403
|       | X | Y   | AREA |
|-------|---|-----|------|
| $t_1$ | 3 | 3   | 12.5 |
| $t_2$ | 4 | 3.5 | 12.2 |
| $t_3$ | 5 | 4   | 12.5 |
| $t_4$ | 6 | 4.5 | 12.0 |
| $t_5$ | 7 | 5   | 11.0 |
| $t_6$ | 8 | 6   | 11.5 |
FIG. 14C
1404
|       | X  | Y    | AREA |
|-------|----|------|------|
| $t_1$ | 12 | 14   | 19.5 |
| $t_2$ | 11 | 12.5 | 19.5 |
| $t_3$ | 10 | 11   | 20.0 |
| $t_4$ | 9  | 10   | 20.0 |
| $t_5$ | 8  | 9    | 20.0 |
| $t_6$ | 8  | 8    | 20.5 |
FIG. 14D

EFFECTIVE MAGNIFICATION = 100−(100−OPERATIONAL MAGNIFICATION)×
RAGE OF CHANGE α

CONTRACTION OPERATION
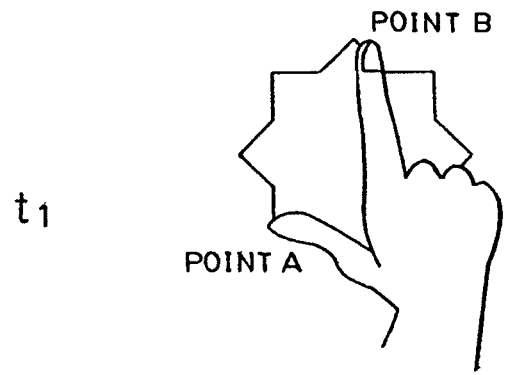
$t_1$
FIG. 20A

DISTANCE BETWEEN DESIGNATED POSITIONS A AND B, AND AMOUNT OF CHANGE

|  | DISTANCE BETWEEN A AND B | MAGNIFICATION (DISTANCE $t_n$/DISTANCE $t_1$) |
|---|---|---|
| $t_1$ | 15.000 | 100% |
| $t_2$ | 11.011 | 73% |
| $t_3$ | 7.810 | 52% |
| $t_4$ | 3.905 | 26% |
| $t_5$ | 1.118 | 7% |

EXPANSION OPERATION
$t_1$
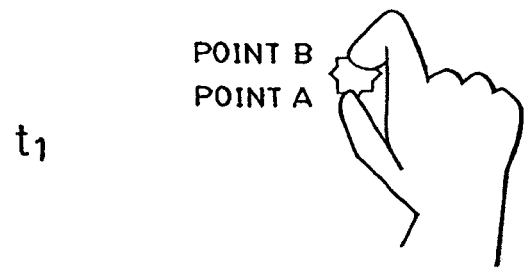
FIG. 22A
$t_n$
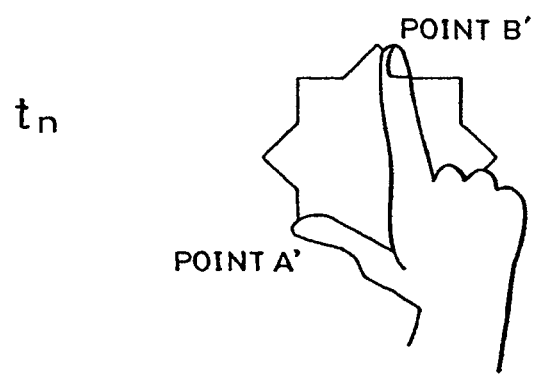
FIG. 22B

DISTANCE BETWEEN DESIGNATED POSITIONS A AND B, AND AMOUNT OF CHANGE

|     | DISTANCE BETWEEN A AND B | MAGNIFICATION (DISTANCE $t_n$/DISTANCE $t_1$) |
| --- | --- | --- |
| $t_1$ | 1.118 | 100% |
| $t_2$ | 4.081 | 365% |
| $t_3$ | 7.080 | 633% |
| $t_4$ | 9.552 | 854% |
| $t_5$ | 11.402 | 1020% |

CW ROTATION
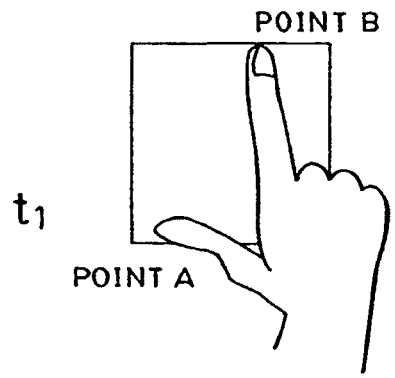
FIG. 27A
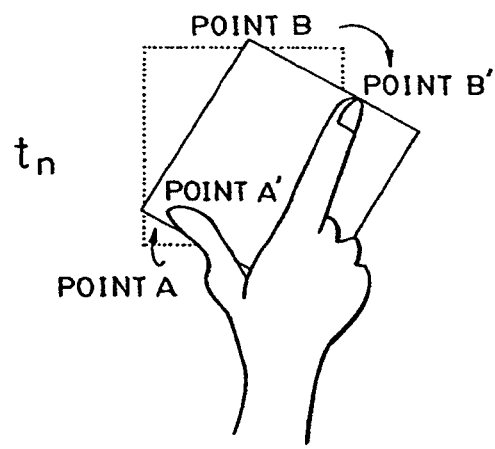
FIG. 27B

ANGLE OF DESIGNATED POSITIONS A AND B, AND AMOUNT OF CHANGE

| | ANGLE OF LINE AB | AMOUNT OF CHANGE ($t_n - t_1$) |
|---|---|---|
| $t_1$ | 60 | 0 |
| $t_2$ | 49 | -11 |
| $t_3$ | 40 | -20 |
| $t_4$ | 33 | -27 |
| $t_5$ | 26 | -34 |

2802

CCW ROTATION
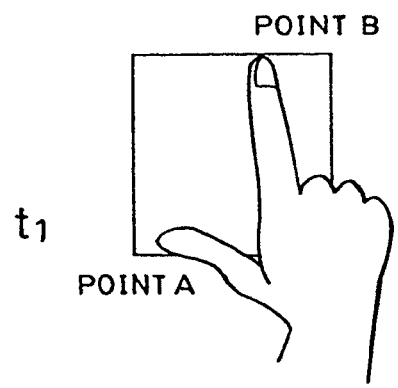
FIG. 29A
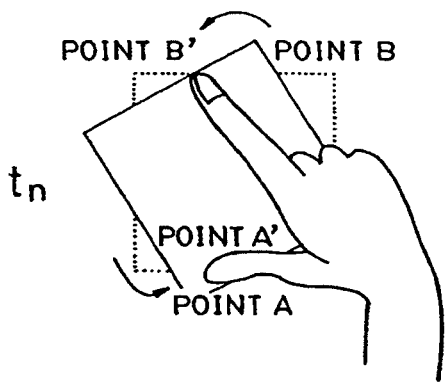
FIG. 29B

ANGLE OF DESIGNATED POSITIONS A AND B, AND AMOUNT OF CHANGE

| | ANGLE OF LINE AB | AMOUNT OF CHANGE ($t_n - t_1$) |
|---|---|---|
| $t_1$ | 60 | 0 |
| $t_2$ | 65 | 5 |
| $t_3$ | 70 | 10 |
| $t_4$ | 80 | 20 |
| $t_5$ | 87 | 27 |

LEFTWARD TRAVEL

DESIGNATED FIXED POSITION
POSITION DATA OF POINT A

|    | $A_X$ | $A_Y$ |
|----|-------|-------|
| $t_1$ | 3 | 3 |
| $t_2$ | 3 | 3 |
| $t_3$ | 3 | 3 |
| $t_4$ | 3 | 3 |
| $t_5$ | 3 | 3 |

DESIGNATED MOVING POSITION
POSITION DATA OF POINT B

|    | $B_X$ | $B_Y$ |
|----|-------|-------|
| $t_1$ | 6.0 | 3.0 |
| $t_2$ | 5.3 | 2.3 |
| $t_3$ | 4.7 | 1.7 |
| $t_4$ | 4.3 | 1.2 |
| $t_5$ | 4.0 | 2.0 |

DESIGNATED POSITION TRAVEL DATA

|    | TRAVEL OF POINT A | TRAVEL OF POINT B | DIRECTION OF TRAVEL (DEGREES) |
|----|-------------------|-------------------|-------------------------------|
| $t_1$ | 0.000 | 0.000 | -153.43 |
| $t_2$ | 0.000 | 0.000 | -153.43 |
| $t_3$ | 0.000 | 1.862 | -153.43 |
| $t_4$ | 0.000 | 2.453 | -153.43 |
| $t_5$ | 0.000 | 2.236 | 153.43 |

UPWARD TRAVEL
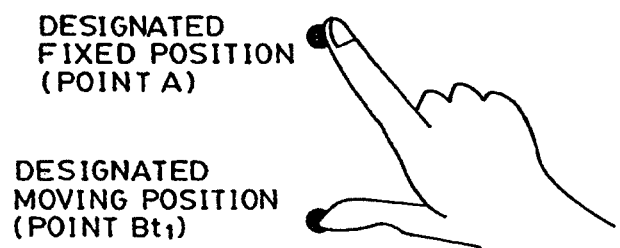
FIG. 38A
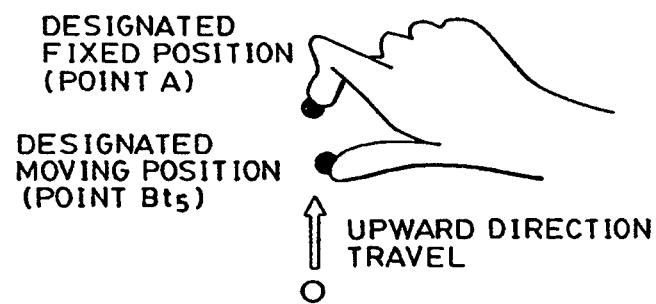
FIG. 38B

DESIGNATED FIXED POSITION
POSITION DATA OF POINT A

|     | $A_X$ | $A_Y$ |
|-----|-------|-------|
| $t_1$ | 6 | 6 |
| $t_2$ | 6 | 6 |
| $t_3$ | 6 | 6 |
| $t_4$ | 6 | 6 |
| $t_5$ | 6 | 6 |

DESIGNATED MOVING POSITION
POSITION DATA OF POINT B

|     | $B_X$ | $B_Y$ |
|-----|-------|-------|
| $t_1$ | 5.0 | 1.0 |
| $t_2$ | 5.6 | 1.8 |
| $t_3$ | 6.0 | 2.3 |
| $t_4$ | 6.6 | 3.5 |
| $t_5$ | 7.0 | 4.0 |

DESIGNATED POSITION TRAVEL DATA

|     | TRAVEL OF POINT A | TRAVEL OF POINT B | DIRECTION OF TRAVEL |
|-----|-------------------|-------------------|---------------------|
| $t_1$ | 0.000 | 0.000 | 0.00 |
| $t_2$ | 0.000 | 1.000 | 53.13 |
| $t_3$ | 0.000 | 1.640 | 52.43 |
| $t_4$ | 0.000 | 2.968 | 57.38 |
| $t_5$ | 0.000 | 3.606 | 56.31 |

DOWNWARD TRAVEL
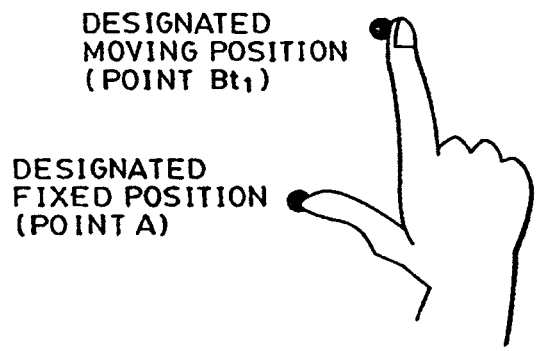
FIG. 40A
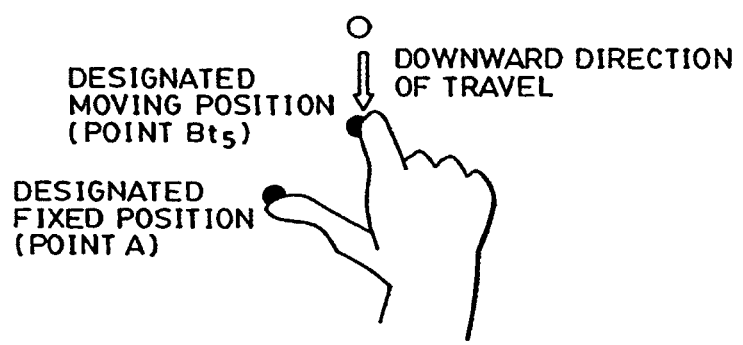
FIG. 40B

DESIGNATED FIXED POSITION
POSITION DATA OF POINT A

|    | $A_X$ | $A_Y$ |
|----|-------|-------|
| $t_1$ | 3 | 3 |
| $t_2$ | 3 | 3 |
| $t_3$ | 3 | 3 |
| $t_4$ | 3 | 3 |
| $t_5$ | 3 | 3 |

DESIGNATED MOVING POSITION
POSITION DATA OF POINT B

|    | $B_X$ | $B_Y$ |
|----|-------|-------|
| $t_1$ | 5.0 | 8.0 |
| $t_2$ | 5.0 | 7.2 |
| $t_3$ | 5.0 | 6.5 |
| $t_4$ | 5.0 | 5.6 |
| $t_5$ | 5.0 | 5.0 |

DESIGNATED POSITION TRAVEL DATA

|    | TRAVEL OF POINT A | TRAVEL OF POINT B | DIRECTION OF TRAVEL |
|----|-------------------|-------------------|---------------------|
| $t_1$ | 0.000 | 0.000 | 0.00 |
| $t_2$ | 0.000 | 0.800 | -90.00 |
| $t_3$ | 0.000 | 1.500 | -90.00 |
| $t_4$ | 0.000 | 2.400 | -90.00 |
| $t_5$ | 0.000 | 3.000 | -90.00 |

RIGHTWARD TRAVEL
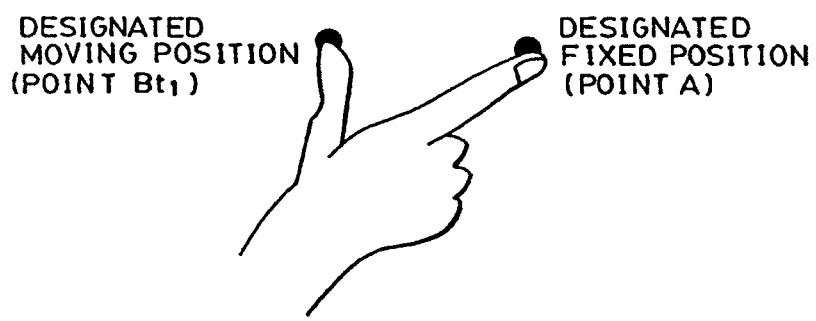
FIG. 42A
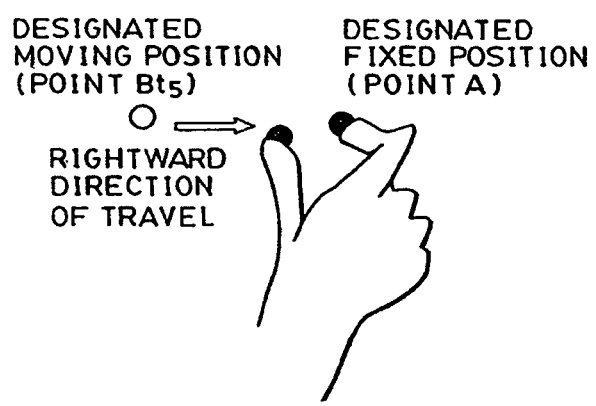
FIG. 42B

DESIGNATED FIXED POSITION
POSITION DATA OF POINT A

|  | $A_X$ | $A_Y$ |
|---|---|---|
| $t_1$ | 6 | 6 |
| $t_2$ | 6 | 6 |
| $t_3$ | 6 | 6 |
| $t_4$ | 6 | 6 |
| $t_5$ | 6 | 6 |

DESIGNATED MOVING POSITION
POSITION DATA OF POINT B

|  | $B_X$ | $B_Y$ |
|---|---|---|
| $t_1$ | 2.0 | 6.0 |
| $t_2$ | 2.8 | 5.7 |
| $t_3$ | 3.5 | 5.6 |
| $t_4$ | 4.2 | 5.2 |
| $t_5$ | 5.0 | 5.0 |

4302

DESIGNATED POSITION TRAVEL DATA 4303

|  | TRAVEL OF POINT A | TRAVEL OF POINT B | DIRECTION OF TRAVEL |
|---|---|---|---|
| $t_1$ | 0.000 | 0.000 | 0.00 |
| $t_2$ | 0.000 | 4.892 | -40.86 |
| $t_3$ | 0.000 | 4.383 | -34.78 |
| $t_4$ | 0.000 | 3.672 | -29.36 |
| $t_5$ | 0.000 | 3.162 | -18.43 |

CONTRACTION OPERATION

DESIGNATED FIXED POSITION
POSITION DATA OF POINT A

|     | Ax | Ay |
|-----|----|----|
| t₁  | 3  | 3  |
| t₂  | 3  | 3  |
| t₃  | 3  | 3  |
| t₄  | 3  | 3  |
| t₅  | 3  | 3  |

DESIGNATED MOVING POSITION
POSITION DATA OF POINT B

|     | Bx  | By  |
|-----|-----|-----|
| t₁  | 6.0 | 3.0 |
| t₂  | 5.3 | 2.3 |
| t₃  | 4.7 | 1.7 |
| t₄  | 4.3 | 1.2 |
| t₅  | 4.0 | 2.0 |

4702

DATA OF CHANGE IN DESIGNATED-POSITION-TO-POSITION DISTANCE 4703

|     | DISTANCE BETWEEN A AND B | MAGNIFICATION (DISTANCE $t_n$/DISTANCE $t_1$) | DISTANCE $t_n$/DISTANCE $t_1$ |
|-----|--------------------------|-----------------------------------------------|-------------------------------|
| t₁  | 3.000                    | 100%                                          | 0.000                         |
| t₂  | 2.436                    | 81%                                           | -0.564                        |
| t₃  | 2.114                    | 70%                                           | -0.886                        |
| t₄  | 2.240                    | 75%                                           | -0.760                        |
| t₅  | 1.414                    | 47%                                           | -1.586                        |

EXPANSION OPERATION

DESIGNATED FIXED POSITION
POSITION DATA OF POINT A

| | $A_X$ | $A_Y$ |
|---|---|---|
| $t_1$ | 3 | 3 |
| $t_2$ | 3 | 3 |
| $t_3$ | 3 | 3 |
| $t_4$ | 3 | 3 |
| $t_5$ | 3 | 3 |

DESIGNATED MOVING POSITION
POSITION DATA OF POINT B

| | $B_X$ | $B_Y$ |
|---|---|---|
| $t_1$ | 4.0 | 2.0 |
| $t_2$ | 4.5 | 2.2 |
| $t_3$ | 5.2 | 2.5 |
| $t_4$ | 5.8 | 2.8 |
| $t_5$ | 6.0 | 3.0 |

4902

DATA OF CHANGE IN DESIGNATED POSITION-TO-POSITION DISTANCE

| | DISTANCE BETWEEN A AND B | MAGNIFICATION (DISTANCE $t_n$ / DISTANCE $t_1$) |
|---|---|---|
| $t_1$ | 1.414 | 100% |
| $t_2$ | 1.700 | 120% |
| $t_3$ | 2.256 | 160% |
| $t_4$ | 2.807 | 198% |
| $t_5$ | 3.000 | 212% |

4903

CONTRACTION OPERATION
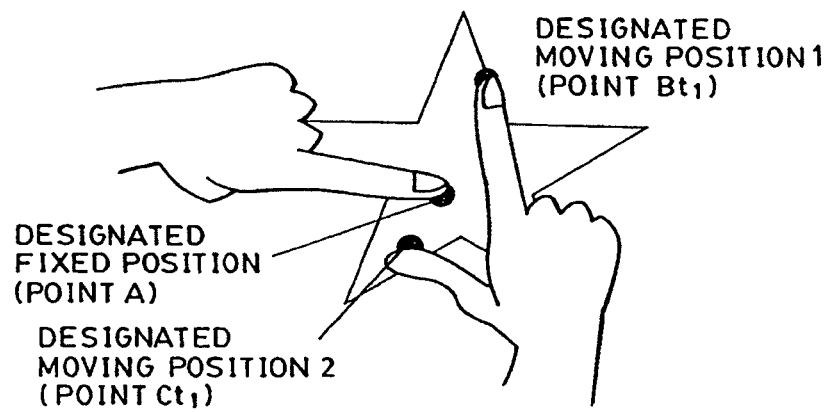
FIG. 50A
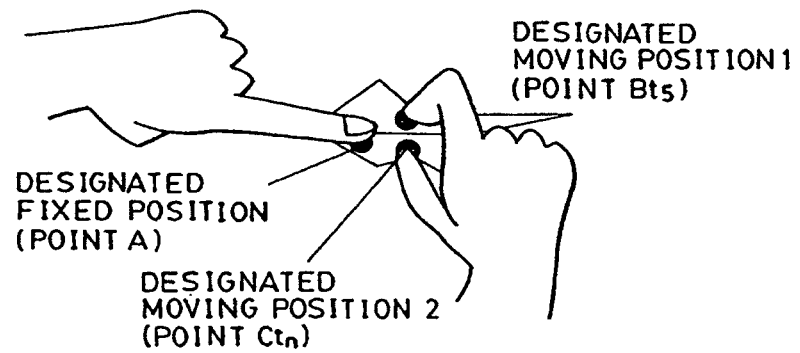
FIG. 50B

FIG. 51B

DESIGNATED FIXED POSITION
POSITION DATA OF POINT A

|     | $A_X$ | $A_Y$ |
|-----|-------|-------|
| $t_1$ | 3 | 3 |
| $t_2$ | 3 | 3 |
| $t_3$ | 3 | 3 |
| $t_4$ | 3 | 3 |
| $t_5$ | 3 | 3 |

FIG. 51C

DESIGNATED MOVING POSITION 1
POSITION DATA OF POINT B

|     | $B_X$ | $B_Y$ |
|-----|-------|-------|
| $t_1$ | 4.0 | 8.0 |
| $t_2$ | 4.2 | 7.2 |
| $t_3$ | 4.4 | 6.3 |
| $t_4$ | 4.7 | 5.8 |
| $t_5$ | 5.0 | 5.0 |

FIG. 51D

DESIGNATED MOVING POSITION 2
POSITION DATA OF POINT C — 5102

|     | $C_X$ | $C_Y$ |
|-----|-------|-------|
| $t_1$ | 2.0 | 2.0 |
| $t_2$ | 2.8 | 2.3 |
| $t_3$ | 3.4 | 2.8 |
| $t_4$ | 3.8 | 3.3 |
| $t_5$ | 4.0 | 3.5 |

FIG. 51E

DATA 1 OF CHANGE IN DESIGNATED
POSITION-TO-POSITION DISTANCE

|     | DISTANCE BETWEEN A AND B | MAGNIFICATION (DISTANCE $t_n$ / DISTANCE $t_1$) |
|-----|--------------------------|-------------------------------------------------|
| $t_1$ | 5.099 | 100% |
| $t_2$ | 4.368 | 86% |
| $t_3$ | 3.585 | 70% |
| $t_4$ | 3.276 | 64% |
| $t_5$ | 2.828 | 55% |

FIG. 51F

DATA 2 OF CHANGE IN DESIGNATED
POSITION-TO-POSITION DISTANCE — 5103

|     | DISTANCE BETWEEN A AND B | MAGNIFICATION (DISTANCE $t_n$ / DISTANCE $t_1$) |
|-----|--------------------------|-------------------------------------------------|
| $t_1$ | 1.414 | 100% |
| $t_2$ | 0.728 | 51% |
| $t_3$ | 0.447 | 32% |
| $t_4$ | 0.854 | 60% |
| $t_5$ | 1.118 | 79% |

CONTRACTION OPERATION
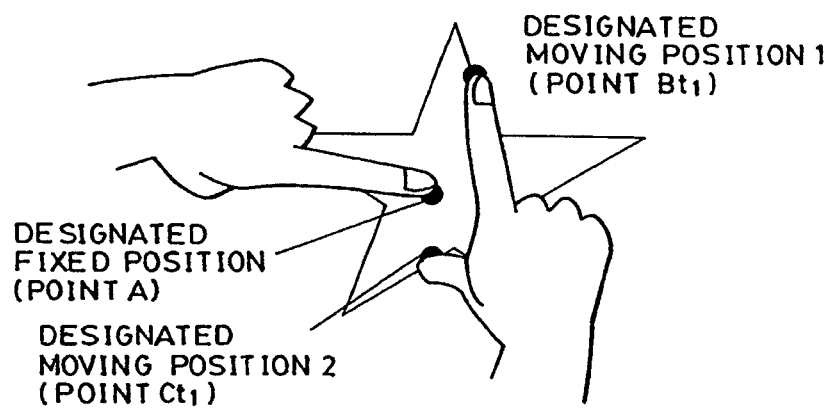
FIG. 54A
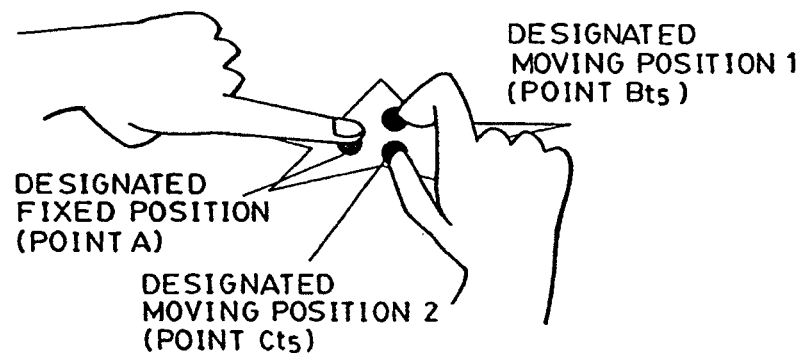
FIG. 54B

FIG. 55B DESIGNATED FIXED POSITION POSITION DATA OF POINT A

FIG. 55C DESIGNATED MOVING POSITION POSITION DATA OF POINT B

FIG. 55D DESIGNATED MOVING POSITION POSITION DATA OF POINT C

FIG. 55E DATA OF CHANGE IN DESIGNATED POSITION-TO-POSITION DISTANCE

CONTRACTION OPERATION

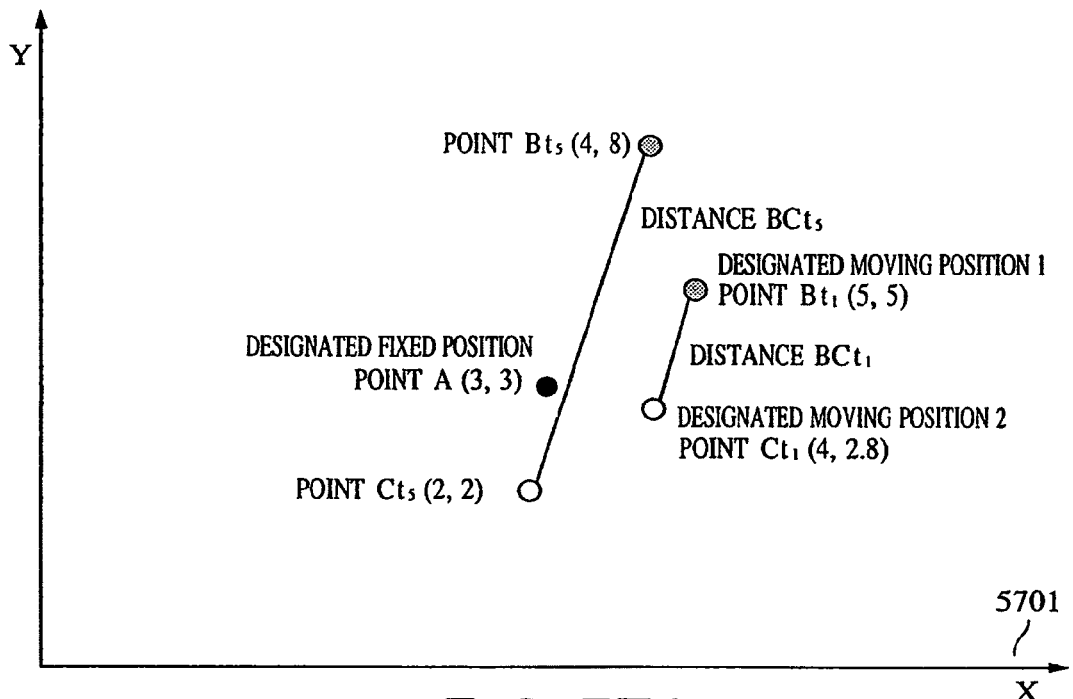

FIG. 57A

DESIGNATED FIXED POSITION
POSITION DATA OF POINT A

|     | $A_X$ | $A_Y$ |
|-----|-------|-------|
| $t_1$ | 3 | 3 |
| $t_2$ | 3 | 3 |
| $t_3$ | 3 | 3 |
| $t_4$ | 3 | 3 |
| $t_5$ | 3 | 3 |

FIG. 57B

DESIGNATED MOVING POSITION 1
POSITION DATA OF POINT B

|     | $B_X$ | $B_Y$ |
|-----|-------|-------|
| $t_1$ | 5.0 | 5.0 |
| $t_2$ | 4.7 | 5.8 |
| $t_3$ | 4.4 | 6.3 |
| $t_4$ | 4.2 | 7.2 |
| $t_5$ | 4.0 | 8.0 |

FIG. 57C

DESIGNATED MOVING POSITION 2
POSITION DATA OF POINT C

|     | $C_X$ | $C_Y$ |
|-----|-------|-------|
| $t_1$ | 4.0 | 2.8 |
| $t_2$ | 3.8 | 2.6 |
| $t_3$ | 3.4 | 2.4 |
| $t_4$ | 2.8 | 2.2 |
| $t_5$ | 2.0 | 2.0 |

FIG. 57D

DATA OF CHANGE IN DESIGNATED
POSITION-TO-POSITION DISTANCE

|     | DISTANCE BETWEEN B AND C | MAGNIFICATION (DISTANCE $t_n$ / DISTANCE $t_1$) |
|-----|--------------------------|------------------------------------------------|
| $t_1$ | 2.417 | 100% |
| $t_2$ | 3.324 | 138% |
| $t_3$ | 4.026 | 167% |
| $t_4$ | 5.192 | 215% |
| $t_5$ | 6.325 | 262% |

FIG. 57E

DESIGNATING A PLURALITY OF MOVING POINTS

FIG. 59B — DESIGNATED FIXED POSITION POSITION DATA OF POINT A

| | $A_X$ | $A_Y$ |
|---|---|---|
| $t_1$ | 3 | 3 |
| $t_2$ | 3 | 3 |
| $t_3$ | 3 | 3 |
| $t_4$ | 3 | 3 |
| $t_5$ | 3 | 3 |

FIG. 59C — DESIGNATED MOVING POSITION POSITION DATA OF POINT B

| | $B_X$ | $B_Y$ |
|---|---|---|
| $t_1$ | 5.0 | 5.0 |
| $t_2$ | 4.7 | 5.8 |
| $t_3$ | 4.4 | 6.3 |
| $t_4$ | 4.2 | 7.2 |
| $t_5$ | 4.0 | 8.0 |

FIG. 59D — DESIGNATED MOVING POSITION POSITION DATA OF POINT C

| | $C_X$ | $C_Y$ |
|---|---|---|
| $t_1$ | 4.0 | 3.5 |
| $t_2$ | 3.8 | 3.3 |
| $t_3$ | 3.4 | 2.8 |
| $t_4$ | 2.8 | 2.3 |
| $t_5$ | 2.0 | 2.0 |

FIG. 59E — DESIGNATED MOVING POSITION POSITION DATA OF POINT D — 5902

| | $D_X$ | $D_Y$ |
|---|---|---|
| $t_1$ | 5.5 | 4.5 |
| $t_2$ | 5.6 | 6.0 |
| $t_3$ | 5.8 | 7.0 |
| $t_4$ | 5.9 | 8.0 |
| $t_5$ | 6.0 | 9.0 |

FIG. 59F — DATA 1 OF CHANGE IN DESIGNATED POSITION-TO-POSITION DISTANCE

| | DISTANCE BETWEEN B AND C | MAGNIFICATION (DISTANCE $t_n$ / DISTANCE $t_1$) |
|---|---|---|
| $t_1$ | 1.803 | 100% |
| $t_2$ | 2.657 | 147% |
| $t_3$ | 3.640 | 202% |
| $t_4$ | 5.096 | 283% |
| $t_5$ | 6.325 | 351% |

FIG. 59G — DATA 2 OF CHANGE IN DESIGNATED POSITION-TO-POSITION DISTANCE

| | DISTANCE BETWEEN B AND D | MAGNIFICATION (DISTANCE $t_n$ / DISTANCE $t_1$) |
|---|---|---|
| $t_1$ | 0.707 | 100% |
| $t_2$ | 0.922 | 130% |
| $t_3$ | 1.565 | 221% |
| $t_4$ | 1.879 | 266% |
| $t_5$ | 2.236 | 316% |

FIG. 59H — DATA 3 OF CHANGE IN DESIGNATED POSITION-TO-POSITION DISTANCE — 5903

| | DISTANCE BETWEEN C AND D | MAGNIFICATION (DISTANCE $t_n$ / DISTANCE $t_1$) |
|---|---|---|
| $t_1$ | 1.803 | 100% |
| $t_2$ | 3.245 | 180% |
| $t_3$ | 4.837 | 268% |
| $t_4$ | 6.488 | 360% |
| $t_5$ | 8.062 | 447% |

CW ROTATION OPERATION

DESIGNATED FIXED POSITION
POSITION DATA OF POINT A

|    | Ax | Ay |
|----|----|----|
| t₁ | 3  | 3  |
| t₂ | 3  | 3  |
| t₃ | 3  | 3  |
| t₄ | 3  | 3  |
| t₅ | 3  | 3  |

DESIGNATED MOVING POSITION
POSITION DATA OF POINT B

|    | Bx  | By  |
|----|-----|-----|
| t₁ | 4.0 | 6.0 |
| t₂ | 4.7 | 5.7 |
| t₃ | 5.2 | 5.3 |
| t₄ | 5.7 | 4.6 |
| t₅ | 6.0 | 4.0 |

DATA OF CHANGE IN ANGLE OF DESIGNATED POSITIONS

|    | ANGLE OF DESIGNATED POSITIONS | AMOUNT OF CHANGE |
|----|-------------------------------|------------------|
| t₁ | 71.57                         | 0.00             |
| t₂ | 57.57                         | -14.00           |
| t₃ | 45.91                         | -25.66           |
| t₄ | 30.67                         | -40.90           |
| t₅ | 18.43                         | -53.13           |

CCW ROTATION OPERATION
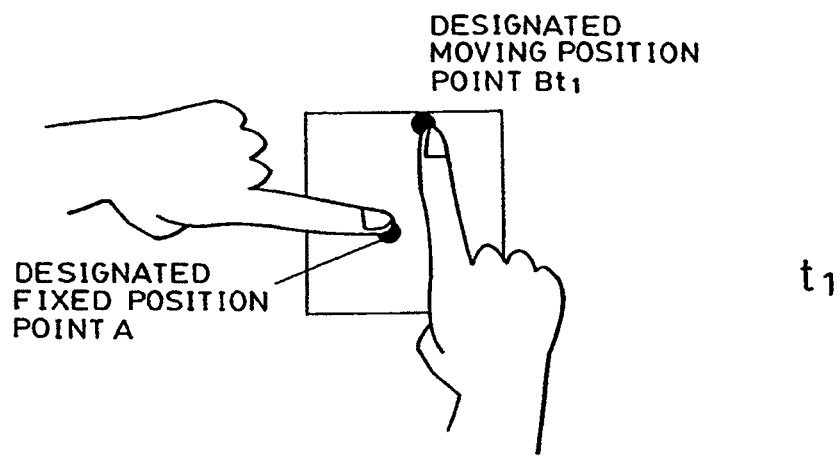
FIG. 64A    $t_1$
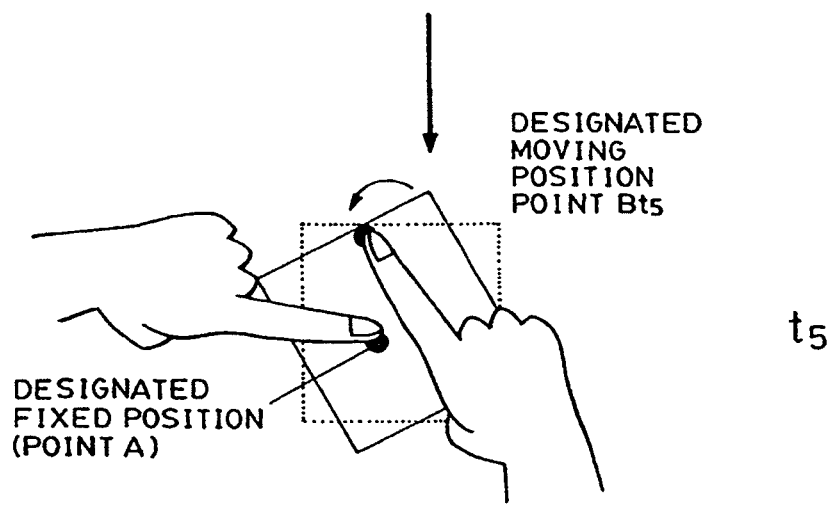
FIG. 64B    $t_5$

DESIGNATED FIXED POSITION
POSITION DATA OF POINT A

|  | $A_X$ | $A_Y$ |
|---|---|---|
| $t_1$ | 3 | 3 |
| $t_2$ | 3 | 3 |
| $t_3$ | 3 | 3 |
| $t_4$ | 3 | 3 |
| $t_5$ | 3 | 3 |

DESIGNATED MOVING POSITION
POSITION DATA OF POINT B

|  | $B_X$ | $B_Y$ |
|---|---|---|
| $t_1$ | 4.0 | 6.0 |
| $t_2$ | 3.5 | 6.1 |
| $t_3$ | 3.0 | 6.2 |
| $t_4$ | 2.5 | 6.1 |
| $t_5$ | 2.0 | 6.0 |

DATA OF CHANGE IN ANGLE OF DESIGNATED POSITIONS

|  | ANGLE OF DESIGNATED FIXED POSITIONS | AMOUNT OF CHANGE |
|---|---|---|
| $t_1$ | 71.57 | 0.00 |
| $t_2$ | 80.90 | 9.34 |
| $t_3$ | 90.00 | 18.43 |
| $t_4$ | 99.10 | 27.53 |
| $t_5$ | 108.43 | 36.87 |

CW ROTATION OPERATION

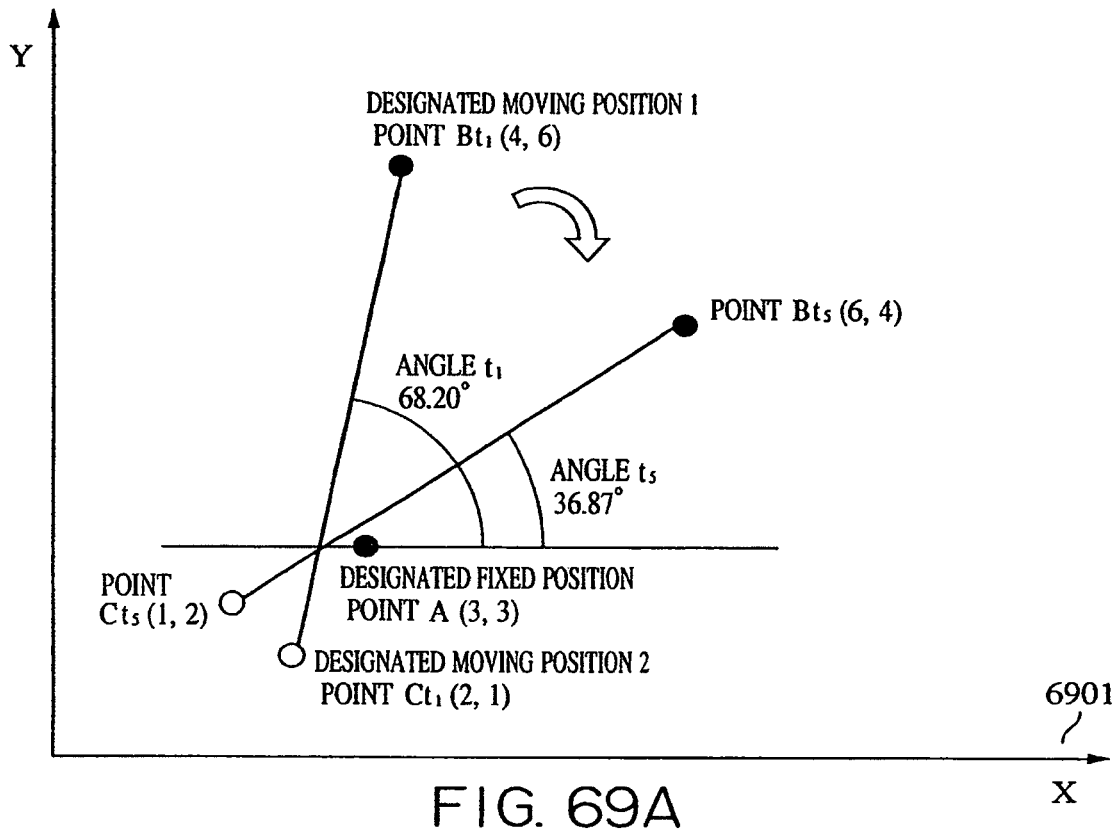

CCW ROTATION OPERATION

ROTATION OPERATION ABOUT THE CENTER OF GRAVITY OF DESIGNATED MOVING POSITION

FIG. 73B — DESIGNATED FIXED POSITION POSITION DATA OF POINT A

| | $A_X$ | $A_Y$ |
|---|---|---|
| $t_1$ | 3 | 3 |
| $t_2$ | 3 | 3 |
| $t_3$ | 3 | 3 |
| $t_4$ | 3 | 3 |
| $t_5$ | 3 | 3 |

FIG. 73C — DESIGNATED MOVING POSITION POSITION DATA OF POINT B

| | $B_X$ | $B_Y$ |
|---|---|---|
| $t_1$ | 5.0 | 5.0 |
| $t_2$ | 4.7 | 5.8 |
| $t_3$ | 4.4 | 6.3 |
| $t_4$ | 4.2 | 7.2 |
| $t_5$ | 4.0 | 8.0 |

FIG. 73D — DESIGNATED MOVING POSITION POSITION DATA OF POINT C

| | $C_X$ | $C_Y$ |
|---|---|---|
| $t_1$ | 4.0 | 3.5 |
| $t_2$ | 3.8 | 3.3 |
| $t_3$ | 3.4 | 2.8 |
| $t_4$ | 2.8 | 2.3 |
| $t_5$ | 2.0 | 2.0 |

FIG. 73E — DESIGNATED MOVING POSITION POSITION DATA OF POINT D (7302)

| | $D_X$ | $D_Y$ |
|---|---|---|
| $t_1$ | 5.5 | 4.5 |
| $t_2$ | 5.6 | 6.0 |
| $t_3$ | 5.8 | 7.0 |
| $t_4$ | 5.9 | 8.0 |
| $t_5$ | 6.0 | 9.0 |

FIG. 73F — DATA OF CHANGE IN DESIGNATED POSITION-TO-POSITION DISTANCE

| | DISTANCE BETWEEN B AND C | MAGNIFICATION (DISTANCE $t_n$ / DISTANCE $t_1$) |
|---|---|---|
| $t_1$ | 1.803 | 100% |
| $t_2$ | 2.657 | 147% |
| $t_3$ | 3.640 | 202% |
| $t_4$ | 5.096 | 283% |
| $t_5$ | 6.325 | 351% |

FIG. 73G — DATA OF CHANGE IN DESIGNATED POSITION-TO-POSITION DISTANCE

| | DISTANCE BETWEEN B AND D | MAGNIFICATION (DISTANCE $t_n$ / DISTANCE $t_1$) |
|---|---|---|
| $t_1$ | 0.707 | 100% |
| $t_2$ | 0.922 | 130% |
| $t_3$ | 1.565 | 221% |
| $t_4$ | 1.879 | 266% |
| $t_5$ | 2.236 | 316% |

FIG. 73H — DATA OF CHANGE IN DESIGNATED POSITION-TO-POSITION DISTANCE (7303)

| | DISTANCE BETWEEN C AND D | MAGNIFICATION (DISTANCE $t_n$ / DISTANCE $t_1$) |
|---|---|---|
| $t_1$ | 1.803 | 100% |
| $t_2$ | 3.245 | 180% |
| $t_3$ | 4.837 | 268% |
| $t_4$ | 6.488 | 360% |
| $t_5$ | 8.062 | 447% |

FIG. 78B — DESIGNATED POSITION POSITION DATA OF POINT A

|  | $A_X$ | $A_Y$ |
|---|---|---|
| $t_1$ | 4.0 | 5.0 |
| $t_2$ | 5.0 | 5.0 |
| $t_3$ | 6.0 | 5.0 |
| $t_4$ | 7.0 | 5.0 |
| $t_5$ | 8.0 | 5.0 |

FIG. 78C — DESIGNATED POSITION POSITION DATA OF POINT B

|  | $B_X$ | $B_Y$ |
|---|---|---|
| $t_1$ | 3.0 | 8.0 |
| $t_2$ | 4.0 | 8.0 |
| $t_3$ | 5.0 | 8.0 |
| $t_4$ | 6.0 | 8.0 |
| $t_5$ | 7.0 | 8.0 |

FIG. 78D — POSITION DATA OF DESIGNATED POSITIONS

|  | ANGLE OF DESIGNATED POSITIONS |
|---|---|
| $t_1$ | 108.43 |
| $t_2$ | 108.43 |
| $t_3$ | 108.43 |
| $t_4$ | 108.43 |
| $t_5$ | 108.43 |

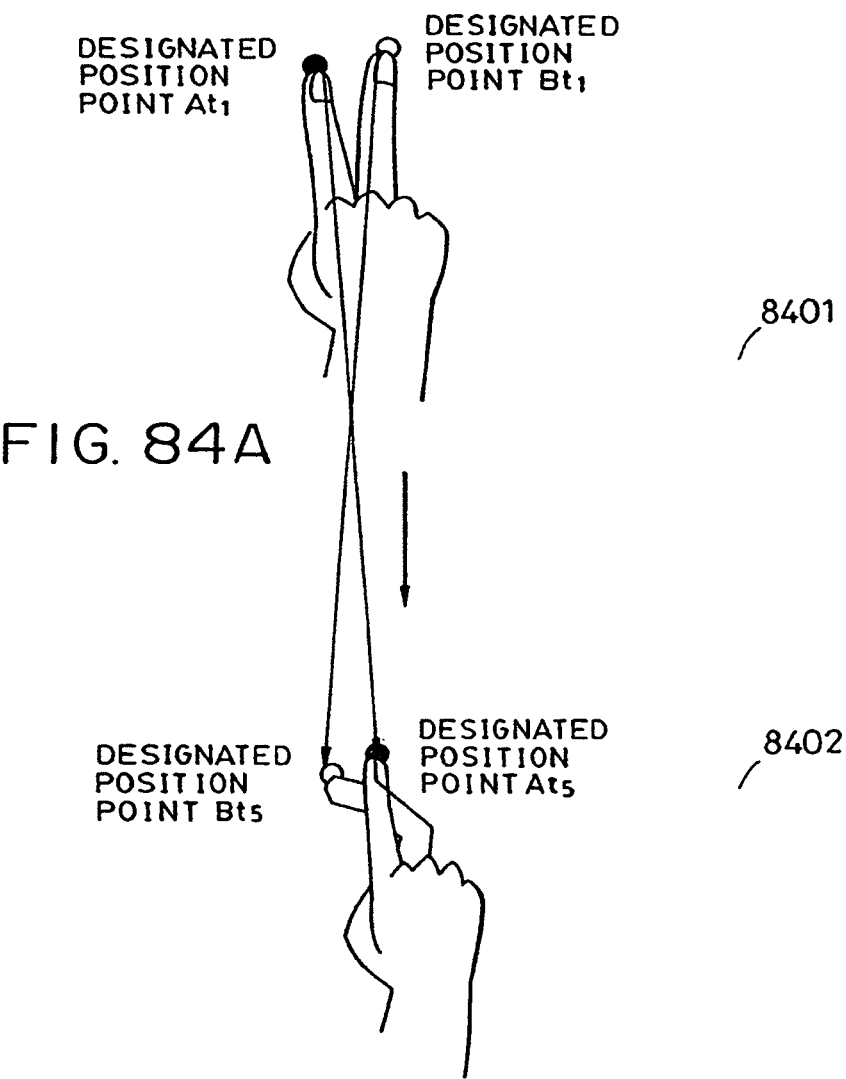
FIG. 84A / FIG. 84B — REVERSAL OPERATION

DESIGNATED POSITION
POSITION DATA OF POINT A

|  | $A_X$ | $A_Y$ |
|---|---|---|
| $t_1$ | 4.0 | 10.0 |
| $t_2$ | 5.0 | 8.0 |
| $t_3$ | 6.0 | 6.0 |
| $t_4$ | 7.0 | 5.0 |
| $t_5$ | 8.0 | 4.0 |

DESIGNATED POSITION
POSITION DATA OF POINT B

|  | $B_X$ | $B_Y$ |
|---|---|---|
| $t_1$ | 8.0 | 11.0 |
| $t_2$ | 7.0 | 9.0 |
| $t_3$ | 6.0 | 7.0 |
| $t_4$ | 5.0 | 5.0 |
| $t_5$ | 4.0 | 3.0 |

DATA OF CHANGE IN POSITIONAL RELATIONSHIP

|  | X DIRECTION | Y DIRECTION | ANGLE OF DESIGNATED POSITIONS | CHANGE IN POSITIONAL RELATIONSHIP |
|---|---|---|---|---|
| $t_1$ | -4.0 | -1.0 | 14.04 | 0.00 |
| $t_2$ | -2.0 | -1.0 | 26.57 | -12.53 |
| $t_3$ | 0.0 | -1.0 | 90.00 | -75.99 |
| $t_4$ | 2.0 | 0.0 | 180.00 | -165.96 |
| $t_5$ | 4.0 | 1.0 | -165.96 | 180.00 |

LATERAL INVERSION

DESIGNATED POSITION
POSITION DATA OF POINT A

|    | $A_X$ | $A_Y$ |
|----|------|------|
| $t_1$ | 10.0 | 10.0 |
| $t_2$ | 9.8  | 8.0  |
| $t_3$ | 9.6  | 6.0  |
| $t_4$ | 9.3  | 5.0  |
| $t_5$ | 9.0  | 3.0  |

DESIGNATED POSITION
POSITION DATA OF POINT B

|    | $B_X$ | $B_Y$ |
|----|------|------|
| $t_1$ | 11.0 | 13.0 |
| $t_2$ | 10.8 | 9.0  |
| $t_3$ | 10.6 | 7.0  |
| $t_4$ | 10.3 | 6.0  |
| $t_5$ | 8.0  | 5.0  |

DATA OF CHANGE IN POSITIONAL RELATIONSHIP

|    | X DIRECTION | Y DIRECTION | ANGLE OF DESIGNATED POSITIONS | CHANGE IN POSITIONAL RELATIONSHIP |
|----|-------------|-------------|-------------------------------|-----------------------------------|
| $t_1$ | -1.0 | -3.0 | 71.57  | 0.00  |
| $t_2$ | -1.0 | -1.0 | 45.00  | 26.57 |
| $t_3$ | -1.0 | -1.0 | 45.00  | 26.57 |
| $t_4$ | -1.0 | -1.0 | 45.00  | 26.57 |
| $t_5$ | 1.0  | -2.0 | 116.57 | 45.00 |

VERTICAL INVERSION

DESIGNATED POSITION
POSITION DATA OF POINT A

|     | Ax  | Ay   |
| --- | --- | ---- |
| t₁  | 5.0 | 12.0 |
| t₂  | 5.0 | 9.0  |
| t₃  | 5.0 | 6.0  |
| t₄  | 5.0 | 3.0  |
| t₅  | 5.0 | 2.0  |

DESIGNATED POSITION
POSITION DATA OF POINT B

|     | Bx  | By   |
| --- | --- | ---- |
| t₁  | 7.0 | 15.0 |
| t₂  | 6.8 | 11.0 |
| t₃  | 6.5 | 8.0  |
| t₄  | 6.2 | 4.0  |
| t₅  | 6.0 | 1.0  |

DATA OF CHANGE IN POSITIONAL RELATIONSHIP

|     | X DIRECTION | Y DIRECTION | ANGLE OF DESIGNATED POSITIONS | CHANGE IN POSITIONAL RELATIONSHIP |
| --- | ----------- | ----------- | ----------------------------- | --------------------------------- |
| t₁  | -2.0        | -3.0        | 56.31                         | 0.00                              |
| t₂  | -1.8        | -2.0        | 48.01                         | 8.30                              |
| t₃  | -1.5        | -2.0        | 53.13                         | 3.18                              |
| t₄  | -1.2        | -1.0        | 39.81                         | 16.50                             |
| t₅  | -1.0        | 1.0         | -45.00                        | 101.31                            |

DESIGNATED FIXED POSITION
POSITION DATA OF POINT A

|    | $A_X$ | $A_Y$ |
|----|-------|-------|
| $t_1$ | 3 | 3 |
| $t_2$ | 3 | 3 |
| $t_3$ | 3 | 3 |
| $t_4$ | 3 | 3 |
| $t_5$ | 3 | 3 |

DESIGNATED MOVING POSITION
POSITION DATA OF POINT B

|    | $B_X$ | $B_Y$ |
|----|-------|-------|
| $t_1$ | 6.0 | 3.0 |
| $t_2$ | 5.3 | 2.3 |
| $t_3$ | 4.7 | 1.7 |
| $t_4$ | 4.3 | 1.2 |
| $t_5$ | 4.0 | 2.0 |

DATA OF TRAVEL OF DESIGNATED MOVING POSITION

|    | TRAVEL OF POINT A | TRAVEL OF POINT B | ANGLE OF DESIGNATED POSITIONS | DIRECTION OF TRAVEL |
|----|-------------------|-------------------|-------------------------------|---------------------|
| $t_1$ | 0.000 | 0.000 | 176.19 | -158.20 |
| $t_2$ | 0.000 | 0.000 | 163.30 | -154.98 |
| $t_3$ | 0.000 | 1.729 | 142.05 | -154.98 |
| $t_4$ | 0.000 | 2.310 | 126.53 | -154.98 |
| $t_5$ | 0.000 | 2.154 | 135.00 | -154.98 |

SYMMETRICAL INVERSION
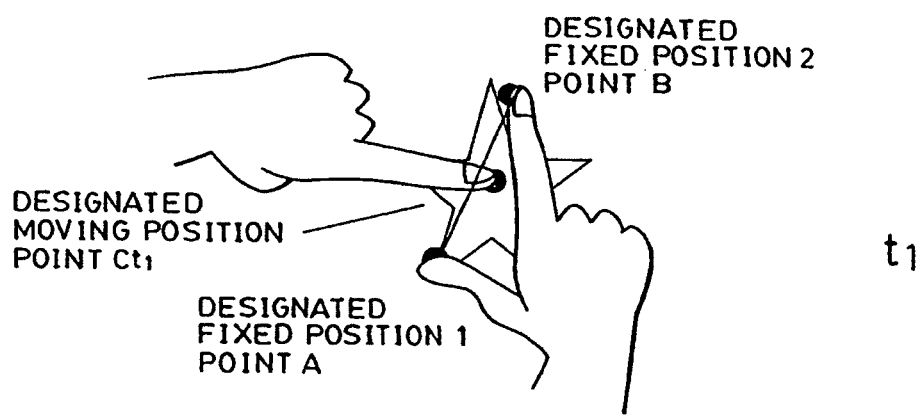
FIG. 102A
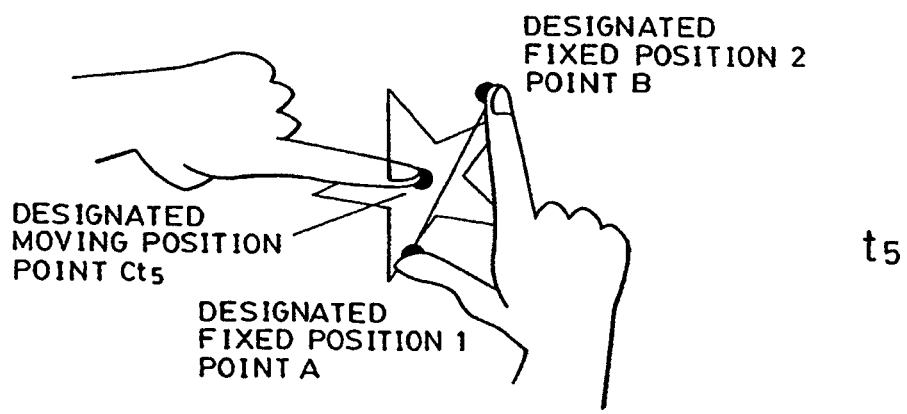
FIG. 102B

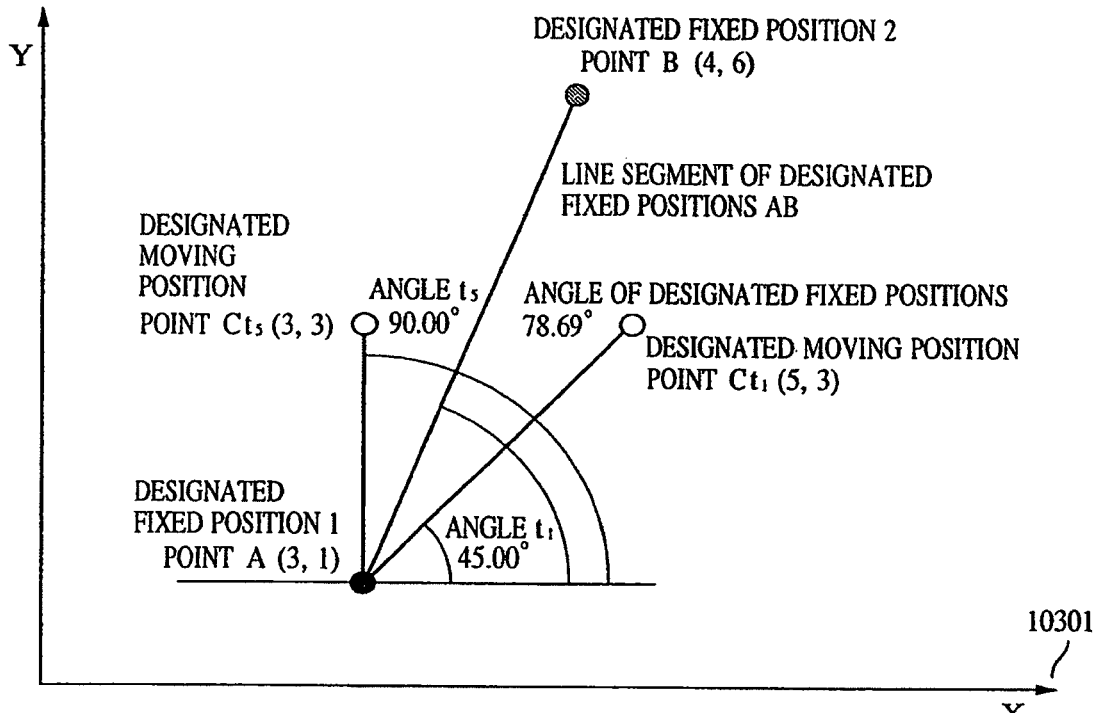

FIG. 103A

DESIGNATED FIXED POSITION
POSITION DATA OF POINT A

|  | $A_X$ | $A_Y$ |
|---|---|---|
| $t_1$ | 3.0 | 1.0 |
| $t_2$ | 3.0 | 1.0 |
| $t_3$ | 3.0 | 1.0 |
| $t_4$ | 3.0 | 1.0 |
| $t_5$ | 3.0 | 1.0 |

FIG. 103B

DESIGNATED FIXED POSITION
POSITION DATA OF POINT B

|  | $B_X$ | $B_Y$ |
|---|---|---|
| $t_1$ | 4.0 | 6.0 |
| $t_2$ | 4.0 | 6.0 |
| $t_3$ | 4.0 | 6.0 |
| $t_4$ | 4.0 | 6.0 |
| $t_5$ | 4.0 | 6.0 |

FIG. 103C

DESIGNATED MOVING POSITION
POSITION DATA OF POINT C

|  | $C_X$ | $C_Y$ |
|---|---|---|
| $t_1$ | 5.0 | 3.0 |
| $t_2$ | 4.5 | 3.0 |
| $t_3$ | 4.0 | 3.0 |
| $t_4$ | 3.5 | 3.0 |
| $t_5$ | 3.0 | 3.0 |

FIG. 103D

POSITIONAL RELATIONSHIP DATA OF TWO DESIGNATED
FIXED POSITIONS AND DESIGNATED MOVING POSITION

|  | ANGLE OF FIXED POSITIONS | ANGLE OF MOVING POSITIONS |
|---|---|---|
| $t_1$ | 78.69 | 45.00 |
| $t_2$ | 78.69 | 53.13 |
| $t_3$ | 78.69 | 63.43 |
| $t_4$ | 78.69 | 75.96 |
| $t_5$ | 78.69 | 90.00 |

FIG. 103E

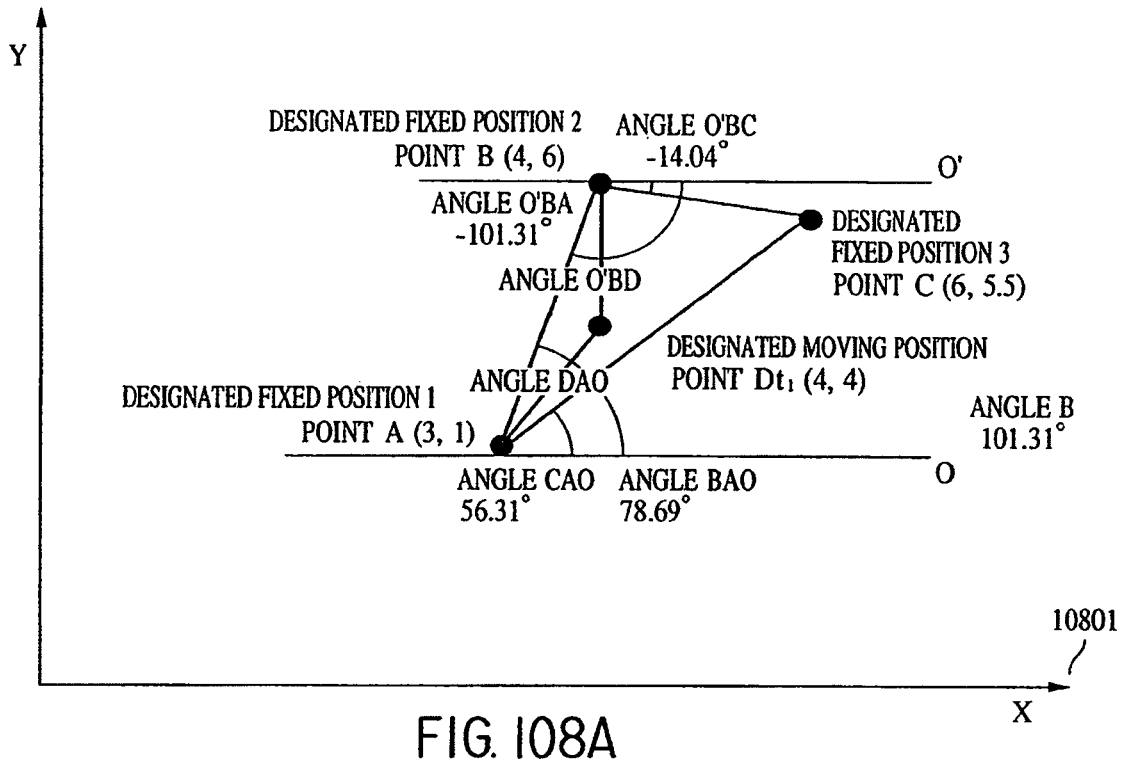

FIG. 108A

| | $A_X$ | $A_Y$ |
|---|---|---|
| $t_1$ | 3.0 | 1.0 |

DESIGNATED FIXED POSITION POSITION DATA OF POINT A

FIG. 108B

| | $B_X$ | $B_Y$ |
|---|---|---|
| $t_1$ | 4.0 | 6.0 |

DESIGNATED FIXED POSITION POSITION DATA OF POINT B

FIG. 108C

| | $C_X$ | $C_Y$ |
|---|---|---|
| $t_1$ | 6.0 | 5.5 |

DESIGNATED FIXED POSITION POSITION DATA OF POINT C

FIG. 108D

| | $D_X$ | $D_Y$ |
|---|---|---|
| $t_1$ | 4.0 | 4.0 |

DESIGNATED MOVING POSITION POSITION DATA OF POINT D

FIG. 108E

DATA OF CHANGE IN POSITIONAL RELATIONSHIP OF DESIGNATED FIXED POSITIONS

| | ANGLE BAO | ANGLE CAO | ANGLE DAO | ANGLE O'BA | ANGLE O'BC | ANGLE O'BD |
|---|---|---|---|---|---|---|
| $t_1$ | 78.69 | 56.31 | 71.57 | -101.31 | -14.04 | -90.00 |

FIG. 108F

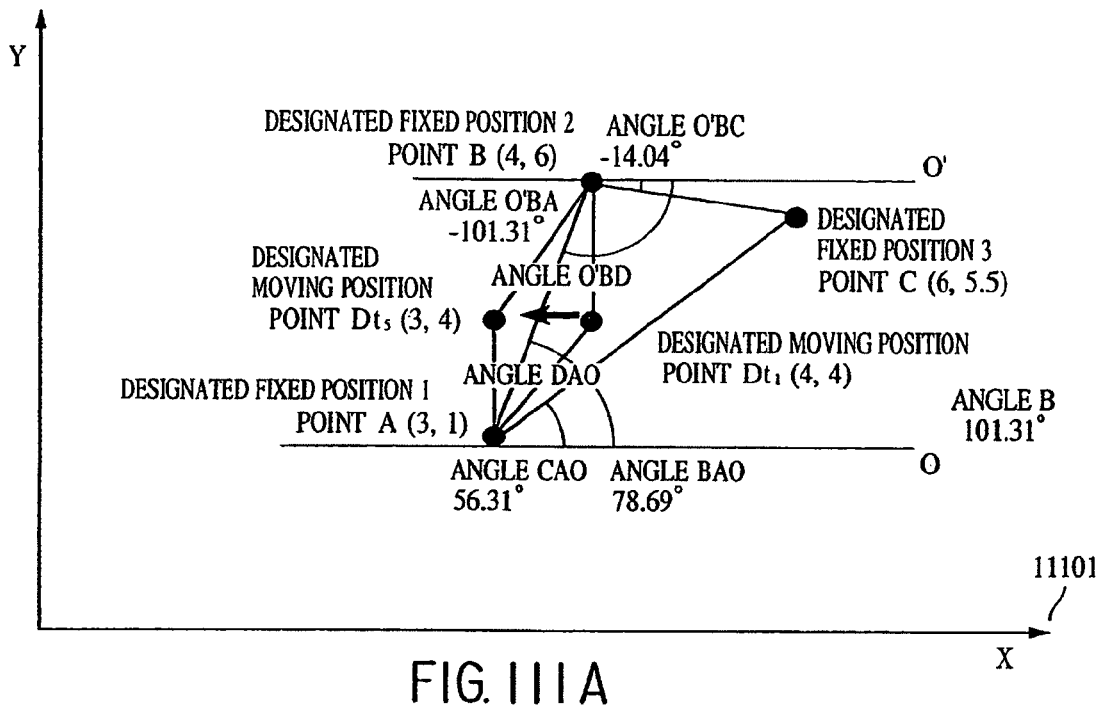

FIG. 111A

| | $A_X$ | $A_Y$ |
|---|---|---|
| $t_1$ | 3.0 | 1.0 |
| $t_2$ | 3.0 | 1.0 |
| $t_3$ | 3.0 | 1.0 |
| $t_4$ | 3.0 | 1.0 |
| $t_5$ | 3.0 | 1.0 |

DESIGNATED FIXED POSITION POSITION DATA OF POINT A

FIG. 111B

| | $B_X$ | $B_Y$ |
|---|---|---|
| $t_1$ | 4.0 | 6.0 |
| $t_2$ | 4.0 | 6.0 |
| $t_3$ | 4.0 | 6.0 |
| $t_4$ | 4.0 | 6.0 |
| $t_5$ | 4.0 | 6.0 |

DESIGNATED FIXED POSITION POSITION DATA OF POINT B

FIG. 111C

| | $C_X$ | $C_Y$ |
|---|---|---|
| $t_1$ | 6.0 | 5.5 |
| $t_2$ | 6.0 | 5.5 |
| $t_3$ | 6.0 | 5.5 |
| $t_4$ | 6.0 | 5.5 |
| $t_5$ | 6.0 | 5.5 |

DESIGNATED FIXED POSITION POSITION DATA OF POINT C

FIG. 111D

| | $D_X$ | $D_Y$ |
|---|---|---|
| $t_1$ | 4.0 | 4.0 |
| $t_2$ | 3.8 | 4.0 |
| $t_3$ | 3.6 | 4.0 |
| $t_4$ | 3.3 | 4.0 |
| $t_5$ | 3.0 | 4.0 |

DESIGNATED MOVING POSITION POSITION DATA OF POINT D

FIG. 111E

DATA OF CHANGE IN POSITIONAL RELATIONSHIP OF DESIGNATED FIXED POSITIONS

| | ANGLE BAO | ANGLE CAO | ANGLE DAO | ANGLE O'BA | ANGLE O'BC | ANGLE O'BD |
|---|---|---|---|---|---|---|
| $t_1$ | 78.69 | 56.31 | 71.57 | -101.31 | -14.04 | -90.00 |
| $t_2$ | 78.69 | 56.31 | 57.07 | -101.31 | -14.04 | -95.71 |
| $t_3$ | 78.69 | 56.31 | 78.69 | -101.31 | -14.04 | -101.31 |
| $t_4$ | 78.69 | 56.31 | 84.29 | -101.31 | -14.04 | -109.29 |
| $t_5$ | 78.69 | 56.31 | 90.00 | -101.31 | -14.04 | -116.57 |

FIG. 111F

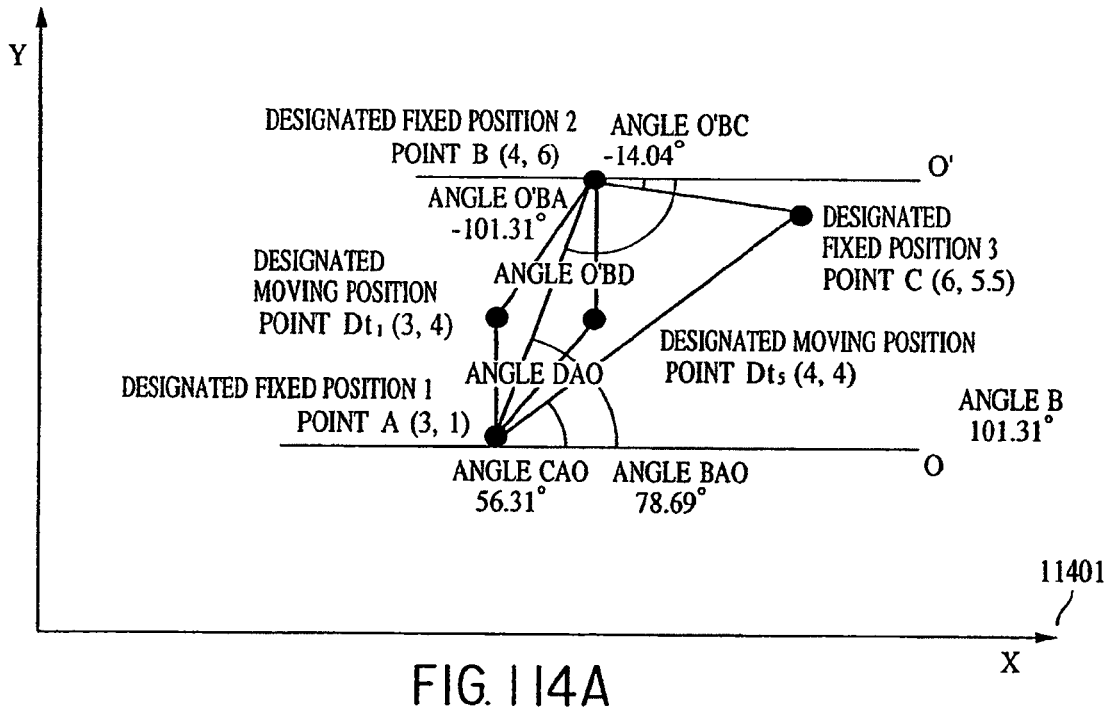

FIG. 114A

| | $A_X$ | $A_Y$ |
|---|---|---|
| $t_1$ | 3.0 | 1.0 |
| $t_2$ | 3.0 | 1.0 |
| $t_3$ | 3.0 | 1.0 |
| $t_4$ | 3.0 | 1.0 |
| $t_5$ | 3.0 | 1.0 |

DESIGNATED FIXED POSITION POSITION DATA OF POINT A

FIG. 114B

| | $B_X$ | $B_Y$ |
|---|---|---|
| $t_1$ | 4.0 | 6.0 |
| $t_2$ | 4.0 | 6.0 |
| $t_3$ | 4.0 | 6.0 |
| $t_4$ | 4.0 | 6.0 |
| $t_5$ | 4.0 | 6.0 |

DESIGNATED FIXED POSITION POSITION DATA OF POINT B

FIG. 114C

| | $C_X$ | $C_Y$ |
|---|---|---|
| $t_1$ | 6.0 | 5.5 |
| $t_2$ | 6.0 | 5.5 |
| $t_3$ | 6.0 | 5.5 |
| $t_4$ | 6.0 | 5.5 |
| $t_5$ | 6.0 | 5.5 |

DESIGNATED FIXED POSITION POSITION DATA OF POINT C

FIG. 114D

| | $D_X$ | $D_Y$ |
|---|---|---|
| $t_1$ | 3.0 | 4.0 |
| $t_2$ | 3.3 | 4.0 |
| $t_3$ | 3.6 | 4.0 |
| $t_4$ | 3.8 | 4.0 |
| $t_5$ | 4.0 | 4.0 |

DESIGNATED MOVING POSITION POSITION DATA OF POINT D

FIG. 114E

DATA OF CHANGE IN POSITIONAL RELATIONSHIP

| | ANGLE BAO | ANGLE CAO | ANGLE DAO | ANGLE O'BA | ANGLE O'BC | ANGLE O'BD |
|---|---|---|---|---|---|---|
| $t_1$ | 78.69 | 56.31 | 90.00 | -101.31 | -14.04 | -116.57 |
| $t_2$ | 78.69 | 56.31 | 84.29 | -101.31 | -14.04 | -109.29 |
| $t_3$ | 78.69 | 56.31 | 78.69 | -101.31 | -14.04 | -101.31 |
| $t_4$ | 78.69 | 56.31 | 75.07 | -101.31 | -14.04 | -95.71 |
| $t_5$ | 78.69 | 56.31 | 71.57 | -101.31 | -14.04 | -90.00 |

FIG. 114F

TIME $t_1$     INITIAL DESIGNATED POSITION POINT $At_1$     INITIAL DESIGNATED POSITION POINT $Bt_1$

In a system for preparing a text by using a knowledge base, knowledge relating to input information is first retrieved from the knowledge base. Then, a plurality of kinds of information used as elements of to be generated i cted from the input ion and the retrieved in ation relating bsequently, a describing r, in ehic ed elements of the text are d ed Then, a text to be output is of the selected elements of the te scribing order.

FIG. 117A

TIME $t_2$     DESIGNATED POSITION POINT $At_2$     DESIGNATED POSITION POINT $Bt_2$

In a system for preparing a text by using a knowledge base, knowledge relating to input information is first retrieved from the knowledge base. Then, a plurality of kinds of i ation used as elements of to be generated ected from the input on and the retrieved i nation relating bsequently, a describin r, in ehic ed elements of the text are ed d. Then output i elements of the t ing order.

DESIGNATED POSITION POINT $Ct_2$

FIG. 117B

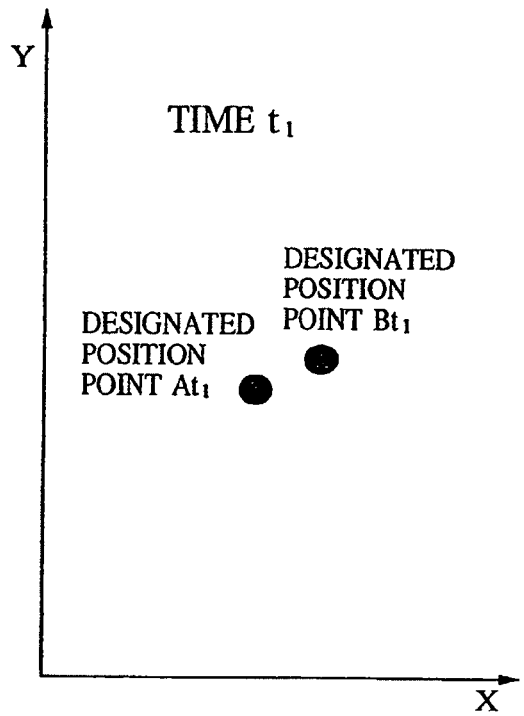
FIG. 118A
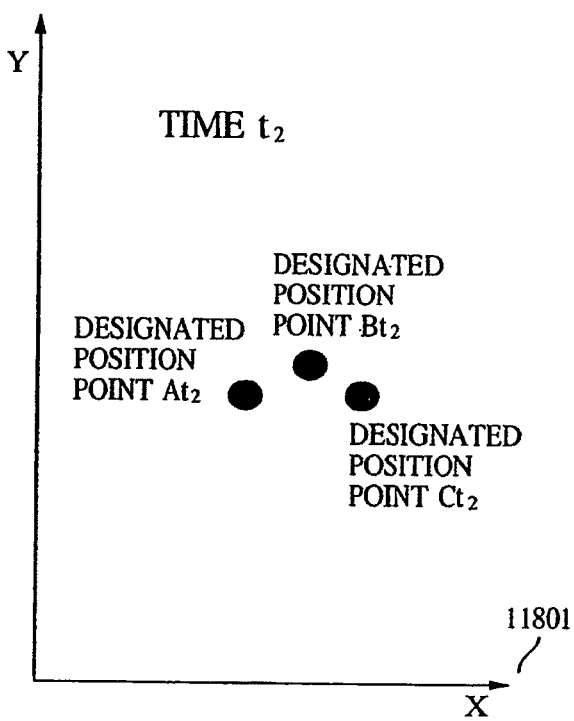
FIG. 118B
DESIGNATED
FIXED POSITION
POSITION DATA
OF POINT A
|    | Ax  | Ay  |
|----|-----|-----|
| t1 | 3.0 | 3.0 |
| t2 | 3.0 | 3.0 |
| t3 | 3.0 | 3.0 |
FIG. 118C
DESIGNATED
FIXED POSITION
POSITION DATA
OF POINT B
|    | Bx  | By  |
|----|-----|-----|
| t1 | 4.0 | 4.0 |
| t2 | 4.0 | 4.0 |
| t3 | 4.0 | 4.0 |
FIG. 118D
DESIGNATED
FIXED POSITION
POSITION DATA
OF POINT C
|    | Cx  | Cy  |
|----|-----|-----|
| t1 |     |     |
| t2 | 5.0 | 3.0 |
| t3 | 5.0 | 3.0 |
FIG. 118E
DATA OF DESIGNATED POSITION COUNT
|    | DESIGNATED POSITION COUNT | CHANGE IN INITIAL DESIGNATED POSITION COUNT |
|----|---------------------------|---------------------------------------------|
| t1 | 2                         | 0                                           |
| t2 | 3                         | 1                                           |
| t3 | 3                         | 1                                           |
FIG. 118F

DESIGNATED POSITION
POSITION DATA OF POINT A

|  | $A_X$ | $A_Y$ |
|---|---|---|
| $t_1$ | 3.0 | 3.0 |
| $t_2$ | 3.0 | 3.0 |
| $t_3$ | 3.0 | 3.0 |
| $t_4$ | 3.0 | 3.0 |
| $t_5$ | 3.0 | 3.0 |
| $t_6$ | 3.0 | 3.0 |

DESIGNATED POSITION
POSITION DATA OF POINT B

|  | $B_X$ | $B_Y$ |
|---|---|---|
| $t_1$ |  |  |
| $t_2$ |  |  |
| $t_3$ | 6.0 | 2.8 |
| $t_4$ | 5.6 | 3.5 |
| $t_5$ | 5.2 | 4.2 |
| $t_6$ | 5.0 | 5.0 |

DATA OF DESIGNATED POSITION COUNT

|  | DESIGNATED POSITION COUNT | CHANGE IN INITIAL DESIGNATED POSITION COUNT |
|---|---|---|
| $t_1$ | 1 | 0 |
| $t_2$ | 1 | 0 |
| $t_3$ | 2 | 1 |
| $t_4$ | 2 | 1 |
| $t_5$ | 2 | 1 |
| $t_6$ | 2 | 1 |

TIME $t_1$

DESIGNATED POSITION POINT $At_1$

DESIGNATED POSITION POINT $Bt_1$

DESIGNATED POSITION POINT $Ct_1$

In a system for preparing a text by using a knowledge base, knowledge relating to input information is first retrieved from the knowledge base. Then, a plurality of kinds of information used as elements of text to be generated is selected from the input information and the retrieved information relating subsequently, a describing order, in which the selected elements of the text are decided. Then, a text to be output is composed of the selected elements of the text in describing order.

FIG. 125A

TIME $t_2$

DESIGNATED POSITION POINT $At_2$

DESIGNATED POSITION POINT $Bt_2$

In a system for preparing a text by using a knowledge base, knowledge relating to input information is first retrieved from the knowledge base. Then, a plurality of kinds of information used as elements of text to be generated is selected from the input information and the retrieved information relating subsequently, a describing order, in which the selected elements of the text are decided. Then, a text to be output is composed of the selected elements of the text in describing order.

FIG. 125B

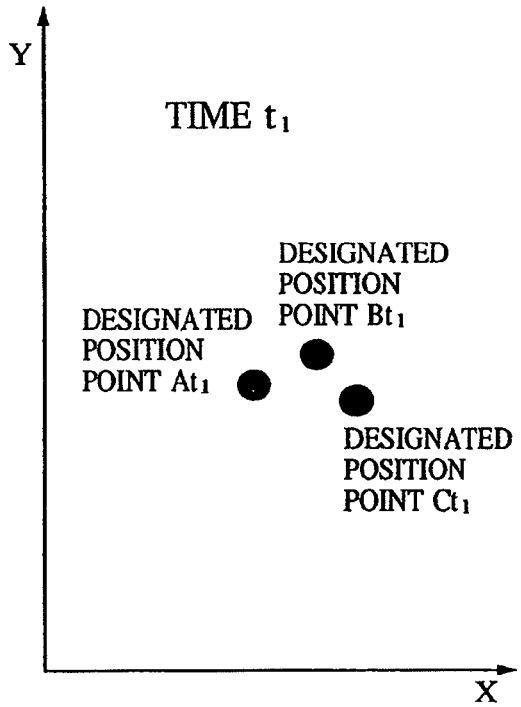
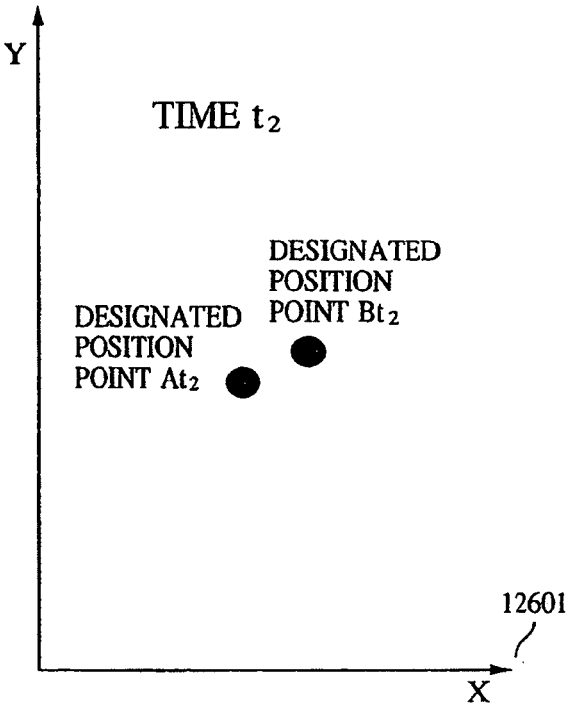
FIG. 126A     FIG. 126B
| DESIGNATED POSITION POSITION DATA OF POINT A | | |
|---|---|---|
| | $A_X$ | $A_Y$ |
| $t_1$ | 3.0 | 3.0 |
| $t_2$ | 3.0 | 3.0 |
FIG. 126C
| DESIGNATED POSITION POSITION DATA OF POINT B | | |
|---|---|---|
| | $B_X$ | $B_Y$ |
| $t_1$ | 4.0 | 4.0 |
| $t_2$ | 4.0 | 4.0 |
FIG. 126D
| DESIGNATED POSITION POSITION DATA OF POINT C | | |
|---|---|---|
| | $C_X$ | $C_Y$ |
| $t_1$ | 5.0 | 3.0 |
| $t_2$ | | |
FIG. 126E
DATA OF DESIGNATED POSITION COUNT
| | DESIGNATED POSITION COUNT | CHANGE IN INITIAL DESIGNATED POSITION COUNT |
|---|---|---|
| $t_1$ | 3 | 0 |
| $t_2$ | 2 | -1 |
FIG. 126F

PAGE TURNING

FIG. 137A

DESIGNATED FIXED POSITION POSITION DATA OF POINT S

| | $S_x$ | $S_y$ |
|---|---|---|
| $t_1$ | 1.0 | 1.0 |
| $t_2$ | 1.0 | 1.0 |
| $t_3$ | 1.0 | 1.0 |
| $t_4$ | 1.0 | 1.0 |
| $t_5$ | 1.0 | 1.0 |

FIG. 137B

DESIGNATED POSITION POSITION DATA OF POINT A

| | $A_x$ | $A_y$ |
|---|---|---|
| $t_1$ | 4.0 | 2.0 |
| $t_2$ | 3.8 | 2.2 |
| $t_3$ | 3.6 | 2.4 |
| $t_4$ | 3.4 | 2.6 |
| $t_5$ | 3.0 | 3.0 |

FIG. 137C

DESIGNATED POSITION POSITION DATA OF POINT B

| | $B_x$ | $B_y$ |
|---|---|---|
| $t_1$ | 5.0 | 3.0 |
| $t_2$ | 4.8 | 3.2 |
| $t_3$ | 4.6 | 3.4 |
| $t_4$ | 4.4 | 3.6 |
| $t_5$ | 4.0 | 4.0 |

DESIGNATED POSITION POSITION DATA OF POINT A'

| | $A'_x$ | $A'_y$ |
|---|---|---|
| $t_1$ | 4.0 | 2.0 |
| $t_2$ | 3.8 | 2.4 |
| $t_3$ | 3.6 | 2.8 |
| $t_4$ | 3.4 | 3.2 |
| $t_5$ | 3.0 | 4.0 |

FIG. 137E

DESIGNATED POSITION POSITION DATA OF POINT B'

| | $B'_x$ | $B'_y$ |
|---|---|---|
| $t_1$ | 5.0 | 3.0 |
| $t_2$ | 4.8 | 3.4 |
| $t_3$ | 4.6 | 3.8 |
| $t_4$ | 4.4 | 4.2 |
| $t_5$ | 4.0 | 5.0 |

DATA OF SPEED OF TRAVEL OF DESIGNATED POSITION

| | SPEED OF POINT A | RATE OF INCREASE OF SPEED OF POINT A | SPEED OF POINT B | RATE OF INCREASE OF SPEED OF POINT B | SPEED OF POINT A' | RATE OF INCREASE OF SPEED OF POINT A' | SPEED OF POINT B' | RATE OF INCREASE OF SPEED OF POINT B' |
|---|---|---|---|---|---|---|---|---|
| $t_1$ | 0.000 | | 0.000 | 0.0 | | 0.000 | | 0.000 |
| $t_2$ | 0.283 | | 0.283 | | | 0.447 | | 0.447 |
| $t_3$ | 0.283 | 1.00 | 0.283 | 1.00 | 0.447 | 1.00 | 0.447 | 1.00 |
| $t_4$ | 0.283 | 1.00 | 0.283 | 1.00 | 0.447 | 1.00 | 0.447 | 1.00 |
| $t_5$ | 0.354 | 1.25 | 0.283 | 1.00 | 0.559 | 1.25 | 0.559 | 1.25 |

FIG. 137G

SCREEN SHIFTING

FIG.14IC

DESIGNATED FIXED POSITION POSITION DATA OF POINT S

| | $S_X$ | $S_Y$ |
|---|---|---|
| $t_1$ | 1.0 | 1.0 |
| $t_2$ | 1.0 | 1.0 |
| $t_3$ | 1.0 | 1.0 |
| $t_4$ | 1.0 | 1.0 |
| $t_5$ | 1.0 | 1.0 |

FIG.14ID

DESIGNATED POSITION POSITION DATA OF POINT A

| | $A_X$ | $A_Y$ |
|---|---|---|
| $t_1$ | 3.0 | 3.0 |
| $t_2$ | 3.0 | 2.6 |
| $t_3$ | 3.0 | 2.2 |
| $t_4$ | 3.0 | 1.8 |
| $t_5$ | 3.0 | 1.0 |

FIG.14IE

DESIGNATED POSITION POSITION DATA OF POINT B

| | $B_X$ | $B_Y$ |
|---|---|---|
| $t_1$ | 4.0 | 4.0 |
| $t_2$ | 4.0 | 3.6 |
| $t_3$ | 4.0 | 3.2 |
| $t_4$ | 4.0 | 2.8 |
| $t_5$ | 4.0 | 2.0 |

FIG.14IF

DESIGNATED POSITION POSITION DATA OF POINT C

| | $C_X$ | $C_Y$ |
|---|---|---|
| $t_1$ | 3.0 | 3.0 |
| $t_2$ | 3.0 | 2.6 |
| $t_3$ | 3.0 | 2.2 |
| $t_4$ | 3.0 | 1.8 |
| $t_5$ | 3.0 | 1.0 |

DESIGNATED POSITION POSITION DATA OF POINT D

| | $D_X$ | $D_Y$ |
|---|---|---|
| $t_1$ | 4.0 | 4.0 |
| $t_2$ | 4.0 | 3.6 |
| $t_3$ | 4.0 | 3.2 |
| $t_4$ | 4.0 | 2.8 |
| $t_5$ | 4.0 | 2.0 |

14103

DATA OF CONTACT PRESSURE AT DESIGNATED POSITION

| | CONTACT PRESSURE AT POINT S | CONTACT PRESSURE AT POINT A | CONTACT PRESSURE AT POINT B | CONTACT PRESSURE AT POINT C | CONTACT PRESSURE AT POINT D |
|---|---|---|---|---|---|
| $t_1$ | 100 | 100 | 100 | 100 | 100 |
| $t_2$ | 105 | 105 | 105 | 140 | 140 |
| $t_3$ | 110 | 110 | 110 | 160 | 160 |
| $t_4$ | 105 | 105 | 105 | 190 | 190 |
| $t_5$ | 100 | 100 | 100 | 210 | 210 |

FIG.14IH

PAGE TURNING

FIG.145B — DESIGNATED FIXED POSITION / POSITION DATA OF POINT S

| | $S_x$ | $S_y$ |
|---|---|---|
| $t_1$ | 1.0 | 1.0 |
| $t_2$ | 1.0 | 1.0 |
| $t_3$ | 1.0 | 1.0 |
| $t_4$ | 1.0 | 1.0 |
| $t_5$ | 1.0 | 1.0 |

FIG.145C — DESIGNATED POSITION / POSITION DATA OF POINT A

| | $A_x$ | $A_y$ |
|---|---|---|
| $t_1$ | 4.0 | 2.0 |
| $t_2$ | 3.8 | 2.2 |
| $t_3$ | 3.6 | 2.4 |
| $t_4$ | 3.4 | 2.6 |
| $t_5$ | 3.0 | 3.0 |

FIG.145D — DESIGNATED POSITION / POSITION DATA OF POINT B

| | $B_x$ | $B_y$ |
|---|---|---|
| $t_1$ | 5.0 | 3.0 |
| $t_2$ | 4.8 | 3.2 |
| $t_3$ | 4.6 | 3.4 |
| $t_4$ | 4.4 | 3.6 |
| $t_5$ | 4.0 | 4.0 |

FIG.145E — DESIGNATED POSITION / POSITION DATA OF POINT A'

| | $A'_x$ | $A'_y$ |
|---|---|---|
| $t_1$ | 4.0 | 2.0 |
| $t_2$ | 3.8 | 2.8 |
| $t_3$ | 3.6 | 3.6 |
| $t_4$ | 3.4 | 4.4 |
| $t_5$ | 3.0 | 6.0 |

FIG.145F — DESIGNATED POSITION / POSITION DATA OF POINT B' — 14502

| | $B'_x$ | $B'_y$ |
|---|---|---|
| $t_1$ | 5.0 | 3.0 |
| $t_2$ | 4.8 | 3.8 |
| $t_3$ | 4.6 | 4.6 |
| $t_4$ | 4.4 | 5.4 |
| $t_5$ | 4.0 | 7.0 |

FIG.145G — DATA OF DISTANCE OF TRAVEL OF DESIGNATED POSITION — 14503

| | TRAVEL OF POINT S | TRAVEL OF POINT A | TRAVEL OF POINT B | TRAVEL OF POINT A' | TRAVEL OF POINT B' |
|---|---|---|---|---|---|
| $t_1$ | 0 | 0.000 | 0.000 | 0.000 | 0.000 |
| $t_2$ | 0 | 0.283 | 0.283 | 0.825 | 0.825 |
| $t_3$ | 0 | 0.566 | 0.566 | 1.649 | 1.649 |
| $t_4$ | 0 | 0.849 | 0.849 | 2.474 | 2.474 |
| $t_5$ | 0 | 1.414 | 1.131 | 4.123 | 4.123 |

DESIGNATED FIXED POSITION POSITION DATA OF POINT A

DESIGNATED FIXED POSITION POSITION DATA OF POINT B

DATA OF TRAVEL OF DESIGNATED POSITION

EXPANSION　　　　　　DESIGNATED　DESIGNATED
OPERATION　　　　　　POSITION　　POSITION
　　　　　　　　　　　POINT At₅　 POINT Bt₅
　　　　　　　　　　　　　　　　　　　　　　　　　　TIME t₅

In a system for preparing a text by using a knowledge base, knowledge relating to input information is first retrieved from the knowledge base. The plurality of kinds of information used as element to be generated is selcted from the input on and the retrieved information relating then uently, a describing order, in which the sele s of the text are described, is determined. T be output is generated on the basis of ements of the text and the determined desc

DESIGNATED POSITION　DESIGNATED POSITION
POINT At₆　　　　　　　POINT Bt₆

In a system for preparing a text by using a knowledge base, knowledge relating to input information is first TIME t₆ retrieved from the knowledge b Then plurality of kinds of information    as element    xt
to be generated is selcted from th   t informa    d
the retrieved information relating   Subse      , a
describing order, in which the sele  ment       text
are described, is determined. Then,  be         is
generated on the basis of the selecte           text
and the determineddescribing orde

METHOD AND APPARATUS FOR DETECTING AND INTERPRETING PATH OF DESIGNATED POSITION

This application is a continuation of U.S. patent application Ser. No. 13/184,470, filed Jul. 15, 2011, which is a divisional of U.S. patent application Ser. No. 11/590,826, now U.S. Pat. No. 7,986,308, filed Nov. 1, 2006, which is a divisional of U.S. patent application Ser. No. 09/769,451, now U.S. Pat. No. 7,138,983, filed Jan. 26, 2001. The contents of each of the foregoing applications are incorporated by reference herein.

BACKGROUND OF THE INVENTION

1. Field of the Invention

The present invention relates to a position information processing apparatus, and more particularly, to a position information processing apparatus that detects position coordinates and paths of the position coordinates input by a finger, a pen, or a pointer, and interprets an instruction, input by a user and represented by the path, to perform an operation.

2. Description of the Related Art

Conventional touch panels allow position coordinates of a plurality of contact points to be detected in operation.

Such a conventional device detects a single input at a point as unknown input data during another point being designated fixedly, and is unable to detect paths of two or more designated positions that are concurrently moving.

The device thus cannot interpret a designation represented by a combination of paths of a plurality of designated positions that are concurrently moving.

SUMMARY OF THE INVENTION

It is an object of the present invention to provide an information processing apparatus and an information processing method for detecting paths of at least two designated positions that are concurrently moving.

It is another object of the present invention to provide an apparatus and method for interpreting a user's designation represented by a combination of paths of at least two designated positions, and for performing a designated operation.

According to one aspect, the present invention which achieves these objects relates to an information processing apparatus and includes a designated position detector for concurrently detecting a plurality of designated positions, a designated position storage unit for storing the plurality of designated positions detected by the designated position detector, a travel path recognizer for recognizing the travel paths of the plurality of designated positions based on the plurality of preceding designated positions stored in the designated position storage unit and the plurality of current designated positions detected by the designated position detector.

According to another aspect, the present invention which achieves these objects relates to an operation apparatus and includes a path detector for detecting paths of a plurality of concurrently moving designated positions, a designation interpreter for interpreting a designation represented by a combination of the paths of the plurality of designated positions detected by the path detector, and an operation unit for performing an operation based on the designation interpreted by the designation interpreter.

According to still another aspect, the present invention which achieves these objects relates to a position information processing method and includes a first detecting step of concurrently detecting a plurality of designated positions, a second detecting step of concurrently detecting a plurality of designated positions subsequent to the first input detecting step, and a travel path recognition step of recognizing the travel paths of the plurality of the designated positions based on the plurality of preceding designated positions detected in the first detecting step and the plurality of current designated positions detected in the second detecting step.

According to yet another aspect, the present invention which achieves these objects relates to an operational method and includes a path detecting step of detecting paths of a plurality of concurrently moving designated positions, a designation interpreting step of interpreting a designation represented by a combination of the paths of the plurality of designated positions detected in the path detecting step, and an operation step of performing an operation based on the designation interpreted by the designation interpreting step.

According to another aspect, the present invention which achieves these objects relates to a computer-readable storage medium storing a position information processing program for controlling a computer to perform processing of position information. The program includes codes for causing the computer to perform a first detecting step of concurrently detecting a plurality of designated positions, a second detecting step of concurrently detecting a plurality of designated positions, and a travel path recognition step of recognizing the travel paths of the plurality of the designated positions based on the plurality of preceding designated positions detected in the first detecting step and the plurality of current designated positions detected in the second detecting step.

According to another aspect, the present invention which achieves these objects relates to a computer-readable storage medium storing a manipulation program for controlling to perform manipulation. The program comprising codes for causing the computer to perform a path detecting step of detecting paths of a plurality of concurrently moving designated positions, a designation interpreting step of interpreting a designation represented by a combination of the paths of the plurality of designated positions detected in the path detecting step, and an operation step of performing an operation based on the designation interpreted by the designation interpreting step.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

Further objects, features and advantages of the present invention will become apparent from the following description of the preferred embodiments with reference to the attached drawings.

BRIEF DESCRIPTION OF THE DRAWINGS

FIGS. 9A-9D show a flow of data that is used in the detection of paths of a plurality of designated positions;

FIGS. 12A and 12B show an area of an acquired current designated position;

FIGS. 14A-14D show a flow of data that is used in a process based on the size of the designated area;

FIGS. 20A and 20B show an operational example that is interpreted as a contraction operation;

FIGS. 22A and 22B show an operational example that is interpreted as an expansion operation;

FIGS. 27A and 27B show an operational example that is interpreted as a clockwise rotation operation;

FIGS. 29A and 29B show an operational example that is interpreted as a counterclockwise rotation operation;

FIGS. 38A and 38B show an operational example that is interpreted as an upward shifting operation;

FIGS. 40A and 40B show an operational example that is interpreted as a downward shifting operation;

FIGS. 42A and 42B show an operational example that are interpreted as a rightward shifting operation;

FIGS. 50A and 50B show an operational example that is interpreted as a contraction operation centered on a designated fixed position;

FIGS. 51A-51F show the corresponding data samples that is interpreted as the contraction operation centered on the designated fixed position;

FIGS. 54A and 54B show an operational example that is interpreted as a contraction operation;

FIGS. 55A-55E show the corresponding data samples that are interpreted as the contraction operation;

FIGS. 57A-57E show the corresponding data samples that are interpreted as the expansion operation;

FIGS. 59A-59H show the corresponding data samples that are interpreted as the operation for moving the plurality of positions;

FIGS. 64A and 64B show an operational example that is interpreted as a counterclockwise rotation operation;

FIGS. 69A-69E show the corresponding data samples that are interpreted as the clockwise rotation operation;

FIGS. 73A-73H show the corresponding data samples that are interpreted as the rotation operation about the center of gravity;

FIGS. 78A-78D show the corresponding data samples that are interpreted as the vertical shifting operation;

FIGS. 84A and 84B show an operational example that is interpreted as an inversion operation;

FIGS. 102A and 102B show an operational example that is interpreted as a symmetrical inversion operation;

FIGS. 103A-103E show the corresponding data samples that are interpreted as the symmetrical inversion operation;

FIGS. 108A-108F show the corresponding data samples which are interpreted to mean that the designated moving position is within the area defined by the designated fixed positions;

FIGS. 111A-111F show the corresponding data samples which are interpreted to mean the shifting operation from within the area;

FIGS. 114A-114F show the corresponding data samples that are interpreted to mean that the attribute is imparted to the area defined by the designated fixed positions;

FIGS. 117A and 117B show an operational example that is interpreted to mean that the designation of an object to be processed is on its way;

FIGS. 118A-118F show the corresponding data samples that are interpreted to mean that the designation of the object to be processed is on its way;

FIG. 120 is a flow diagram showing a designation interpretation process based on an initial designated position;

FIGS. 121A and 121B show an operational example that is interpreted as a rotation operation about a designated position;

FIGS. 122A-122D show the corresponding data samples which are interpreted as the rotation operation about the designated position;

FIG. 123 is a flow diagram showing an algorithm that uses a change in the last count of designated positions;

FIG. 124 is a flow diagram showing a designation interpretation process based on the change in the last count of the designated positions;

FIGS. 125A and 125B show an operational example that is interpreted as a canceling operation to cancel an immediately preceding operation;

FIGS. 126A-126F show the corresponding data samples that are interpreted as the canceling operation to cancel the immediately preceding operation;

FIG. 127 is a flow diagram showing an algorithm that uses designated information other than a designated path;

FIG. 128 is a flow diagram showing an algorithm that uses designated information other than a designated path;

FIG. 129 is a flow diagram showing an algorithm that uses the count of all designated positions;

FIG. 130 is a flow diagram showing a designation interpretation process based on the designated position count;

FIGS. 131A and 131B show an operational example that is interpreted as a page-turning operation;

Figure 133:
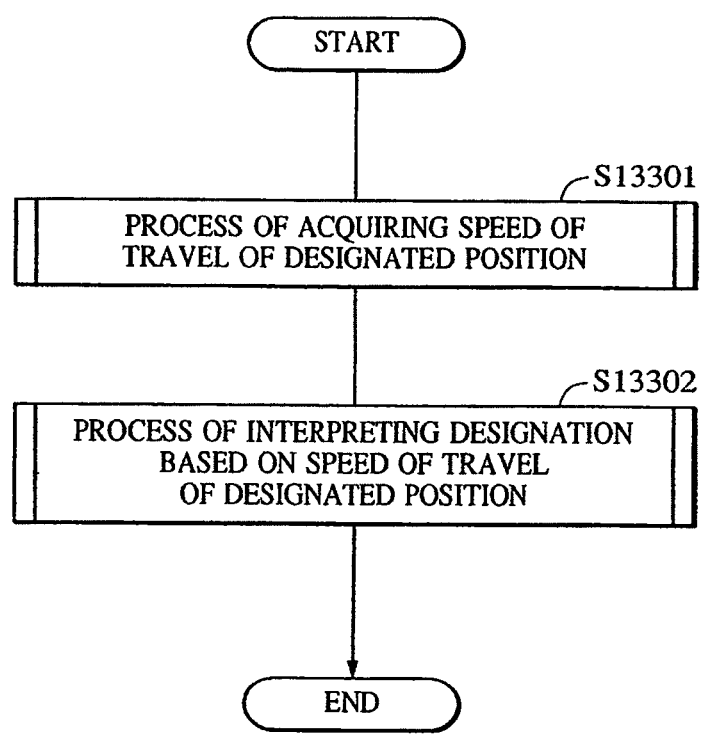
Figure 134:
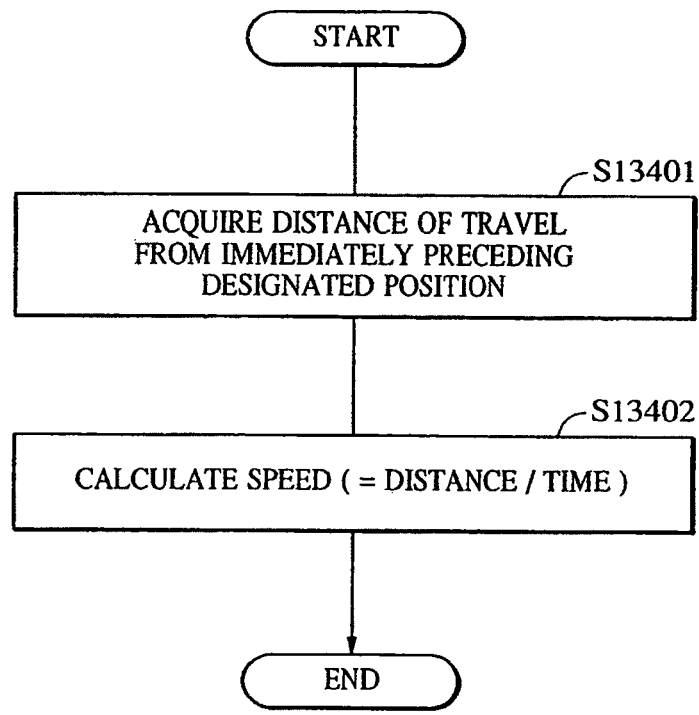
Figure 135:
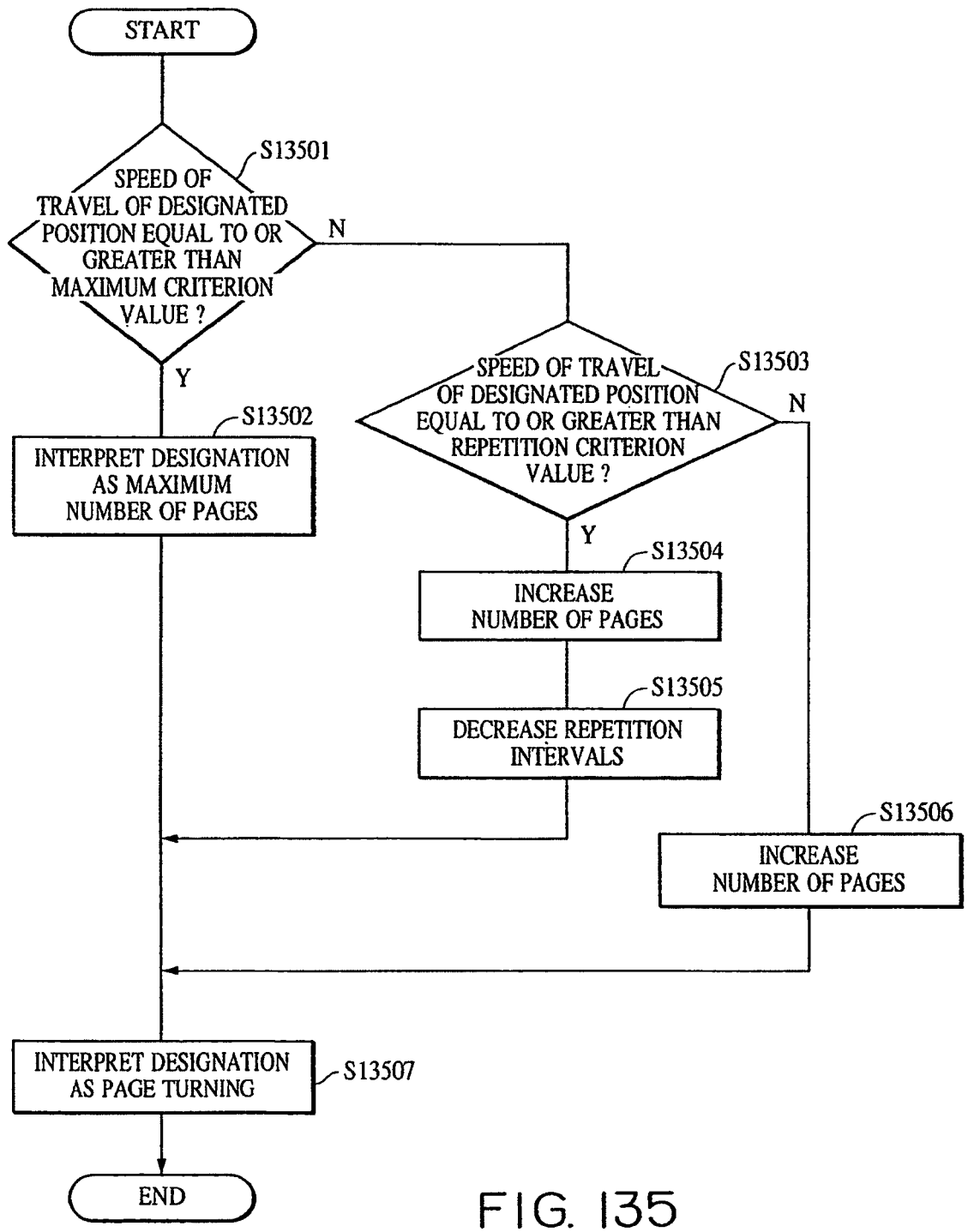
Figure 138:
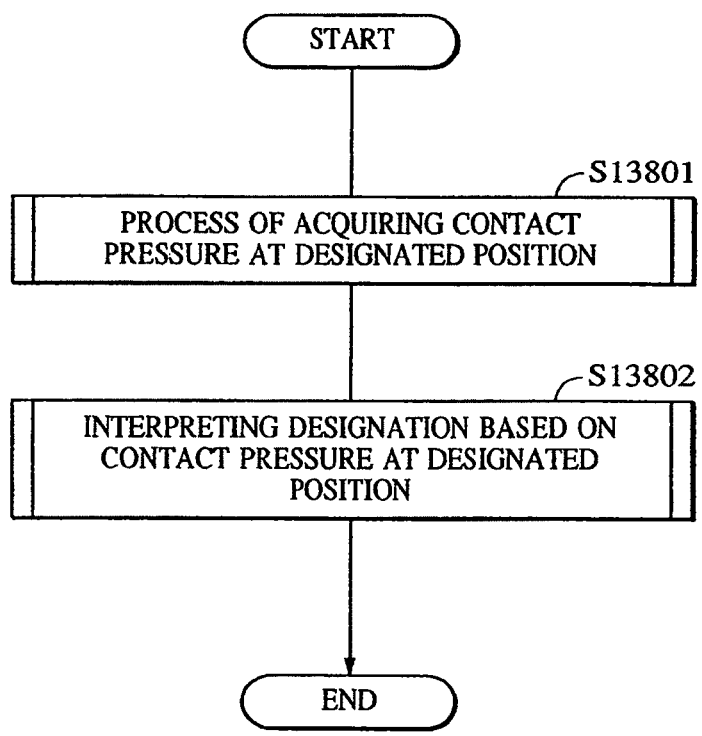
Figure 139:
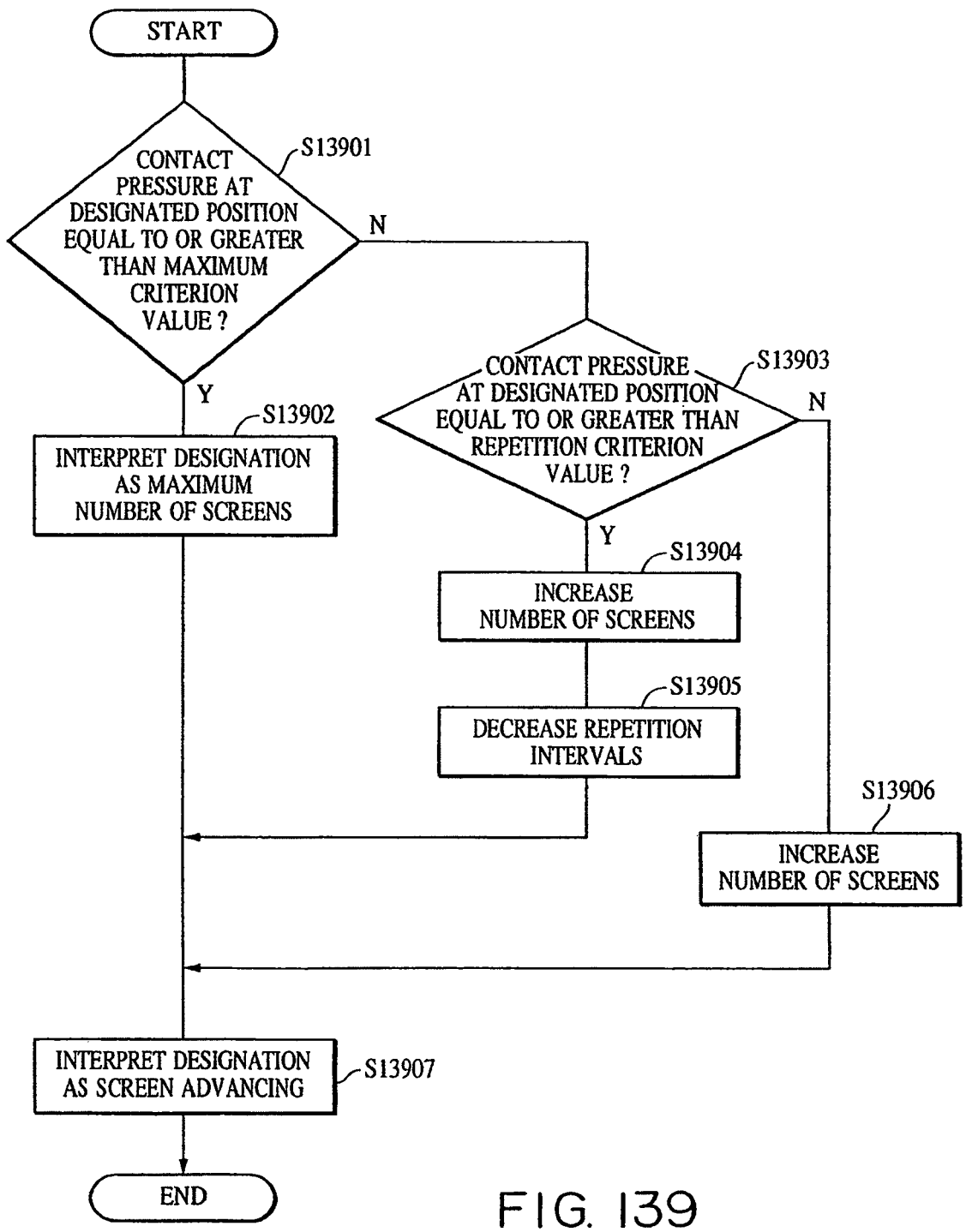
Figure 140A:
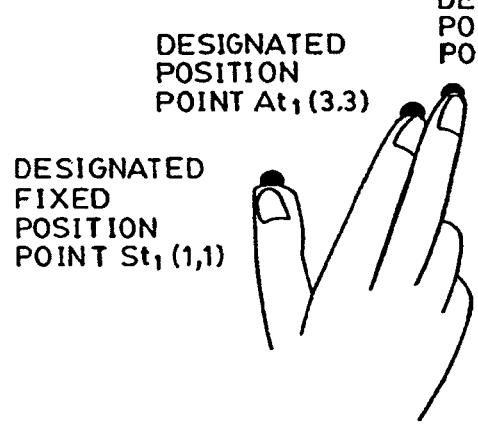
Figure 140C:
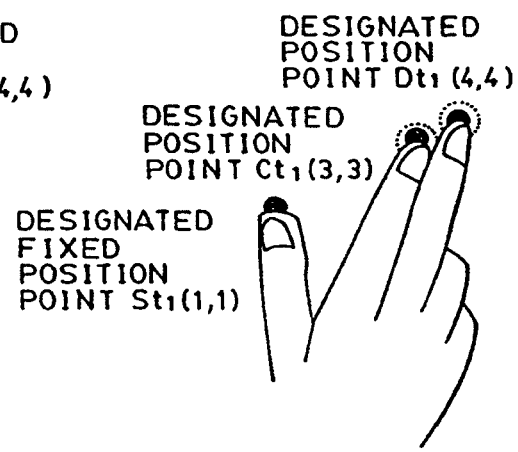
Figure 140B:
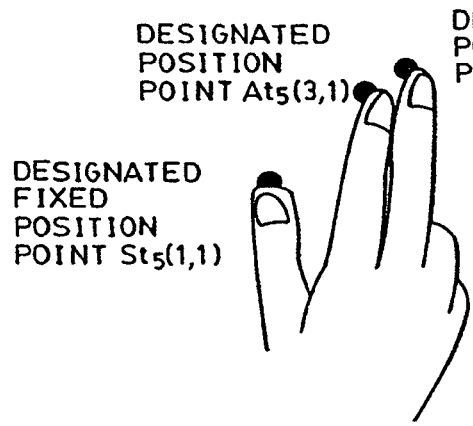
Figure 140D:
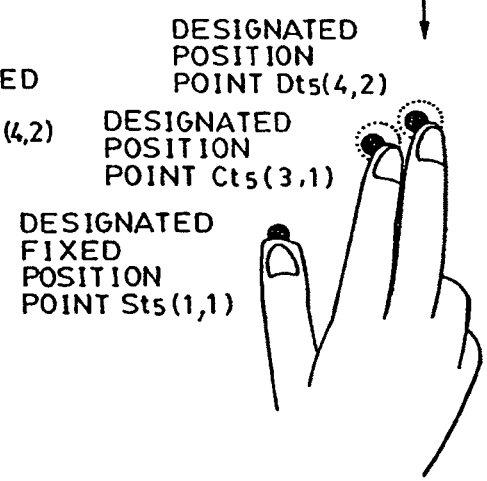
Figures 141A, 141B:
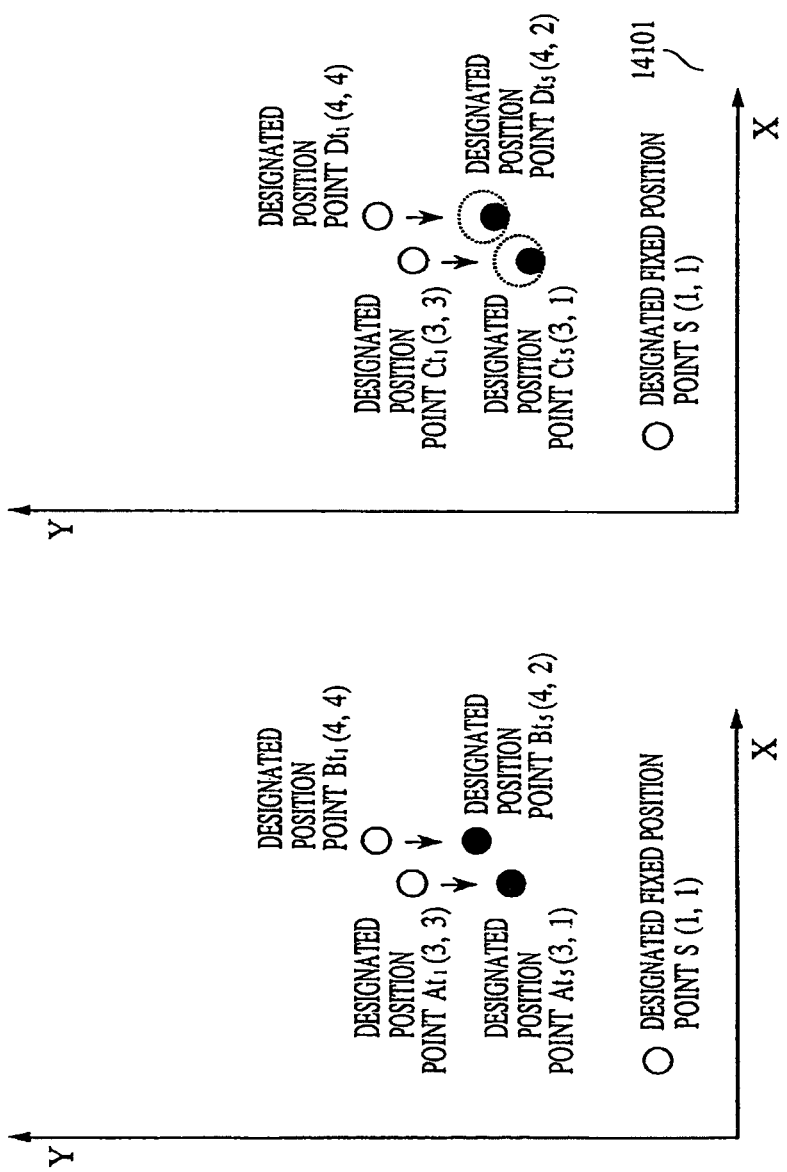
Figure 142:
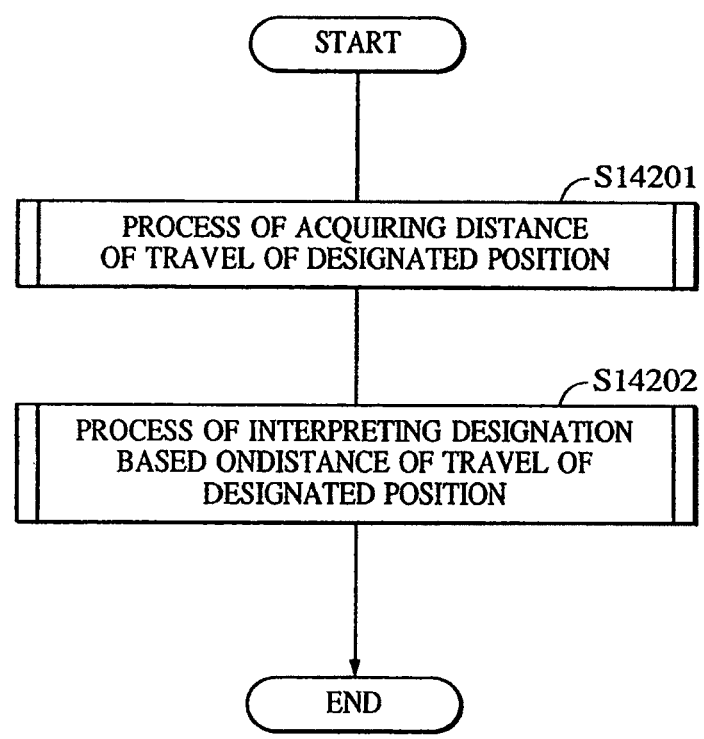
Figure 143:
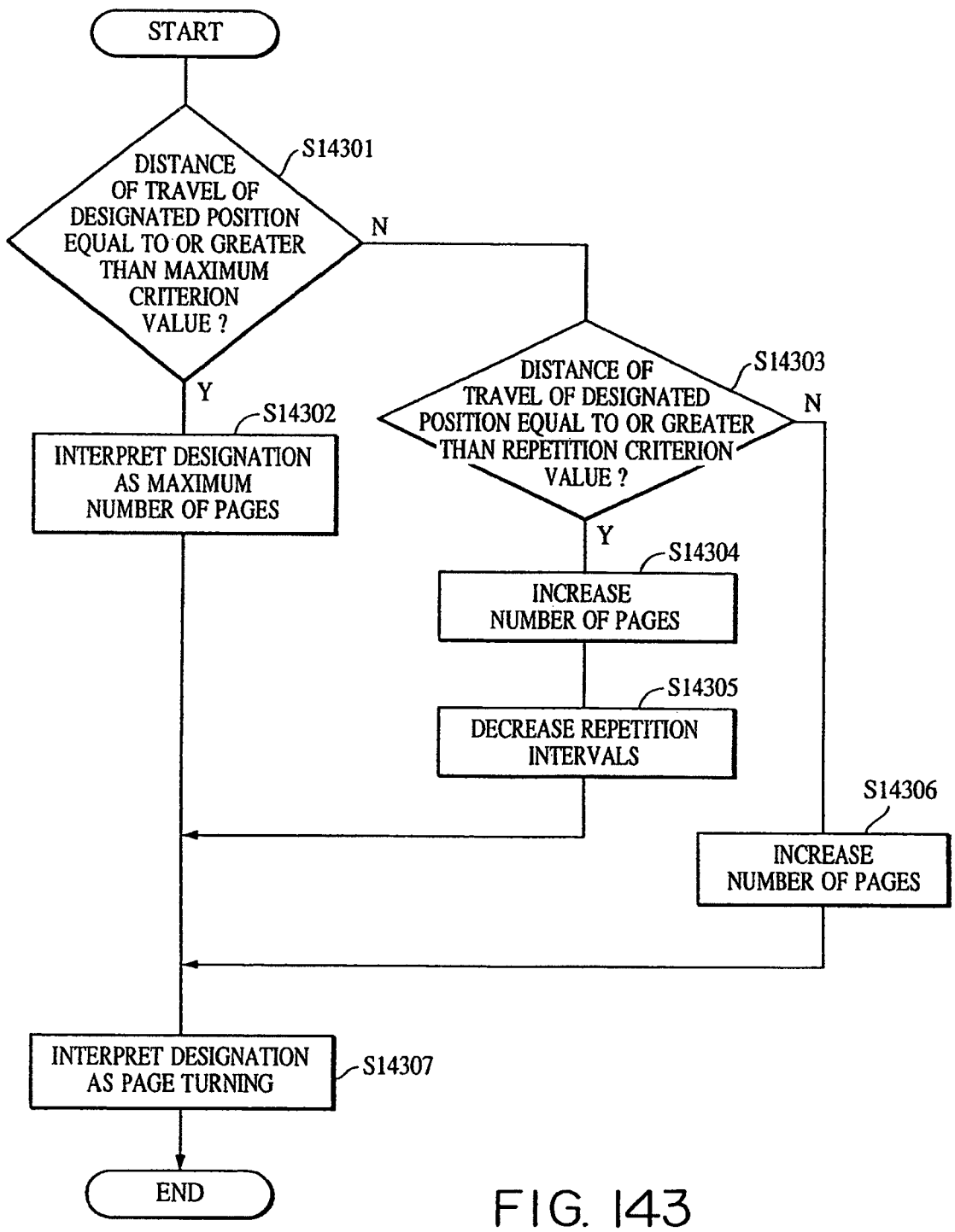
Figure 146:
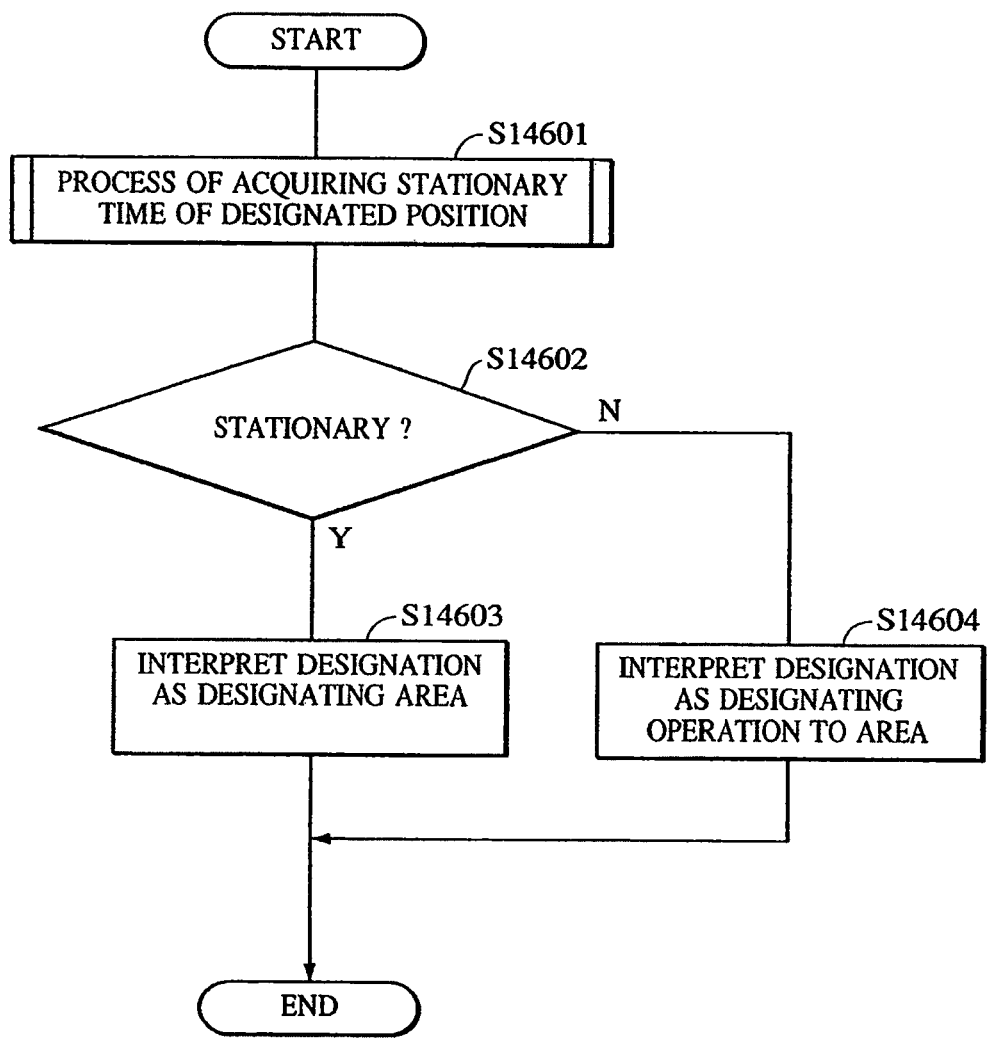
Figure 147A:
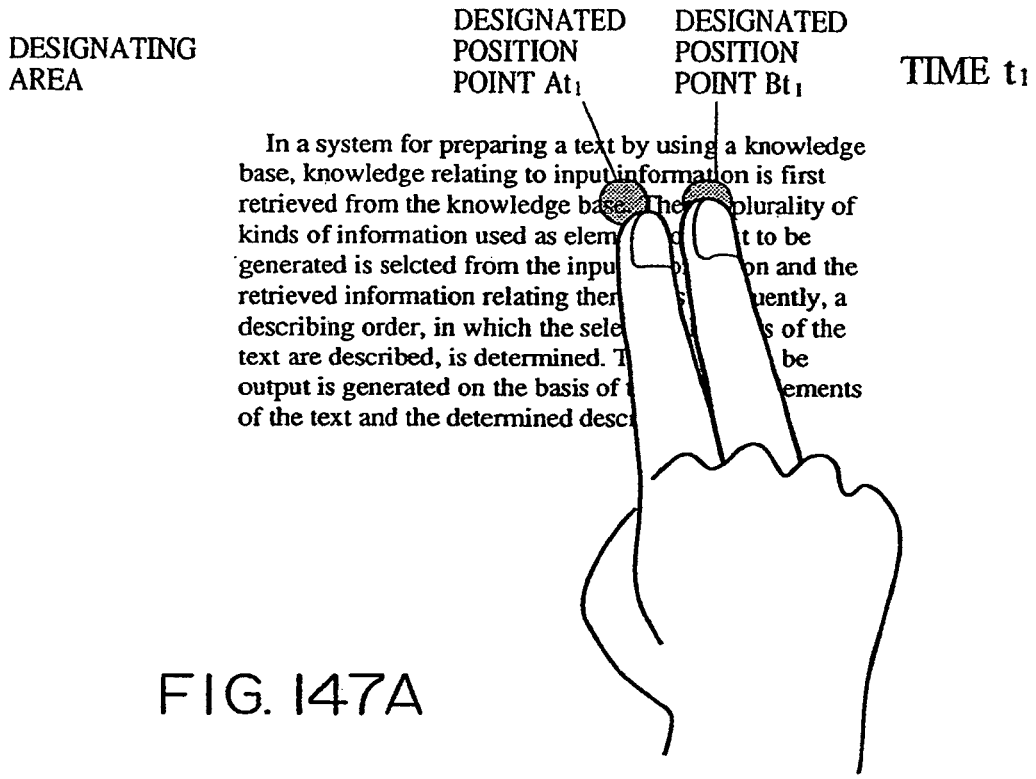
Figure 147B:
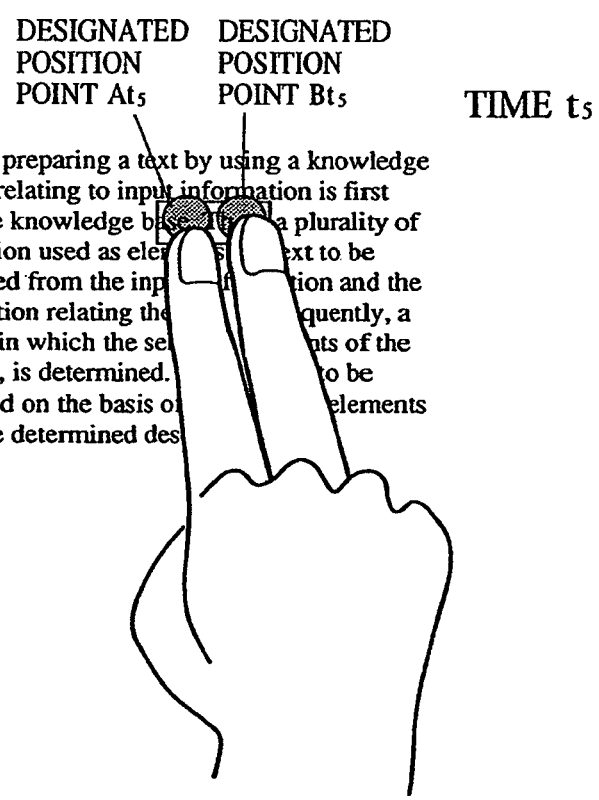
Figures 148A, 148B, 148C, 148D:
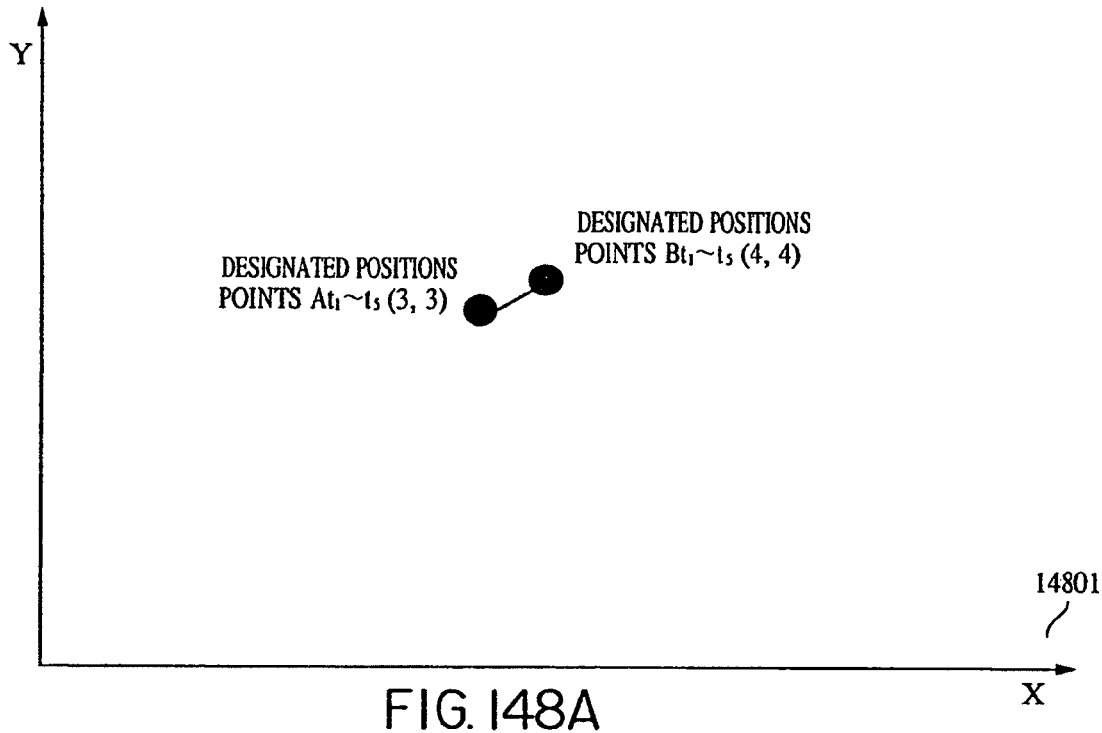
Figures 150A, 150B, 150C, 150D:
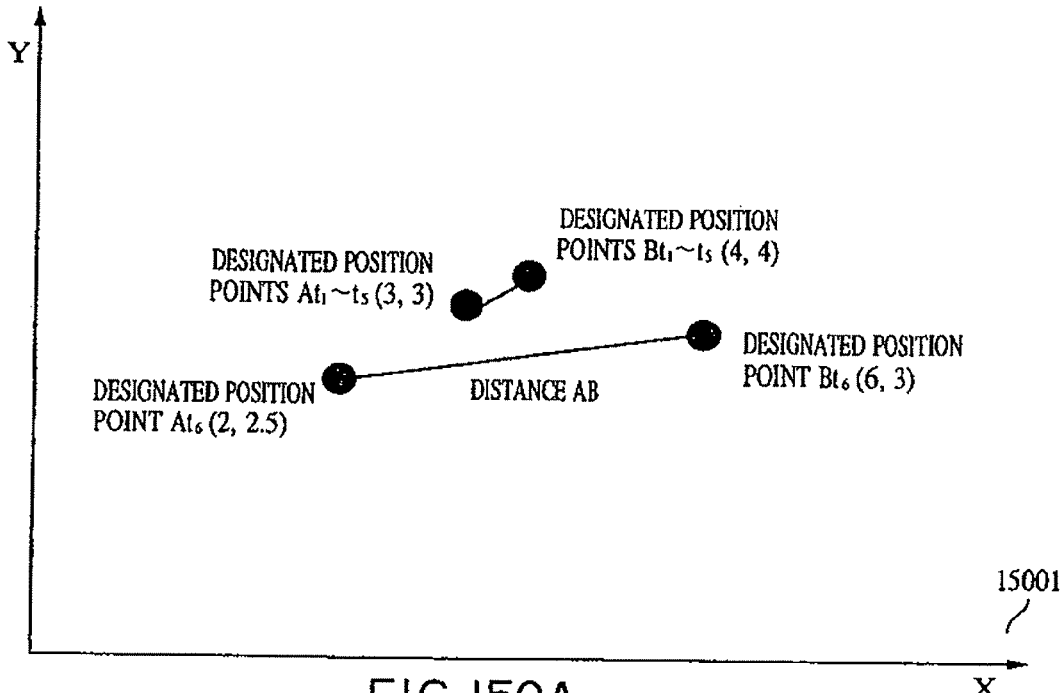

FIGS. 132A-132H show the corresponding data samples that are interpreted as the page-turning operation;

FIG. 133 is a flow diagram showing an algorithm for acquiring the speed of travel of a designated position as the designated position information other than the designated path;

FIG. 134 is a flow diagram showing an algorithm for acquiring the speed of travel of the designated position;

FIG. 135 is a flow diagram showing a designation interpretation process based on the designated position travel speed;

FIGS. 136A-136D show an operational example that is interpreted as a page-turning using the designated position travel speed;

FIGS. 137A-137G show the corresponding data samples that are interpreted as the page-turning using the designated position travel speed;

FIG. 138 is a flow diagram showing an algorithm that uses a contact pressure at a designated position as the designated information other than the designated path;

FIG. 139 is a flow diagram showing a designation interpretation process based on the designated position contact pressure;

FIGS. 140A-140D show an operational example that is interpreted as a screen shifting operation in response to the designated position contact pressure;

FIGS. 141A-141H show the corresponding data samples that are interpreted as the screen shifting operation in response to the designated position contract pressure;

FIG. 142 is a flow diagram showing an algorithm that uses the distances of travel of a plurality of designated positions;

FIG. 143 is a flow diagram showing a designation interpretation process based on the distances of travel of the plurality of designated positions;

FIGS. 144A-144D show an operational example that is interpreted as a page-turning operation in response to the distances of travel of the plurality of designated positions;

FIGS. 145A-145G show the corresponding data samples that are interpreted as the page-turning operation in response to the distances of travel of the plurality of designated positions;

FIG. 146 is a flow diagram showing an algorithm that uses stationary times of a plurality of designated positions;

FIGS. 147A and 147B show an operational example that is interpreted as an area designating operation;

FIGS. 148A-148D show the corresponding data samples that are interpreted as the area designating operation;

FIGS. 149A and 149B show an operational example that is interpreted as an expansion operation to be effected on a designated area; and FIGS. 150A-150D show the corresponding data samples that are interpreted as the expansion operation to be effected on the designated area.

DESCRIPTION OF THE PREFERRED EMBODIMENTS

Preferred embodiments of the present invention are discussed, referring to the drawings.

Figure 1:
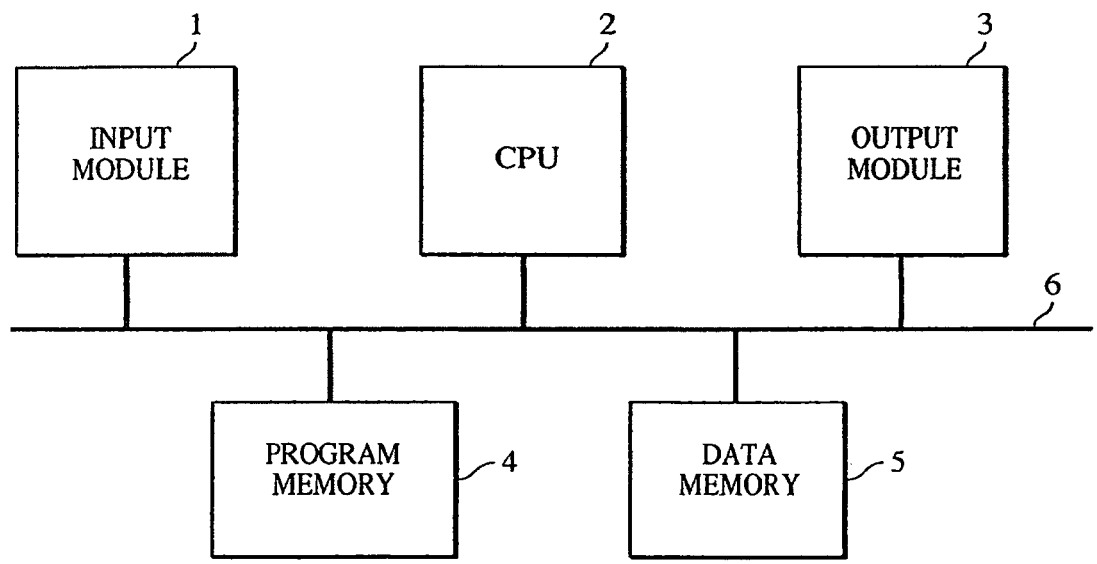
FIG. 1 is a block diagram showing the hardware structure of an information processing apparatus of one embodiment.

FIG. 1 is a block diagram showing the hardware structure of an information processing apparatus of one embodiment of the present invention.

As shown, for example, an input module 1 is a touch panel for receiving information by a position designation. A CPU 2, performing computation and logical determination for a variety of processes, controls elements connected to a bus 6. An output module 3 is a display for displaying information thereon, a printer for printing out information, or a modem for transmitting information.

A program memory 4 stores programs which are executed by the CPU 2, as will be discussed in detail with reference to flow diagrams. The program memory 4 may be a ROM (Read-Only Memory) or a RAM (Random Access Memory) into which programs are transferred from an external storage device.

A data memory 5 stores data that is created in the course of each process, and knowledge base, as will be discussed later. The data memory 5 may be a RAM. The knowledge base may be preloaded from a nonvolatile external storage device, or may be referenced in time of need.

The bus 6 transfers an address signal designating an element that is to be controlled by the CPU 2, a control signal for controlling each element, and data to be exchanged the elements.

First Embodiment

Figure 2A:
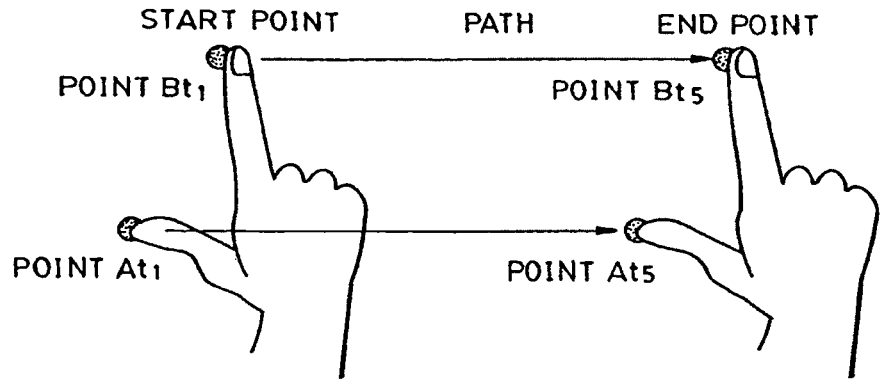
FIGS. 2A-2C show an example of position inputting using a finger on a touch panel.
Figure 2B:
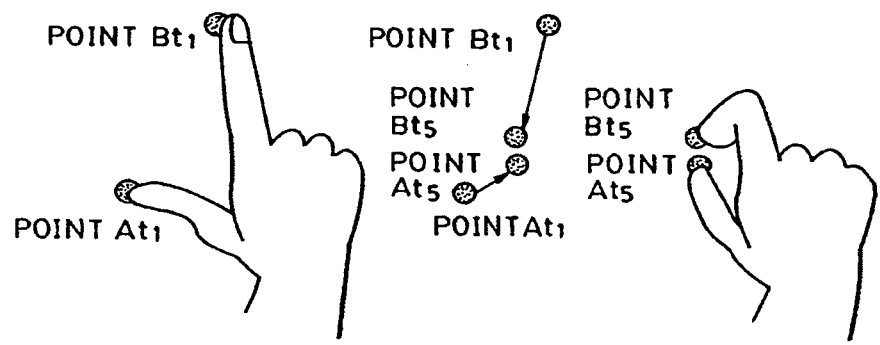
Figure 2C:
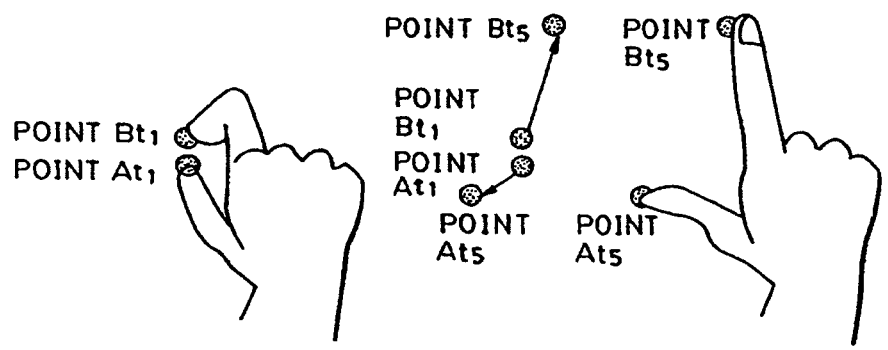

FIGS. 2A-2C show an example of position inputting using a finger on a touch panel. As shown, the information processing apparatus knows an input by acquiring the paths extending between the start points and the end points of two paths A and B at which fingers touch.

In an example 1 of travel of designated position points in a parallel direction, the distance between the two points remain unchanged, and the resulting paths are parallel. This example may be used to translate an object.

In an example 2 of travel of designated position points in an inward direction, the two points approach each other in the paths thereof. This example may be used to contract or minimize an object.

In an example 3 of travel of designated position points, the two points move away from each other in the paths thereof. This example may be used to expand or maximize an object.

Figure 3:
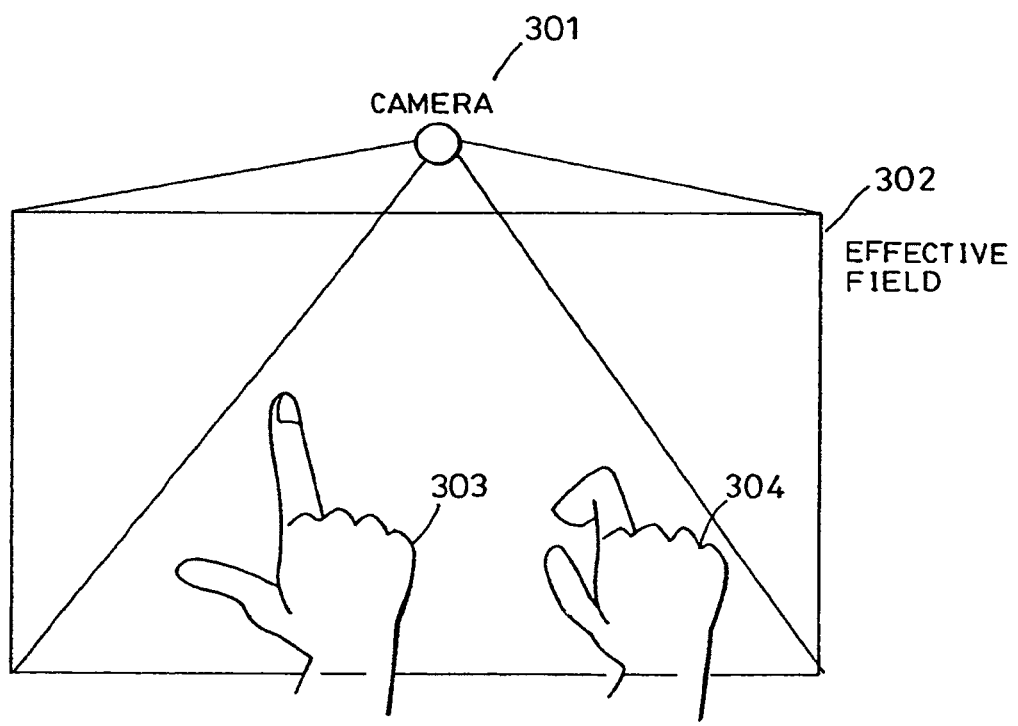
FIG. 3 shows an example of position inputting using a finger on an image pickup device.

FIG. 3 shows an example of position inputting using a finger on an image pickup device. Instead of directly touching the touch panel with the fingers, a user moves the fingers as represented by signs 303 and 304 within a effective field 302 of a camera 301. The apparatus recognizes a pointed location (at the finger tip), thereby detecting a designated position point.

Figure 4:
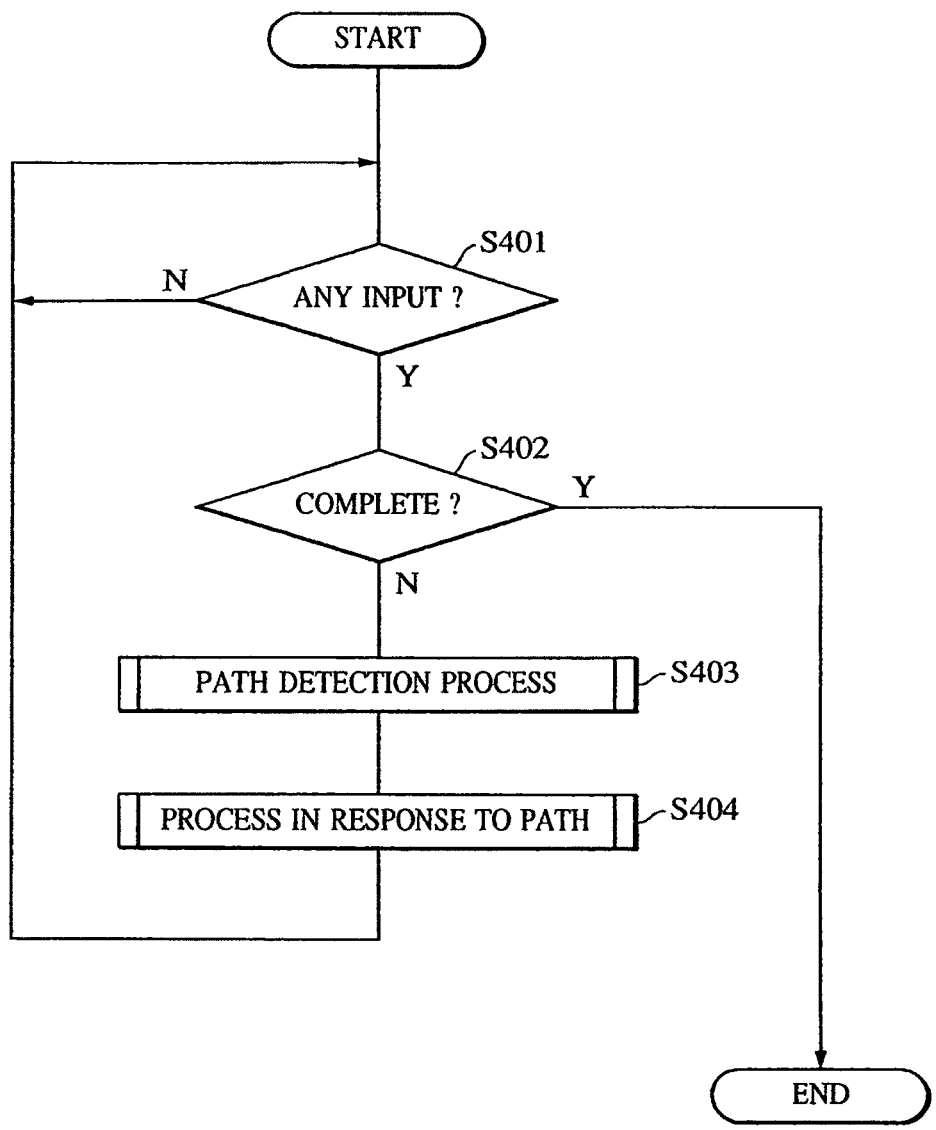
FIG. 4 is a flow diagram showing a process of using a path of a designated position.

FIG. 4 is a flow diagram showing a process of using a path of a designated position point. As shown, an input is sensed in step S401. When the end of the input remains undetected, the algorithm proceeds to step S403. A path detection process is thus initiated. In succession, in step S404, a process in response to a detected path as input information is initiated.

Figure 5:
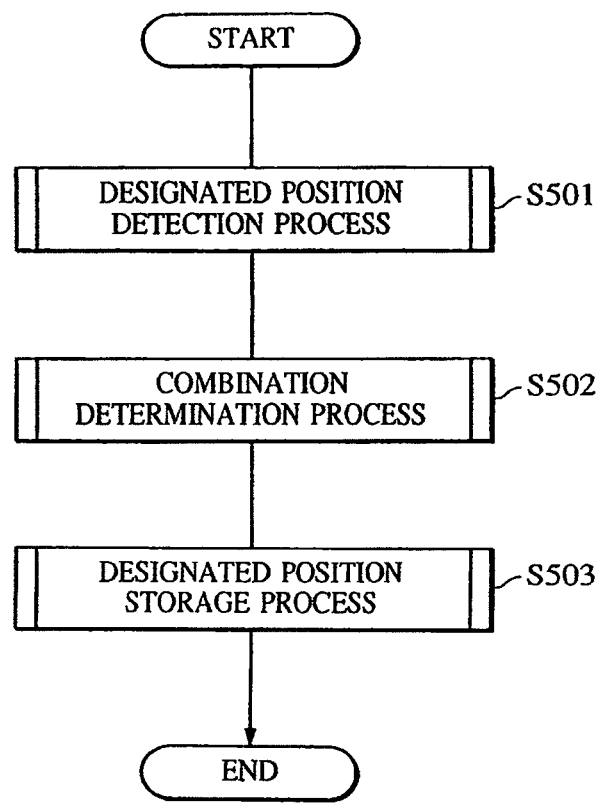
FIG. 5 is a flow diagram showing a process of a path detection.

FIG. 5 is a flow diagram showing the path detection process performed in step S403. In step S501, a designated position detection process is executed to acquire coordinate data of current designated position points. In step S502, a combination determination process is performed to determine combinations of current designated position points and immediately preceding designated position points respectively closest thereto. In step S503, a designated position storage process is executed to store the current designated position point in an optimum designated position table (i.e., the same table in which the immediately preceding position closest thereto is stored).

Figure 6:
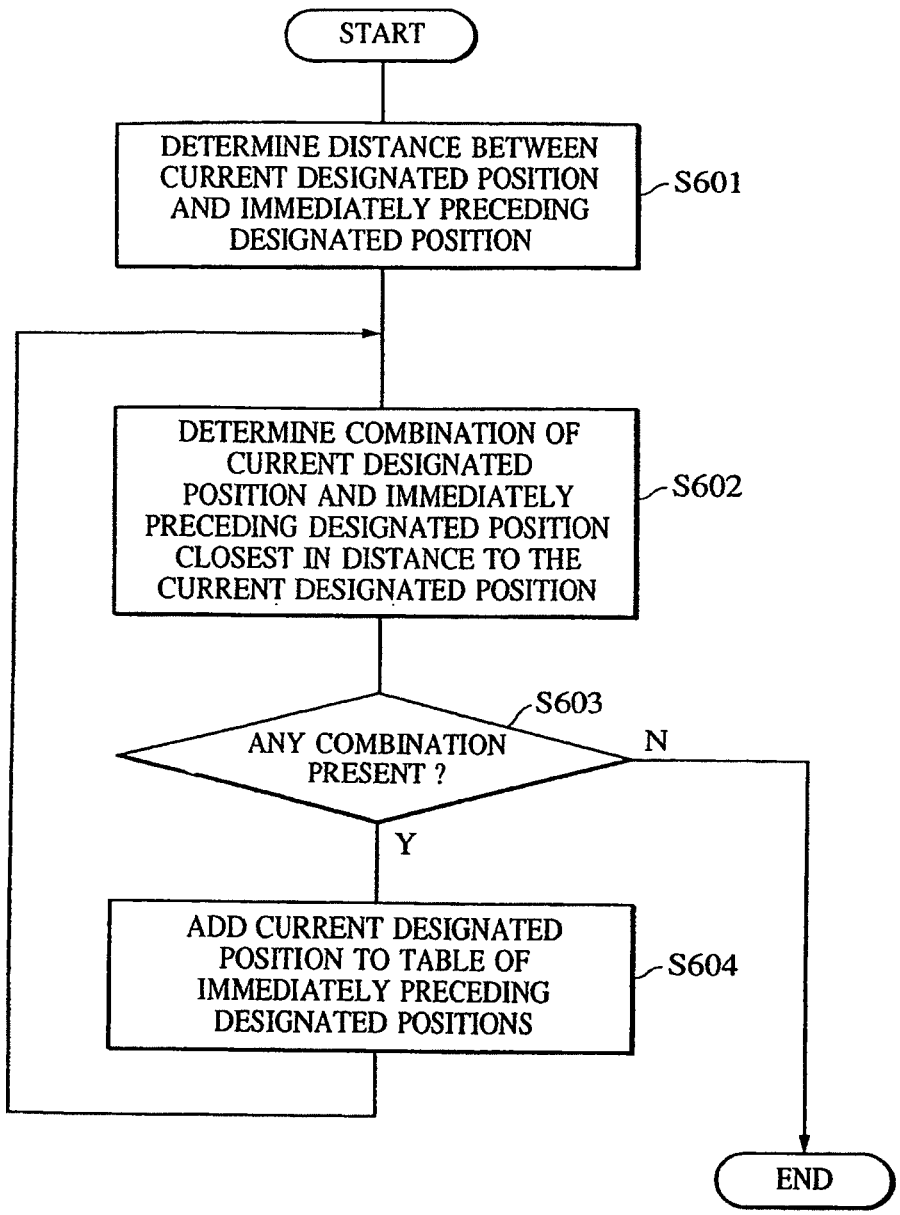
FIG. 6 is a flow diagram showing a combination determination process.

FIG. 6 is a flow diagram showing a combination determination process in step S502. As shown, step S601 performs a process for determining a distance between one of the current designated position points and each of the immediately preceding designated position points. In step S602, a combination of the current designated position point and the immediately preceding designated position point closest thereto is determined. When such a combination is found in step S603, the algorithm proceeds to step S604. The current designated position point is then added to the table that stores the immediately preceding designated position point to be combined therewith. This series of steps is repeated until no further combination is found in step S603.

Figures 7A, 7B, 7C:
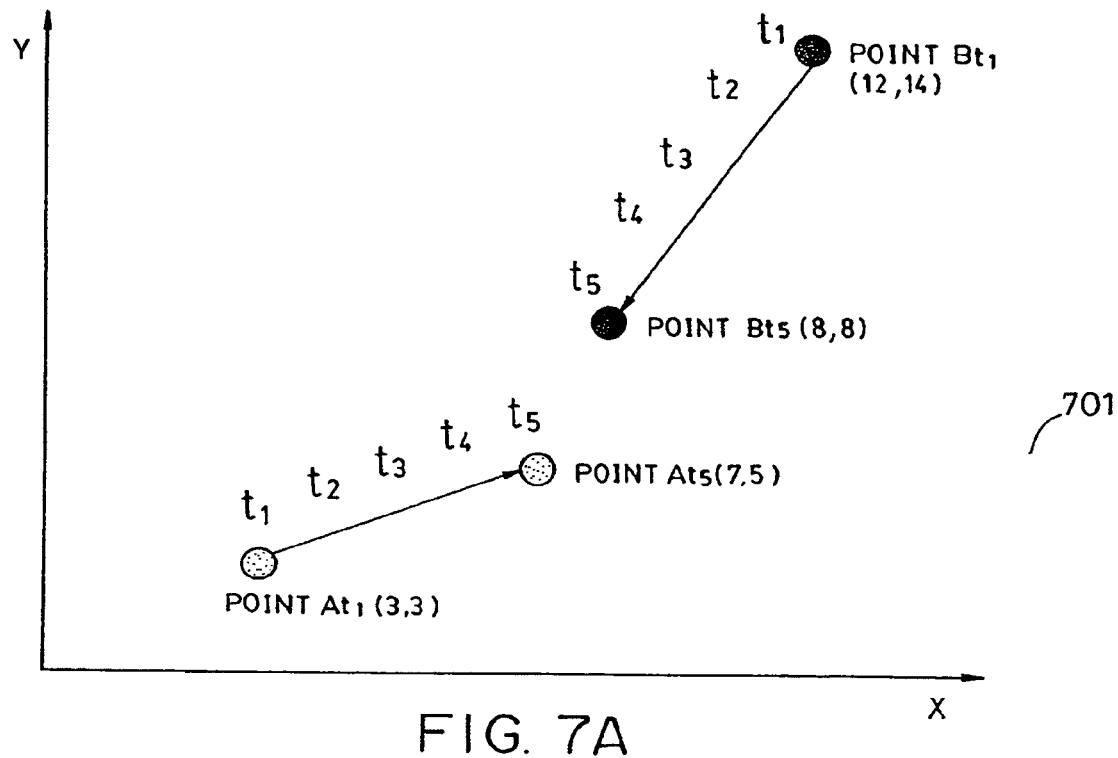
FIGS. 7A-7C show stored designated position data.

FIGS. 7A-7C show stored current designated position data that is stored in the path detection process. As shown in a graph 701, the XY coordinates of a point $At_1$ are (3,3) at time $t_1$, and the XY coordinates of a point $At_5$ are (7,5) at time $t_5$. Tables 702 and 703 respectively store the coordinate data of the points A and B taken at time points from $t_1$ to $t_5$.

Figures 8A, 8B:
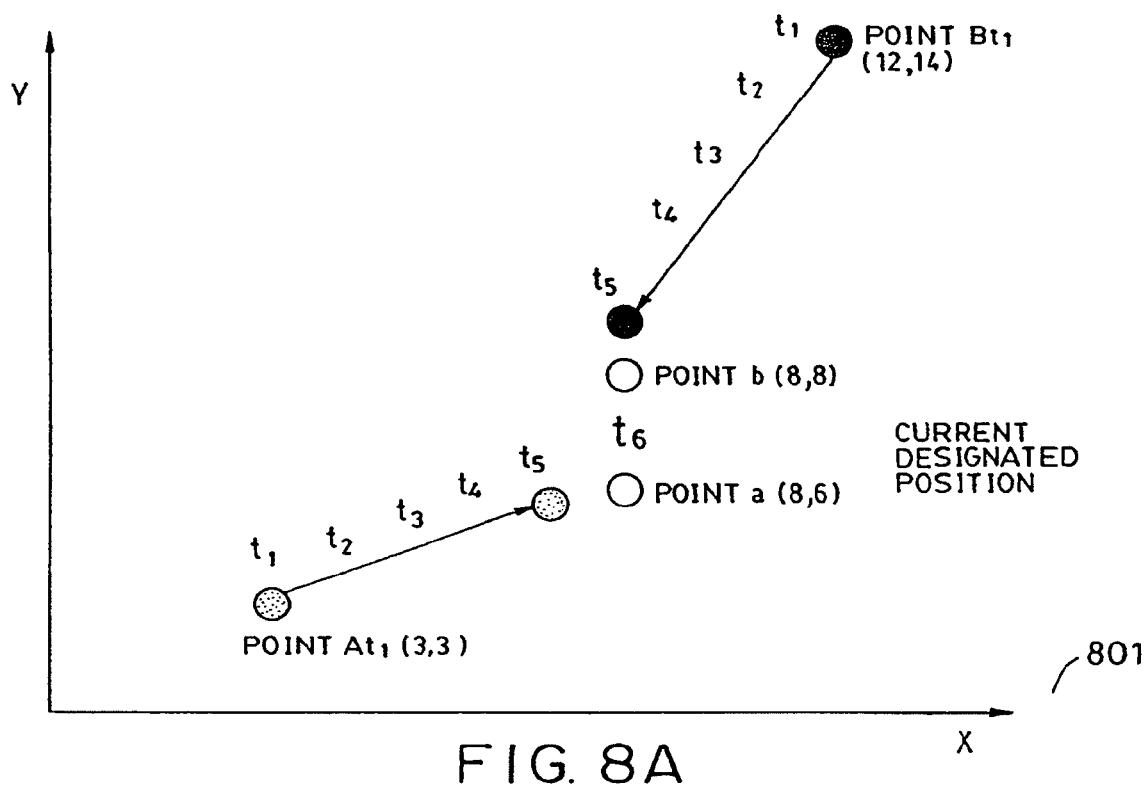
FIGS. 8A and 8B show current designated position data.

FIGS. 8A and 8B show current designated position data that is acquired in the path detection process. As shown in a graph 801, there are a plurality of designated position points at time $t_6$: a point a having XY coordinates (8,6) and a point b having XY coordinates (8,8). A table 802 stores the position data currently acquired (at time $t_6$).

FIGS. 9A-9D show a flow of data that is used in the detection of paths of a plurality of designated position points. As shown, a table 901 stores the point a (8,6) and the point b (8,8) as the current designated data. Referencing the current designated position data, a distance is calculated from each of the current designated position points to each of the immediately preceding designated position points. For example, the apparatus determines a distance of 1.414 from the point a to the immediately preceding designated position point $At_5$ and a distance of 4.123 from the point a to the immediately preceding designated position point $Bt_5$.

As a result, the point a is stored in a table 903 which stores the immediately preceding designated position point $At_5$ closest thereto. Similarly, the point b is stored in a table 904 which stores the immediately preceding designated position point $Bt_5$ closest thereto.

Figure 10:
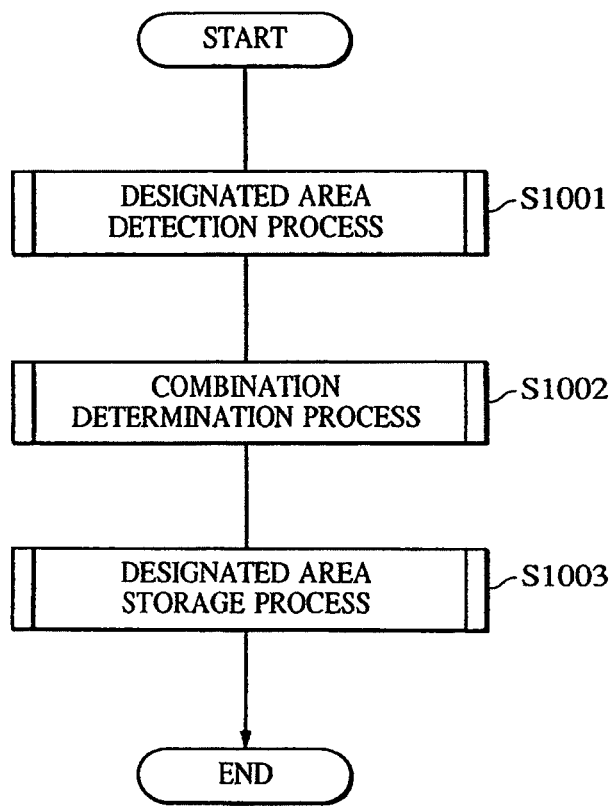
FIG. 10 is a flow diagram showing a path detection process using the size of a designated area.

FIG. 10 is a flow diagram showing a path detection process using the size of a designated area. In the above process, the path is determined based on the assumption that each of the current designated position points is linked to one of the immediately preceding designated position points closest thereto. Here, a path is determined based on the assumption that each of the current designated position points is linked to one of the plurality of preceding designated position points having a designated area (for example, a contact area by a finger on a touch panel) closest in size to the area of the current designated position point.

As shown, a designated area detection process is initiated to acquire the current designated area in step S1001. In step S1002, a combination determination process is initiated to determine a combination of the current designated area and the immediately preceding designated area closest thereto based on a difference between the current designated area and the immediately preceding designated area. In step S1003, a designated-area storage process is initiated in step S1003 to store the current designated area in an optimum table (i.e., the table that stores the immediately preceding designated area closest to the current designated area).

Figure 11:
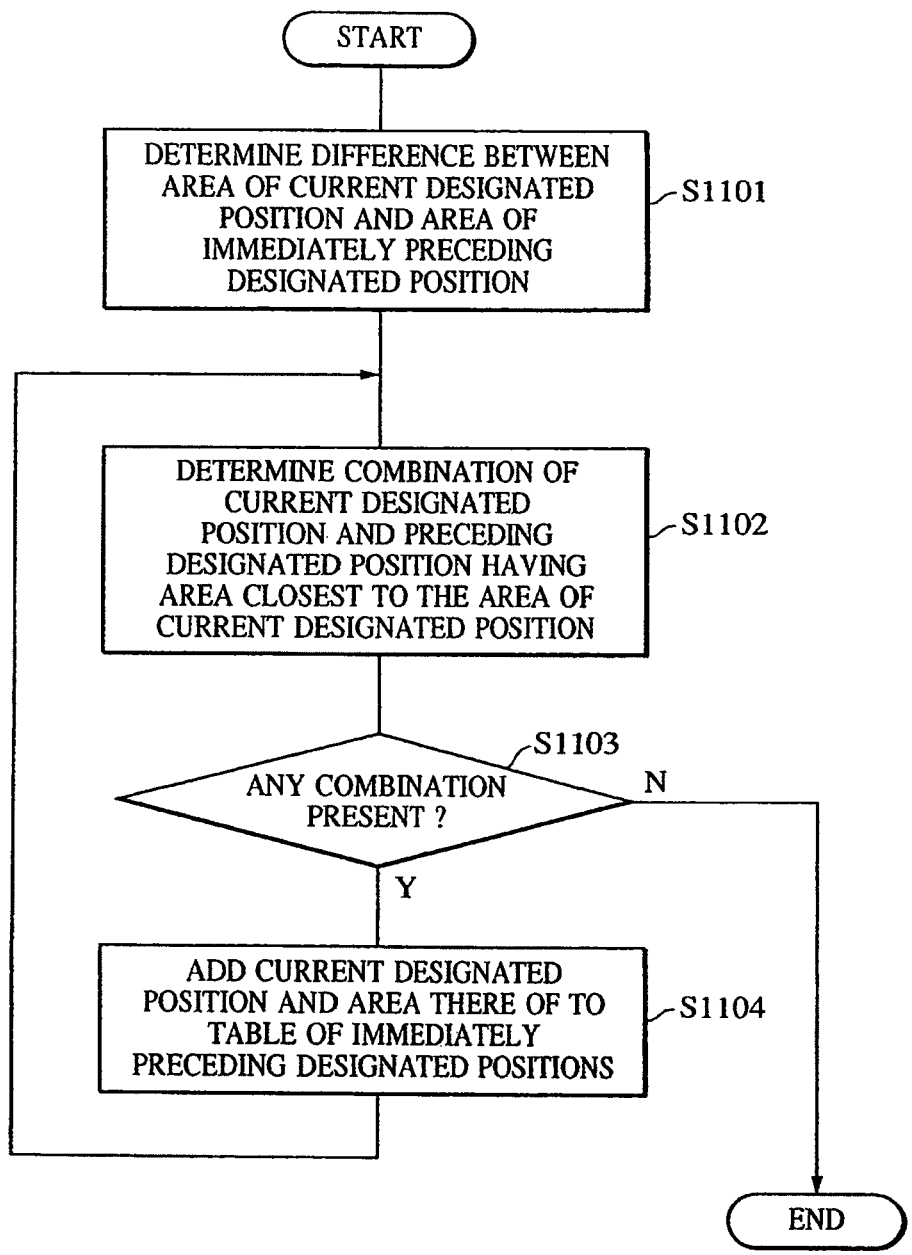
FIG. 11 is a flow diagram showing a combination determination process using the designated area.
Figures 13A, 13B, 13C, 13D:
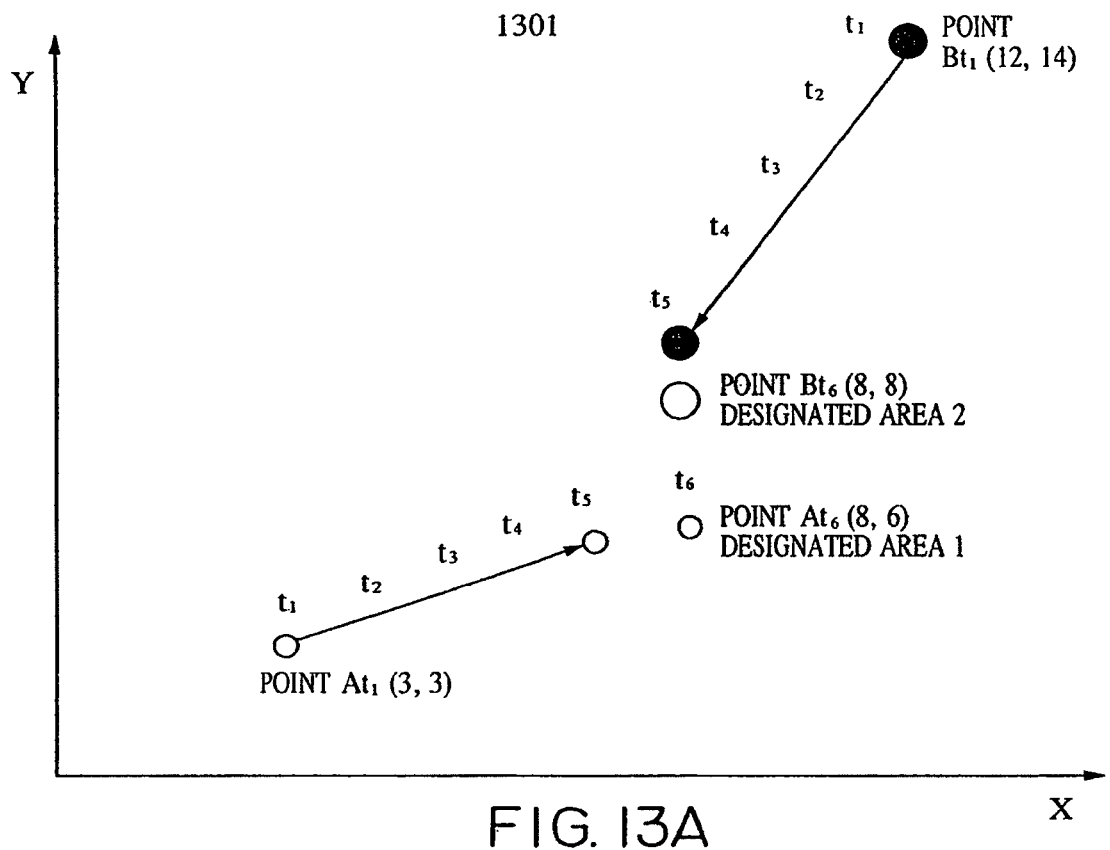
FIGS. 13A-13D show the data of the area of the stored designated positions.

FIG. 11 is a flow diagram showing the combination determination process using the size of the designated area in step S1002. As shown, in step S1101, a process is initiated to determine a difference between the current designated area and the immediately preceding designated area. In succession, step S1102 determines a combination of the current designated area and the immediately preceding designated area closest in size thereto. The algorithm proceeds to step S1104 when any combination is found in step S1103. The current designated position point and the area thereof are added to the table of the immediately preceding designated position point and the area thereof respectively closest in position and size thereto. This series of process steps is repeated until no further combinations are found in the step S1103.

FIGS. 12A and 12B show an area of an acquired current designated position point. In a graph 1201, the current designated position is the point a(8,6). An enlarged view 1202 shows the touch state of the touch panel when the point a is pressed. The area of the designated position point is thus determined.

FIGS. 13A-13D show the data of the area of the stored designated positions. As shown, in a graph 1301 at time $t_1$, the XY coordinates of the designated position point $At_1$ are (3,3) and the XY coordinates of the designated position point $Bt_1$ are (12, 14). At time $t_5$, the XY coordinates of the designated position point $At_5$ are (7,5) and the XY coordinates of the designated position point $Bt_5$ is (8,8). There also exist a current designated area 1 containing the point a(8,6) and a current designated area 2 containing the point b(8,8) at time $t_6$.

In a table 1302, the area A of the point a is 12.5 at time t1, and the area data of the point a at subsequent time points between time $t_1$ and time $t_5$ are also stored in the table 1302. Similarly, the data of the area B of the point b at each time point is stored in a table 1303. A table 1304 stores an area of 11.5 containing the point a and an area of 20.0 containing the point b as the acquired designated data at current time $t_6$.

FIGS. 14A-14D show a flow of data that is used in a path acquisition process based on the size of the designated area. As shown, a table 1401 lists, as the current designated area data, an area of 11.5 containing the point a(8,6) and an area of 20.0 containing the point b(8,8). Referencing the current designated area data, the apparatus acquires a difference between the current designated area data and the immediately preceding area data and stores the difference in a table 1402. With respect to the designated area 11.5 containing the point a, the apparatus thus acquires a difference of 0.5 from the immediately preceding area A and a difference of 9.0 from the immediately preceding area B.

The designated area data 11.5 containing the point a is thus stored in a table 1403 that stores the immediately preceding area A that results in the minimum difference. Similarly, the designated area data containing the point b is stored in a table 1404 that stores the immediately preceding designated area B.

Second Embodiment

A second embodiment of the present invention is discussed. In the second embodiment, a process for interpreting an operation to perform is based on a combination of travel paths of at least two designated position points.

Figure 15:
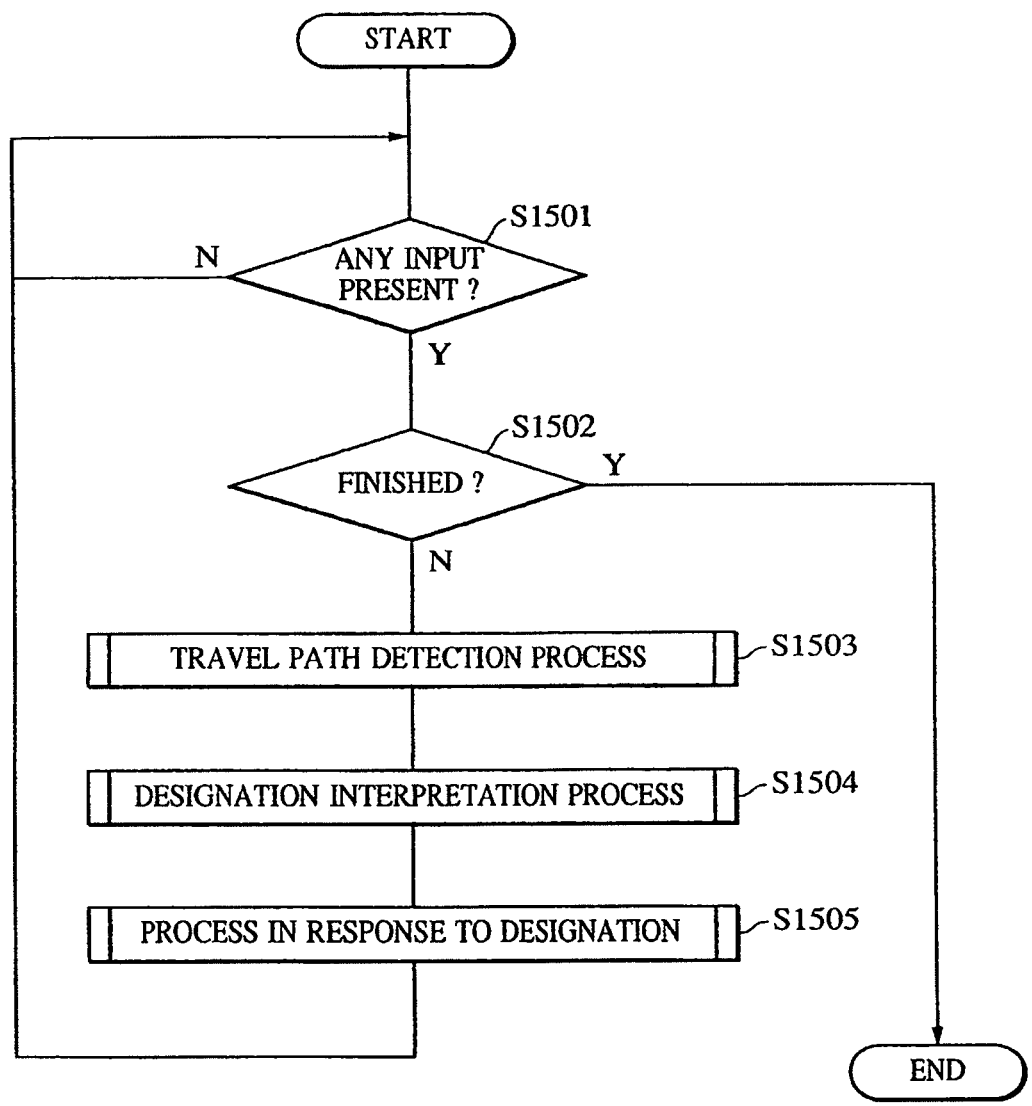
FIG. 15 is a flow diagram showing an operational procedure using the paths of a plurality of designated positions.

FIG. 15 is a flow diagram showing an operational procedure using the paths of a plurality of designated position points. An input is detected in step S1501. The algorithm proceeds to step S1502. When the end of the input remains undetected in step S1502, the algorithm proceeds to step S1503, thereby initiating a travel path detection process. In step S1504, a designation interpretation process is performed, and in step S1505, a process in response to the designation is initiated.

Figure 16:
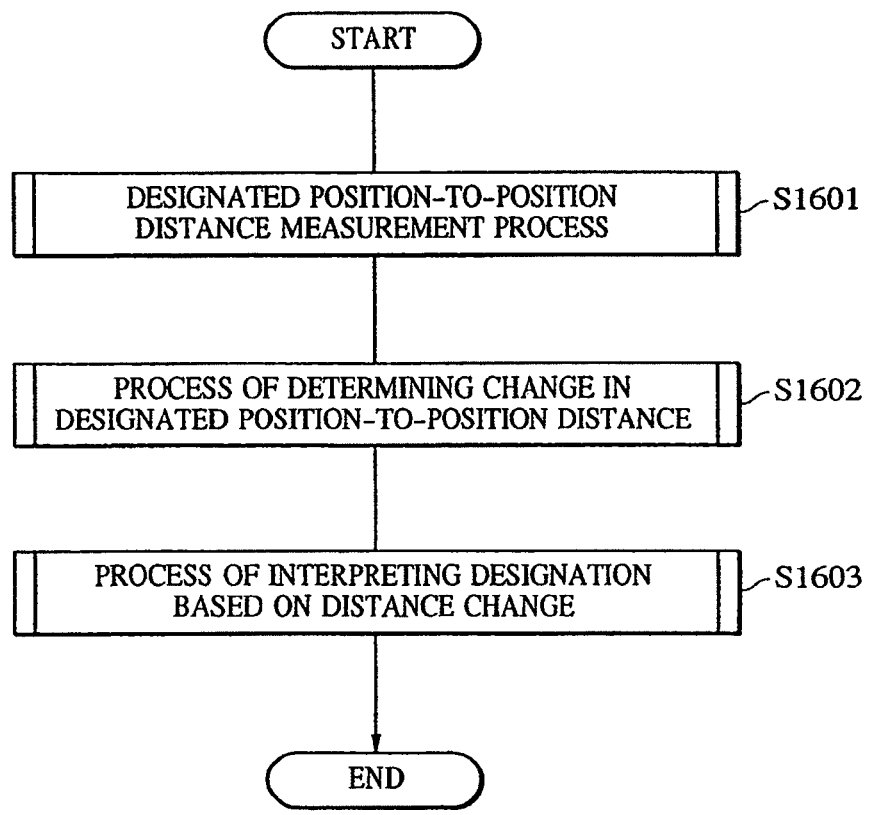
FIG. 16 is a flow diagram showing a process flow of a designation interpretation process.

FIG. 16 is a flow diagram showing a process flow of the designation interpretation process in the step S1504. In step S1601, a designated position-to-position distance measurement process is initiated to measure a distance between current designated position points. In succession, step S1602 performs a process for acquiring a change in the designated position-to-position distance to acquire the distance change. In step S1603, the designation interpretation process based on the distance change is performed to interpret an operation to perform based on the acquired distance change.

Figure 17:
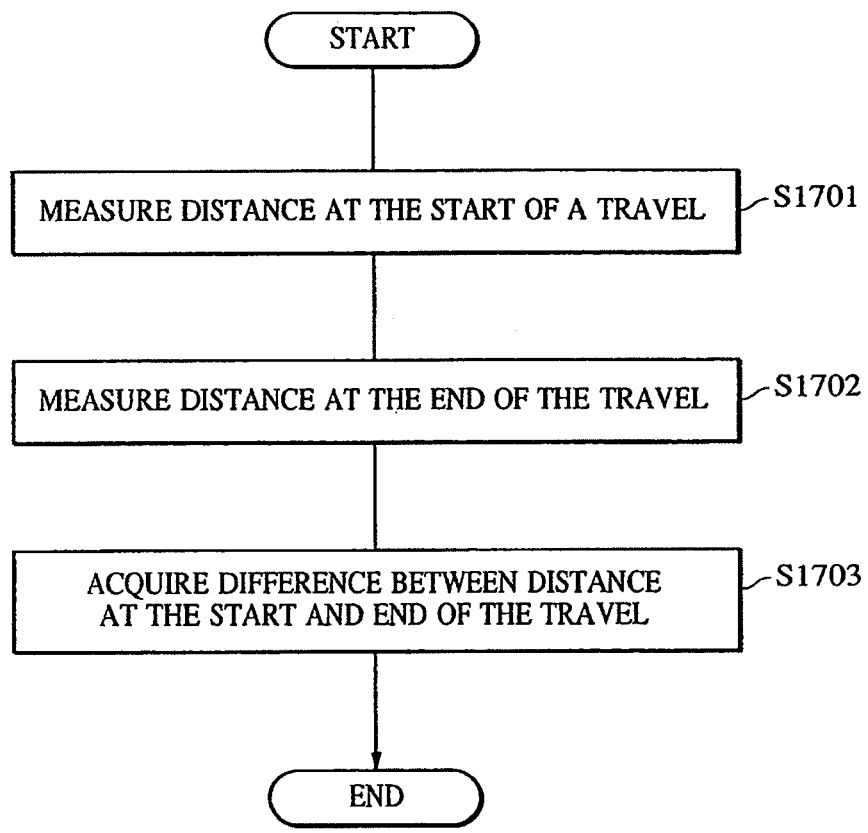
FIG. 17 is a flow diagram showing an algorithm for acquiring a change in the distance between designated positions.

FIG. 17 is a flow diagram showing a process in the step S1602 for acquiring the change in the distance between the designated position points. In step S1701, a distance between the designated position points at the start of a travel is measured. In step S1702, a distance between the designated position points at the end of the travel is measured. In succession, step S1703 determines a difference between the distance between the designated position points at the start of the travel and the distance between the designated position points at the end of the travel.

Figure 18:
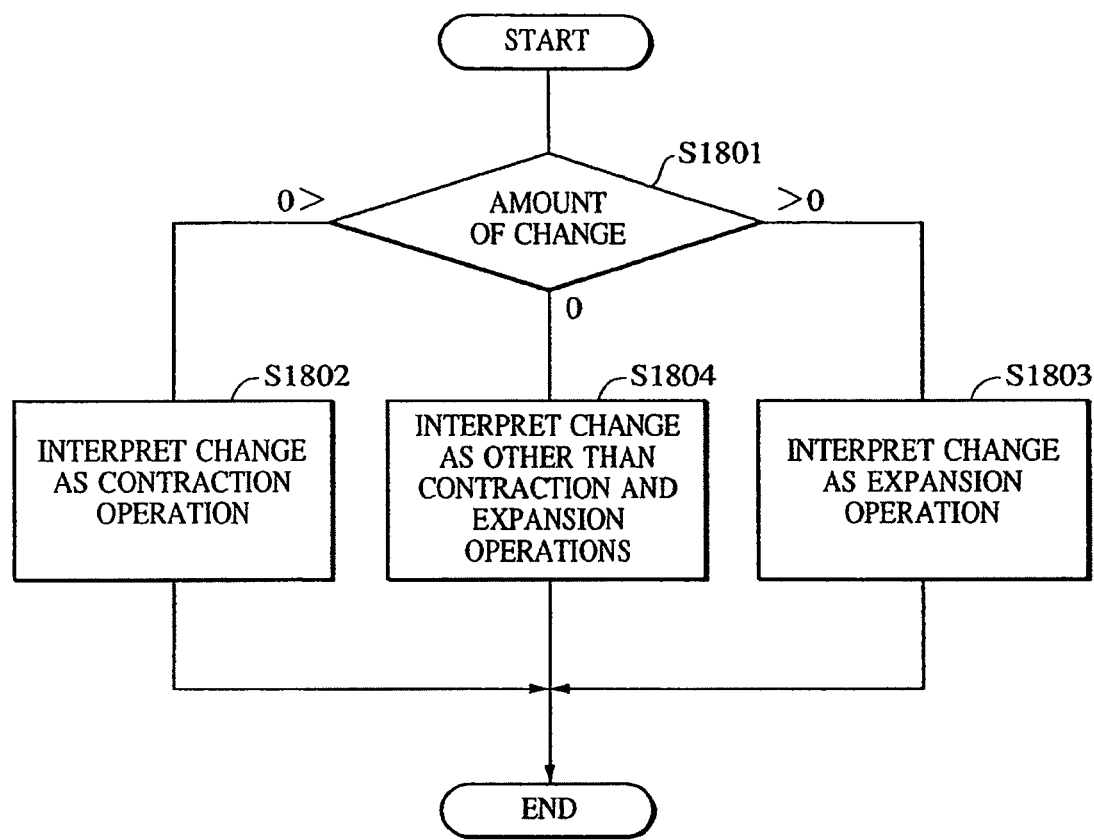
FIG. 18 is a flow diagram showing a designation interpretation process based on the change in the distance between the designated positions.

FIG. 18 is a flow diagram showing a designation interpretation process in the step S1603 based on the change in the distance between the designated position points. When the amount of change in the distance is smaller than zero in step S1801, the designation is interpreted as a contraction operation (in step S1802). When the amount of change is greater than zero, the designation is interpreted as an expansion operation (in step S1803). When the amount of change is equal to zero, the designation is interpreted as an operation other than the contraction and expansion operations (in step S1804).

Figure 19:
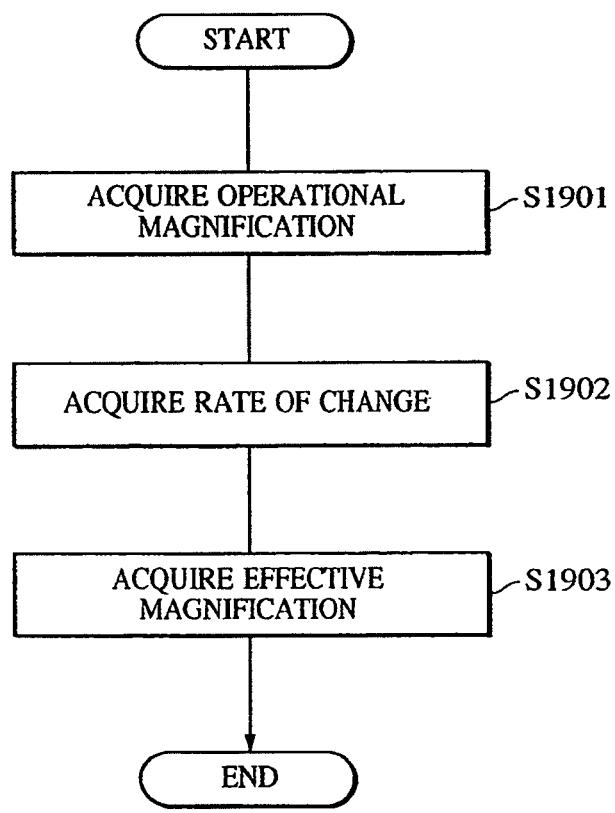
FIG. 19 is a flow diagram showing another designation interpretation process based on the change in the distance between the designated positions.

FIG. 19 is a flow diagram showing another designation interpretation process based on the change in the distance between the designated position points. In step S1901, an operational magnification is acquired from the distance change obtained in the process of acquiring the distance change between the designated position points. In step S1902, the rate of change is acquired, and in step S1903, an effective magnification results from the operational magnification and rate of change data in accordance with the following equation.

Effective magnification=100−(100−operational magnification $X$)×rate of change $\alpha$ FIGS. 20A and 20B show an operational example that is interpreted as a contraction operation. As shown, designated position points A and B at the start time $t_1$ of a travel are respectively shifted to designated position points A' and B' at the end time $t_5$ of the travel. This input is interpreted as a contraction operation.

Figures 21A, 21B:
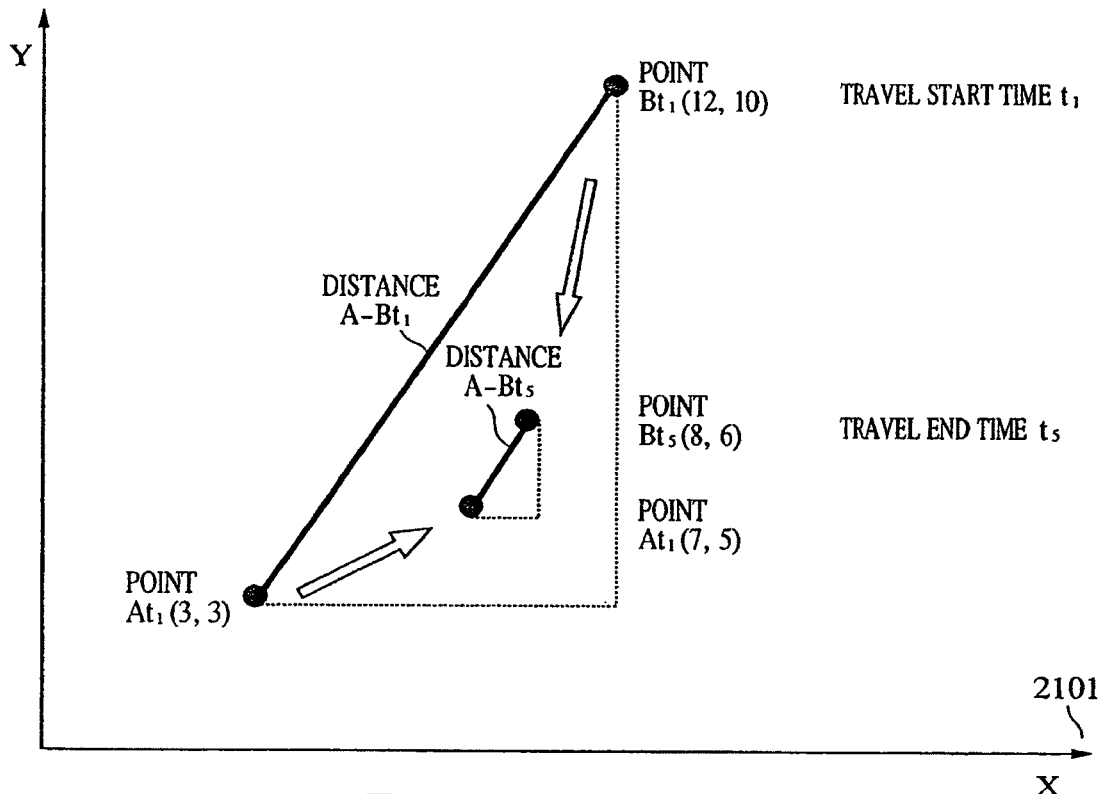
FIGS. 21A and 21B show the corresponding data samples that are interpreted as the contraction operation.

FIGS. 21A and 21B show the corresponding data samples that are interpreted as the contraction operation. In a graph 2101, the XY coordinates of the designated position points are $At_1(3,3)$ and $Bt_1(12,10)$ at the start time $t_1$ and $At_5(7,5)$ and $Bt_5(8,6)$ at the end time $t_5$ of the travel. Referring to a table 2102, the distance between the designated points is 15.00 at the start time $t_1$, and is 1.118 at the end time $t_5$. The mount of change in the distance between the designated position points is −13.882 from the start time $t_1$ to the end time $t_5$. The magnification of the distance change between the designated position points from the start time t1 to the end time $t_5$ is 7%.

FIGS. 22A and 22B show an operational example that is interpreted as an expansion operation. As shown, designated position points A and B at the start time $t_1$ of a travel are respectively shifted to designated position points A' and B' at the end time $t_5$ of the travel. This input is interpreted as an expansion operation.

Figures 23A, 23B:
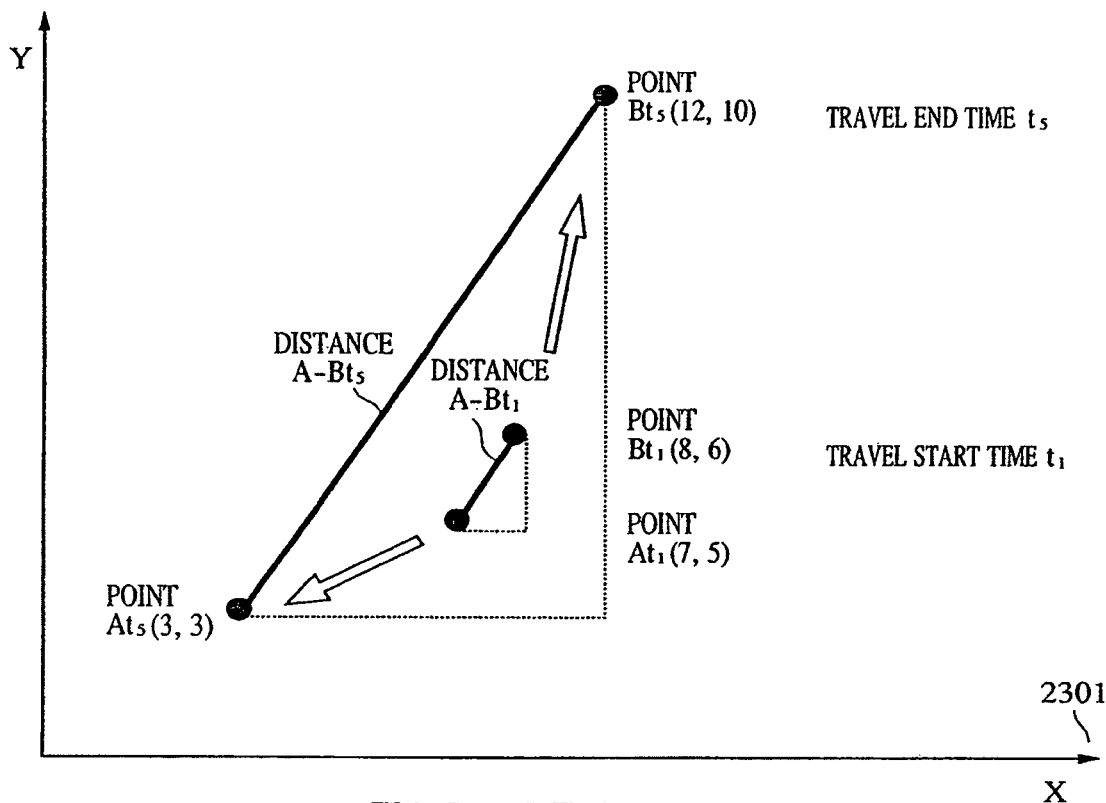
FIGS. 23A and 23B show the corresponding data samples that are interpreted as the expansion operation.

FIGS. 23A and 23B show the corresponding data samples that are interpreted as the expansion operation. In a graph 2301, the XY coordinates of the designated position points are $At_1(7,5)$ and $Bt_1(8,6)$ at the start time $t_1$ and $At_5(3,3)$ and $Bt_5(12,10)$ at the end time $t_5$ of the travel. Referring to a table 2302, the distance between the designated points at the start time $t_1$ is 1.118, and 11.402 at the end time $t_5$. The mount of change in the distance between the designated position points is +13.586 from the start time $t_1$ to the end time $t_5$. The magnification of the distance change between the designated position points from the start time $t_1$ to the end time $t_5$ is 1020%.

Third Embodiment

A third embodiment of the present invention is now discussed. The third embodiment accounts for a change in an angle made between a reference line and a line that connects two designated positions when an operation to perform is interpreted from a combination of travel paths of at least two designated positions. The angle made between the reference line and the line that connects the two designated positions is hereinafter occasionally referred to as the designated position angle.

Figure 24:
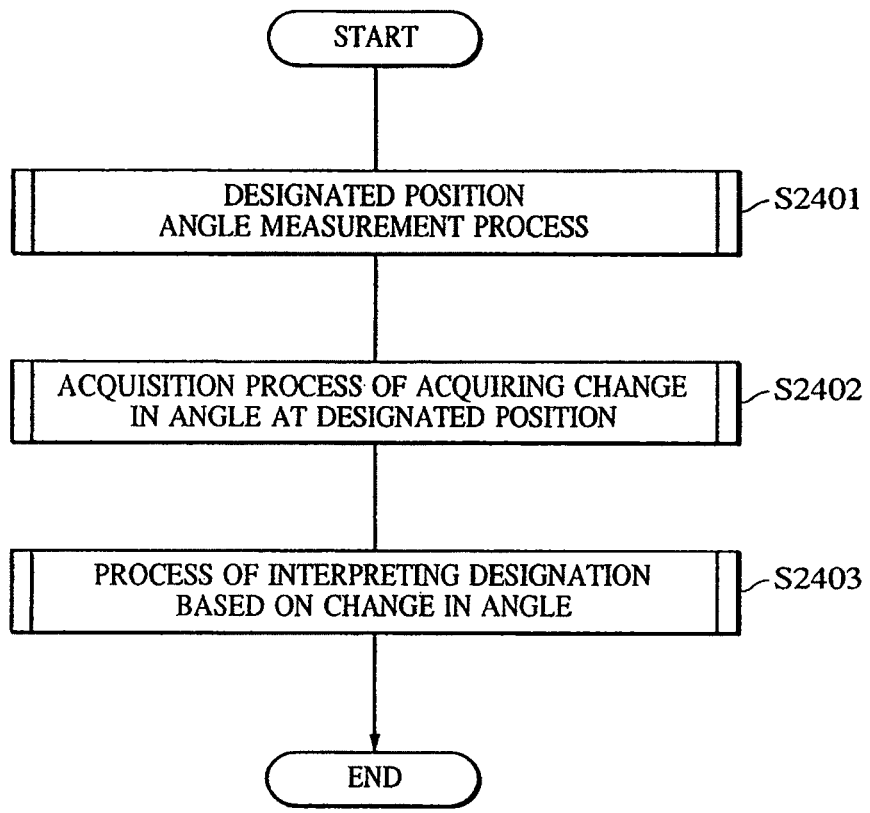
FIG. 24 is a flow diagram showing a designation interpretation process using a change in the angle of designated positions.

FIG. 24 is a flow diagram showing a designation interpretation process using a change in the angle of designated positions. In step S2401, a process for measuring the designated position angle is initiated. At each time point, the designated position angle is measured. The algorithm proceeds to step S2402. An acquisition process of acquiring a change in the designated position angle is performed. In step S2403, a designation interpretation process is initiated to interpret an operation to perform based on the acquired angle change.

Figure 25:
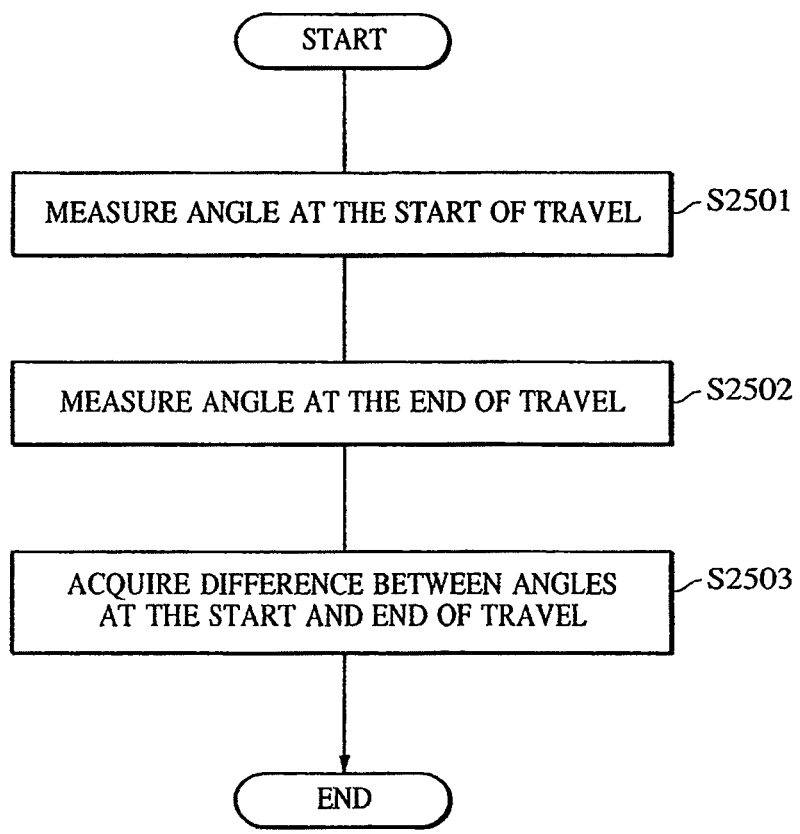
FIG. 25 is a flow diagram showing an algorithm for acquiring the change in the angle of the designated position.

FIG. 25 is a flow diagram showing the process for acquiring the change in the angle of the designated position. In step S2501, an angle of a line connecting the designated positions is measured at the start of a travel, and in step S2502, an angle of a line connecting the designated A and B is 60 degrees with respect to the X axis at the start time $t_1$ of the travel and is 26 degrees with respect to the X axis at the end time $t_5$ of the travel. As listed in a table 2802, the amount of change in the angle from the start time $t_1$ of the travel to the end time $t_5$ of the travel is −34°.

FIGS. 29A and 29B show an operational example that is interpreted as a counterclockwise rotation operation. As shown, designated position points A and B at the start time $t_1$ of the travel are respectively shifted to designated position points A' and B' at the end time $t_5$ of the travel. This input is interpreted as a counterclockwise rotation operation.

Figures 30A, 30B:
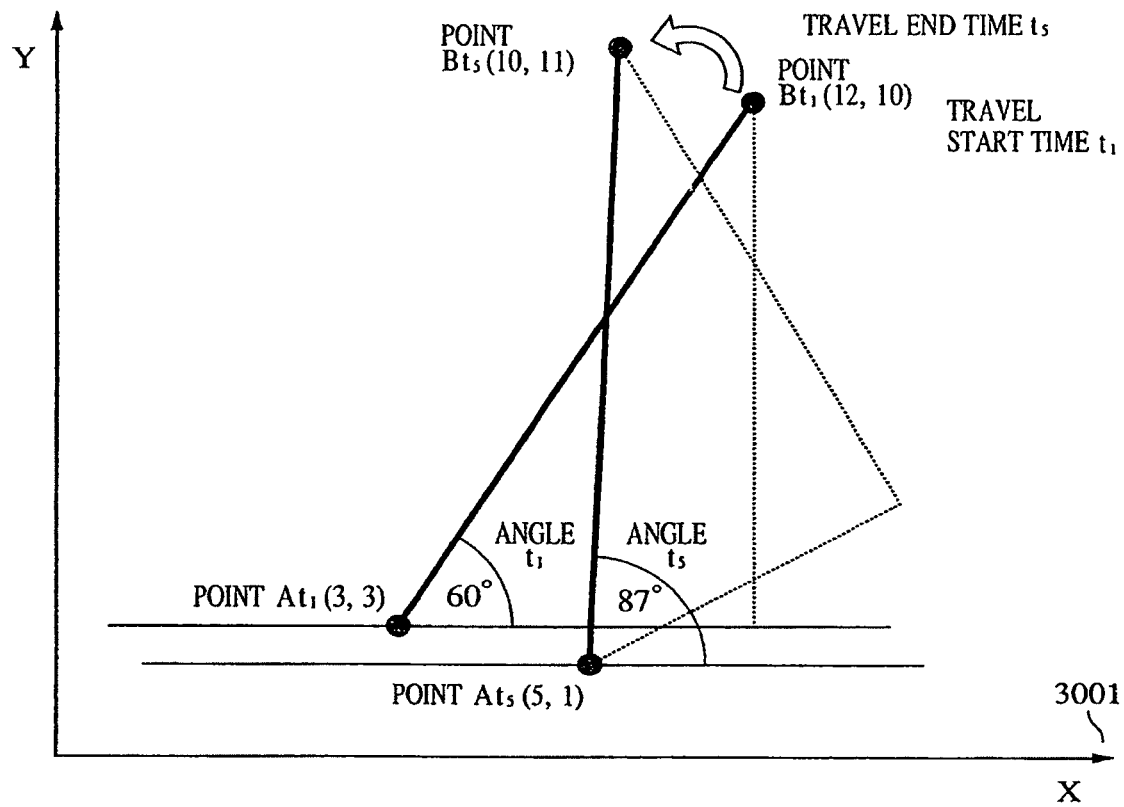
FIGS. 30A and 30B show the corresponding data samples that are interpreted as the counterclockwise rotation operation.

FIGS. 30A and 30B show the corresponding data samples that are interpreted as the counterclockwise rotation operation. In a graph 3001, the angle of the designated position point points A and B is 60 degrees with respect to the X axis at the start time $t_1$ of the travel and is 87 degrees with respect to the X axis at the end time $t_5$ of the travel. As listed in a table 3002, the amount of change in the angle from the start time $t_1$ of the travel to the end time $t_5$ of the travel is +27°.

Fourth Embodiment

A fourth embodiment of the present invention is now positions is measured at the end of the travel. The algorithm proceeds to step S2503. A difference between the angles of the line connecting the designated position points at the start of the travel and the line connecting the designated position points at the end of the travel is acquired.

Figure 26:
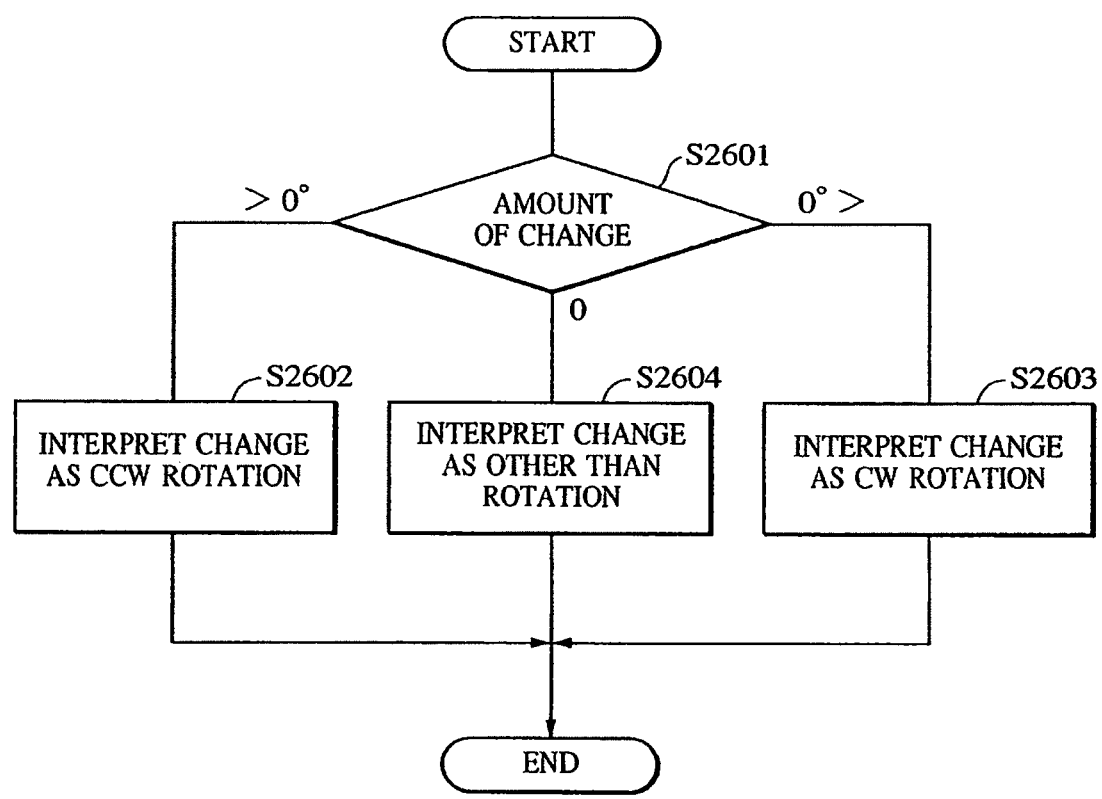
FIG. 26 is a flow diagram showing a designation interpretation process based on the angle change.

FIG. 26 is a flow diagram showing a designation interpretation process based on the angle change. When the amount of change is greater than zero degree in step S2601, the designation is interpreted as a counterclockwise rotation operation (in step S2602). When the amount of change is smaller than zero degree in the step S2601, the designation is interpreted as a clockwise rotation operation (in step S2603). When the amount of change equals zero degree, the designation is interpreted as an operation other than rotation operations (in step S2604).

FIGS. 27A and 27B show an operational example that is interpreted as a clockwise rotation operation. As shown, designated position points A and B at the start time $t_1$ of the travel are respectively shifted to designated position points A' and B' at the end time $t_5$ of the travel. This input is interpreted as a clockwise rotation operation.

Figures 28A, 28B:
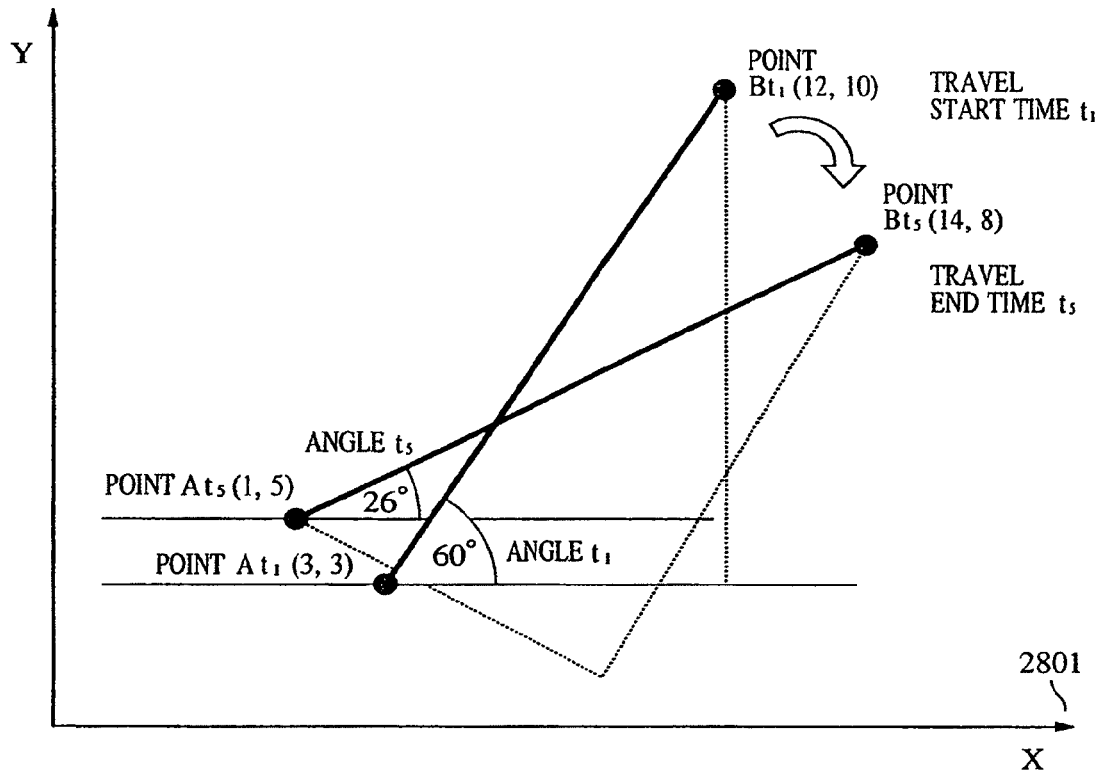
FIGS. 28A and 28B show the corresponding data samples that are interpreted as the clockwise rotation operation.

FIGS. 28A and 28B show the corresponding data samples that are interpreted as the clockwise rotation operation. In a graph 2801, the angle of the designated position points discussed. The fourth embodiment accounts for a change in a relationship between a designated fixed position and a designated moving position when an operation to perform is interpreted from a combination of travel paths of at least two designated position points.

Figure 31:
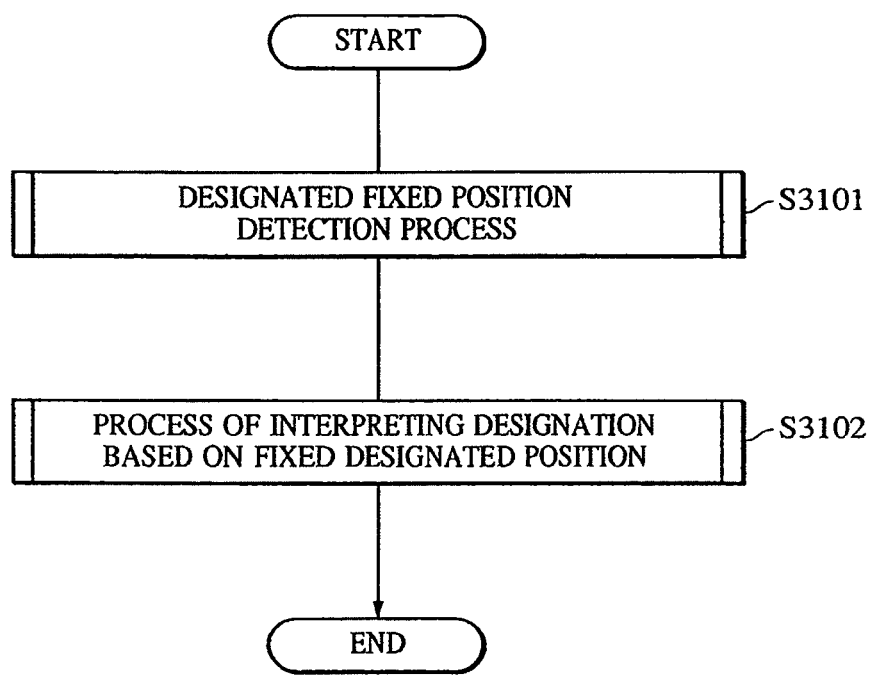
FIG. 31 is a flow diagram showing a designation interpretation process that uses a relationship between a designated fixed position and a designated moving position.

FIG. 31 is a flow diagram showing a designation interpretation process that uses a relationship between a designated fixed position and a designated moving position. In step S3101, a designated fixed position detection process is initiated to detect a designated fixed position. In succession, step S3102 initiates a designation interpretation process in response to the designated fixed position to interpret an operation to perform.

Figure 32:
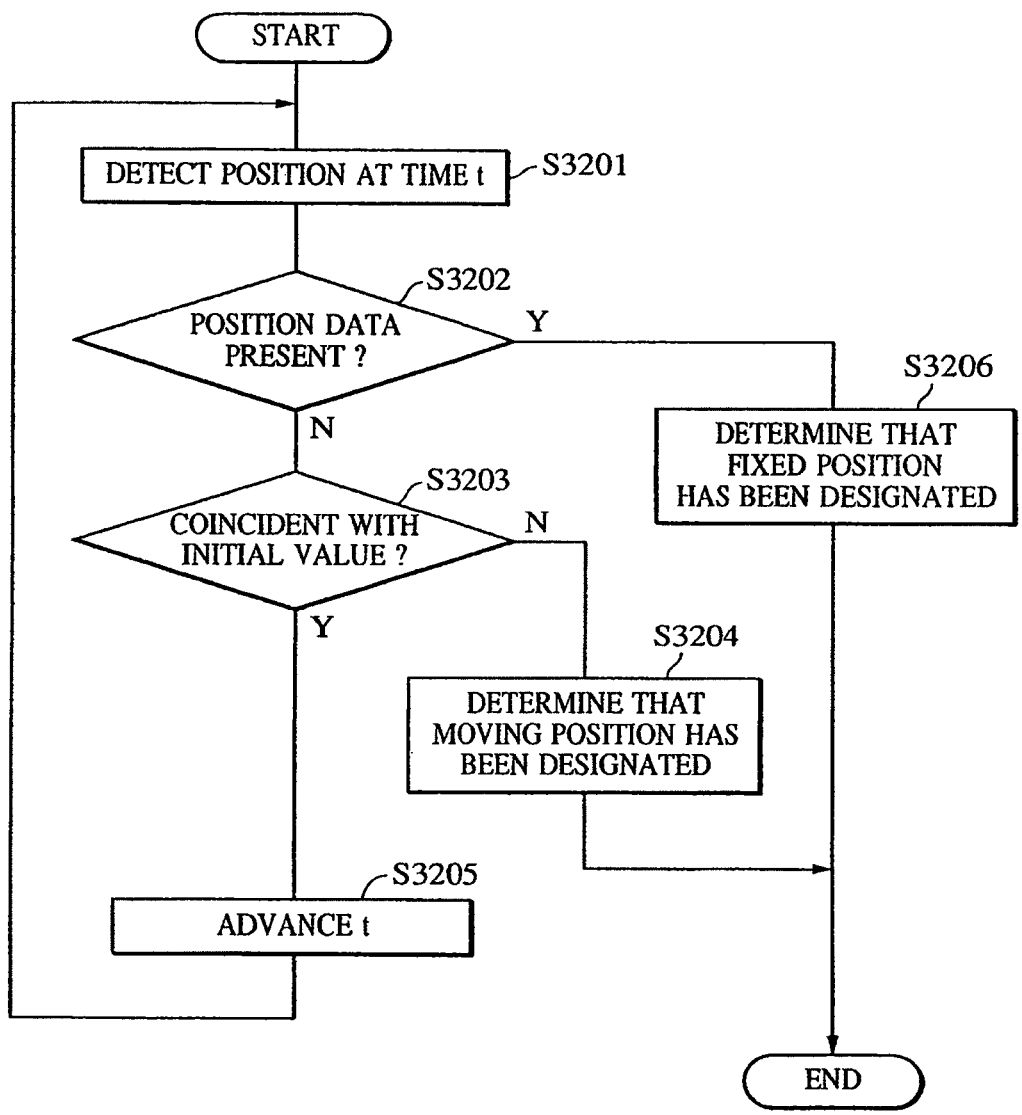
FIG. 32 is a flow diagram showing a designated fixed position detection process.

FIG. 32 is a flow diagram showing the designated fixed position detection process. When the designated fixed position detection process is initiated, a designated position at time t is detected in step S3201. When position data is present in step S3202, the algorithm proceeds to step S3203 to compare the current designated position with an initial value of the designated position. When both are unmatched, the designated position is determined to be as being shifted in step S3204. When the designate position at time t matches the initial value thereof, the algorithm proceeds to step S3205 to advance time t, and then the above series of steps starts again with the step S3201. When no position data is available in the step S3202, the designated position is determined to be fixed, and the designated fixed position is then detected.

Figure 33:
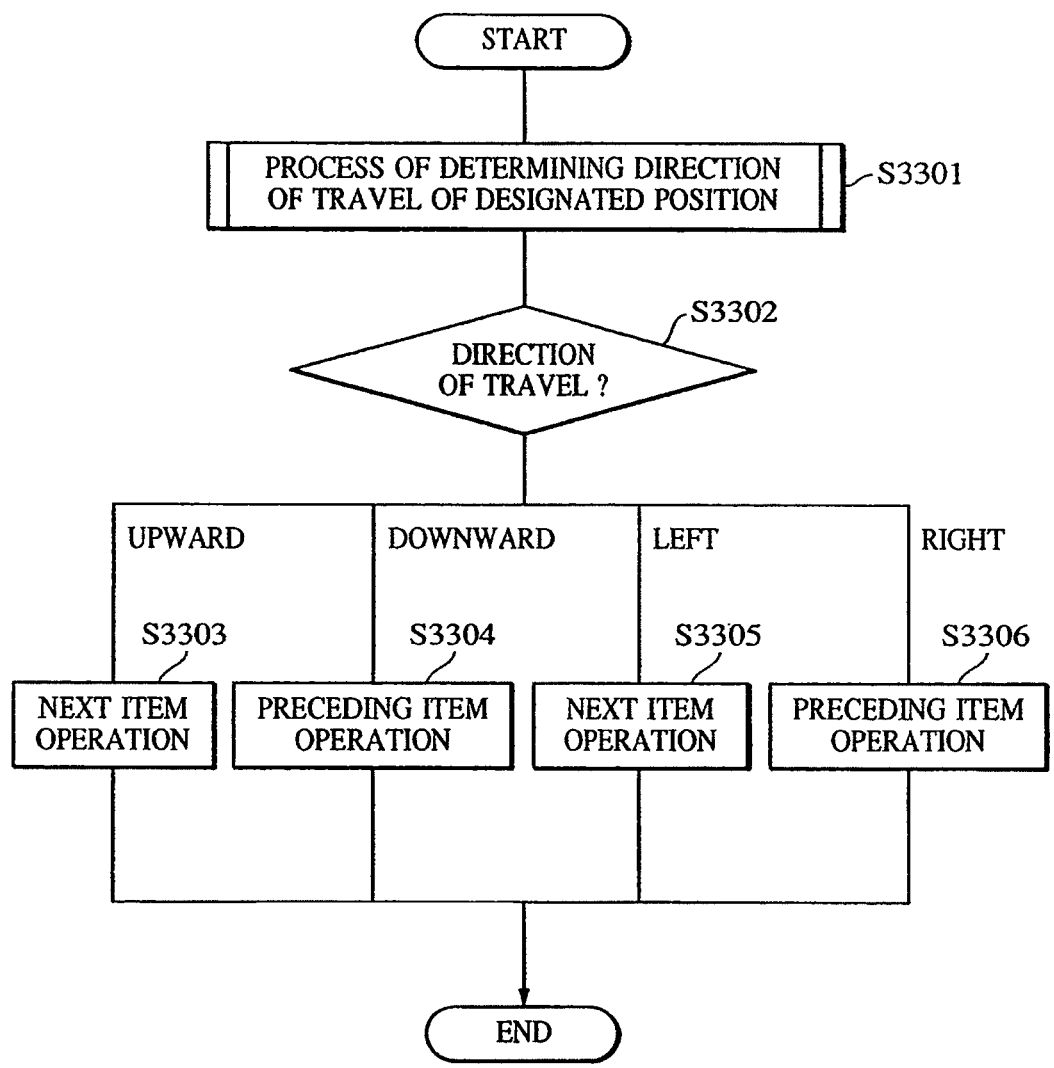
FIG. 33 is a flow diagram showing a designation interpretation process based on the direction of travel.

FIG. 33 is a flow diagram showing a designation interpretation process based on the direction of travel. In step S3301, a process is initiated to determine the travel direction of the designated position. In step S3302, an operation to perform is interpreted based on the determined travel direction of the designated position.

When the travel direction is upward, the algorithm proceeds to step S3303, thereby interpreting the designation as a next-item operation. Besides the next-item operation, the designation may be interpreted as one of a next-page operation, a next-screen operation, a last-line operation, an upward shifting operation, an expansion operation in a vertical direction only, and a contraction operation in a vertical direction only. When the travel direction is downward, the algorithm proceeds to step S3304, thereby interpreting the designation as one of a preceding-item operation. Besides the preceding-item operation, the designation may be interpreted as a preceding-page operation, a preceding-screen operation, a first-line operation, a downward shifting operation, an expansion operation in a vertical direction only, and a contraction operation in a vertical direction only.

When the travel direction is leftward, the algorithm proceeds to step S3305, thereby interpreting the designation as a next-item operation. Besides the next-item operation, the designation may be interpreted as one of a next-page operation, a next-screen operation, a last-line operation, a leftward screen shifting operation, an expansion operation in a lateral direction only, and a contraction operation in a lateral direction only. When the travel direction is rightward, the algorithm proceeds to step S3306, thereby interpreting the designation as a preceding-item operation. Besides the preceding-item operation, the designation may be interpreted as one of a preceding-page operation, a preceding-screen operation, a first-line operation, a rightward screen shifting operation, an expansion operation in a lateral direction only, and a contraction operation in a lateral direction only.

Figure 34:
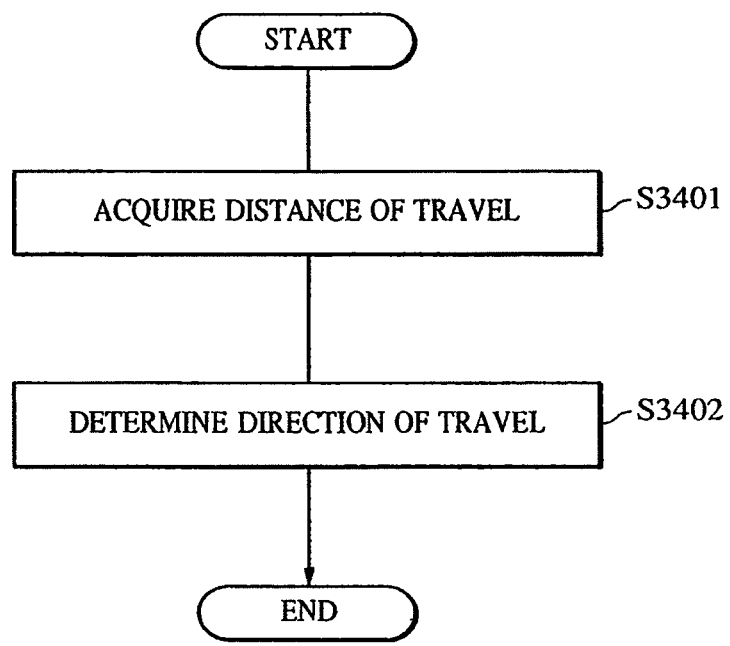
FIG. 34 is a flow diagram showing a process of determining the direction of travel of a designated position.

FIG. 34 is a flow diagram showing the process of determining the direction of travel of the designated position point in step S3301. In step S3401, the distance of travel of the designated position point is acquired in step S3401. In step S3402, the direction of travel is determined from the current coordinates of the designated moving position. In this case, the arctangent of the current coordinates (X,Y) of the designated moving position is determined and the unit of measure is converted from radian to degree.

Figure 35:
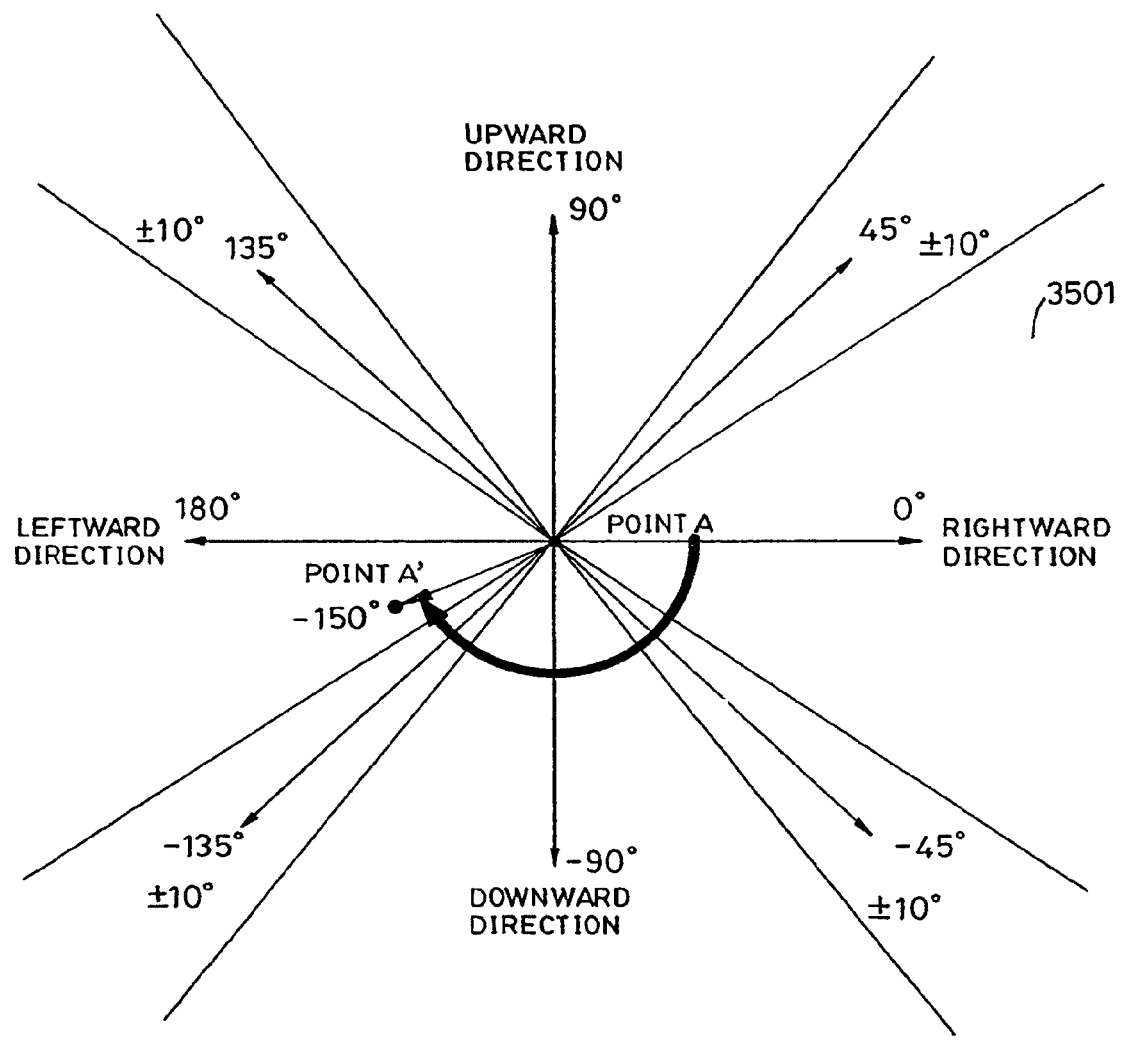
FIG. 35 illustrates the interpretation of angles used in the designated position travel direction determination process.

FIG. 35 illustrates the interpretation of angles used in the designated position travel direction determination process. As shown in a diagram 3501, the angle range of 360° is divided into two zones with respect to the X axis: one zone ranges from 0° to 180° in the positive Y axis area and the other ranges from −1° to −179° in the negative Y axis area.

An angle segment having a range of ±35° (from −35° to 35°) with respect to 0° is interpreted as a rightward direction range. An angle segment having a range of ±35° (from 55° to 125°) with respect to 90° is interpreted as an upward direction range. An angle segment having a range of ±35° (from 145° to 180° and from −179° to −145°) with respect to 180° is interpreted as a leftward direction range. An angle segment having a range of ±35° (from −55° to −125°) with respect to −90° is interpreted as a downward direction range. Angle ranges of ±10° respectively with respect to 45°, 135°, −135°, and −45° are used for other operations.

Figure 36A:
FIGS. 36A and 36B show an operational example that is interpreted as a leftward shifting operation.
Figure 36B:
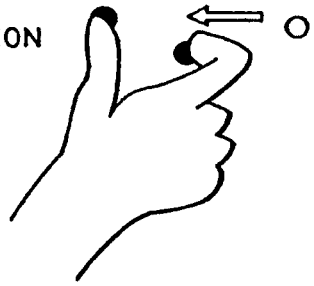
Figures 37A, 37B, 37C, 37D:
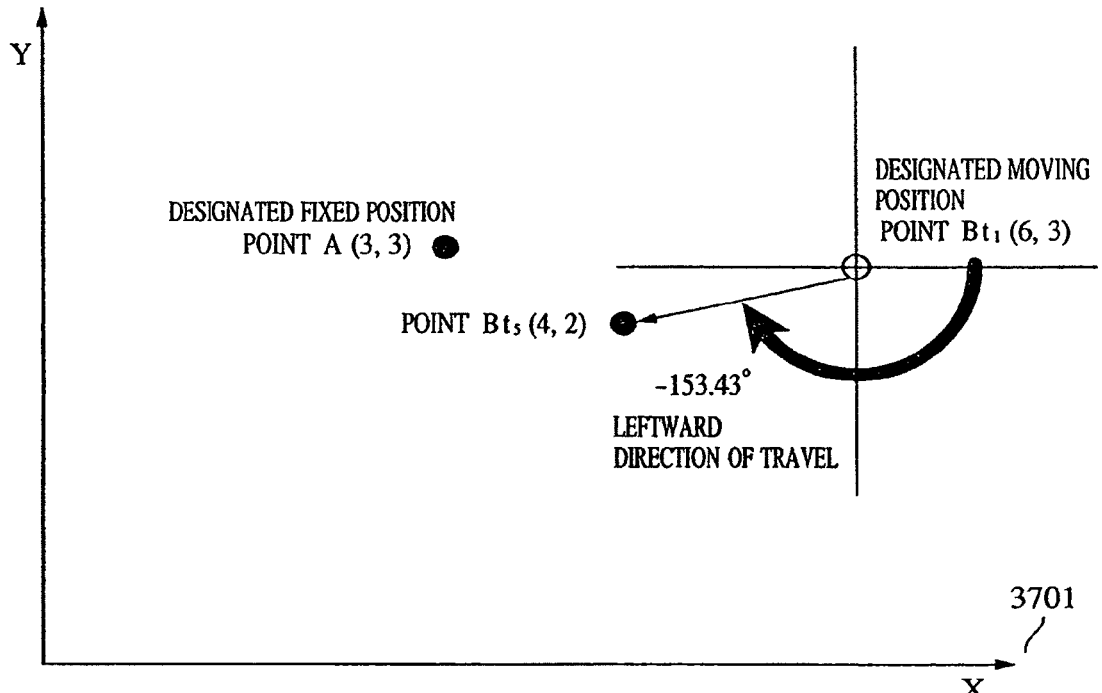
FIGS. 37A-37D show the corresponding data samples that are interpreted as the leftward shifting operation.
Figures 39A, 39B, 39C, 39D:
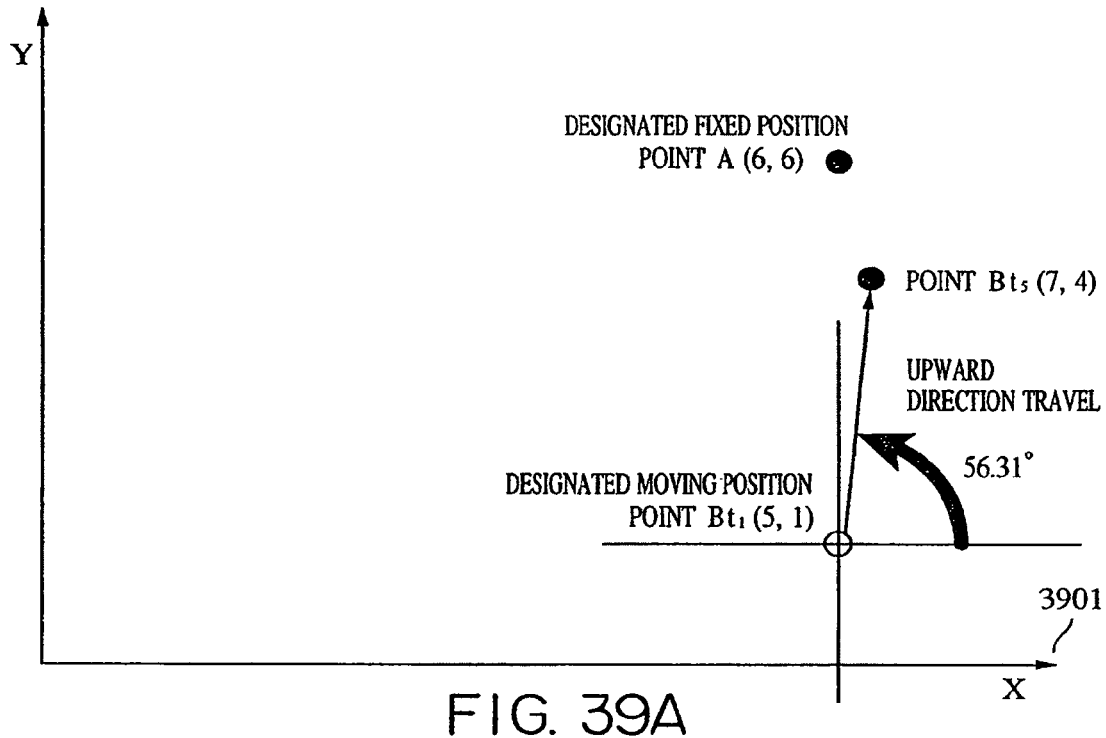
FIGS. 39A-39D show the corresponding data samples that are interpreted as the upward shifting operation.
Figures 41A, 41B, 41C, 41D:
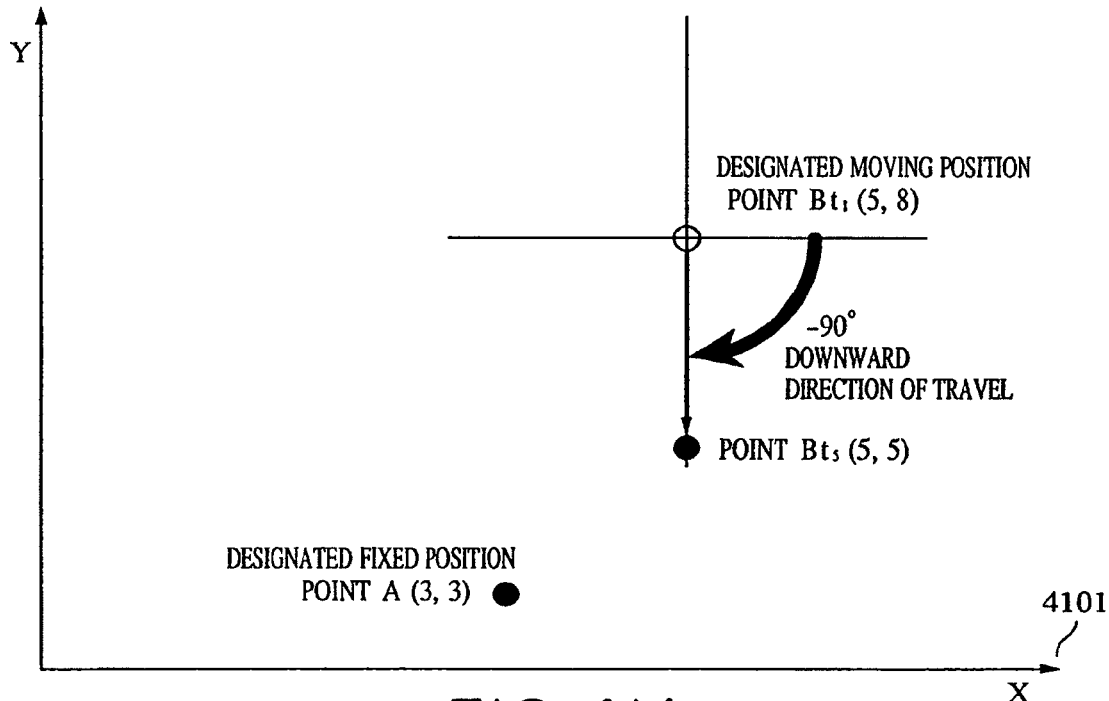
FIGS. 41A-41D show the corresponding data samples that are interpreted as the downward shifting operation.
Figures 43A, 43B, 43C, 43D:
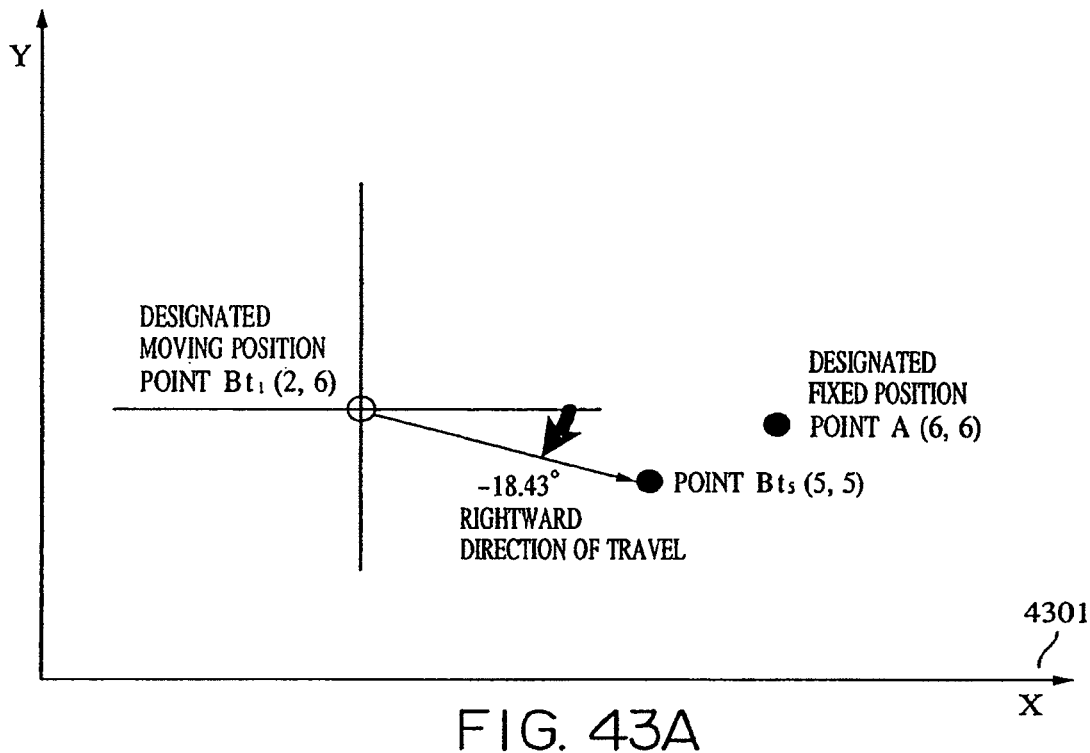
FIGS. 43A-43D show the corresponding data samples that are interpreted as the rightward shifting operation.

FIGS. 36A and 36B show an operational example that is interpreted as a leftward shifting operation. When the designated position point A is fixed with the designated position point B being moved from $Bt_1$ to $Bt_5$, the input is designated as a leftward shifting operation.

FIGS. 37A-37D show the corresponding data samples that are interpreted as the leftward shifting operation. As shown in a graph 3701, the designated fixed position has the coordinates thereof at point A(3,3). The designated moving position has the coordinates thereof at point $Bt_1(6,3)$ at travel start time $t_1$ and at point $Bt_5(4,2)$ at travel end time $t_5$. Tables 3702 list position data of the designated fixed position point A and the designated moving position point B from time $t_1$ to time $t_5$. A table 3703 lists designated position travel data. The travel distance of the designated fixed position point A at the travel end time $t_5$ is zero. The designated moving position point B has a distance of travel of 2.236 and a direction of travel of −135.43°.

FIGS. 38A and 38B show an operational example that is interpreted as an upward shifting operation. As shown, the designated position point A is fixed while the designated position point B is being moved from $Bt_1$ to $Bt_5$. This input is interpreted as an upward shifting operation.

FIGS. 39A-39D show the corresponding data samples that are interpreted as the upward shifting operation. As shown in a graph 3901, the designated fixed position has the coordinates thereof at point A(6,6). The designated moving position has the coordinates thereof at point $Bt_1(5,1)$ at travel start time $t_1$ and at point $Bt_5(7,4)$ at travel end time $t_5$. Tables 3902 list position data of the designated fixed position point A and the designated moving position point B from time $t_1$ to time $t_5$. A table 3903 lists designated position travel data. The travel distance of the designated fixed position point A at the travel end time $t_5$ is zero. The designated moving position point B has a distance of travel of 3.603 and a direction of travel of −56.31°.

FIGS. 40A and 40B show an operational example that is interpreted as a downward shifting operation. As shown, the designated position point A is fixed while the designated position point B is being moved from $Bt_1$ to $Bt_5$. This input is interpreted as a downward shifting operation.

FIGS. 41A-41D show the corresponding data samples that are interpreted as the downward shifting operation. As shown in a graph 4101, the designated fixed position A has the coordinates thereof at point A(3,3). The designated moving position B has the coordinates thereof at point $Bt_1(5,8)$ at travel start time $t_1$ and at point $Bt_5(5,5)$ at travel end time $t_5$. Tables 4102 list position data of the designated fixed position point A and the designated moving position point B from time $t_1$ to time $t_5$. A table 4103 lists designated position travel data. The travel distance of the designated fixed position point A at the travel end time $t_5$ is zero. The designated moving position point B has a distance of travel of 3.000 and a direction of travel of −90°.

FIGS. 42A and 42B show an operational example that are interpreted as a rightward shifting operation. As shown, the designated position point A is fixed while the designated position point B is being moved from $Bt_1$ as shown FIG. 42A to $Bt_5$ as shown in FIG. 42B. This input is interpreted as a rightward shifting operation.

FIGS. 43A-43D show the corresponding data samples that are interpreted as the rightward shifting operation. As shown in a graph 4301, the designated fixed position A has the coordinates thereof at point A(6,6). The designated moving position B has the coordinates thereof at point $Bt_1(2,6)$ at travel start time $t_1$ and at point $Bt_5(5,5)$ at travel end time $t_5$. Tables 4302 list position data of the designated fixed position point A and the designated moving position point B from time $t_1$ to time $t_5$. A table 4303 lists designated position travel data. The travel distance of the designated fixed position point A at the travel end time $t_5$ is zero. The designated moving position point B has a distance of travel of 3.162 and a direction of travel of −18.43°.

Fifth Embodiment

A fifth embodiment of the present invention is now discussed. The fifth embodiment accounts for a change in a distance between a designated fixed position and a designated moving position when an operation to perform is interpreted from a combination of travel paths of at least two designated positions.

Figure 44:
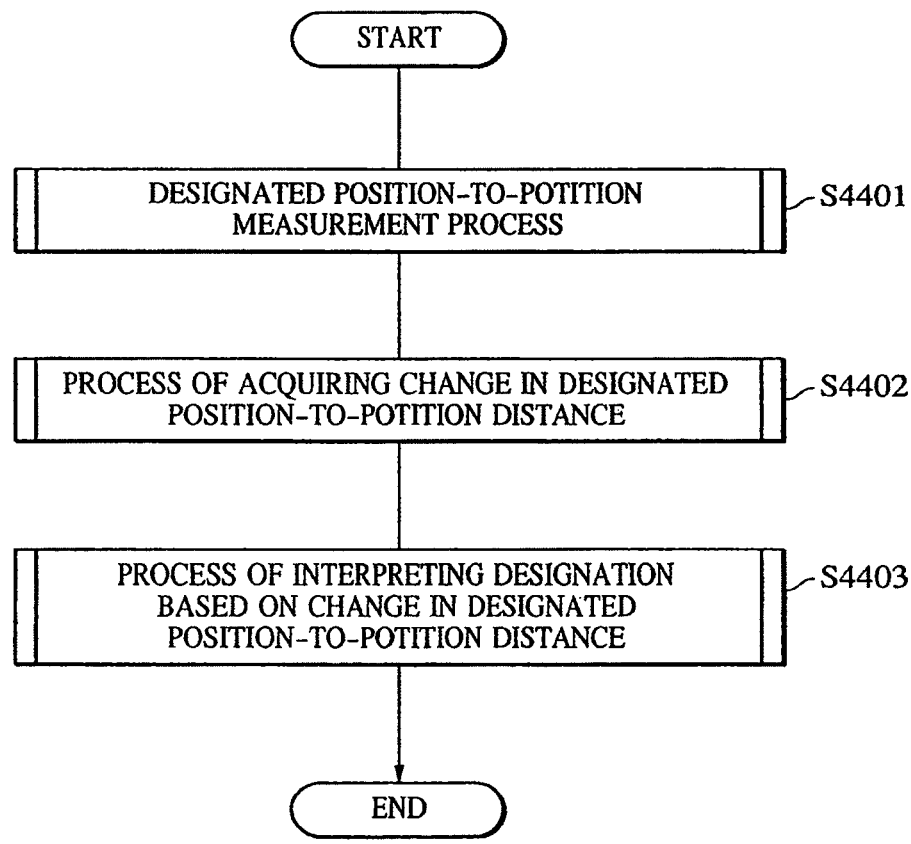
FIG. 44 is a flow diagram showing a designation interpretation process that uses a change in the distance between a designated fixed position and a designated moving position.

FIG. 44 is a flow diagram showing a designation interpretation process that uses the change in the distance between the designated fixed position and the designated moving position. A process is initiated to measure the distance between the designated fixed position and the designated moving position in step S4401. In step S4402, a process of acquiring a change in the designated position-to-position distance is performed to acquire the distance change. In step S4403, the designation interpretation process is initiated based on the acquired distance change, thereby interpreting what operation to perform.

Figure 45:
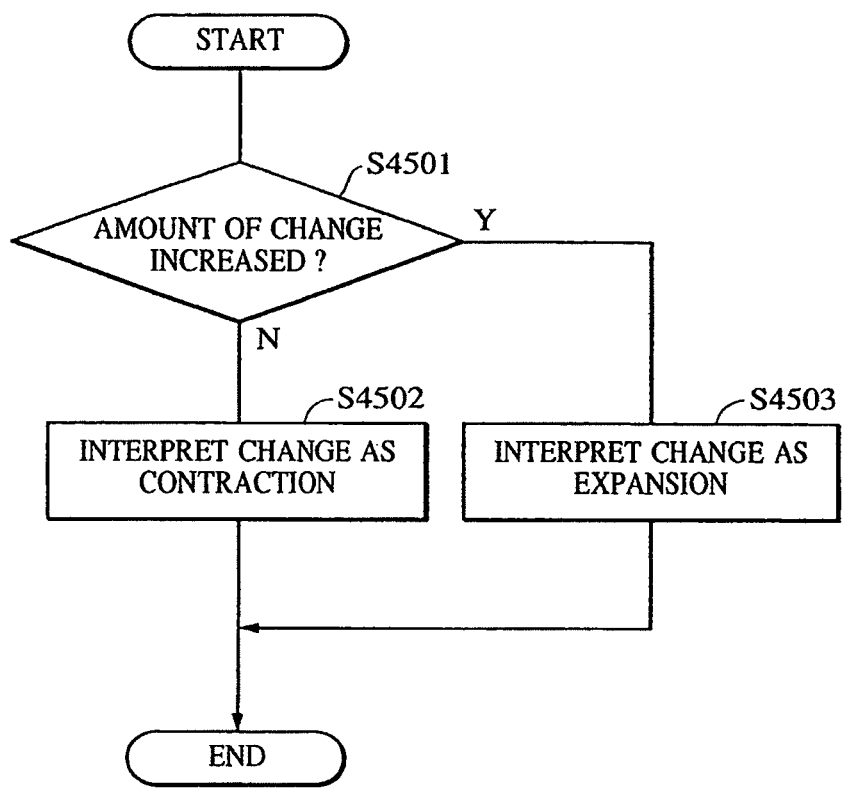
FIG. 45 is a flow diagram showing a designation interpretation process that uses the change in the distance between the designated positions.

FIG. 45 is a flow diagram showing, in step S4403, the designation interpretation process that uses the change in the distance between the designated positions. The amount of change is determined in step S4501. When the amount of change is found to decrease, the input is interpreted as a contraction operation (in step S4502). When the amount of change is found to increase, the input is interpreted as an expansion operation (in step S4503).

Figure 46A:
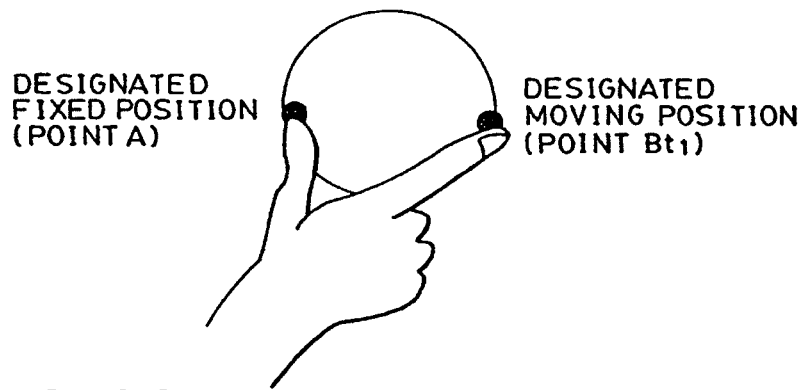
FIGS. 46A and 46B show an operational example that is interpreted as a contraction operation.
Figure 46B:
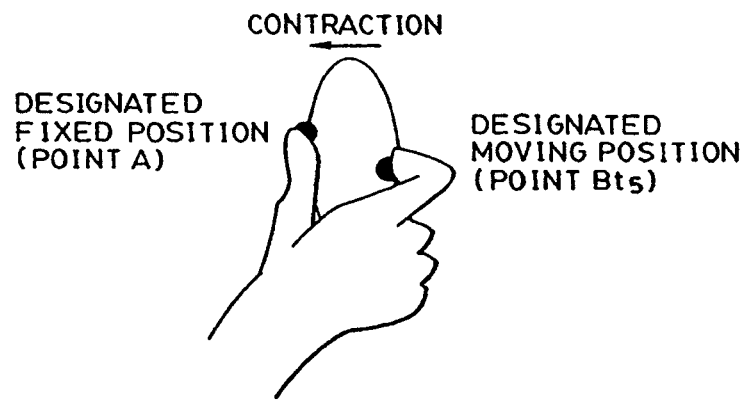
Figures 47A, 47B, 47C, 47D:
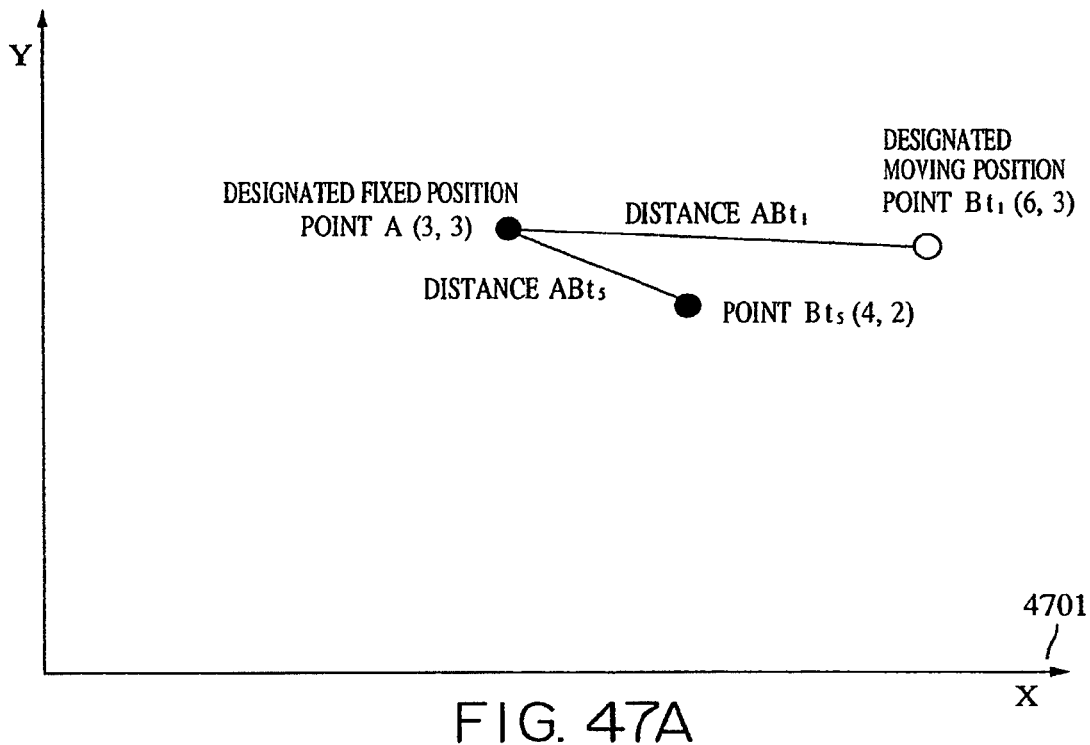
FIGS. 47A-47D show the corresponding data samples that are interpreted as the contraction operation.

FIGS. 46A and 46B show an operational example that is interpreted as a contraction operation. As shown, the designated position point A is fixed while the designated position point B is being moved from $Bt_1$ to $Bt_5$ toward the designated fixed position A. This input is interpreted as a contraction operation.

FIGS. 47A-47D show the corresponding data samples that are interpreted as the contraction operation. As shown in a graph 4701, the designated fixed position A has the coordinates thereof at point A(3,3). The designated moving position B has the coordinates thereof at point $Bt_1(6,3)$ at travel start time $t_1$ and at point $Bt_5(4,2)$ at travel end time $t_5$. Tables 4702 list position data of the designated fixed position point A and the designated moving position point B from time $t_1$ to time $t_5$. A table 4703 lists data of a change in the distance between the designated positions. The position-to-position distance between the points A and B is 3.000 at the travel start time $t_1$ and is 1.414 at the travel end time $t_5$. The magnification of the position-to-position distance between the points A and B is 47% from time $t_1$ to time $t_5$.

Figure 48A:
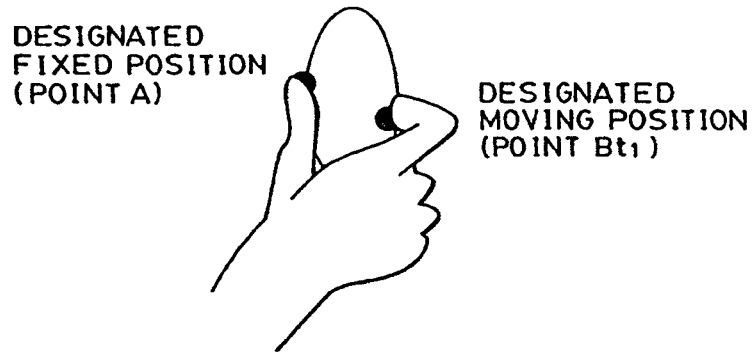
FIGS. 48A and 48B show an operational example that is interpreted as an expansion operation.
Figure 48B:
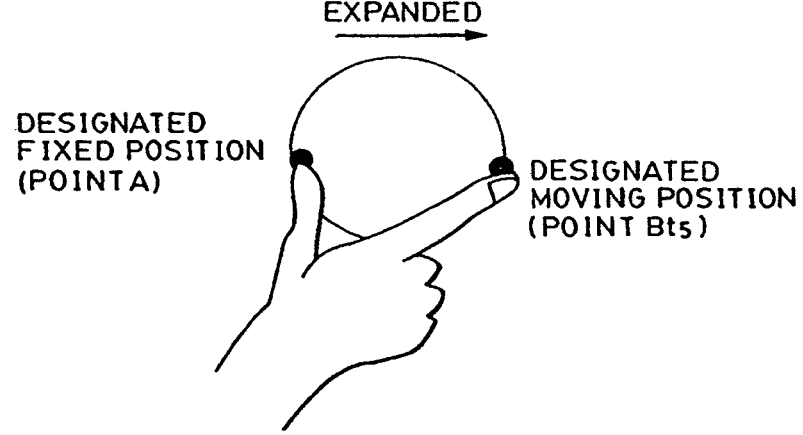
Figures 49A, 49B, 49C, 49D:
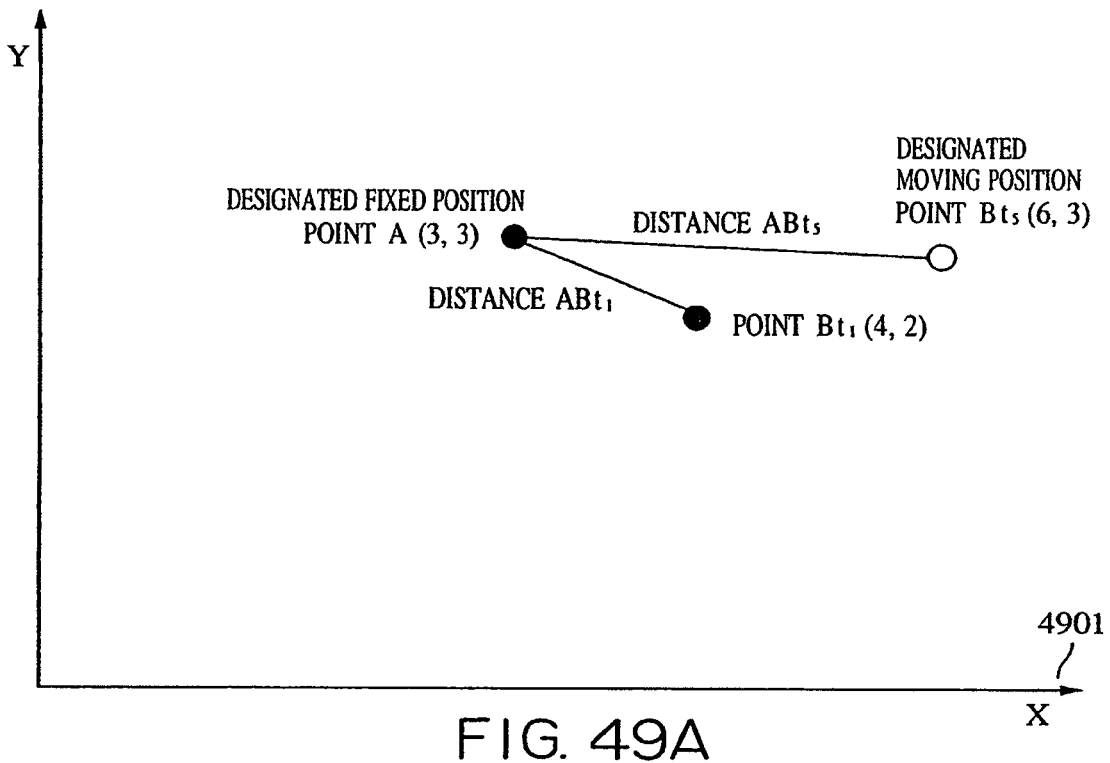
FIGS. 49A-49D show the corresponding data samples that is interpreted as the expansion operation.
Figure 51A:
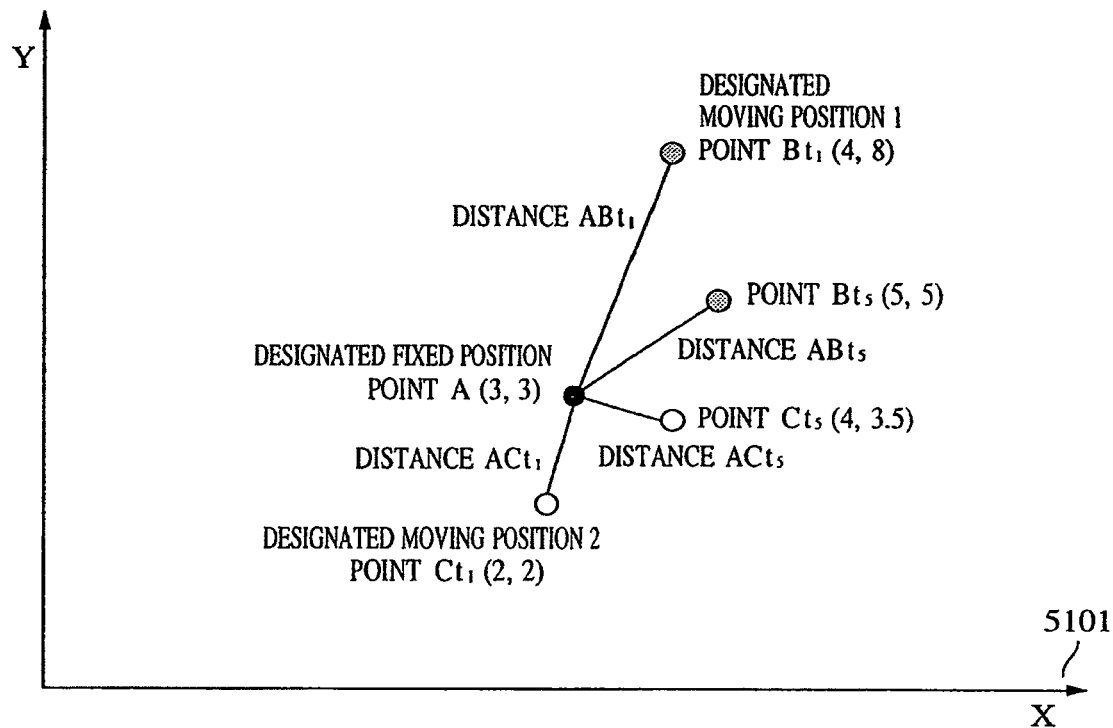

FIGS. 48A and 48B show an operational example that is interpreted as an expansion operation. As shown, the designated position point A is fixed while the designated position point B is being moved from $Bt_1$ to $Bt_5$ in a direction away from the designated fixed position A. This input is interpreted as an expansion operation.

FIGS. 49A-49D show the corresponding data samples that are interpreted as the contraction operation. As shown in a graph 4901, the designated fixed position A has the coordinates thereof at point A(3,3). The designated moving position B has the coordinates thereof at point $Bt_1(4,2)$ at travel start time $t_1$ and at point $Bt_5(6,3)$ at travel end time $t_5$. Tables 4902 list position data of the designated fixed position point A and the designated moving position point B from time $t_1$ to time $t_5$. A table 4903 lists data of a change in the distance between the designated positions. The position-to-position distance between the points A and B is 1.414 at the travel start time $t_1$ and 3.000 at the travel end time $t_5$. The magnification of the position-to-position distance change between the points A and B is 212% from time $t_1$ to time $t_5$.

FIGS. 50A and 50B show an operational example that is interpreted as a contraction operation centered on a designated fixed position. As shown, the designated position A is fixed. As shown, a designated fixed position A remains stationary, and designated moving position points B and C are respectively moved from $Bt_1$ and $Ct_1$ to $Bt_5$ and $Ct_5$. This input is interpreted as a contraction operation toward the designated fixed position point A.

FIGS. 51A-51F show the corresponding data samples that is interpreted as the contraction operation centered on the designated fixed position. As shown in a graph 5101, a designated fixed position A has the coordinates thereof at point A(3,3). A designated moving position 1 as the point B has the coordinates thereof at point $Bt_1(4,8)$ at travel start time $t_1$ and at point $Bt_5(5,5)$ at travel end time $t_5$. A designated moving position 2 as the point C has the coordinates thereof at point $Ct_1(2,2)$ at the travel start time $t_1$ and at point $Ct_5(4,3.5)$ at the travel end time $t_5$. Tables 5102 list position data of the designated fixed position point A, the designated moving position 1 (the point B) and the designated moving position 2 (the point C) from time $t_1$ to time $t_5$.

Tables 5103 list data of the change in the distance between the designated positions. In data 1 of the change in the designated position-to-position distance, the distance between the points A and B is 5.099 at the travel start time $t_1$ and is 2.828 at the travel end time $t_5$. The magnification resulting from the position-to-position distance change between the points A and B is 55% from time $t_1$ to time $t_5$. In data 2 of the change in the designated position-to-position distance, the distance between the points A and C is 1.414 at the travel start time $t_1$ and is 1.118 at the travel end time $t_5$. The magnification resulting from the position-to-position distance change between the points A and C is 79% from time $t_1$ to time $t_5$.

Sixth Embodiment

A sixth embodiment of the present invention is now discussed. The sixth embodiment accounts for the presence of a designated fixed position and a change in a distance between designated moving positions when an operation to perform is interpreted from a combination of travel paths of at least two designated positions.

Figure 52:
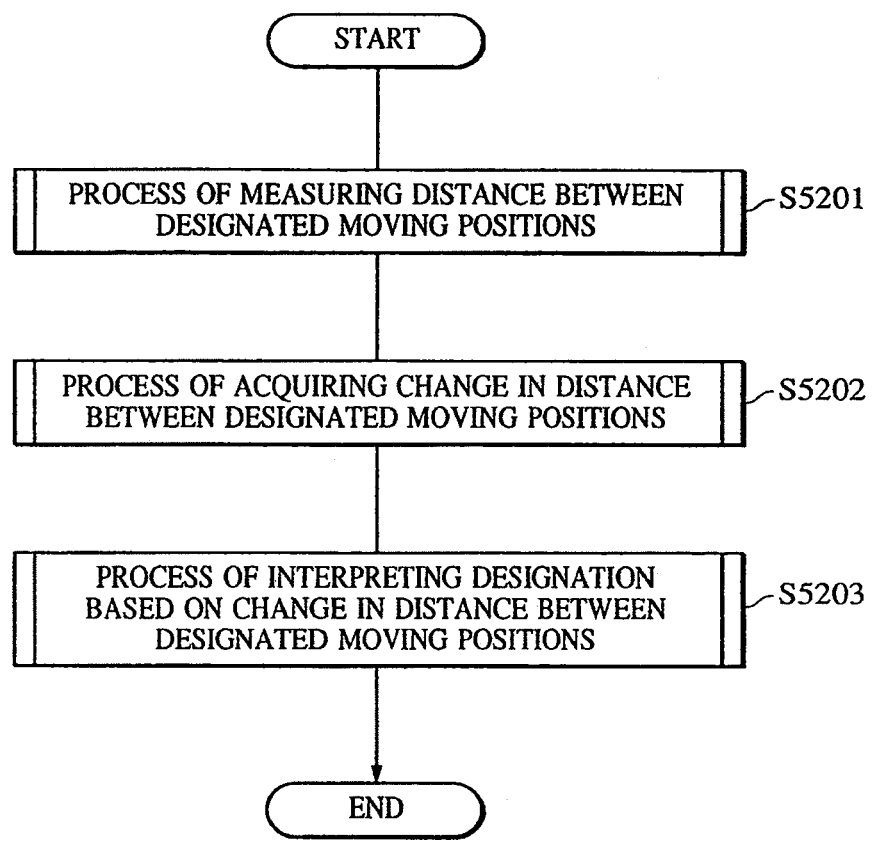
FIG. 52 is a flow diagram showing an algorithm that uses a distance between designated moving positions.

FIG. 52 is a flow diagram showing an algorithm that uses a distance between designated moving positions. In succession to the initiation of a designated fixed-position based designation interpretation process, a process of acquiring the distance between the designated moving positions is initiated in step S5201. In step S5202, a process of acquiring the change in the distance between the designated moving positions is initiated, thereby acquiring the change in the distance. In step S5203, a designation interpretation process based on the distance change between the designated moving positions is initiated, thus interpreting the input based on the amount of change in the distance between the designated moving positions.

Figure 53:
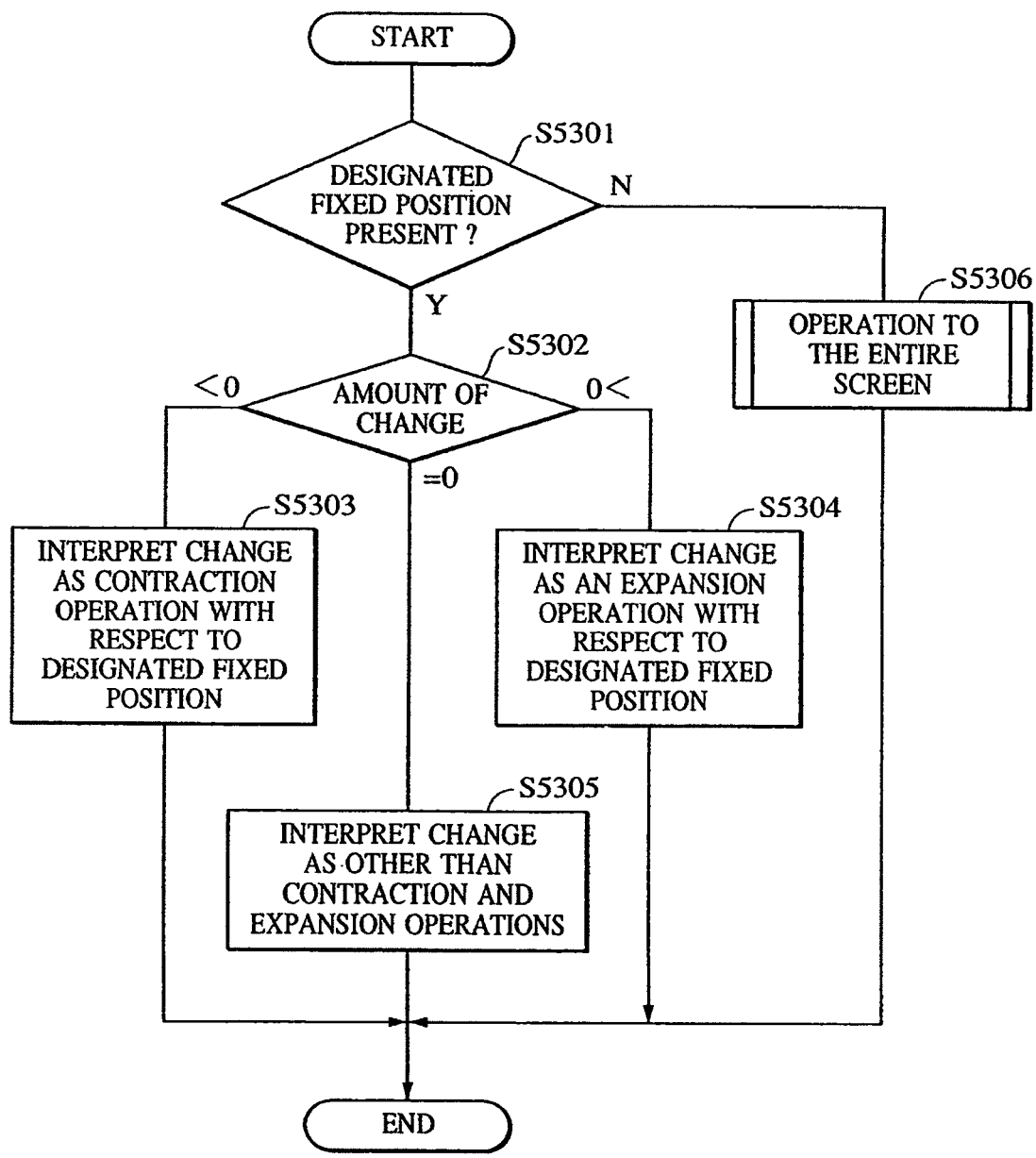
FIG. 53 is a flow diagram showing a designation interpretation process based on a change in the distance between the designated moving positions.
Figure 55A:
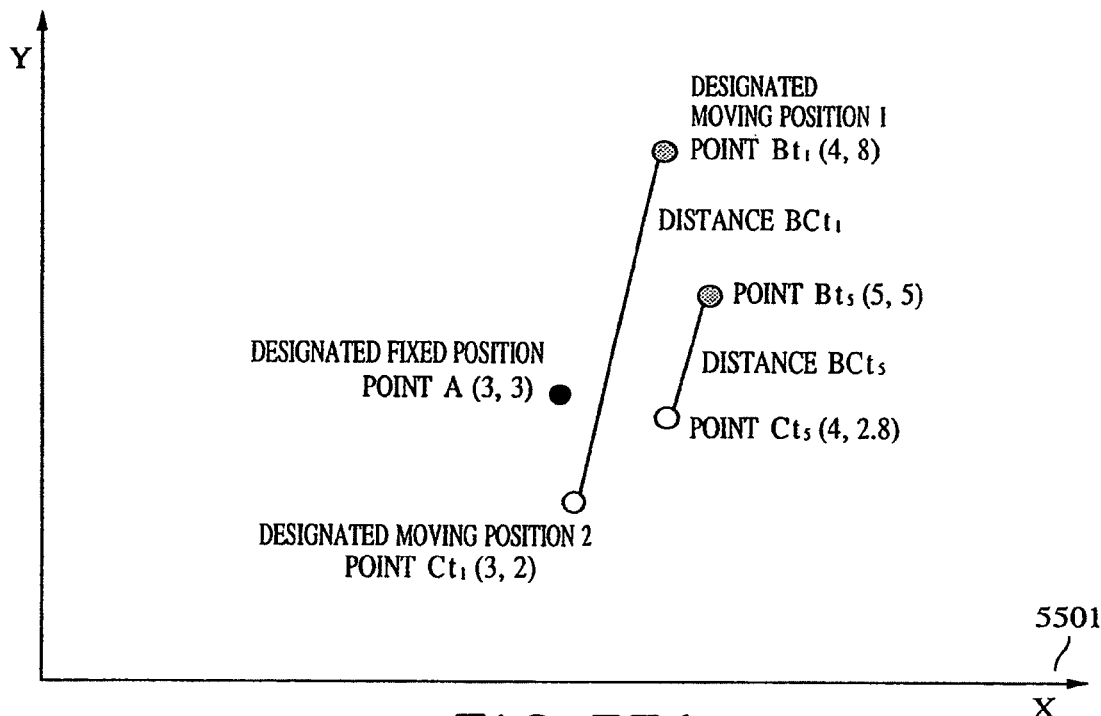

FIG. 53 is a flow diagram showing the designation interpretation process based on the change in the distance between the designated moving positions. When there is a designated fixed position in step S5301, the algorithm proceeds to step S5302. When the amount of change is smaller than zero, the input is interpreted as a contraction operation with respect to the designated fixed position in step S5303. When the amount of change is greater than zero, the input is interpreted as an expansion operation with respect to the designated fixed position in step S5304. When the amount of change equals zero, the input is interpreted as an operation other than the contraction and expansion operations in step S305. When the presence of the designated fixed position is not verified in the step S5301, the algorithm proceeds to step S5306 and the input is thus interpreted as an operation effective on the entire screen.

FIGS. 54A and 54B show an operational example that is interpreted as a contraction operation. A designated position point A is fixed while two designated moving positions $Bt_1$ and $Ct_1$ respectively move to $Bt_5$ and $Ct_5$ toward the designated fixed position A. The input is thus interpreted as a contraction operation centered on the designated fixed position A in accordance with the amount of change in the distance between the designated moving positions.

FIGS. 55A-55E show the corresponding data samples that are interpreted as the contraction operation. In a graph 5501, the designated fixed position has the coordinates thereof at point A(3,3). The designated moving position B has the coordinates thereof at point $Bt_1(4,8)$ at travel start time $t_1$ and at point $Bt_5(5,5)$ at travel end time $t_5$. The designated moving position point C has the coordinates thereof at point $Ct_1(3,2)$ at the travel start time $t_1$ and at point $Ct_5(4,2.8)$ at the travel end time $t_5$.

Tables 5502 list position data of the designated fixed position point A, the designated moving position point B, and the designated moving position point C from time $t_1$ to time $t_5$. A table 5503 lists data of the change in the distance between the designated moving positions. In the data of the distance change between the designated moving positions, the distance between the designated position points B and C is 6.083 at the travel start time $t_1$ and is 2.417 at the travel end time $t_5$. The magnification resulting from the distance change between the designated position points B and C is 40% from time $t_1$ to time $t_5$.

Figure 56A:
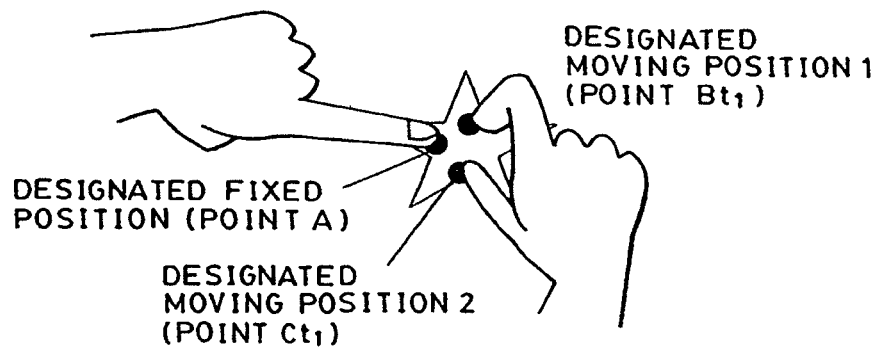
FIGS. 56A and 56B show an operational example that is interpreted as an expansion operation.
Figure 56B:
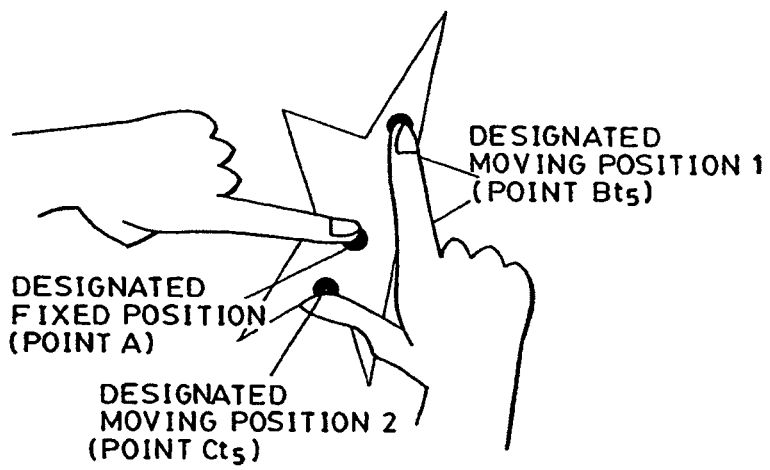

FIGS. 56A and 56B show an operational example that is interpreted as an expansion operation centered on the designated fixed position. A designated position point A is fixed while two designated moving positions $Bt_1$ and $Ct_1$ respectively move to $Bt_5$ and $Ct_5$ in a direction away from the designated fixed position A. The input is thus interpreted as an expansion operation centered on the designated fixed position A in accordance with the amount of change in the distance between the designated moving positions.

FIGS. 57A-57E show the corresponding data samples that are interpreted as the expansion operation centered on the designated fixed position. In a graph 5701, the designated fixed position has the coordinates thereof at point A(3,3). The designated moving position 1 (the point B) has the coordinates thereof at point $Bt_1(5,5)$ at travel start time $t_1$ and at point $Bt_5(4,8)$ at travel end time $t_5$. The designated moving position 2 (the point C) has the coordinates thereof at point $Ct_1(4,2.8)$ at the travel start time $t_1$ and at point $Ct_5(2,2)$ at the travel end time $t_5$.

Tables 5702 list position data of the designated fixed position point A, the designated moving position 1 (the point B), and the designated moving position 2 (the point C) from time $t_1$ to time $t_5$. A table 5703 lists data of the change in the distance between the designated moving positions. In the data 1 of the distance change between the designated moving positions, the distance between the designated position points B and C is 2.417 at the travel start time $t_1$ and is 6.325 at the travel end time $t_5$. The magnification resulting from the distance change between the designated position points B and C is 262% from time $t_1$ to time $t_5$.

Figure 58A:
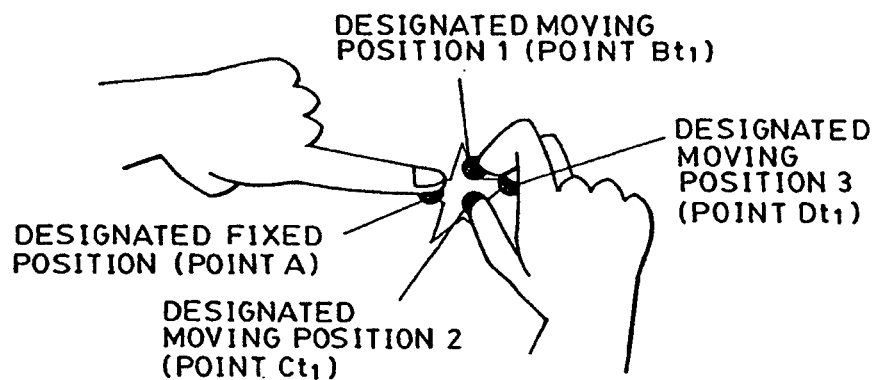
FIGS. 58A and 58B show an operational example that are interpreted as an operation for moving a plurality of positions.
Figure 58B:
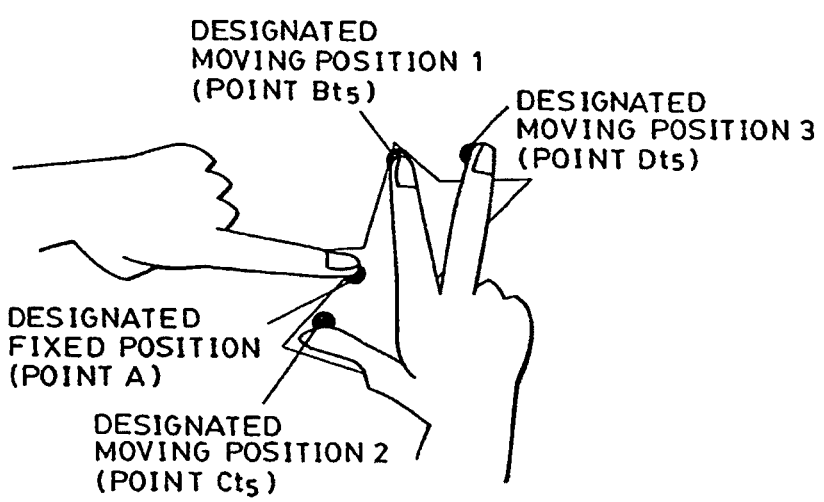
Figure 59A:
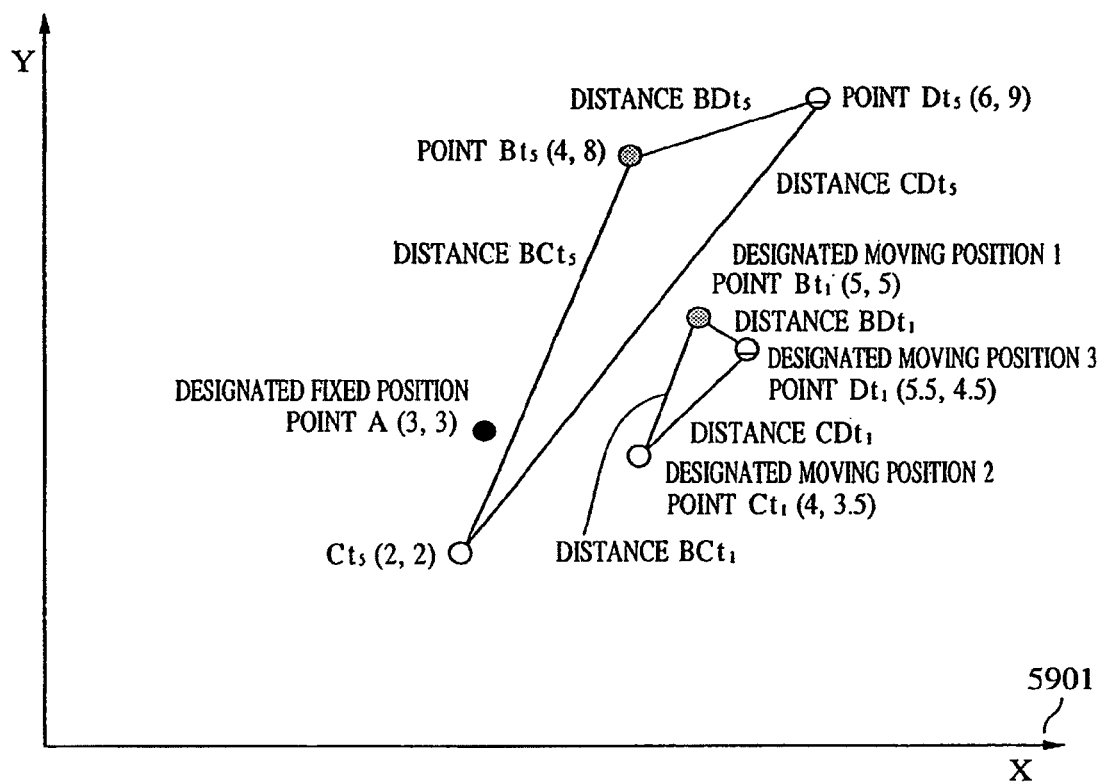

FIGS. 58A and 58B show an operational example that are interpreted as an operation for moving a plurality of positions with respect to a designated fixed position. As shown, a designated position point A is fixed. A designated moving position 1, a designated moving position 2 and a designated moving position 3, which are respectively positioned at a point $Bt_1$, a point $Ct_1$, and a point $Dt_1$ as shown in FIG. 58A at travel start time $t_1$, are respectively moved to a point $Bt_5$, a point $Ct_5$, and a point $Dt_5$ as shown in FIG. 58B toward the designated fixed position A at travel end time $t_5$. The input is thus interpreted as an operation for moving the plurality of designated position points toward the designated fixed position A according to the amount of change in the distance between the designated moving positions.

FIGS. 59A-59H show the corresponding data samples that are interpreted as the operation for moving the plurality of positions. In a graph 5901, the designated fixed position is placed at coordinates A(3,3). The designated moving position 1 (the point B) is placed at coordinates $Bt_1(5,5)$ at the travel start time $t_1$ and at coordinates $Bt_5(4,8)$ at the travel end time $t_5$. The designated moving position 2 (the point C) is placed at coordinates $Ct_1(4,3.5)$ at the travel start time $t_1$ and at $Ct_5(2,2)$ at the travel end time $t_5$. The designated moving position 3 (the point D) is placed at coordinates $Dt_1(5.5,4.5)$ at the travel start time $t_1$ and at coordinates $Dt_5(6,9)$ at the travel end time $t_5$.

Tables 5902 list position data of the designated fixed position A, and the three designated moving positions B, C, and D. Tables 5903 list changes in the distances between the designated moving positions. In data 1 of the distance change, the distance between the designated position points B and C is 1.803 at the travel start time $t_1$, and is 6.325 at the travel end time $t_5$. The magnification resulting from the distance change between the designated positions is 352% from time $t_1$ to time $t_5$. In data 2 of the distance change, the distance between the designated position points B and D is 0.707 at the travel start time $t_1$, and is 2.236 at the travel end time $t_5$. The magnification resulting from the distance change between the designated position points is 316% from time $t_1$ to time $t_5$. In data 2 of the distance change, the distance between the designated position points C and D is 1.803 at the travel start time $t_1$, and is 8.062 at the travel end time $t_5$. The magnification resulting from the distance change between the designated position points is 447% from time $t_1$ to time $t_5$.

Seventh Embodiment

A seventh embodiment of the present invention is now discussed. The seventh embodiment accounts for a change in an angle made between a horizontal direction and a line that connects a designated fixed position and a designated moving position when an operation to perform is interpreted from a combination of travel paths of at least two designated position points. The angle is hereinafter referred to as a fixed-to-moving position angle.

Figure 60:
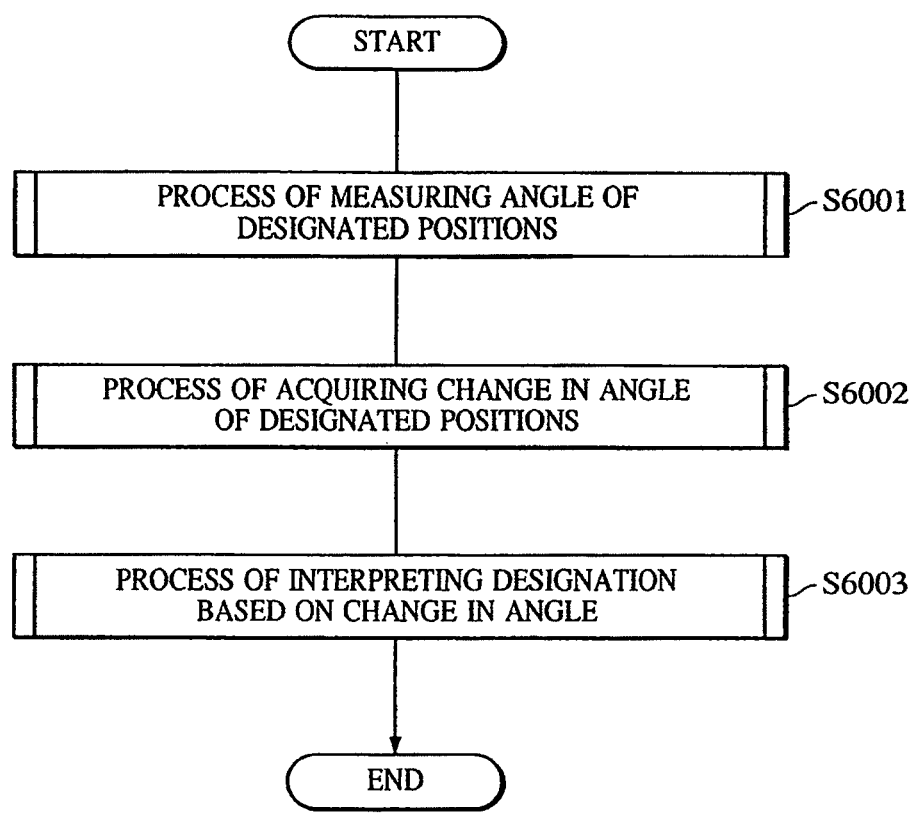
FIG. 60 is a flow diagram of an algorithm that uses a change in an angle of the designated positions.

FIG. 60 is a flow diagram of an algorithm that uses a change in the angle of the designated fixed and moving positions. In step S6001, a process is performed to measure the fixed-to-moving position angle. In step S6002, a process is performed to acquire a change in the fixed-to-moving position angle. In step S6003, a designation interpretation process is performed to interpret the input based on the acquired angle change.

Figure 61:
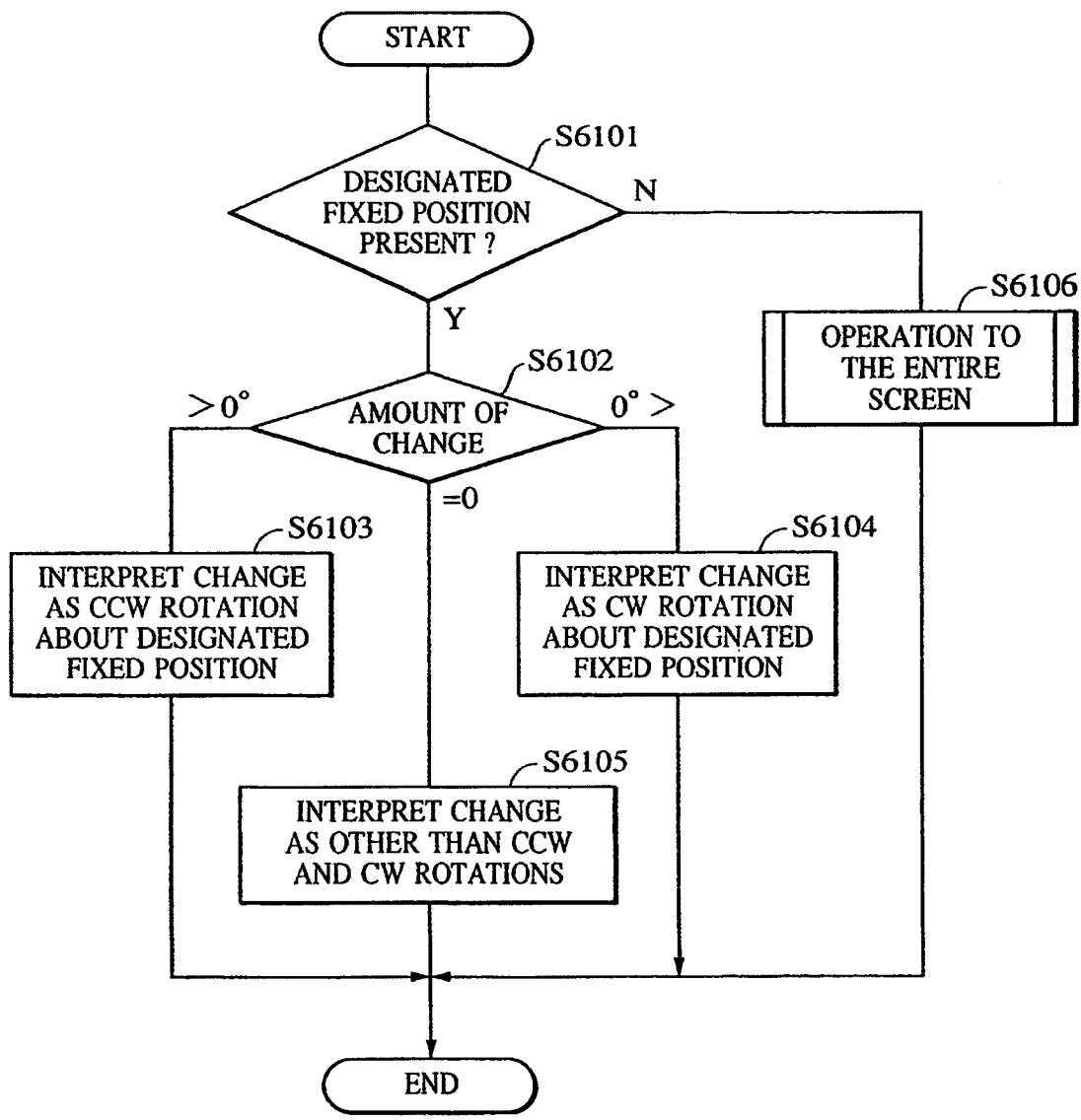
FIG. 61 is a flow diagram showing a designation interpretation process based on the change in the angle of the designated positions.

FIG. 61 is a flow diagram showing the designation interpretation process based on the change in the fixed-to-moving position angle. When there is no designated fixed position in step S6101, the algorithm proceeds to step S6106. The input is interpreted as an operation for the entire screen. When any designated fixed position is found in the step S6106, the algorithm proceeds to step 6102. When the amount of change is smaller than zero degree, the algorithm proceeds to step S6104, and the input is interpreted as a clockwise rotation operation about the designated fixed position. When the amount of change is greater than zero degree, the algorithm proceeds to step S6103, and the input is interpreted as a counterclockwise rotation operation about the designated fixed position. When the amount of change equals zero degree, the algorithm proceeds to step S6105, and the input is interpreted as an operation other than rotation operations, or a modified operation in a rotational direction with the designated fixed position stationary.

Figure 62A:
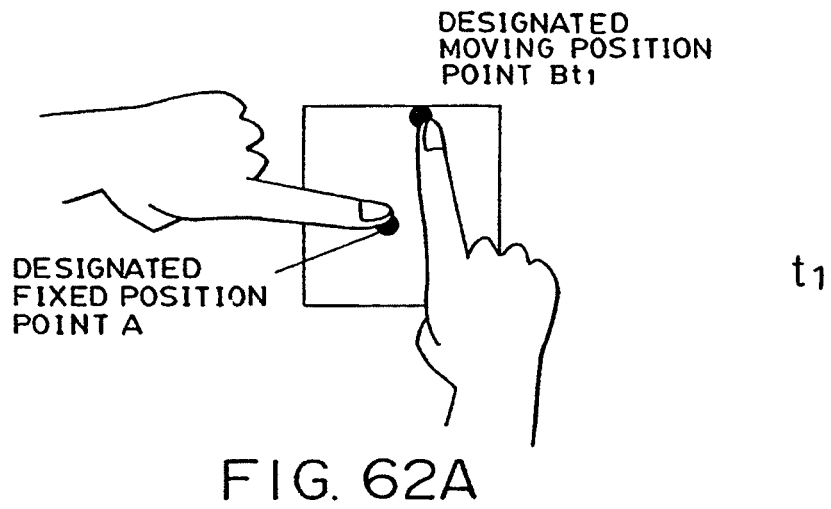
FIGS. 62A and 62B show an operational example that is interpreted as a clockwise rotation operation.
Figure 62B:
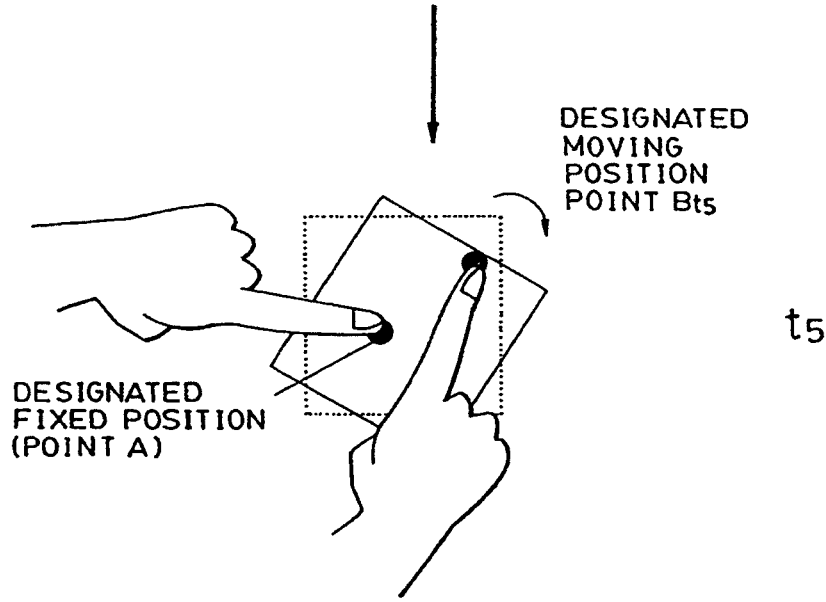
Figures 63A, 63B, 63C, 63D:
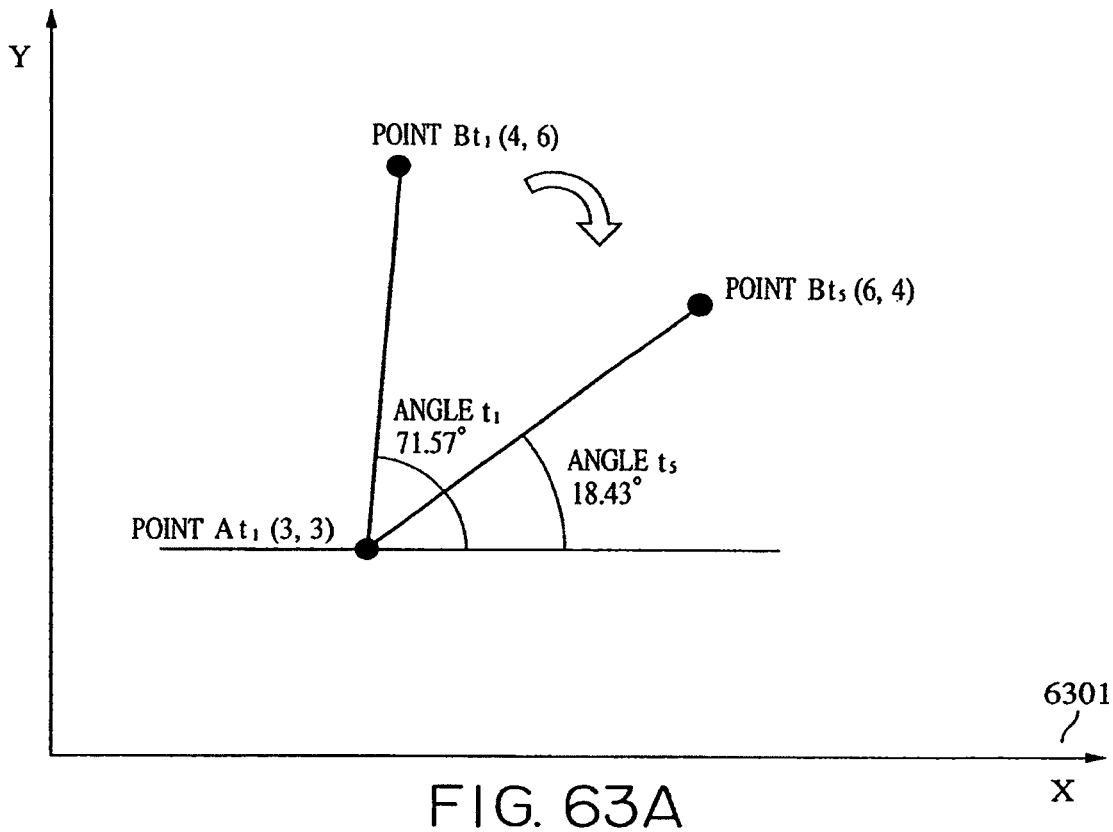
FIGS. 63A-63D show the corresponding data samples that are interpreted as the clockwise rotation operation.
Figures 65A, 65B, 65C, 65D:
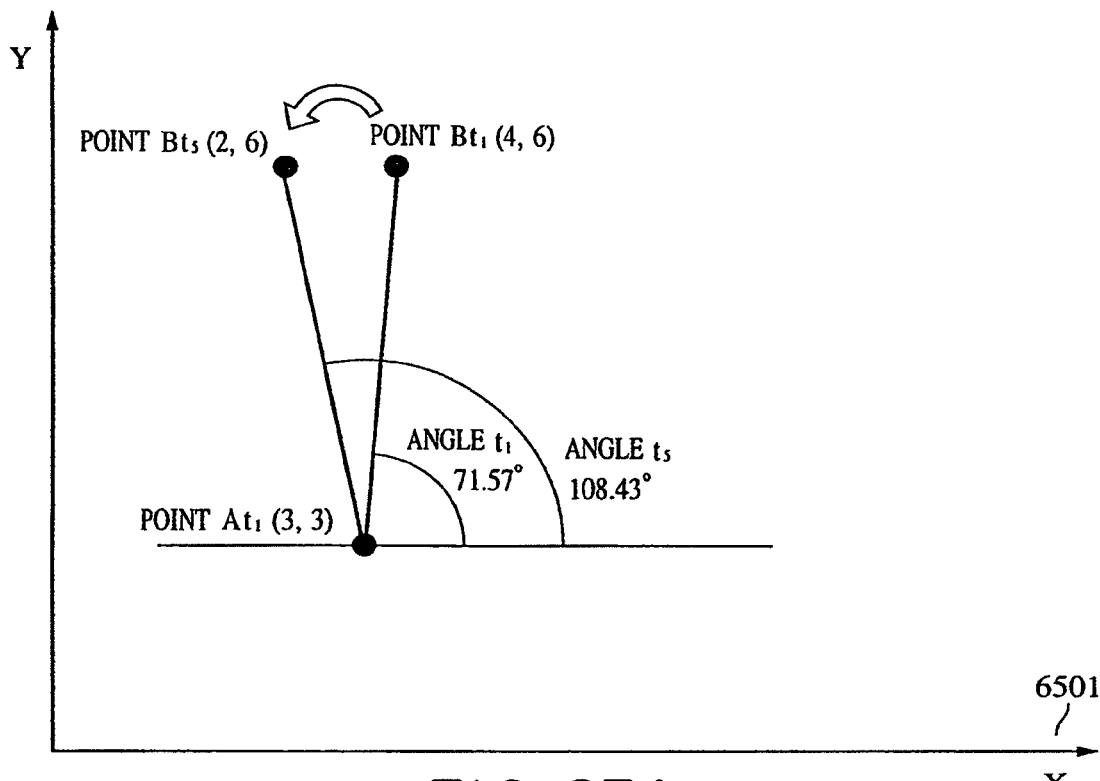
FIGS. 65A-65D show the corresponding data samples that are interpreted as the counterclockwise rotation operation.

FIGS. 62A and 62B show an operational example that is interpreted as a clockwise rotation operation. As shown, a designated position point A is fixed while a designated moving position B moves from a point $Bt_1$ at travel start time $t_1$ to a point $Bt_5$ at travel end time $t_5$. This input is interpreted as a clockwise rotation operation.

FIGS. 63A-63D show the corresponding data samples that are interpreted as the clockwise rotation operation. In a graph 6301, the angle of the line connecting the designated fixed position A and the designated moving position B with respect to the horizontal line is 71.57° at the travel start time $t_1$ and is 18.43° at the travel end time $t_5$. Tables 6302A and 6302B list position data of the designated fixed position A and the designated moving position B. A table 6303 lists angle change data of the designated position points, in which the amount of change in the fixed-to-moving position angle from the travel start time $t_1$ to the travel end time $t_5$ is −53.13°.

FIGS. 64A and 64B show an operational example that is interpreted as a counterclockwise rotation operation. As shown, a designated position point A is fixed while a designated moving position B moves from a point $Bt_1$ at travel start time $t_1$ to a point $Bt_5$ at travel end time $t_5$. This input is interpreted as a counterclockwise rotation operation.

FIGS. 65A-65D show the corresponding data samples that are interpreted as the counterclockwise rotation operation. In a graph 6501, the angle of the line connecting the designated fixed position A and the designated moving position B with respect to the horizontal line is 71.57° at the travel start time $t_1$ and is 108.43° at the travel end time $t_5$. Tables 6502A and 6502B list position data of the designated fixed position A and the designated moving position B. A table 6503 lists angle change data of the designated position points, in which the amount of change in the fixed-to-moving position angle from the travel start time $t_1$ to the travel end time $t_5$ is +36.87°.

Eighth Embodiment

An eight embodiment of the present invention is now discussed. The eighth embodiment accounts for a change in an angle made between a horizontal direction and a line that connects two designated moving positions when an operation to perform is interpreted from a combination of travel paths of at least two designated position points. The angle is hereinafter referred to as a moving-to-moving position angle.

Figure 66:
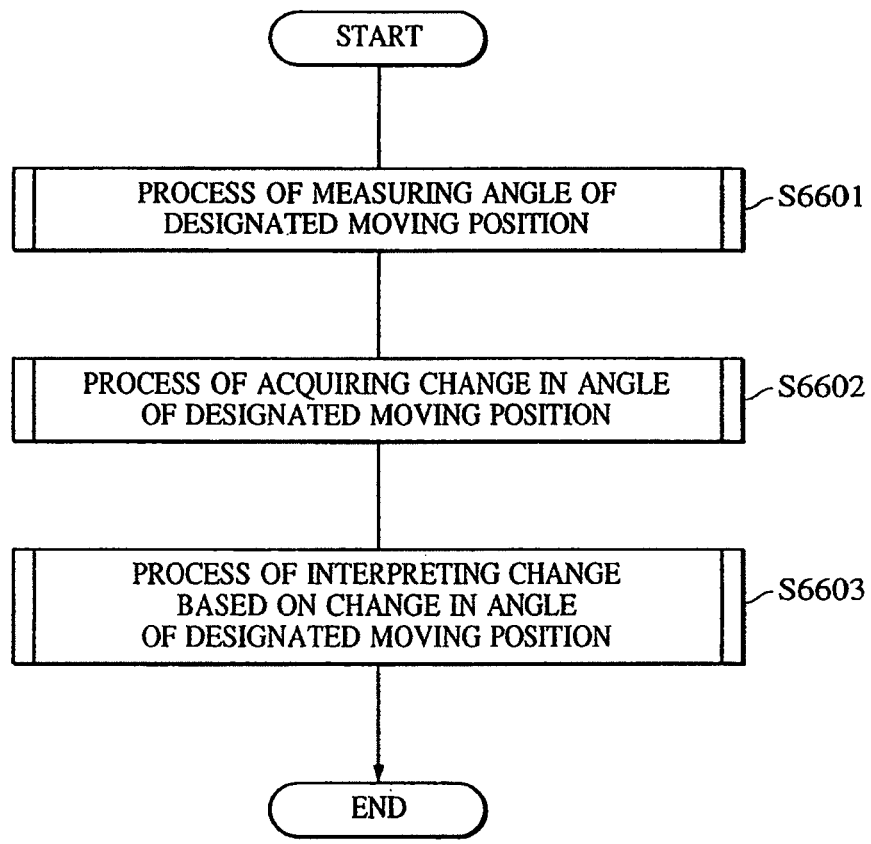
FIG. 66 is a flow diagram of an algorithm that uses a change in an angle of designated moving positions.

FIG. 66 is a flow diagram of an algorithm that uses a change in the moving-to-moving position angle. In step S6601, a process is performed to measure the moving-to-moving position angle. In step S6602, a process is performed to acquire a change in the moving-to-moving position angle. In step S6603, a designation interpretation process is performed to interpret the input based on the acquired angle change.

Figure 67:
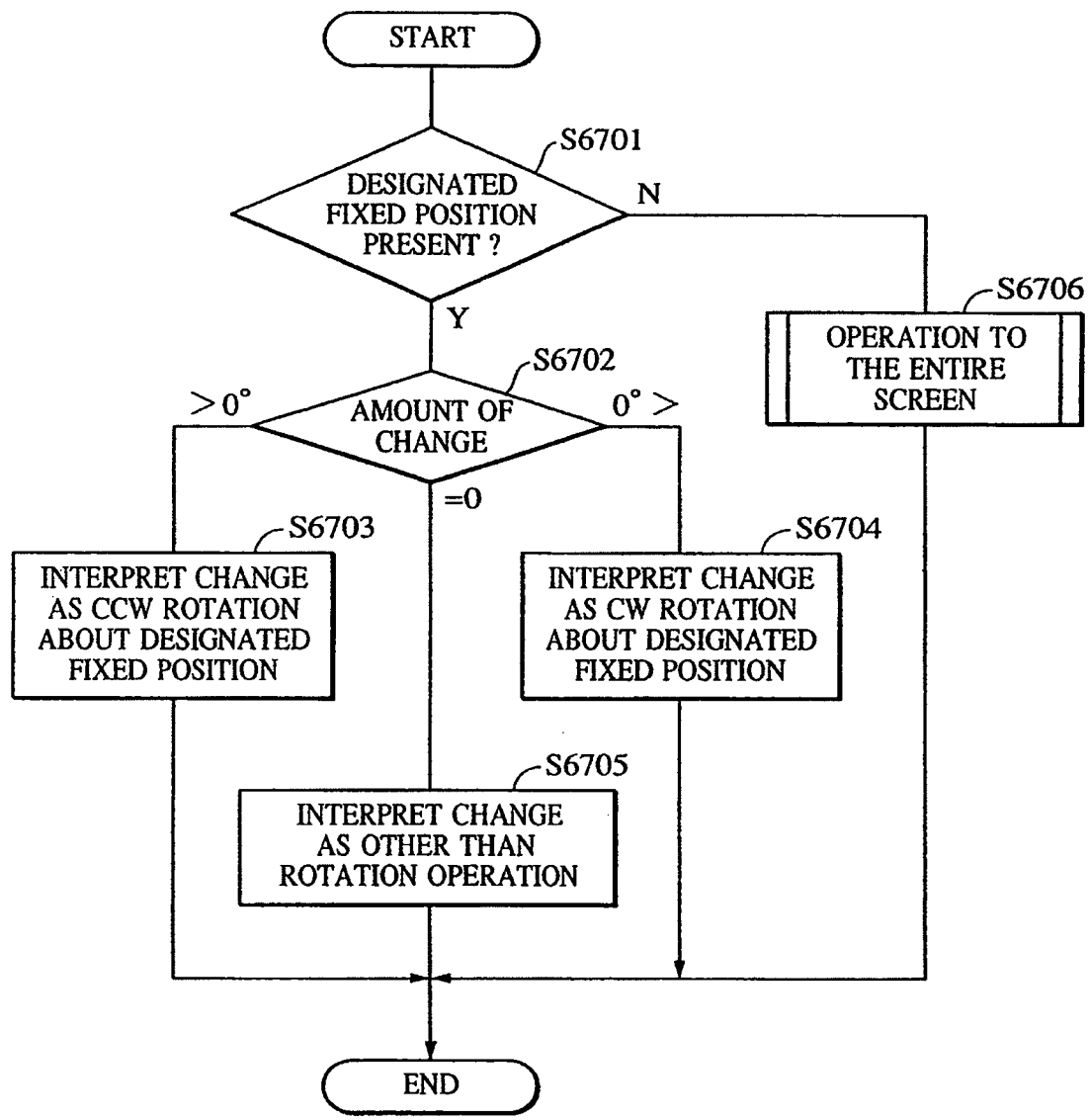
FIG. 67 is a flow diagram of a designation interpretation process based on the change in the angle of the designated moving positions.

FIG. 67 is a flow diagram of the designation interpretation process based on the change in the moving-to-moving position angle. When no designated fixed position is found in step S6701, the algorithm proceeds to step S6706. The input is then interpreted as an operation effective on the entire screen. When a designated fixed position is found in the step S6701, the amount of change is checked in step S6702. When the amount of change is smaller than zero degree, the algorithm proceeds to step S6704, and the input is interpreted as a clockwise rotation operation about the designated fixed position. When the amount of change is greater than zero degree, the algorithm proceeds to step S6703, and the input is interpreted as a counterclockwise rotation operation about the designated fixed position. When the amount of change equals zero degree, the algorithm proceeds to step S6705, and the input is interpreted as an operation other than rotation operations. Otherwise, the input is interpreted as a modified operation in a rotation direction about the center of gravity of the designated moving positions with the designated fixed position stationary.

Figure 68A:
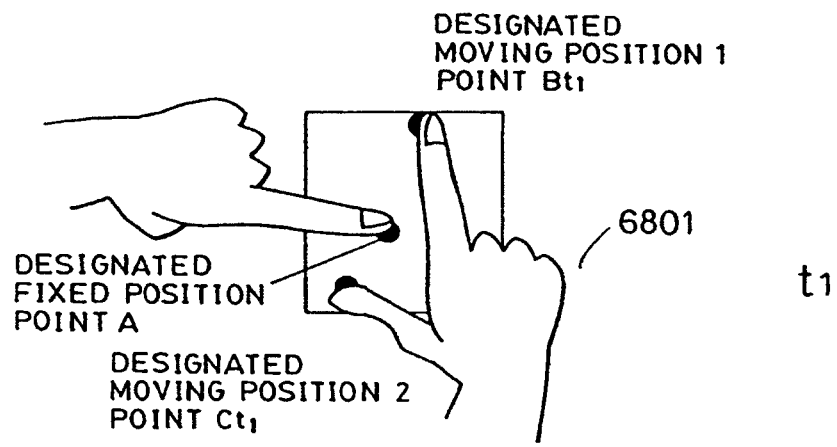
FIGS. 68A and 68B show an operational example that is interpreted as a clockwise rotation operation.
Figure 68B:
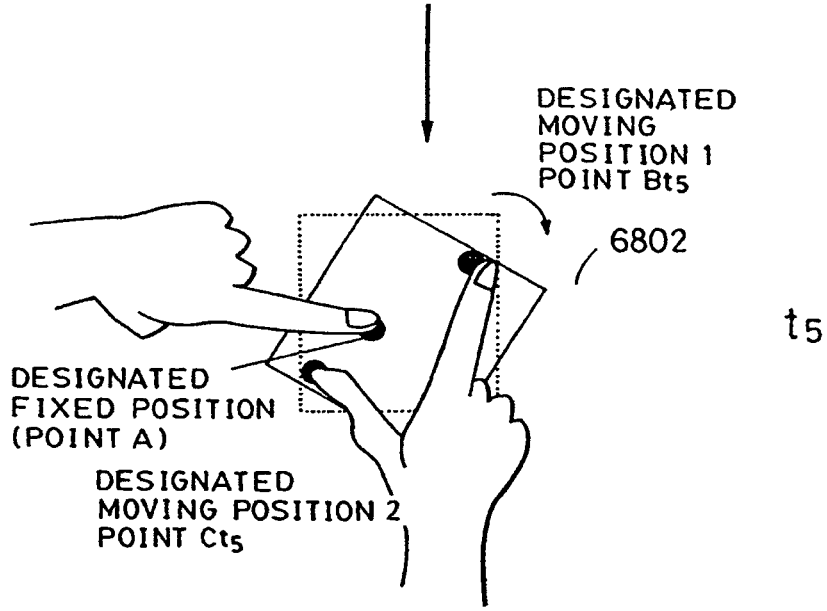

FIGS. 68A and 68B show an operational example that is interpreted as the clockwise rotation operation. As shown, a designated position point A is fixed while designated moving positions 1 and 2 respectively move from a point $Bt_1$ and a point $Ct_1$ to a point $Bt_5$ and a point $Ct_5$. This input is interpreted as a clockwise rotation operation.

FIGS. 69A-69E show the corresponding data samples that are interpreted as the clockwise rotation operation. In a graph 6901, the designated fixed position A has coordinates A(3,3). The designated moving position B is placed at coordinates $Bt_1(4,6)$ at the travel start time $t_1$ and placed at coordinates $Bt_5(6,4)$ at the travel end time $t_5$. The designated moving position C is placed at coordinates $Ct_1(2,1)$ at the travel start time $t_1$ and placed at coordinates $Ct_5(1,2)$ at the travel end time $t_5$. Tables 6902 list position data of the designated fixed position A, the designated moving position 1 (the point B), and the designated moving position 2 (the point C) from $t_1$ to $t_5$. A table 6903 lists data of angle change in the moving-to-moving position angle. In the angle change data, the moving-to-moving position angle is 68.20° at the travel start time $t_1$ and is 36.87° at the travel end time $t_5$. The amount of change in the moving-to-moving position angle is −31.33°.

Figure 70A:
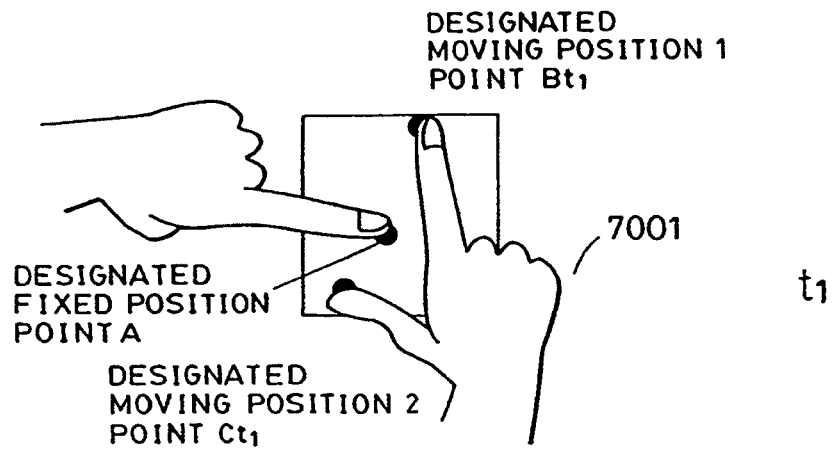
FIGS. 70A and 70B show an operational example that is interpreted as a counterclockwise rotation operation.
Figure 70B:
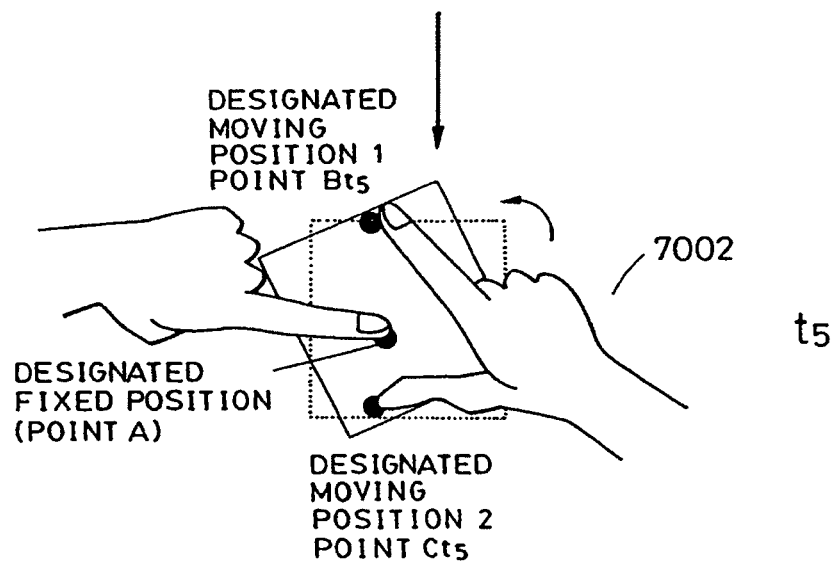
Figures 71A, 71B, 71C, 71D, 71E:
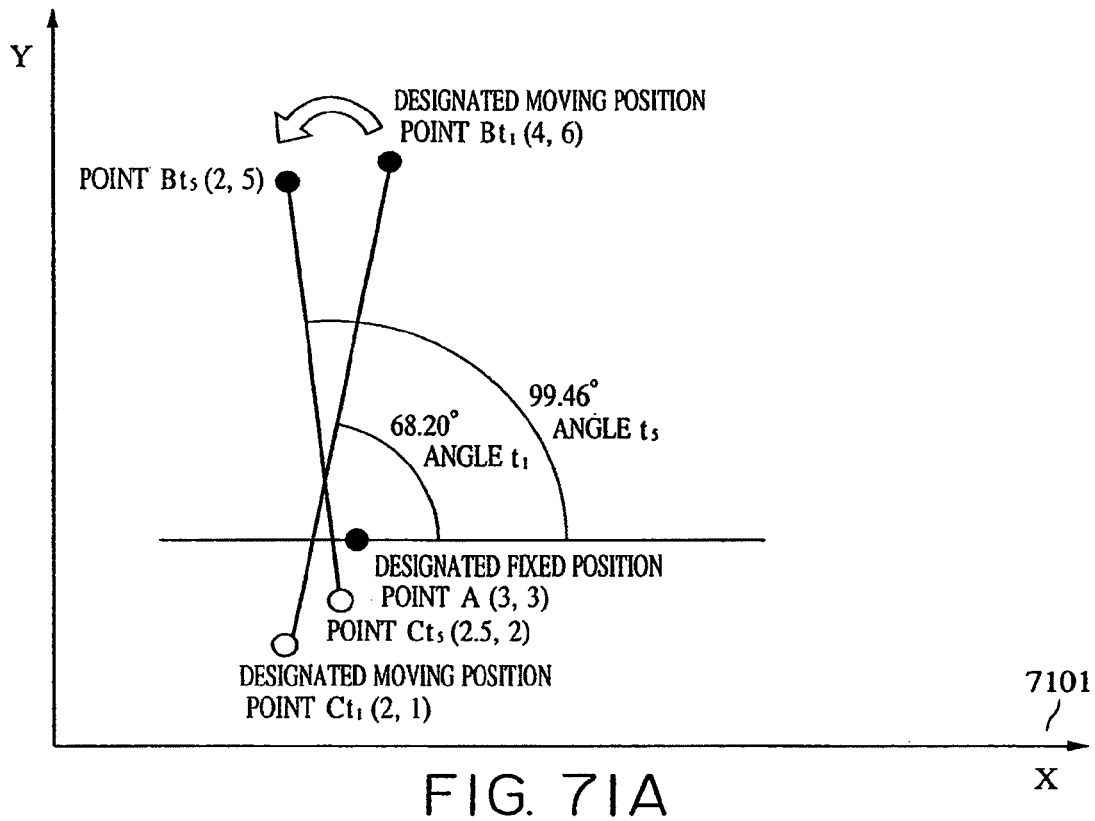
FIGS. 71A-71E show the corresponding data samples that are interpreted as the counterclockwise rotation operation.

FIGS. 70A and 70B show an operational example that is interpreted as a counterclockwise rotation operation. As shown, a designated position point A is fixed while designated moving positions B and C respectively move from a point $Bt_1$ and a point $Ct_1$ to a point $Bt_5$ and a point $Ct_5$. This input is interpreted as a counterclockwise rotation operation.

FIGS. 71A-71E show the corresponding data samples that are interpreted as the counterclockwise rotation operation. In a graph 7101, the designated fixed position A has coordinates A(3,3). The designated moving position B is placed at coordinates $Bt_1(4,6)$ at the travel start time $t_1$ and placed at coordinates $Bt_5(2,5)$ at the travel end time $t_5$. The designated moving position C is placed at coordinates $Ct_1(2,1)$ at the travel start time $t_1$ and placed at coordinates $Ct_5(2.5,2)$ at the travel end time $t_5$. Tables 7102 list position data of the designated fixed position point A, the designated moving position point B, and the designated moving position point C from $t_1$ to $t_5$. A table 7103 lists data of angle change in the moving-to-moving position angle. In the angle change data, the moving-to-moving position angle is 68.20° at the travel start time $t_1$ and is 99.46° at the travel end time $t_5$. The amount of change in the moving-to-moving position angle is +31.26°.

Figure 72A:
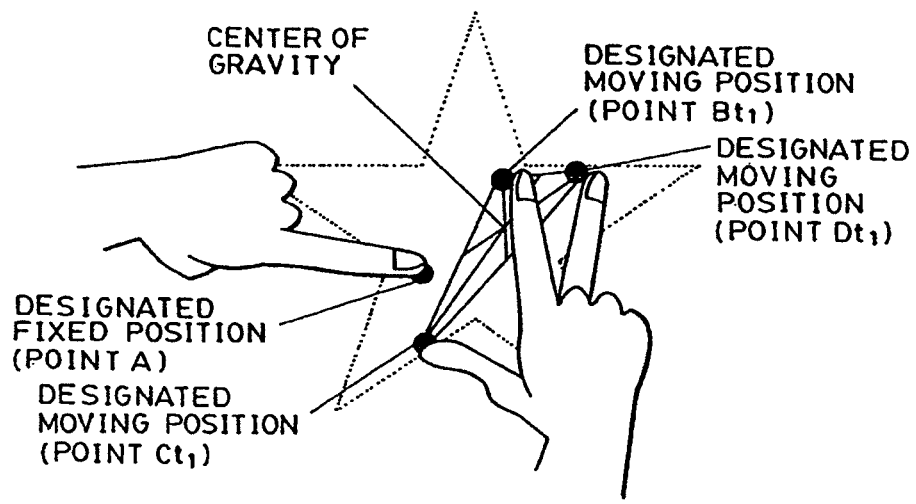
FIGS. 72A and 72B show an operational example that is interpreted as a rotation operation about the center of gravity.
Figure 72B:
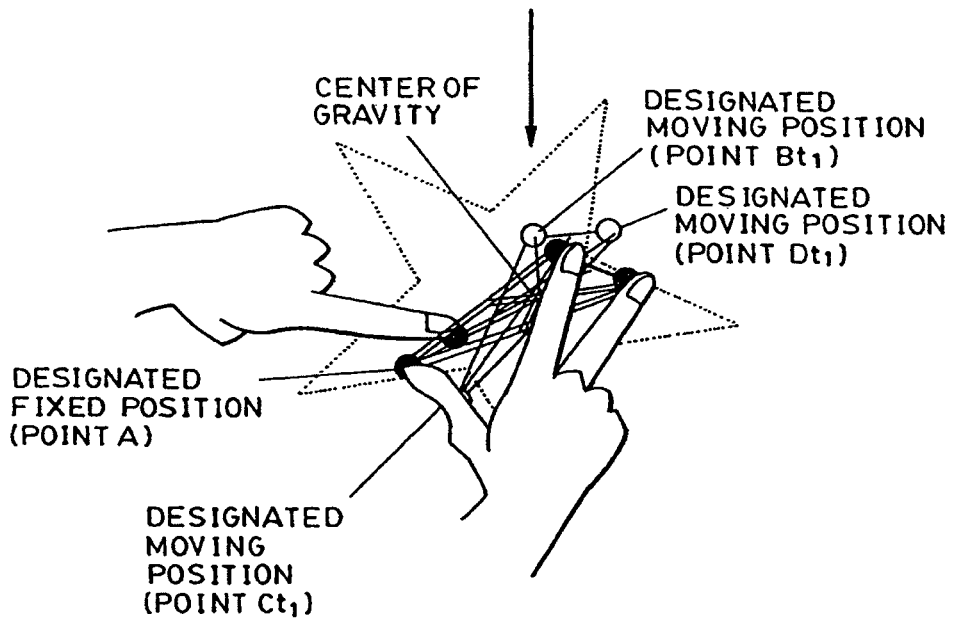
Figure 73A:
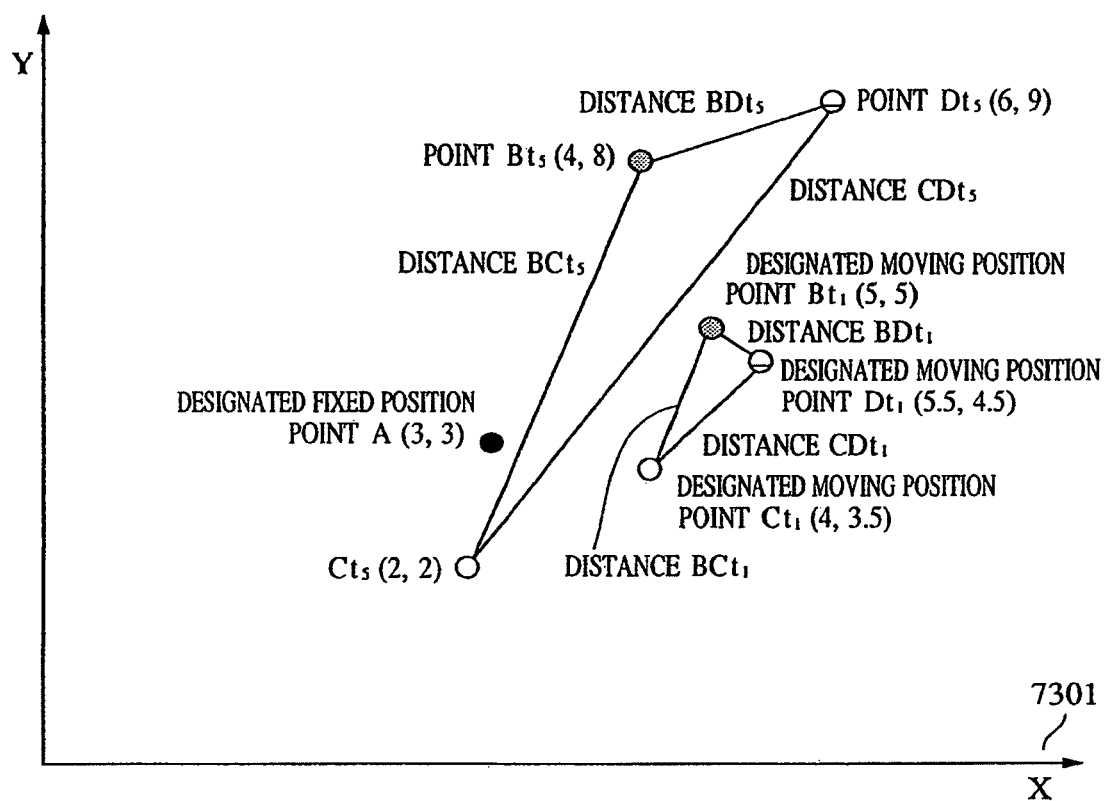

FIGS. 72A and 72B show an operational example that is interpreted as a rotation operation about the center of gravity of three designated moving positions. As shown, a designated position point A is fixed while designated moving positions B, C, and D respectively move from a point $Bt_1$, a point $Ct_1$, and a point $Dt_1$ to a point $Bt_5$, a point $Ct_5$, and a point $Dt_5$. This input is interpreted as the rotation operation about the center of gravity.

FIGS. 73A-73H show the corresponding data samples that are interpreted as the rotation operation about the center of gravity. In a graph 7301, the designated fixed position A has coordinates A(3,3). The designated moving position B is placed at coordinates $Bt_1(5,5)$ at the travel start time $t_1$ and placed at coordinates $Bt_5(4,8)$ at the travel end time $t_5$. The designated moving position C is placed at coordinates $Ct_1(4, 3.5)$ at the travel start time $t_1$ and placed at coordinates $Ct_5(2, 2)$ at the travel end time $t_5$. The designated moving position D is placed at coordinates $Dt_1(5.5, 4.5)$ at the travel start time $t_1$ and placed at coordinates $Dt_5(6,9)$ at the travel end time $t_5$. Tables 7302 list position data of the designated fixed position point A, the designated moving position point B, the designated moving position point C, and the designated moving position point D from $t_1$ to $t_5$. Table 7303 list data of distance change between the designated moving positions. In the distance change data, the distance change between the designated moving positions B and C is 1.803 at the travel start time $t_1$ and is 6.325 at the travel end time $t_5$. The magnification resulting from the distance change therebetween is 351%. The distance change between the designated moving positions B and D is 0.707 at the travel start time $t_1$ and is 2.236 at the travel end time $t_5$. The magnification resulting from the distance change therebetween is 316%. The distance change between the designated moving positions C and D is 1.803 at the travel start time $t_1$ and is 8.062 at the travel end time $t_5$. The magnification resulting from the distance change therebetween is 447%.

Ninth Embodiment

A ninth embodiment of the present invention is now discussed. The ninth embodiment accounts for a positional relationship between a plurality of designated positions when an operation to perform is interpreted from a combination of travel paths of at least two designated positions.

Figure 74:
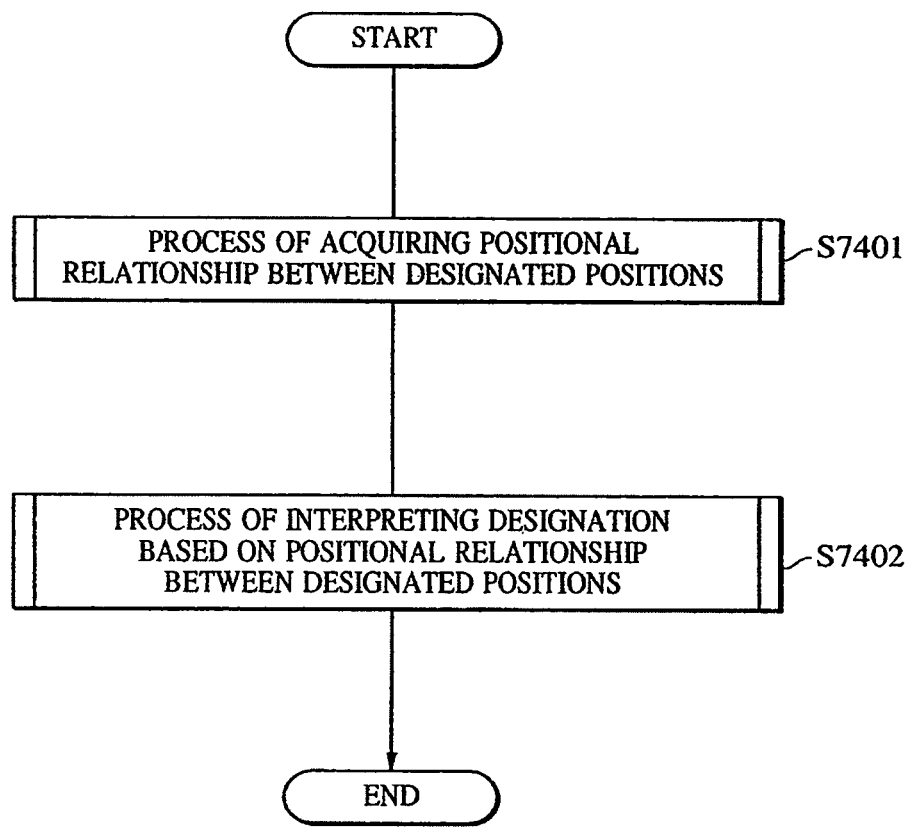
FIG. 74 is a flow diagram showing an algorithm that uses a positional relationship between designated positions.

FIG. 74 is a flow diagram showing an algorithm that uses a positional relationship between designated positions. In step S7401, a process is performed to acquire the positional relationship between the designated positions. In step S7402, a designation interpretation process is performed to interpret the input based on the acquired positional relationship between the plurality of designated positions.

Figure 75:
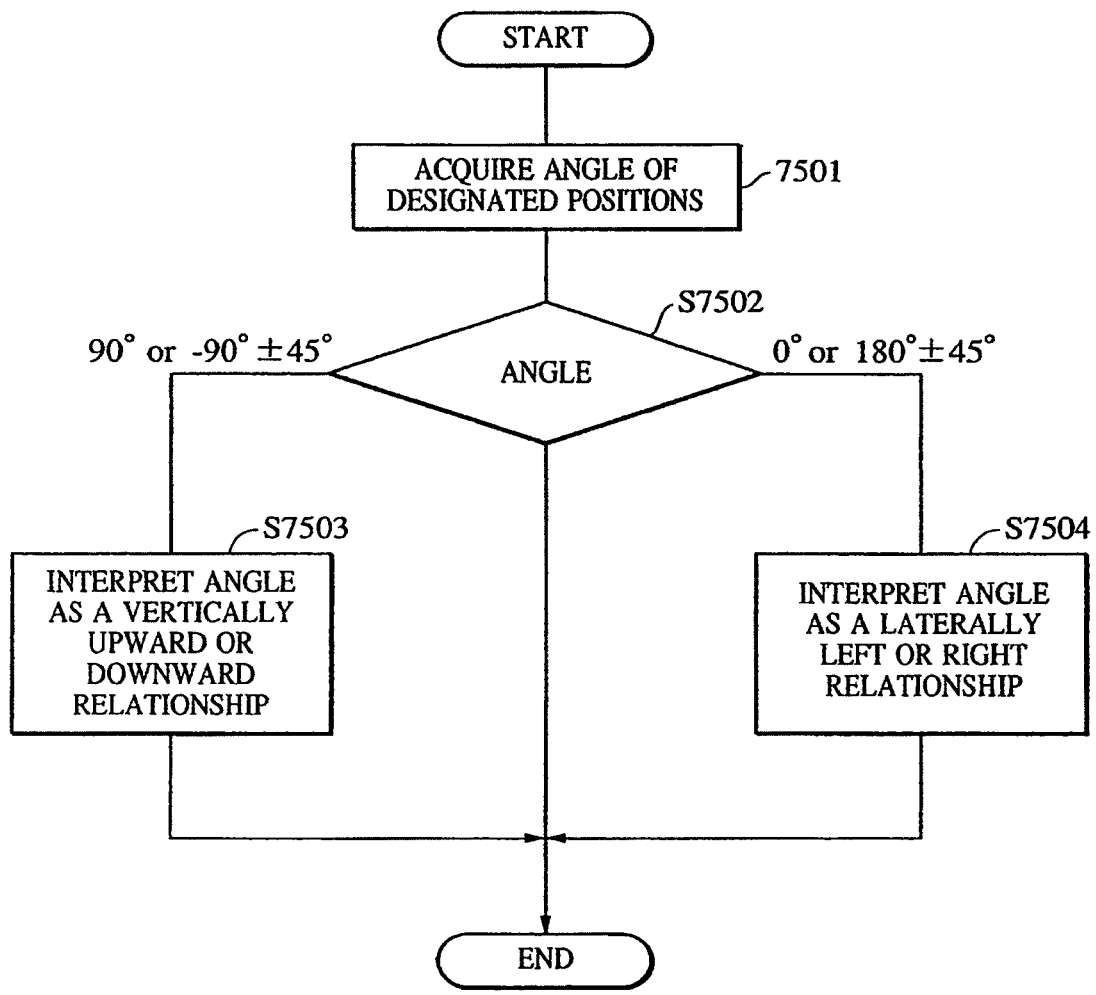
FIG. 75 is a flow diagram showing an algorithm for determining a positional relationship between designated positions.

FIG. 75 is a flow diagram showing, in the step S7401, the process for determining the positional relationship between designated positions. In step S7501, the angle of the designated positions is acquired. When the acquired angle is found to be within a range of from 45° to 135° with respect to 90° or a range of from −45° to −135° with respect to −90° in step S7502, the positional relationship between the designated position points is vertically upward or downward. When the acquired angle is found to be within a range of from 45° to −45° with respect to 0° or a range of from 135° to −135° with respect to 180° in step S7502, the relationship between the designated position points is laterally rightward or leftward. The interpretation of angle is already illustrated in FIG. 35.

Figure 76:
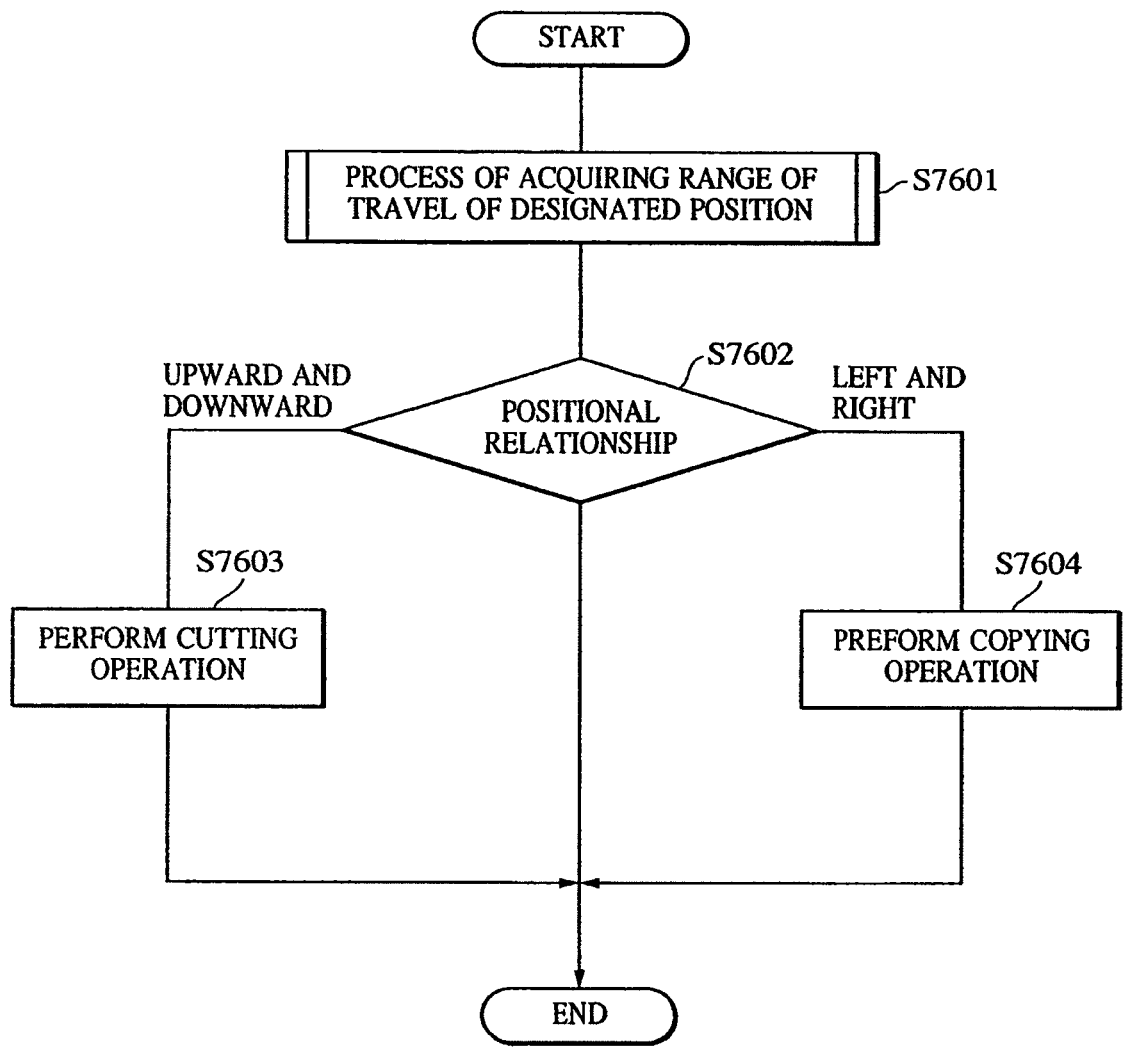
FIG. 76 is a flow diagram showing a designation interpretation process based on the positional relationship between the designated positions.

FIG. 76 is a flow diagram showing, in the step S7402, the designation interpretation process based on the positional relationship between the designated position points. In step S7601, a process is performed to acquire an area of travel. In step S7602, the positional relationship is interpreted. When the positional relationship is vertically upward or downward, the algorithm proceeds to step S7603. The input is thus interpreted as a command for one of a cutting operation and a deleting operation. When the positional relationship is laterally rightward or leftward, the algorithm proceeds to step S7604. The input is thus interpreted as a command for a copying operation.

Figure 77:
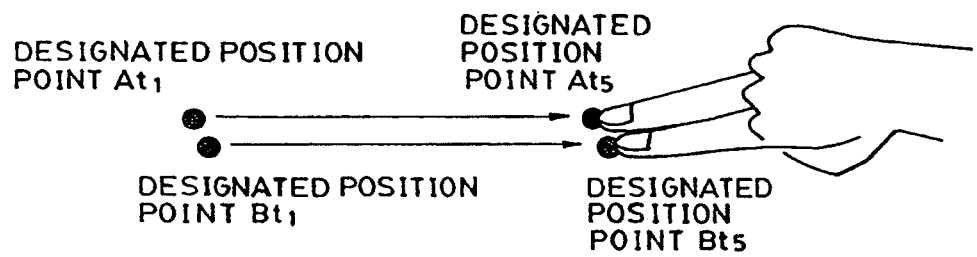
FIG. 77 shows an operational example that is interpreted as a vertical shifting operation.
Figure 78A:
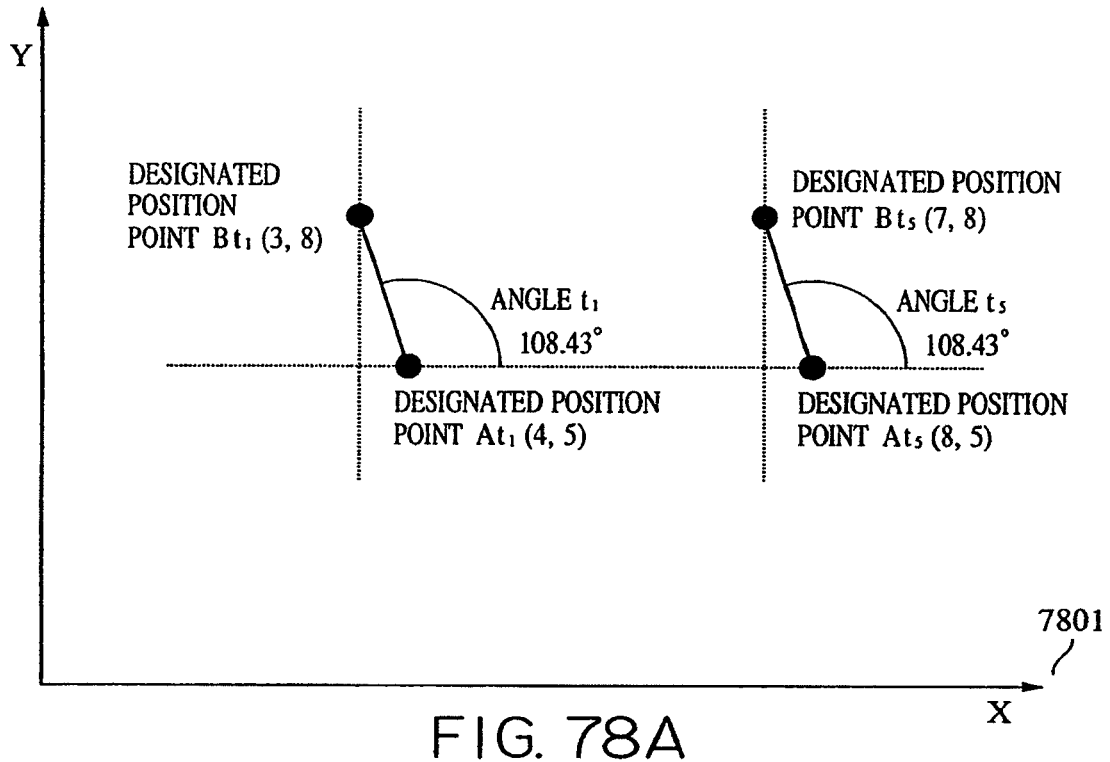

FIG. 77 shows an operational example that is interpreted as a vertical-relationship translation operation. As shown, designated position points A and B respectively move from $At_1$ and $Bt_1$ to $At_5$ and $Bt_5$. The input is thus interpreted as a vertical-relationship translation operation.

FIGS. 78A-78D show the corresponding data samples that are interpreted as the vertical-relationship translation operation. In a graph 7801, the angle $t_1$ representing the relationship of the designated positions is 108.43° when the designated positions A and B respectively are placed at coordinates $At_1(4,5)$ and coordinates $Bt_1(3,8)$ at travel start time $t_1$. The angle $t_5$ representing the relationship of the designated positions is 108.43° when the designated position points A and B are respectively placed at coordinates $A_t5(8,5)$ and at coordinates $Bt_5(7,8)$ at travel end time $t_5$. Tables 7802 list position data of the designated position point A and the designated position point B from time $t_1$ to time $t_5$. A table 7803 lists data of the positional relationship between the designated positions, namely, the angles of the lines connecting the designated positions with respect to the horizontal line from time $t_1$ to time $t_5$.

Figure 79:
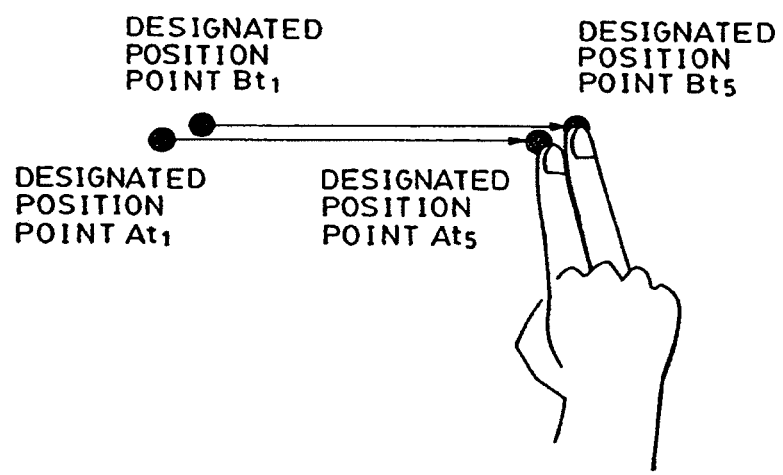
FIG. 79 shows an operational example that is interpreted as a lateral shifting operation.
Figure 80:
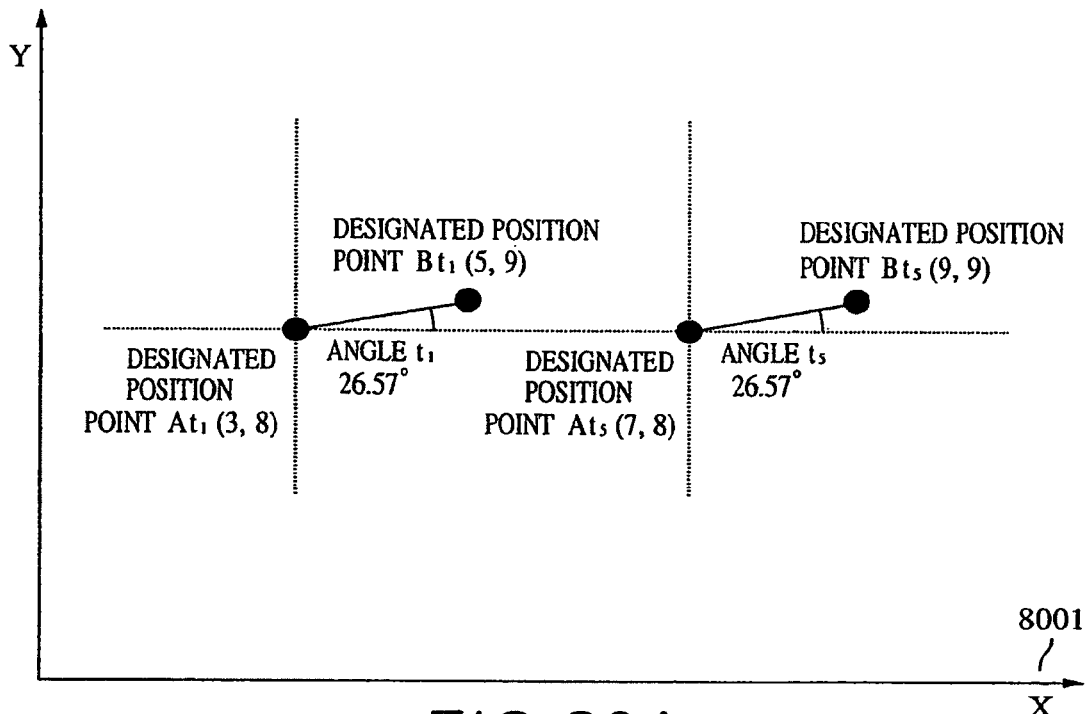
FIGS. 80A-80D show the corresponding data samples that are interpreted as the lateral shifting operation.

FIG. 79 shows an operational example that is interpreted as a lateral relationship translation operation. As shown, designated position points A and B respectively move from $At_1$ and $Bt_1$ to $At_5$ and $Bt_5$. The input is thus interpreted as a lateral-relationship translation operation.

FIGS. 80A-80D show the corresponding data samples that are interpreted as the lateral-relationship translation operation. In a graph 8001, the angle $t_1$ representing the relationship of the designated positions is 26.57° when the designated position points A and B respectively are placed at coordinates $At_1(3,8)$ and coordinates $Bt_1(5,9)$ at travel start time $t_1$. The angle $t_5$ representing the relationship of the designated positions is 26.57° when the designated position points A and B are respectively placed at coordinates $At_5(7,8)$ and at coordinates $Bt_5(9,9)$ at travel end time $t_5$. Tables 8002 list position data of the designated position point A and the designated position point B from time $t_1$ to time $t_5$. A table 8003 lists data of the positional relationship between the designated position points, namely, the angles of the lines connecting the designated positions with respect to the horizontal line from time $t_1$ to time $t_5$.

Tenth Embodiment

A tenth embodiment of the present invention is now discussed. The tenth embodiment accounts for a change in a positional relationship between a plurality of designated positions when an operation to perform is interpreted from a combination of travel paths of at least two designated positions.

Figure 81:
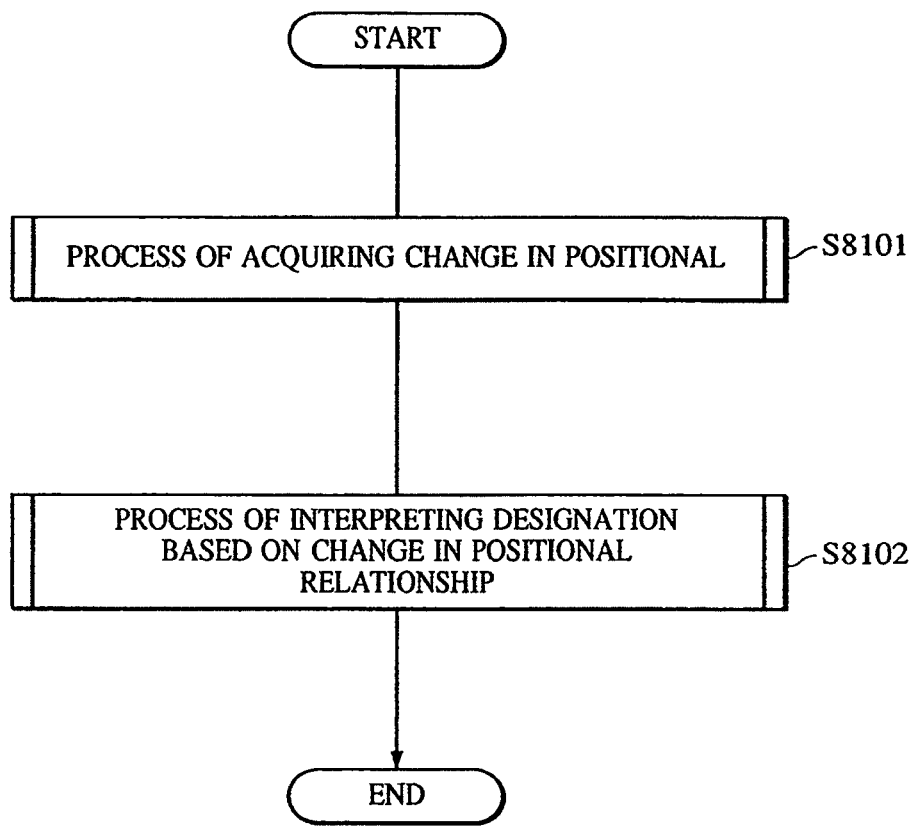
FIG. 81 is a flow diagram showing a designation interpretation process based on a positional relationship between designated positions.

FIG. 81 is a flow diagram showing a designation interpretation process based on a positional relationship between designated positions. In step S8101, a process is performed to determine a change in the positional relationship between the designated positions. In step S8102, a designation interpretation process is performed to interpret the input based on the data of the change in the positional relationship.

Figure 82:
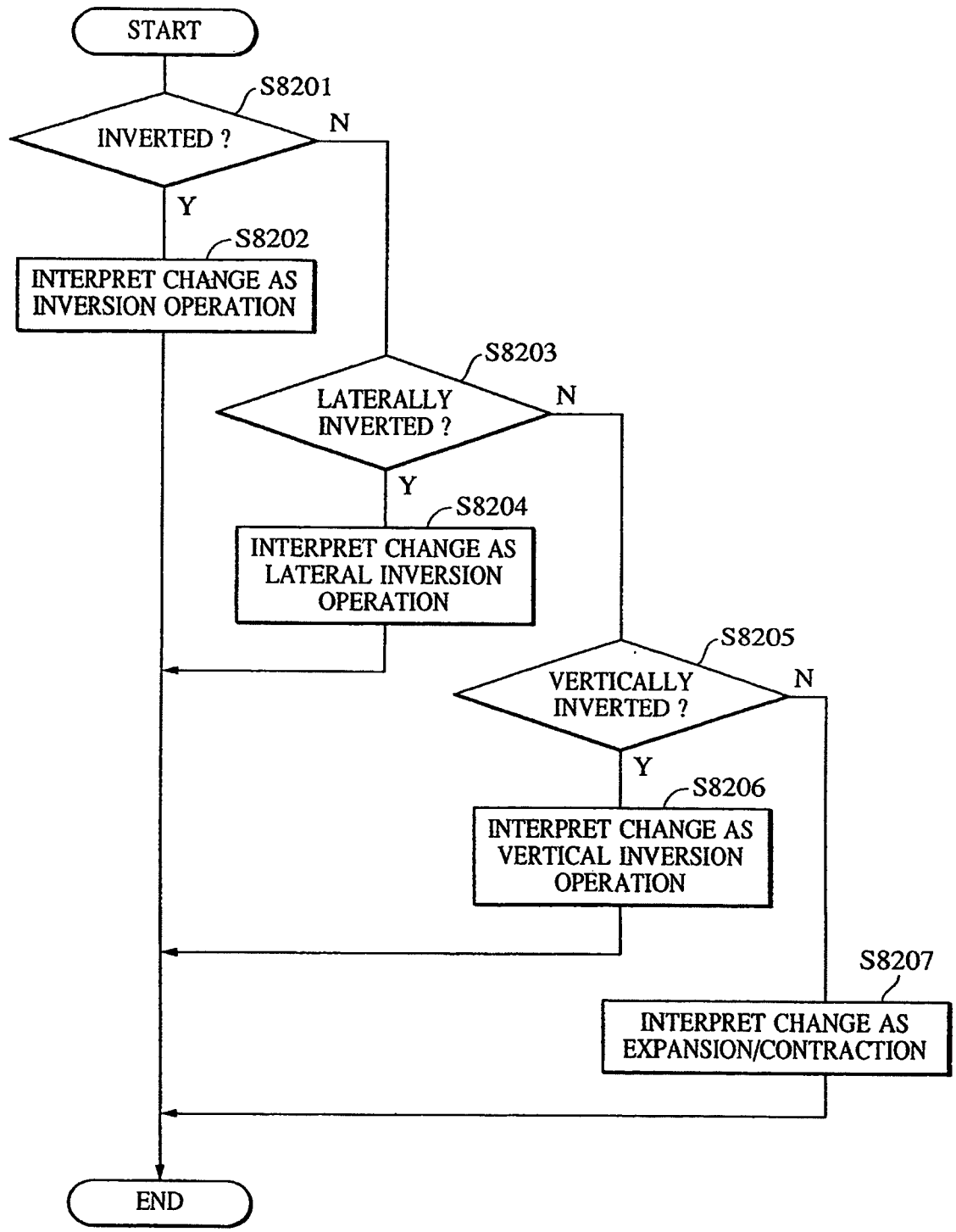
FIG. 82 is a flow diagram showing a designation interpretation process based on the positional relationship between the designated positions.

FIG. 82 is a flow diagram showing a designation interpretation process based on the positional relationship between the designated positions. In step S8201, the amount of angle change is checked. When the amount of angle change is in a direction of inversion, the algorithm proceeds to step S8202. The input is then interpreted as a command for one of an inversion operation, a deleting operation, and a cutting operation. When the amount of angle change is not in a direction of inversion in the step S8201, the algorithm proceeds to step S8203. A positional change in the X direction is checked. When the designated positions are laterally inverted, the algorithm proceeds to step S8204. The input is interpreted as a command for one of a laterally right-left inverting operation, a deleting operation, and a cutting operation.

When the positional change in the X direction is not laterally inverted in the step S8203, the positional change in the Y direction is checked in step S8205. When the designated positions are found to be vertically inverted in the step S8205, the algorithm proceeds to step S8206. The input is thus interpreted as a command for one of a vertically up and down inverting operation, a deleting operation, and a cutting operation. When the designated positions are not vertically inverted in the step S8205, the algorithm proceeds to step S8207. The input is interpreted as a command for one of an expansion operation, and a contraction operation.

Figure 83:
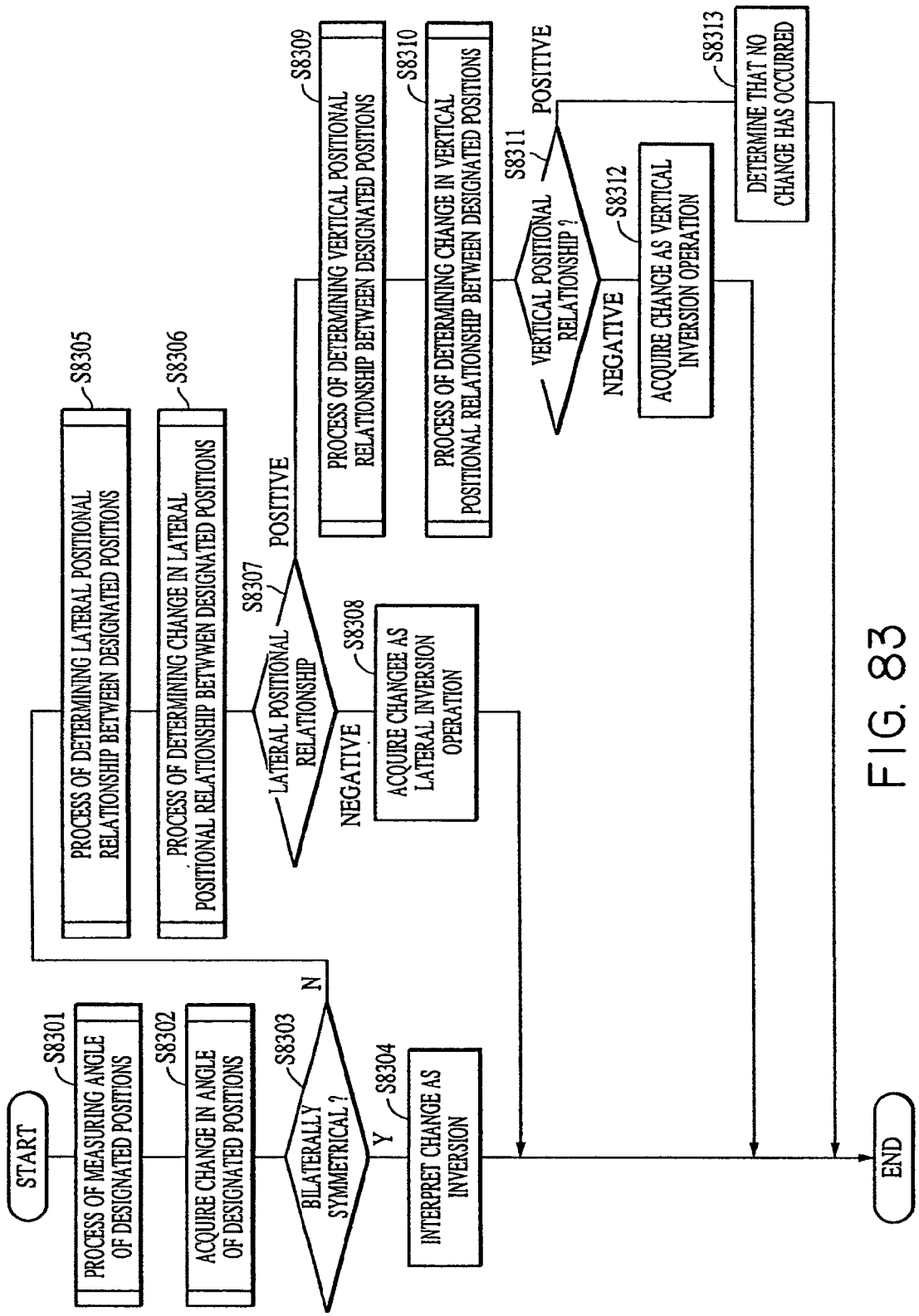
FIG. 83 is a flow diagram showing an algorithm for acquiring a change in the positional relationship between the designated positions.
Figures 85A, 85B, 85C, 85D:
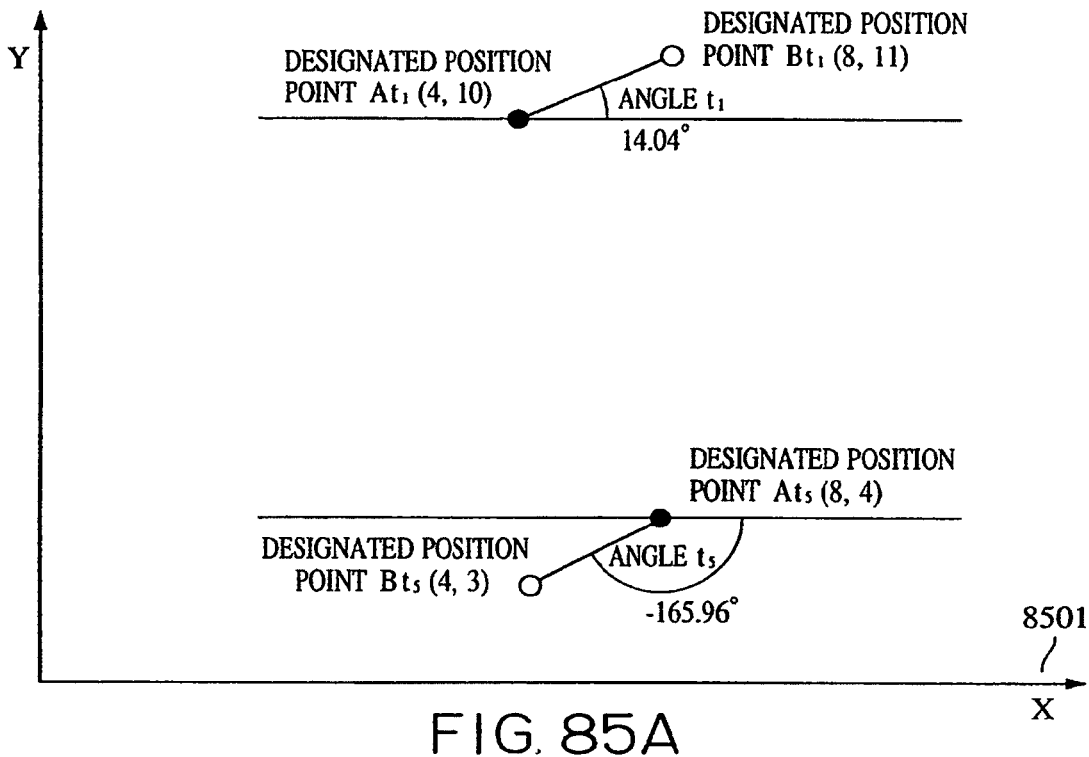
FIGS. 85A-85D show the corresponding data samples that are interpreted as the inversion operation.

FIG. 83 is a flow diagram showing an algorithm for acquiring a change in the positional relationship between the designated positions. In step S8301, a process is performed to acquire the angle of the designated positions. In step S8302, a process is performed to acquire a change in the angle of the designated positions. When the angle change acquired in the step S8302 falls within a predetermined range with respect to a bilaterally symmetrical direction in step S8303, the algorithm proceeds to step S8304. The positional relationship change between the designated positions is interpreted as an inversion operation.

When the acquired angle change is found to fall outside the predetermined range in step S8303, the algorithm proceeds to step S8305. In step S8305, a process is performed to determine a lateral positional relationship between the designated positions. In step S8306, a process is performed to determine a change in the lateral positional relationship between the designated positions. The algorithm proceeds to step S8307. When the acquired change in the lateral positional relationship is found to be negative in the step S8307, the algorithm proceeds to step S8308, and the acquired change in the lateral positional relationship is interpreted as a laterally right and left inverting operation.

When the acquired change in the lateral positional relationship is found to be positive in the step S8307, the algorithm proceeds to step S8309. In step S8309, a process is performed to determine a vertical positional relationship between the designated positions. In step S8310, a process is performed to determine a change in the vertical positional relationship between the designated positions. The algorithm proceeds to step S8311. When the acquired change in the vertical positional relationship is found to be negative in the step S8311, the algorithm proceeds to step S8312. The acquired change in the vertical positional relationship is thus interpreted as a vertically up and down inverting operation. On the other hand, when the acquired change is found to be positive in the step S8311, the algorithm proceeds to step S8313, and the positional relationship is thus determined to be free from any change.

FIGS. 84A and 84B show an operational example that is interpreted as an inversion operation. As shown, designated position points A and B respectively move from points $At_1$ and $Bt_1$ to points $At_5$ and $Bt_5$. This input is interpreted as the inversion operation.

FIGS. 85A-85D show the corresponding data samples that are interpreted as the inversion operation. In a graph 8501, the angle $t_1$ of the line connecting the designated position point A to the designated position point B with respect to the horizontal line is 14.04° when the designated position points A and B respectively are placed at coordinates $At_1(4,10)$ and coordinates $Bt_1(8,11)$ at travel start time $t_1$. The angle $t_5$ of the line connecting the designated position point A to the designated position point B is −165.96° when the designated position points A and B are respectively placed at coordinates $At_5(8,4)$ and at coordinates $Bt_5(4,3)$ at travel end time $t_5$. Tables 8502 list position data of the designated position point A and the designated position point B from time $t_1$ to time $t_5$. A table 8503 lists data of the positional relationship between the designated positions. Specifically, the table 8503 stores the changes in the positional relationship between the designated positions in the X direction, and in the Y direction, and in the angle of the designated positions. In this case, the change in the positional relationship is 180°, indicating that the designated position point A and the designated position point B are inverted in position.

Figures 86A, 86B:
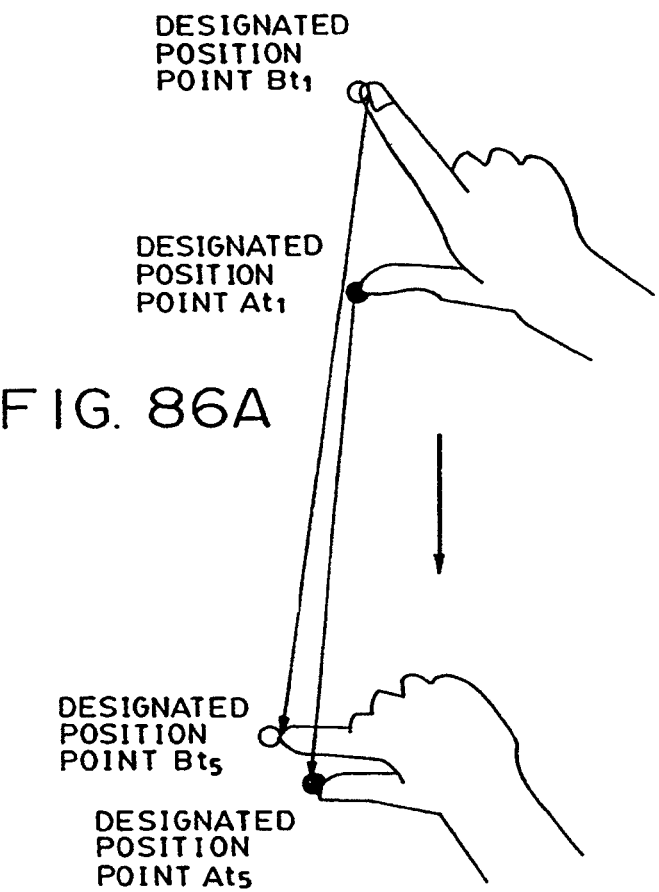
FIGS. 86A and 86B show an operational example that is interpreted as a lateral inversion operation.
Figures 87A, 87B, 87C, 87D:
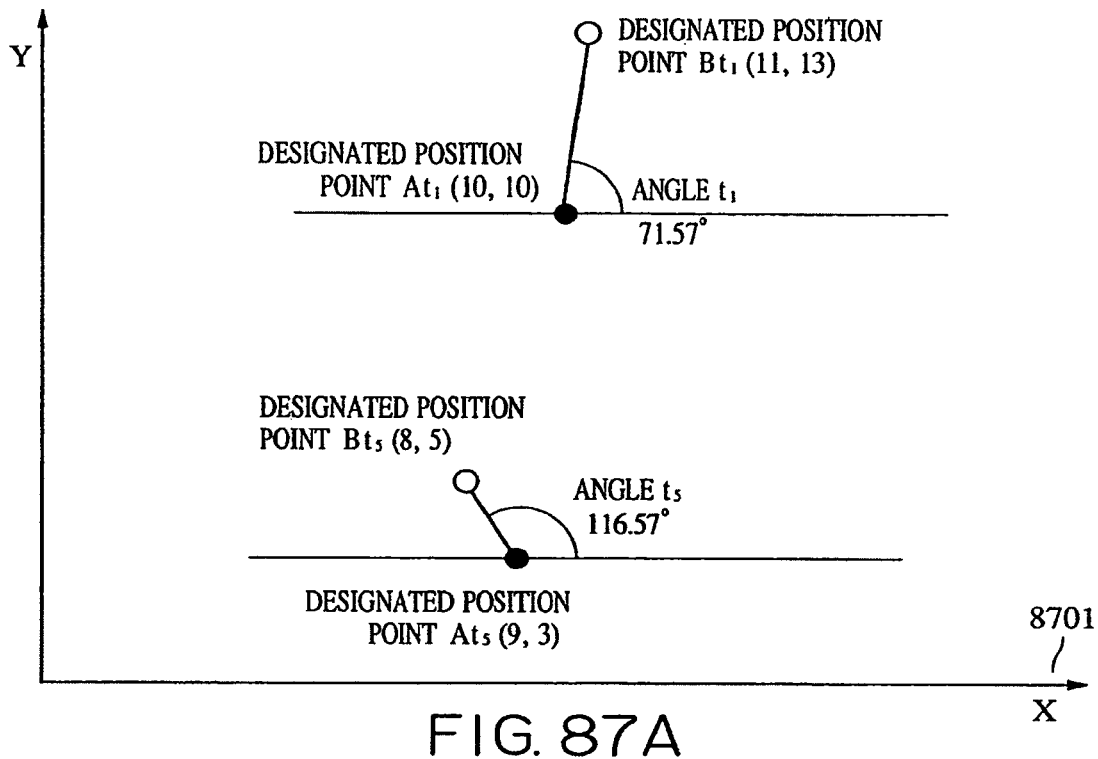
FIGS. 87A-87D show the corresponding data samples that are interpreted as the lateral inversion operation.

FIGS. 86A and 86B show an operational example that is interpreted as a lateral inversion operation. As shown, the designated position points A and B respectively move from points $At_1$ and $Bt_1$ to points $At_5$ and $Bt_5$. This input is interpreted as a laterally right and left inverting operation.

FIGS. 87A-87D show the corresponding data samples that are interpreted as the lateral inversion operation. In a graph 8701, the angle $t_1$ of the line connecting the designated position point A to the designated position point B with respect to the horizontal line is 71.57° when the designated position points A and B respectively are placed at coordinates $At_1(10, 10)$ and coordinates $Bt_1(11,13)$ at travel start time $t_1$. The angle $t_5$ of the line connecting the designated position point A to the designated position point B is 116.57° when the designated position points A and B are respectively placed at coordinates $At_5(9,3)$ and at coordinates $Bt_5(8,5)$ at travel end time $t_5$. Tables 8702 list position data of the designated position point A and the designated position point B from time $t_1$ to time $t_5$. A table 8703 lists data of the positional relationship between the designated positions. Specifically, the table 8703 stores the changes in the positional relationship between the designated positions in the X direction, and in the Y direction, and in the angle of the designated positions. Since the positional relationship in the X direction changes from negative to positive in this case, the designated position points A and B are laterally inverted.

Figures 88A, 88B:
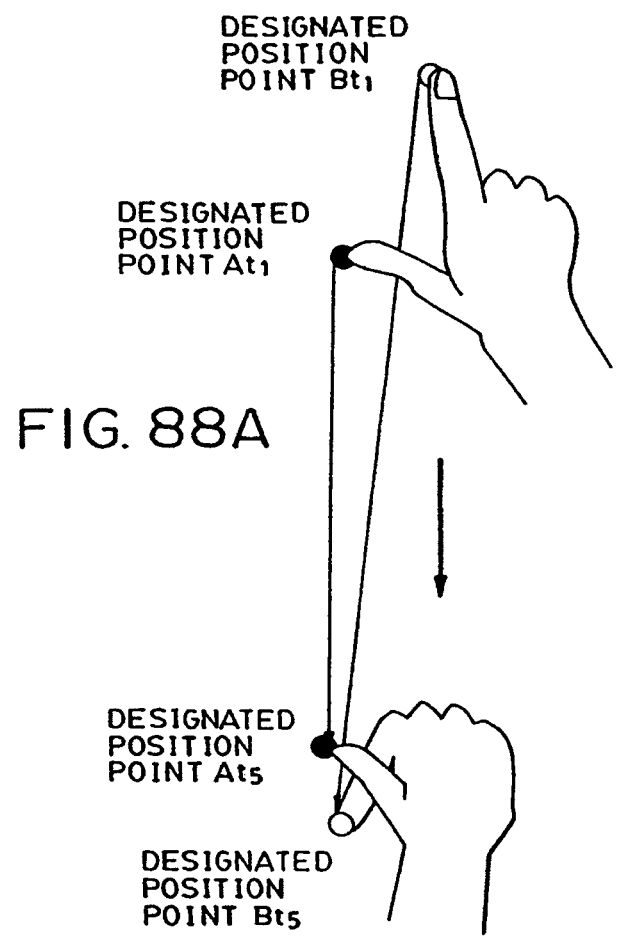
FIGS. 88A and 88B show an operational example that is interpreted as a vertical inversion operation.
Figures 89A, 89B, 89C, 89D:
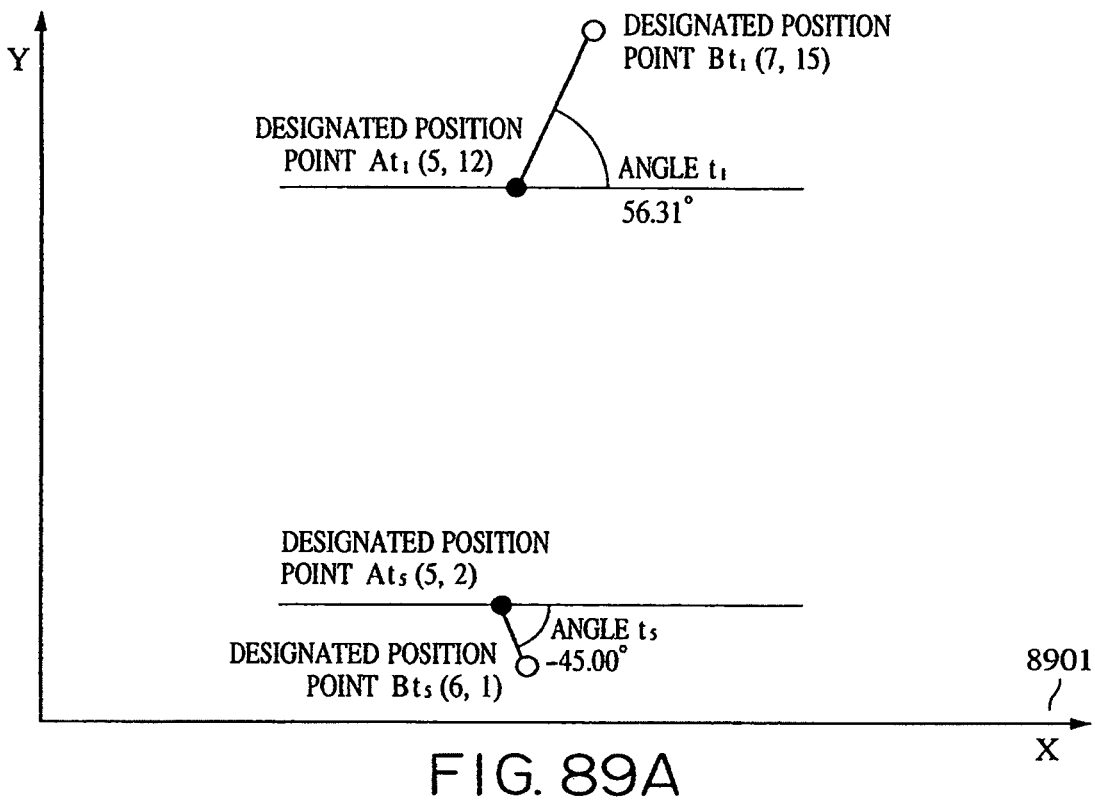
FIGS. 89A-89D show the corresponding data samples that are interpreted as the vertical inversion operation.

FIGS. 88A and 88B show an operational example that is interpreted as a vertical inversion operation. As shown, the designated position points A and B respectively move from points $At_1$ and $Bt_1$ to points $At_5$ and $Bt_5$. This input is interpreted as a vertically up and down inverting operation.

FIGS. 89A-89D show the corresponding data samples that are interpreted as the vertical inversion operation. In a graph 8901, the angle $t_1$ of the line connecting the designated position point A to the designated position point B with respect to the horizontal line is 56.31° when the designated position points A and B respectively are placed at coordinates $At_1(5, 12)$ and coordinates $Bt_1(7,15)$ at travel start time $t_1$. The angle $t_5$ of the line connecting the designated position point A to the designated position point B is −45.00° when the designated position points A and B are respectively placed at coordinates $At_5(5,2)$ and at coordinates $Bt_5(6,1)$ at travel end time $t_5$. Tables 8902 list position data of the designated position point A and the designated position point B from time $t_1$ to time $t_5$. A table 8903 lists data of the positional relationship between the designated positions. Specifically, the table 8903 stores the changes in the positional relationship between the designated positions in the X direction, and in the Y direction, and in the angle of the designated positions. Since the positional relationship in the Y direction changes from negative to positive in this case, the designated position points A and B are vertically up and down inverted.

Eleventh Embodiment

An eleventh embodiment of the present invention is now discussed. The eleventh embodiment accounts for a positional relationship between a designated fixed position and a designated moving position when an operation to perform is interpreted from a combination of travel paths of at least two designated positions.

Figure 90:
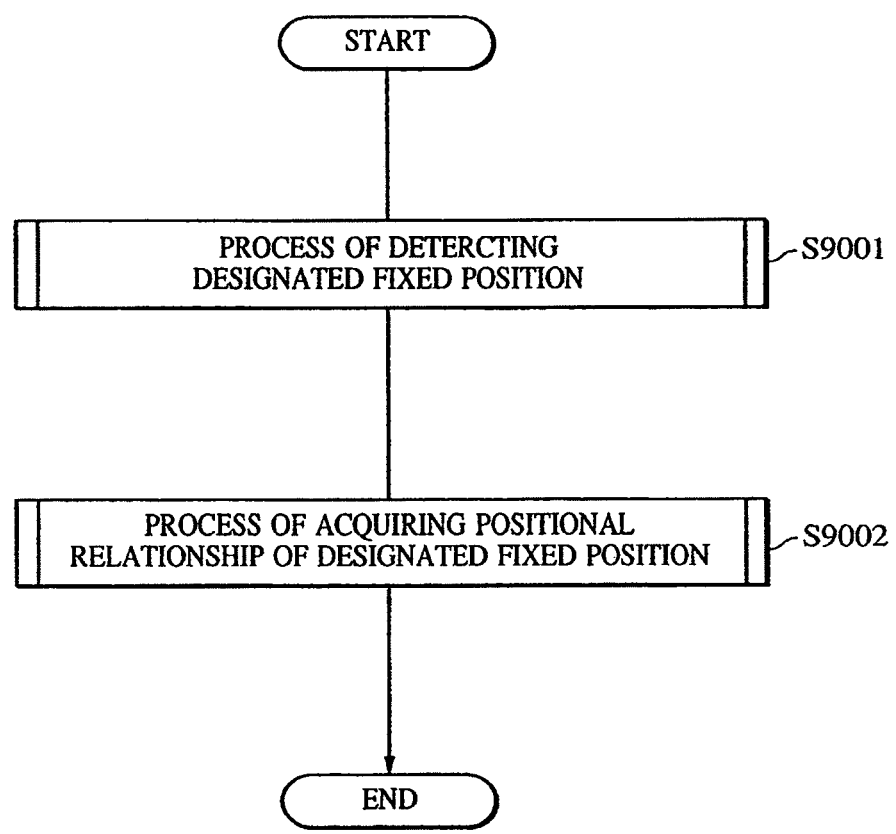
FIG. 90 is a flow diagram showing an algorithm for determining a positional relationship between designated positions.

FIG. 90 is a flow diagram showing an algorithm for determining a positional relationship between designated positions. In step S9001, a process is performed to detect the designated fixed position. In step 9002, a process is performed to determine the positional relationship between the designated fixed position and the designated moving position.

Figure 91:
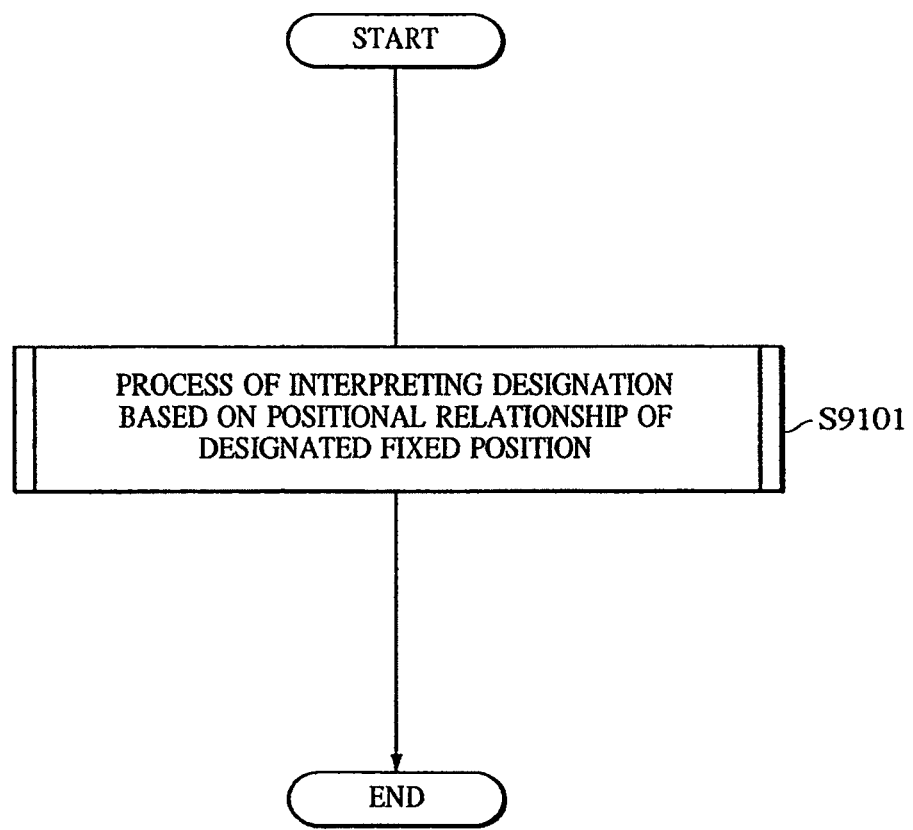
FIG. 91 is a flow diagram of a designation interpretation process based on the positional relationship to the designated fixed position.

FIG. 91 is a flow diagram of a designation interpretation process based on the positional relationship to the designated fixed position. In step S9101, a process is performed to interpret the input based on the determined positional relationship data.

Figure 92:
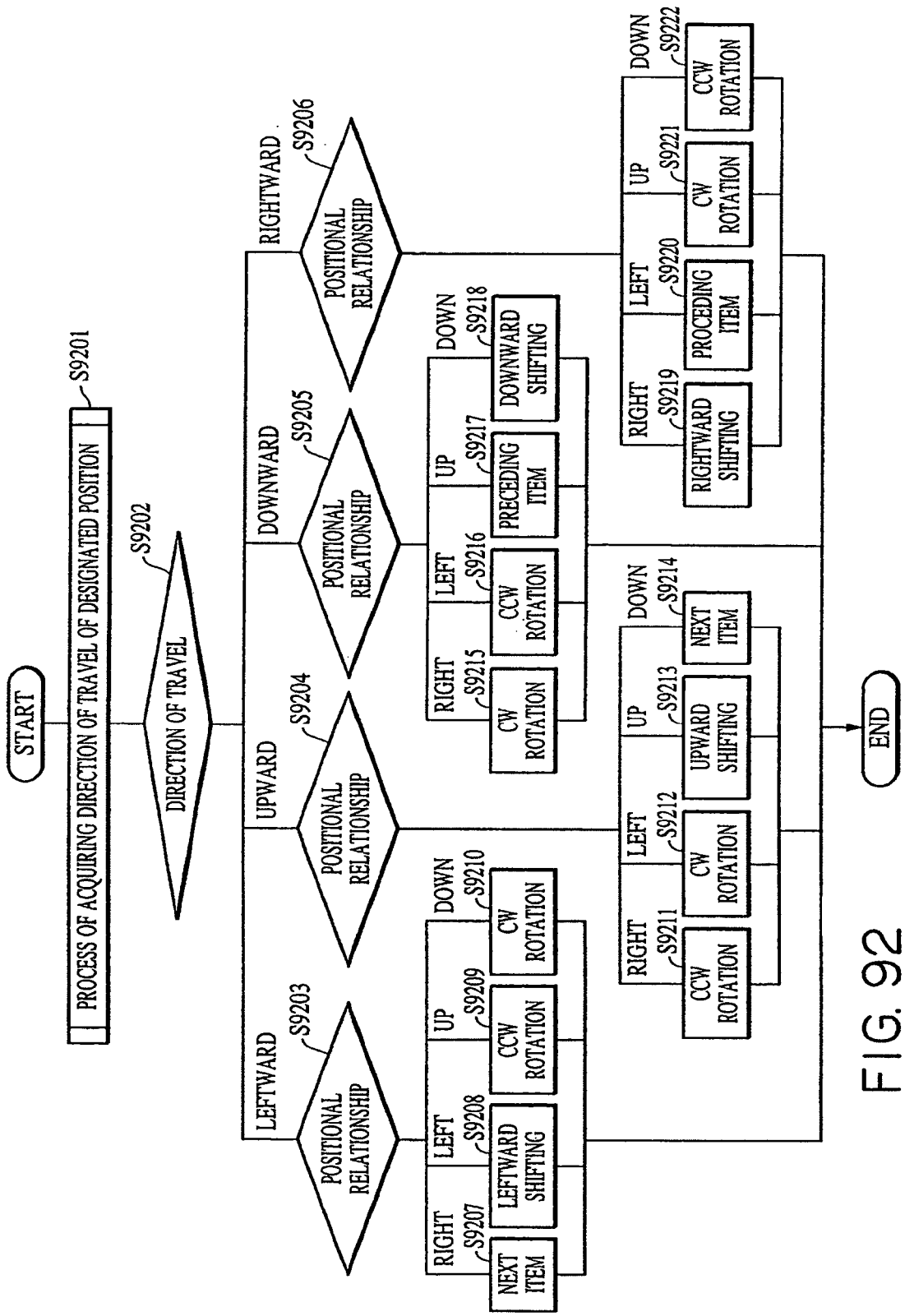
FIG. 92 is a flow diagram showing in detail the designation interpretation process based on the positional relationship to the designated fixed position.

FIG. 92 is a flow diagram showing in detail the designation interpretation process based on the positional relationship of the designated fixed position. In step S9201, a process is performed to acquire the direction of travel of the designated moving position. In step S9202, the travel direction is determined. When the travel direction is found to be leftward in the step S9202, the algorithm proceeds to step S9203.

When the positional relationship of the designated moving position is found to be to the right of the designated fixed position in the step S9203, the algorithm proceeds to step S9207. The input is interpreted as a command for one of a next-item operation, a next-page operation, a next-screen operation, a last-line operation, and a contraction operation in a lateral direction only. When the positional relationship of the designated moving position is found to be the left of the designated fixed position in the step S9203, the algorithm proceeds to step S9208. The input is interpreted as a command for one of a leftward screen shifting operation and an expansion operation in a lateral direction only. When the positional relationship of the designated moving position is found to be above the designated fixed position in the step S9203, the algorithm proceeds to step S9209. The input is interpreted as a command for a counterclockwise rotation operation. When the positional relationship of the designated moving position is found to be below the designated fixed position in the step S9203, the algorithm proceeds to step S9210. The input is interpreted as a command for a clockwise rotation operation.

When the travel direction is found to be upward in the step S9202, the algorithm proceeds to step S9204. When the positional relationship of the designated moving position is found to be to the right of the designated fixed position in the step S9204, the algorithm proceeds to step S9211. The input is interpreted as a command for a counterclockwise rotation operation. When the positional relationship of the designated moving position is found to be to the left of the designated fixed position in the step S9204, the algorithm proceeds to step S9212. The input is interpreted as a command for a clockwise rotation operation. When the positional relationship of the designated moving position is found to be above the designated fixed position in the step S9204, the algorithm proceeds to step S9213. The input is interpreted as a command for a screen upward shifting operation or an expansion operation in a vertical direction. When the positional relationship of the designated moving position is found to be below the designated fixed position in the step S9204, the algorithm proceeds to step S9214. The input is interpreted as a command for one of a next-item operation, a next-page operation, a next-screen operation, a last-line operation, and a contraction operation in a lateral direction only.

When the travel direction is found to be downward in the step 9202, the algorithm proceeds to step S9205. When the positional relationship of the designated moving position is found to be to the right of the designated fixed position in the step S9205, the algorithm proceeds to step S9215. The input is interpreted as a command for a clockwise rotation operation. When the positional relationship of the designated moving position is found to be to the left of the designated fixed position in the step S9205, the algorithm proceeds to step S9216. The input is interpreted as a command for a counterclockwise rotation operation. When the positional relationship of the designated moving position is found to be above the designated fixed position in the step S9205, the algorithm proceeds to step S9217. The input is interpreted as a command for one of a preceding-item operation, a preceding-page operation, a preceding-screen operation, a first-line operation, and a contraction operation in a vertical direction only. When the positional relationship of the designated moving position is found to be below the designated fixed position in the step S9205, the algorithm proceeds to step S9218. The input is interpreted as a command for a downward screen shifting operation.

When the travel direction is found to be rightward in the step S9202, the algorithm proceeds to step S9206. When the positional relationship of the designated moving position is found to be to the right of the designated fixed position in the step S9206, the algorithm proceeds to step S9219. The input is interpreted as a command for one of rightward screen shifting operation and an expansion operation in a lateral direction only. When the positional relationship of the designated moving position is found to be to the left of the designated fixed position in the step S9206, the algorithm proceeds to step S9220. The input is interpreted as a command for one of a preceding-item operation, a preceding-page operation, a preceding-screen operation, a first-line operation, and a contraction operation in a vertical direction only. When the positional relationship of the designated moving position is found to be above the designated fixed position in the step S9206, the algorithm proceeds to step S9221. The input is interpreted as a command for a clockwise rotation operation. When the positional relationship of the designated moving position is found to be below the designated fixed position in the step S9206, the algorithm proceeds to step S9222. The input is interpreted as a command for a counterclockwise rotation operation.

Figure 93:
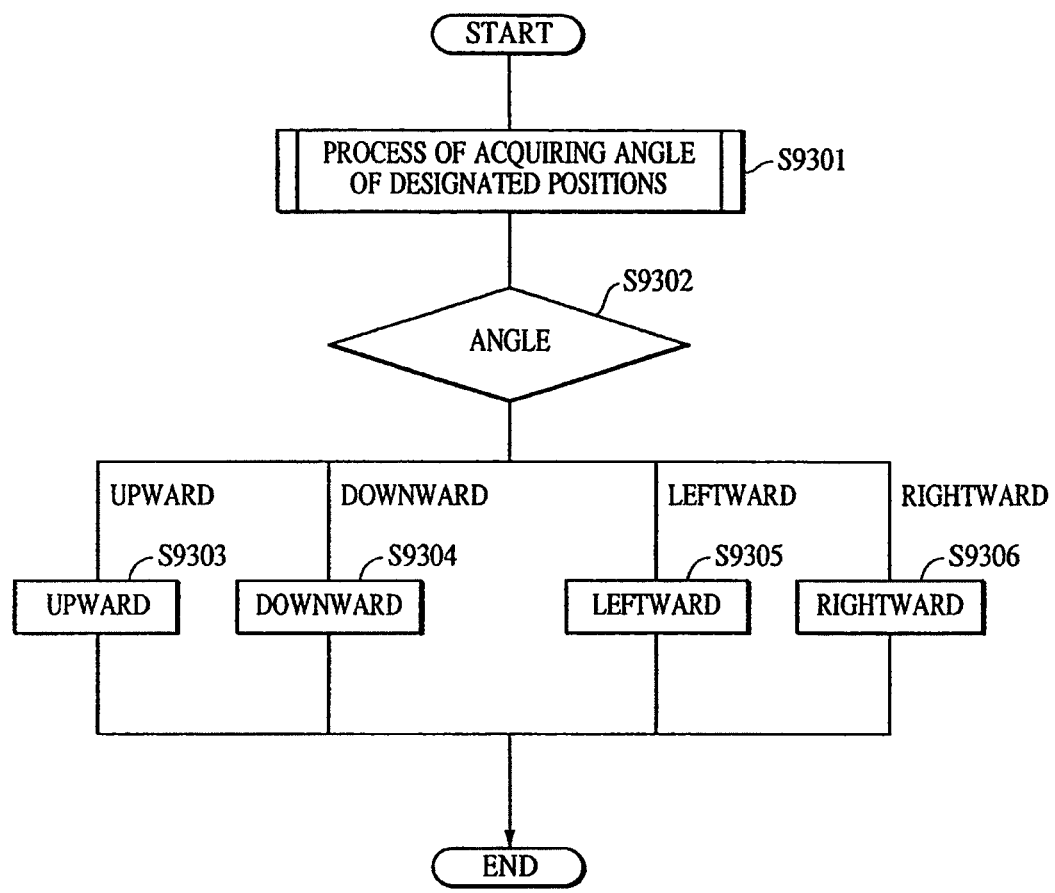
FIG. 93 is a flow diagram showing an algorithm for determining the positional relationship to the designated fixed position.

FIG. 93 is a flow diagram showing an algorithm for determining the positional relationship to the designated fixed position. In step S9301, a process is performed to acquire an angle of the designated positions. When the acquired angle is found to fall within a predetermined range in an upward direction in step S9302, the positional relationship of the designated positions is determined to be upward in step S9303. When the acquired angle is found to fall within a predetermined range in a downward direction in the step S9302, the positional relationship is determined to downward in step S9304. When the acquired angle is found to fall within a predetermined range in a leftward direction in the step S9302, the positional relationship is determined to be leftward in step S9305. When the acquired angle is found to fall within a predetermined range in a rightward direction in the step S9302, the positional relationship is determined to be leftward in step S9306.

Figure 94:
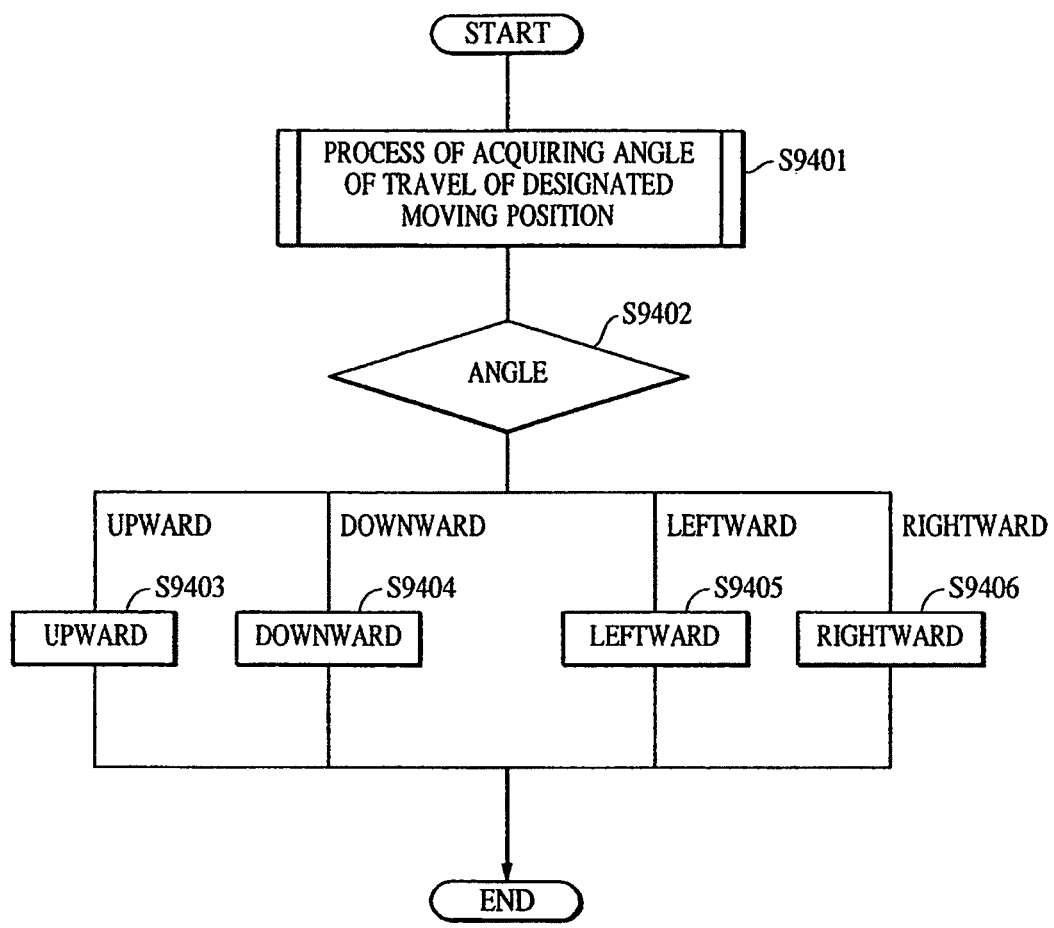
FIG. 94 is a flow diagram showing an algorithm for acquiring the direction of travel of a designated position.

FIG. 94 is a flow diagram showing an algorithm for acquiring the direction of travel of a designated position. As shown, in step S9401, a process is performed to acquire the angle of travel of a designated position. When the acquired angle is found to fall within a predetermined range in an upward direction in step S9402, the travel direction relationship of the designated positions is determined to be upward in step S9403. When the acquired angle is found to fall within a predetermined range in a downward direction in the step S9402, the travel direction is determined to downward in step S9404. When the acquired angle is found to fall within a predetermined range in a leftward direction in the step S9402, the travel direction is determined to be leftward in step S9405. When the acquired angle is found to fall within a predetermined range in a rightward direction in the step S9402, the travel direction is determined to be rightward in step S9406.

Figures 95A, 95B:
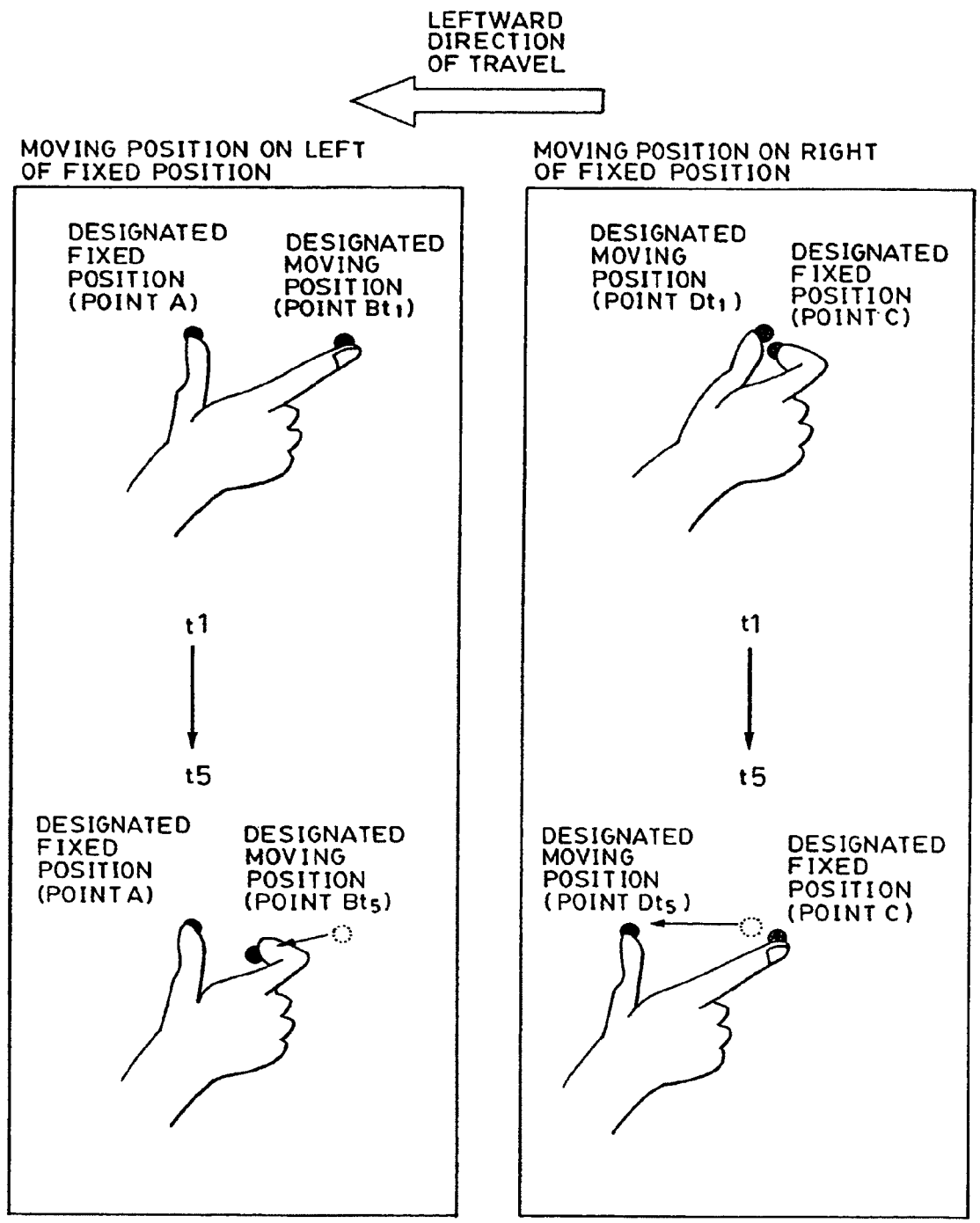
FIGS. 95A and 95B show two operational examples that have different interpretations depending on the positional relationship of designated positions even though the travel directions thereof are the same.
Figures 96A, 96B, 96C, 96D:
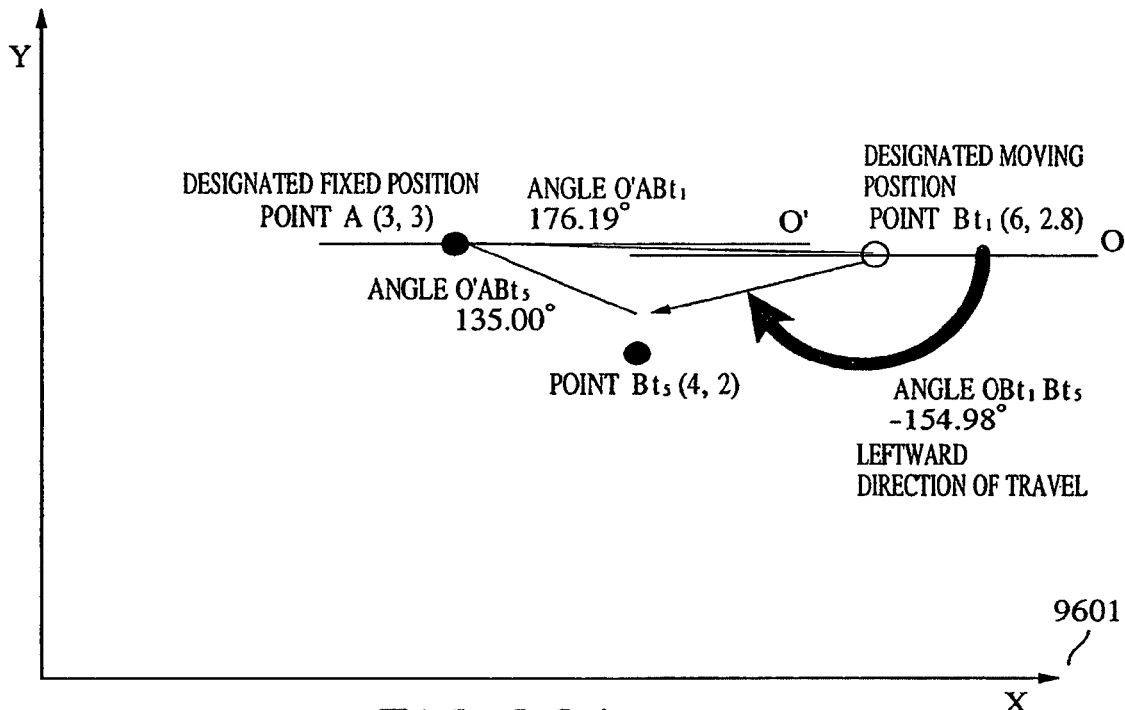
FIGS. 96A-96D show the corresponding data samples that are interpreted as a next-item operation.

FIGS. 95A and 95B show two operational examples that are interpreted as a next-item operation or a leftward screen shifting operation depending on the positional relationship of designated positions even though the travel directions thereof are the same. As shown in FIG. 95A, a designated position point B, placed to the right of a designated fixed position point A, leftward moves. An operation to perform is interpreted as one of a next-item operation, a next-screen operation, a last-line operation, and a contraction operation in a lateral direction only. On the other hand, as shown in FIG. 95B, a designated moving position point D, placed to the left of a designated fixed position point C, leftward moves. An operation to perform is interpreted as one of a leftward screen shifting operation and an expansion operation in a lateral direction only.

When the designated moving position point, placed above the designated fixed position point, leftward moves, an operation to perform is interpreted as a counterclockwise rotation operation. When the designated moving position point, placed below the designated fixed position point, leftward moves, an operation to perform is interpreted as a clockwise rotation operation.

When the travel direction is upward, the following interpretations are preformed depending on the positional relationship. With the designated moving position point placed to the right of the designated fixed position point, an operation to perform is interpreted as a counterclockwise rotation operation. With the designated moving position point placed to the left of the designated fixed position point, an operation to perform is interpreted as a clockwise rotation operation. With the designated moving position placed above the designated fixed position point, an operation to perform is interpreted as one of an upward screen shifting operation, and an expansion operation in a vertical direction only. With the designated moving position point placed below the designated fixed position point, an operation to perform is interpreted as a next-item operation, a next-page operation, a next-screen operation, a last-line operation, and a contraction operation in a vertical direction only.

When the travel direction is downward, the following interpretations are preformed depending on the positional relationship. With the designated moving position point placed to the right of the designated fixed position point, an operation to perform is interpreted as a clockwise rotation operation. With the designated moving position point placed to the left of the designated fixed position point, an operation to perform is interpreted as a counterclockwise rotation operation. With the designated moving position placed above the designated fixed position point, an operation to perform is interpreted as one of a preceding-item operation, a preceding-page operation, a preceding-screen operation, a first-line operation, and a contraction operation in a vertical direction only. With the designated moving position point placed below the designated fixed position point, an operation to perform is interpreted as one of a downward screen shifting operation and an expansion operation in a vertical direction only.

When the travel direction is rightward, the following interpretations are preformed depending on the positional relationship. With the designated moving position point placed to the right of the designated fixed position point, an operation to perform is interpreted as one of a rightward screen shifting operation and an expansion operation in a lateral direction only. With the designated moving position point placed to the left of the designated fixed position point, an operation to perform is interpreted as a preceding-item operation, a preceding-page operation, a preceding-screen operation, a first-line operation, and a contraction operation in a vertical direction only. With the designated moving position placed above the designated fixed position point, an operation to perform is interpreted as a clockwise rotation operation. With the designated moving position point placed below the designated fixed position point, an operation to perform is interpreted as a counterclockwise rotation operation.

FIGS. 96A-96D show the corresponding data samples that are interpreted as a next-item operation. In a graph 9601, a designated fixed position point A remains stationary at A(3, 3), a designated moving position point B is placed at $Bt_1$(6, 2.8) at travel start time $t_1$ and at $Bt_5$(4,2) at travel end time $t_5$. Tables 9602 list position data of the designated fixed position point A and the designated moving position point B from time $t_1$ to time $t_5$. A table 9603 lists the positional relationship between the designated fixed position and the designated moving position. As listed, at the travel end time $t_5$, the designated fixed position point A has a distance of travel of zero, and the designated moving position point B has a distance of travel of 2.236. The positional relationship between the designated fixed position A and the designated moving position B is changed from 176.19° at the travel start time $t_1$ to 135.00° at the travel end time $t_5$. The direction of travel of the designated moving position point B is −153.43°.

Twelfth Embodiment

A twelfth embodiment of the present invention is now discussed. The twelfth embodiment accounts for a change in the positional relationship between two designated fixed positions and a single designated moving position when an operation to perform is interpreted from a combination of travel paths of at least two designated positions.

Figure 97:
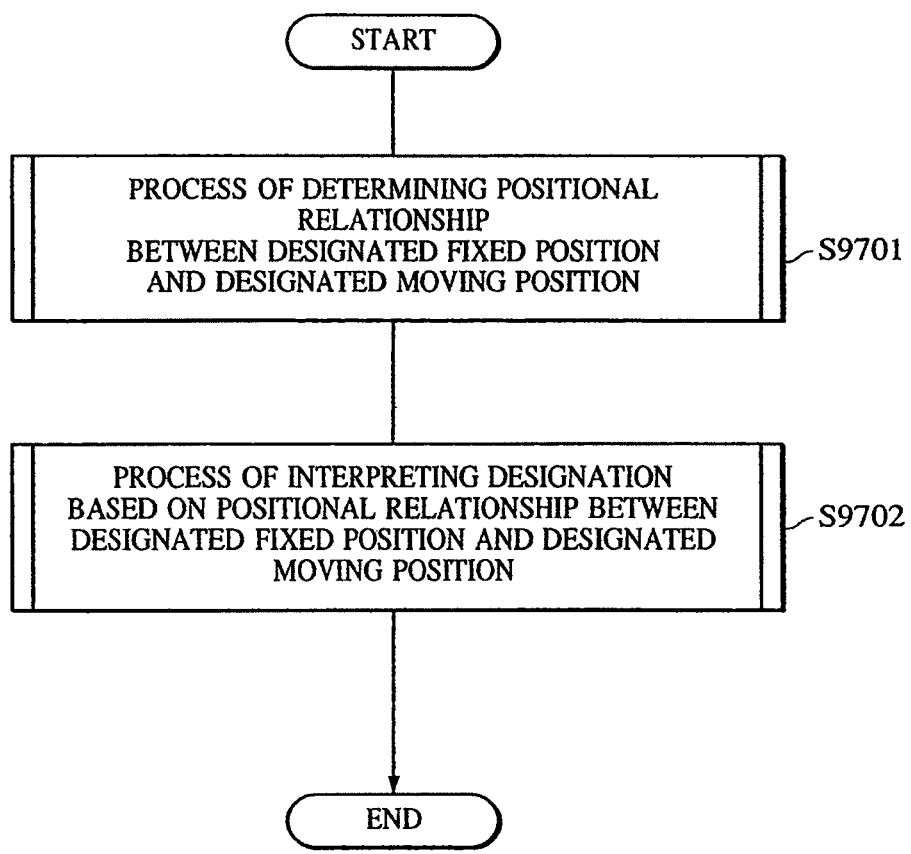
FIG. 97 is a flow diagram showing an algorithm for determining a positional relationship between designated fixed positions and a designated moving position.

FIG. 97 is a flow diagram showing an algorithm for determining a positional relationship between designated fixed positions and a designated moving position. As shown, in step S9701, a process is performed to determine the positional relationship between the two designated fixed positions and the designated moving position. In step S9702, a designation interpretation process is performed to interpret the input based on the acquired positional relationship.

Figure 98:
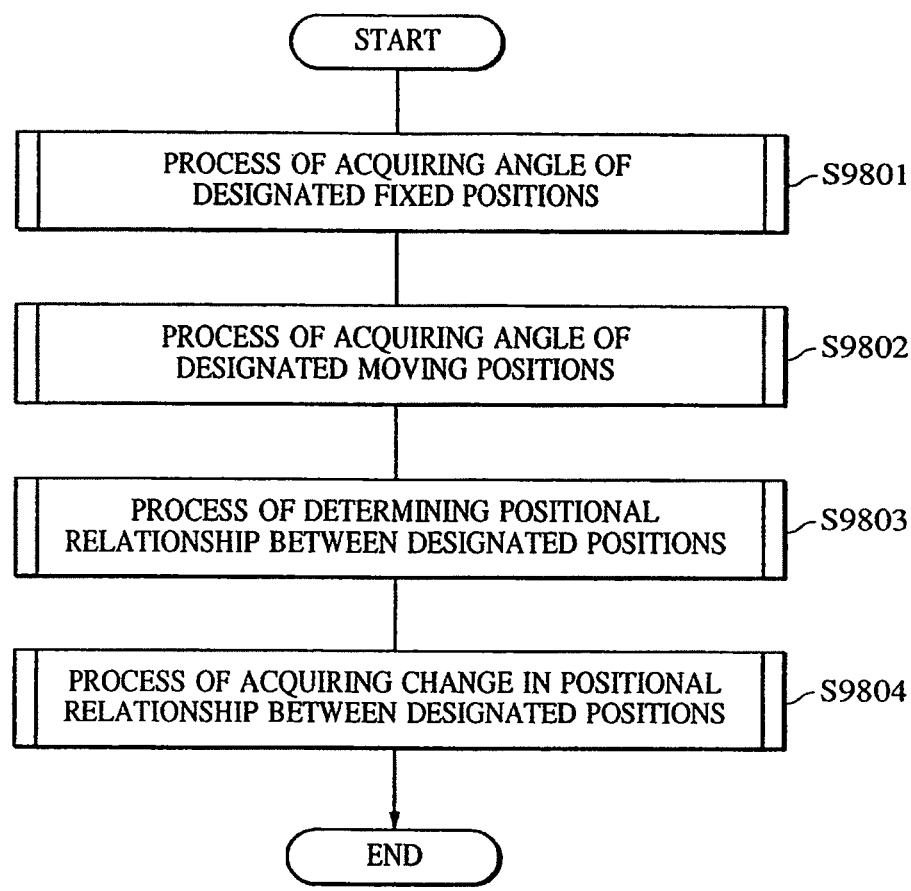
FIG. 98 is a flow diagram showing an algorithm for determining a positional relationship between designated positions.

FIG. 98 is a flow diagram showing an algorithm for determining the positional relationship between designated positions. In step S9801, the angle of a line connecting the two designated fixed positions (fixed-to-fixed-position angle) is acquired. In step S9802, a process is performed to acquire the angle of a line connecting one of the two designated fixed positions to the designated moving position (fixed-to-moving-position angle). In step S9803, a process is performed to acquire the relationship between the angle of the line connecting the two designated fixed position and the angle of the line connecting the one of the two designated fixed position and the designated moving position. In step S9804, a process is performed to acquire a change in the relationship between the two angles.

Figure 99:
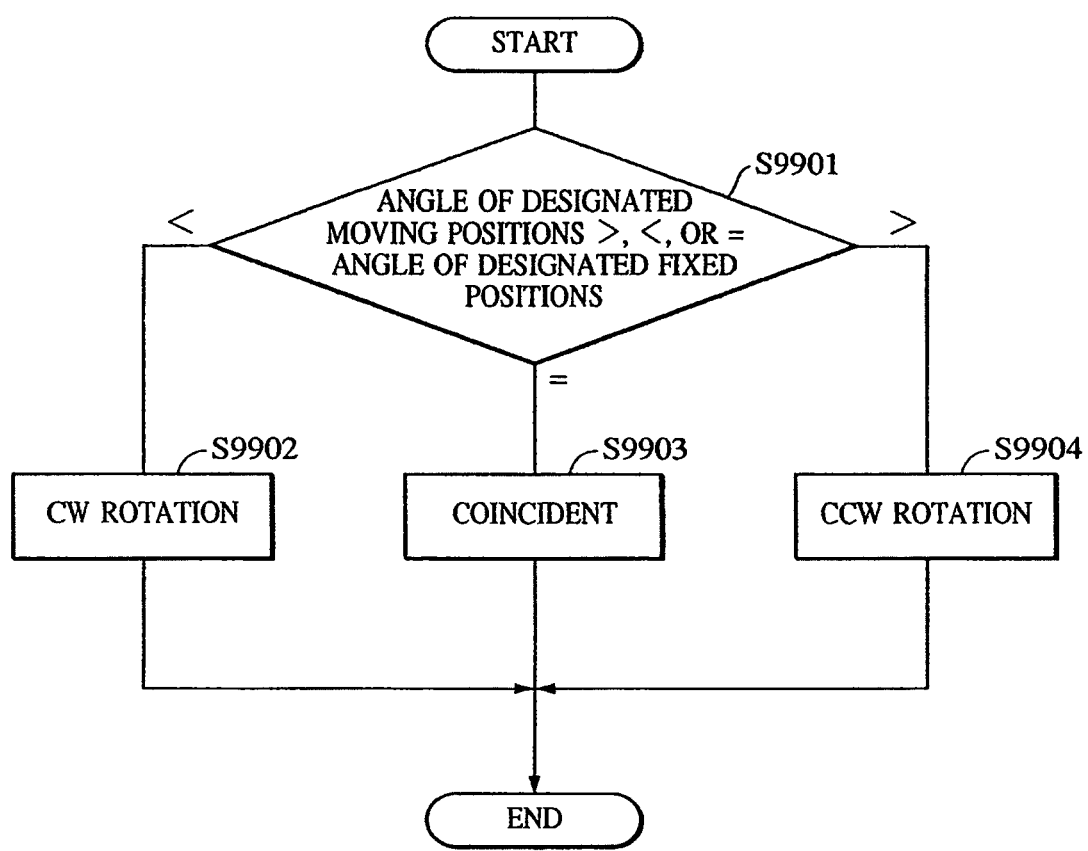
FIG. 99 is a flow diagram showing an algorithm for determining the positional relationship between the designated positions.

FIG. 99 is a flow diagram showing an algorithm for determining the positional relationship between the designated positions. When the fixed-to-fixed-position angle is smaller than the fixed-to-moving-position angle in step S9901, the algorithm proceeds to step S9902, and the positional relationship is determined to be in a clockwise rotation direction. When the fixed-to-fixed-position angle equals the fixed-to-moving position angle in step S9901, the algorithm proceeds to step S9903, and the positional relationship is determined to be coincident. When the fixed-to-fixed-position angle is greater than the fixed-to-moving position angle in step S9901, the algorithm proceeds to step S9904, and the positional relationship is determined to be in a counterclockwise rotation direction.

Figure 100:
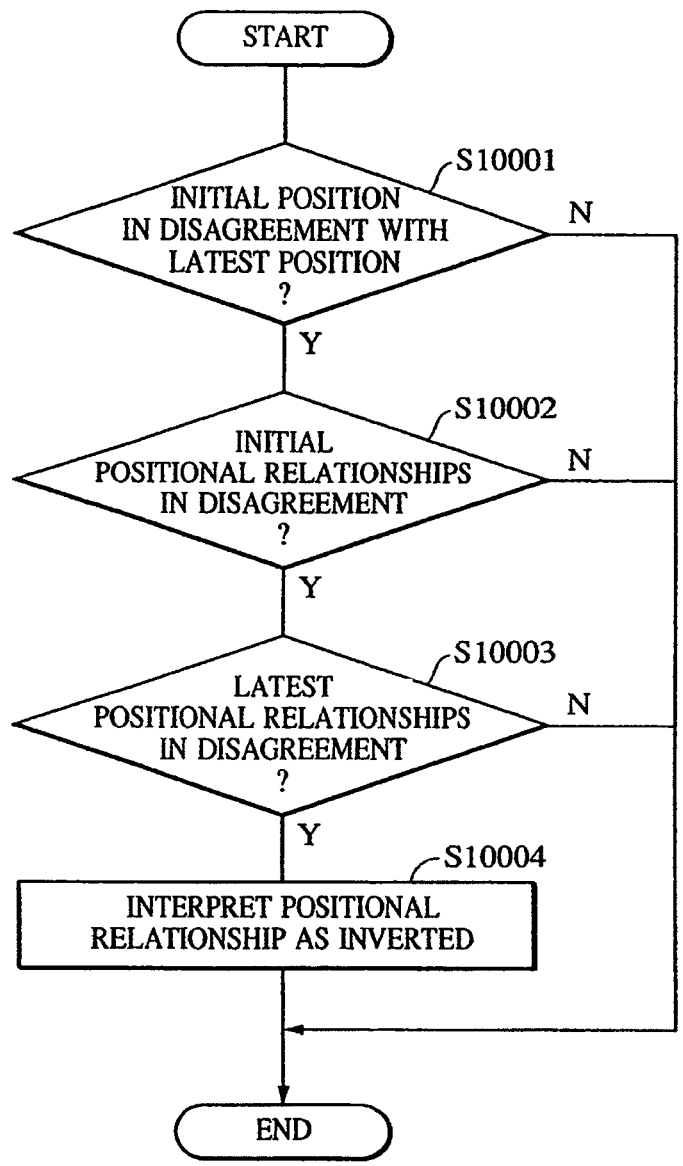
FIG. 100 is a flow diagram showing an algorithm for acquiring a change in the positional relationship between the designated positions.

FIG. 100 is a flow diagram showing an algorithm for acquiring a change in the positional relationship between the designated positions. When the latest position of a designated position fails to coincide with the initial position thereof in step S10001, the algorithm proceeds to step S10002. When the initial positional relationships of the designated positions fail to be coincident in step S10002, the algorithm proceeds to step S10003. When the latest positional relationships of the designated positions fail to be coincident in step S10003, the algorithm proceeds to step S10004. The positional relationship is thus determined to be an inversion.

Figure 101:
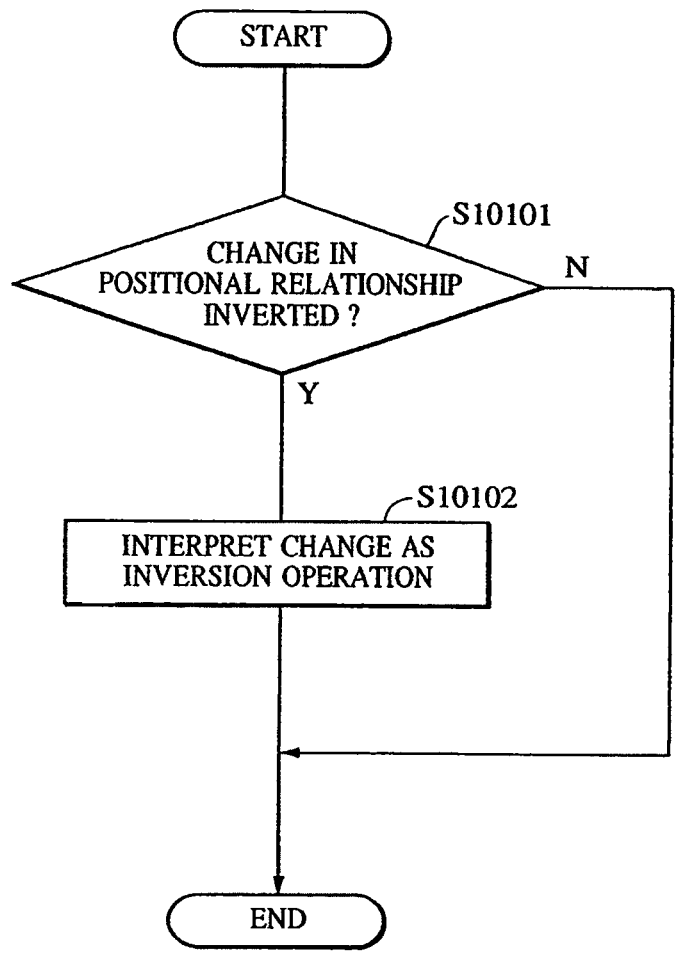
FIG. 101 is a flow diagram showing a designation interpretation process based on the positional relationship between the designated fixed positions and the designated moving position.

FIG. 101 is a flow diagram showing the designation interpretation process based on the positional relationship between the designated fixed positions and the designated moving position. When the determined change in the positional relationship is found to be an inversion in step S10101, the algorithm proceeds to step S10102. The input is thus interpreted as an inversion operation with respect to a line connecting the designated fixed positions.

FIGS. 102A and 102B show an operational example that is interpreted as a symmetrical inversion operation. There are shown two designated fixed position points A and B, and a designated moving position point C. The designated moving position point C moves from $Ct_1$ to $Ct_5$. This input is interpreted as a symmetrical inversion operation.

FIGS. 103A-103E show the corresponding data samples that are interpreted as the symmetrical inversion operation. In a graph 10301, there are shown the designated fixed positions A(3,1) and B(4,6). The fixed-to-fixed-position angle therebetween is 78.69° with respect to the X direction. The designated moving position point C is placed at $Ct_1$(5,3) at travel start time $t_1$, and the fixed-to-moving-position angle $t_1$ to the designated fixed position point A is 45.00°. The point $Ct_1$(5,3) is placed to the right of the line AB connecting the two designated fixed position points A and B. The designated moving position point B is placed at $Ct_5$(3,3) at travel end time $t_5$. The fixed-to-moving-position angle $t_5$ to the designated fixed position point A is 90.00° with respect to the X direction. The point $Ct_5$ is placed to the left of the line AB connecting the two designated fixed positions.

Tables 10302 list position data of the designated fixed position points A and B and the designated moving position point C from time $t_1$ to time $t_5$. A table 10303 lists the positional relationship between the two designated fixed positions and the designated moving position. As listed, the fixed-to-fixed-position angle remains unchanged from 78.69°, and the fixed-to-moving-position angle $t_1$ increases from 45.00° at $t_1$ to 90.00° at $t_5$, thereby becoming greater than the fixed-to-fixed-position angle.

Thirteenth Embodiment

A thirteenth embodiment of the present invention is now discussed. The thirteenth embodiment accounts for a change in the positional relationship between three designated fixed positions and a single designated moving position when an operation to perform is interpreted from a combination of travel paths of at least two designated positions.

Figure 104:
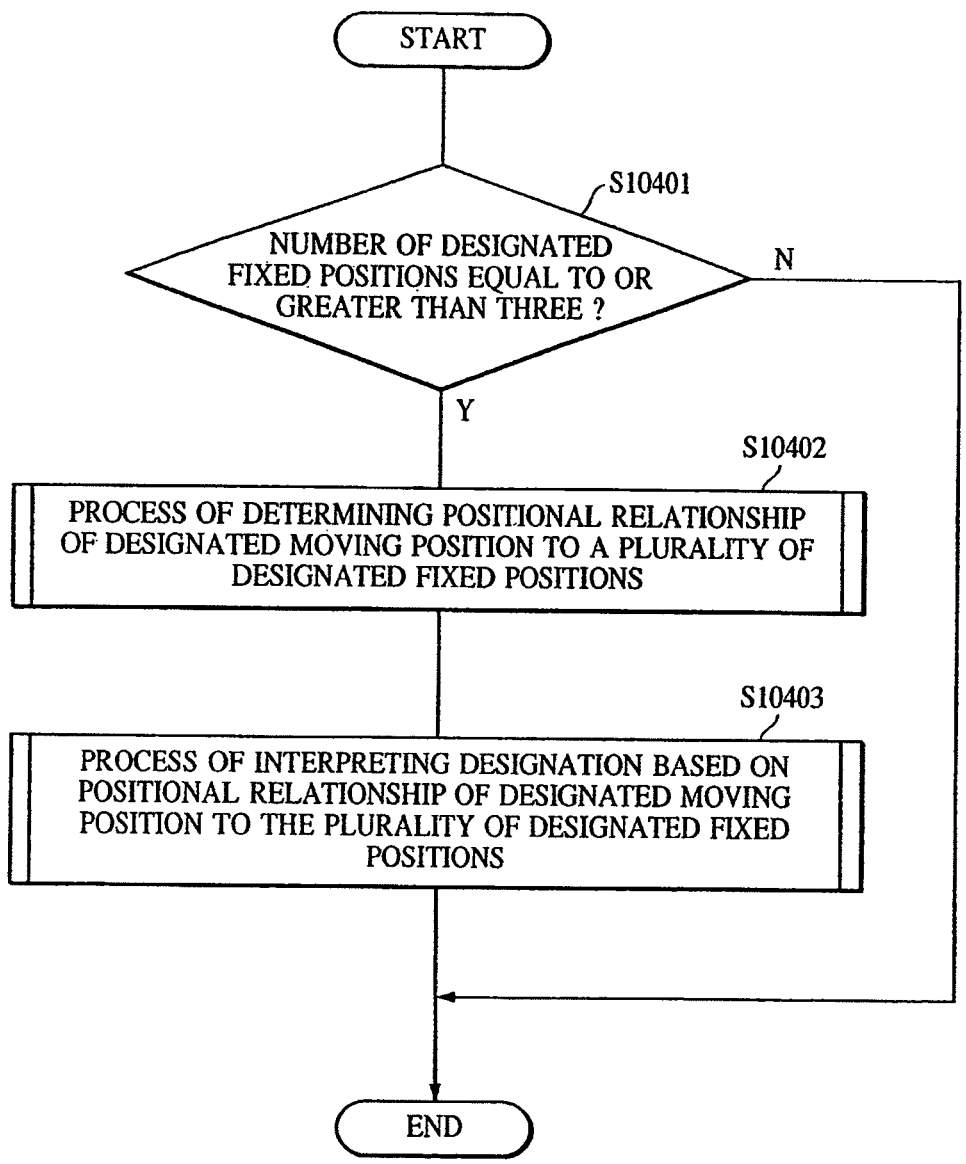
FIG. 104 is a flow diagram showing an algorithm for at least three designated fixed positions.

FIG. 104 is a flow diagram showing an algorithm for at least three designated fixed positions. When there are at least three designated fixed positions in step S10401, the algorithm proceeds to step S10402. A process is performed to determine a positional relationship between at least three designated fixed positions and a designated moving position. In step S10403, a designation interpretation process is performed to interpret the input based on the positional relationship.

Figure 105:
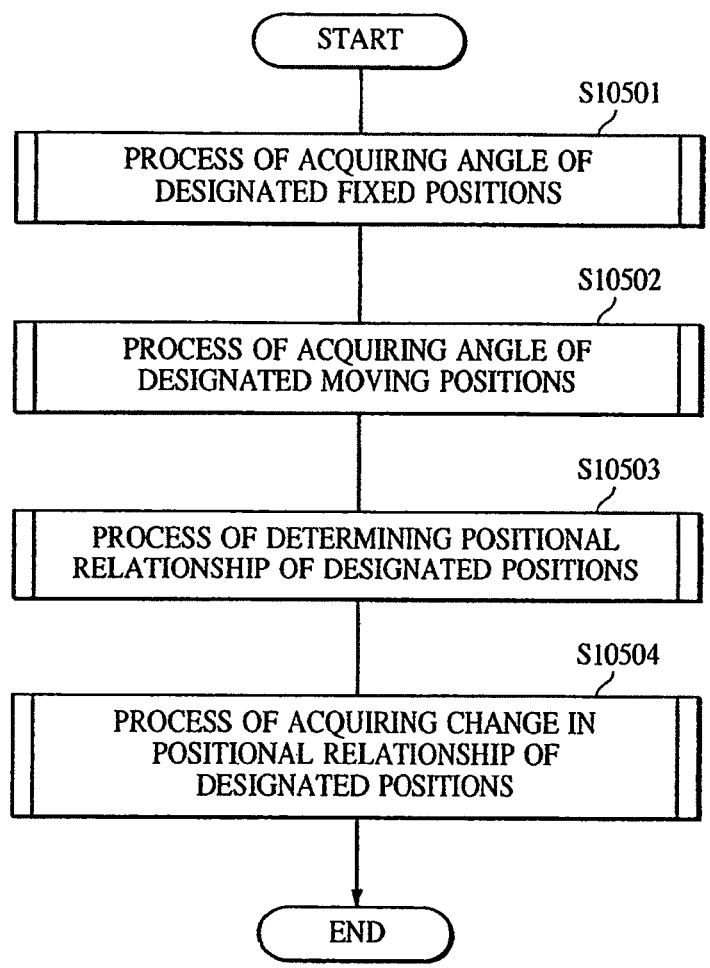
FIG. 105 is a flow diagram of a process for determining a positional relationship of a designated moving position with respect to a plurality of designated fixed positions.

FIG. 105 is a flow diagram of a process for determining the positional relationship of the designated moving position with respect to the plurality of designated fixed positions. In step S10501, a process is performed to acquire fixed-to-fixed-position angles. In step S10502, a process is performed to acquire the angle of a line connecting the designated moving position and one of the plurality of designated fixed positions (fixed-to-moving-position angle). In step S10503, a process is performed to determine a relationship between the fixed-to-fixed-position angle and the fixed-to-moving-position angle. In step S10504, a process is performed to acquire a change in the relationship of the angles.

Figure 106:
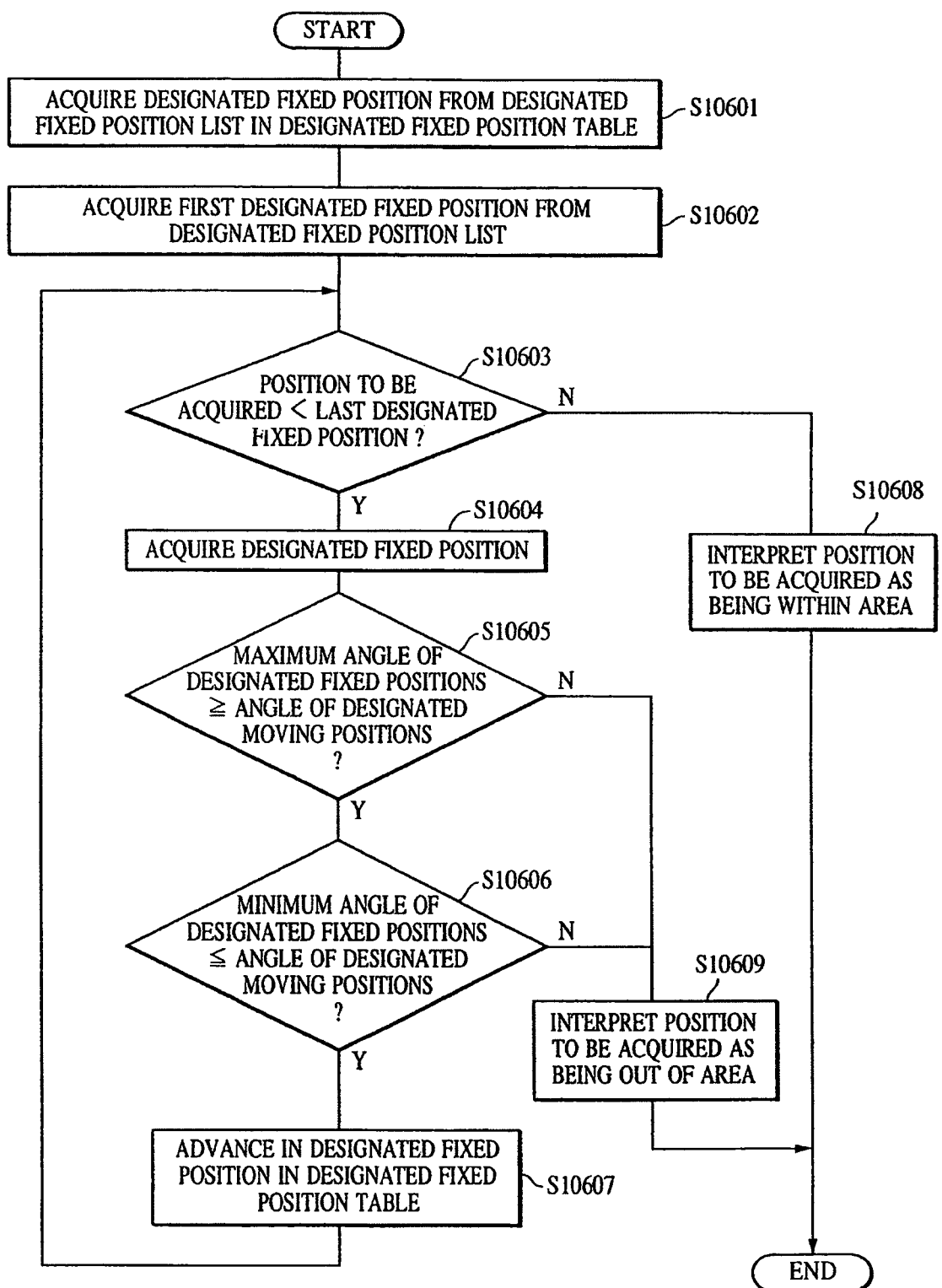
FIG. 106 is a flow diagram of a process for acquiring the positional relationship between the designated positions.

FIG. 106 is a flow diagram of a process for acquiring the positional relationship between at least three designated fixed positions and a single designated moving position. In step S10601, designated fixed positions are retrieved from a list of designated fixed positions from a designated fixed position table. A first designated fixed position is retrieved from the designated fixed position list in step S10602. When the designated fixed position to be retrieved is higher in listing order than the last designated fixed position in the list in step S10603, the algorithm proceeds to step S10604 to retrieve the designated fixed position. In step S10605, the fixed-to-moving-position angle is found to be not more than the maximum fixed-to-fixed-position angle, the algorithm proceeds to step S10606. When the fixed-to-moving-position angle is found to be not less than the minimum fixed-to-fixed-position angle in the step S10606, the algorithm proceeds to step S10607 to advance in the list.

When the designated fixed position reaches the last one in the list in the step S10603, the algorithm proceeds to step S10608. The designated moving position is interpreted as being present within an area defined by the designated fixed positions. When the fixed-to-moving-position angle is found to be more than the maximum fixed-to-fixed-position angle in the step S10605, the algorithm proceeds to step S10609. When the fixed-to-moving-position angle is found to be less than the minimum fixed-to-fixed-position angle in step S10606, the algorithm proceeds to step S10609. The designated moving position is interpreted as being present outside the area of the designated fixed positions.

Figure 107:
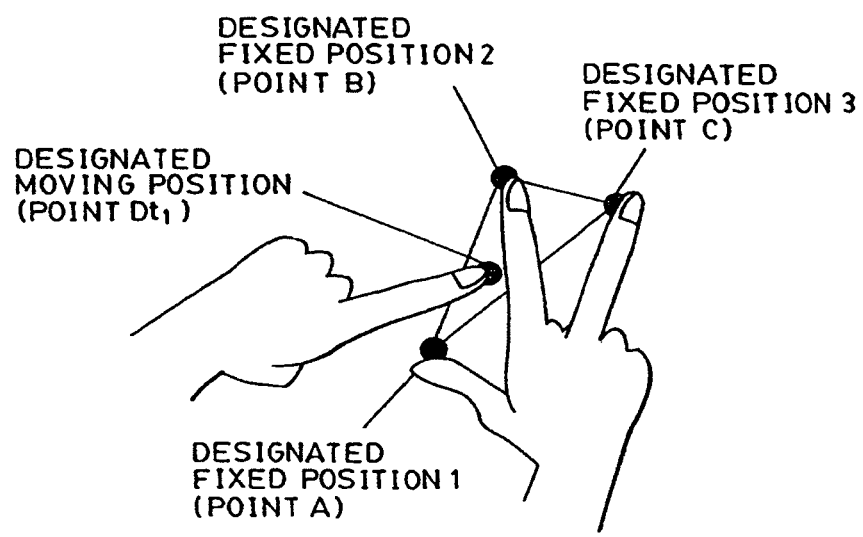
FIG. 107 shows an operational example which is interpreted to mean that the designated moving position is within an area defined by the designated fixed positions.

FIG. 107 shows an operational example that is interpreted to mean that the designated moving position is within an area defined by the designated fixed positions. As shown, the positional relationship of a designated moving position $Dt_1$ is interpreted as being within the area that is enclosed by designated fixed positions A, B, and C.

FIGS. 108A-108F show the corresponding data samples which are interpreted to mean that the designated moving position is within the area defined by the designated fixed positions. In a graph 10801, there are shown the designated fixed position A(3,1), the designated fixed position B(4,6), the designated fixed position C(6,5.5), and the designated moving position $Dt_1$(4,4). The angle DAO of the line connecting the designated fixed position to the point $Dt_1$, being 71.57°, is between the angle BAO at the designated fixed position A being 78.69° and the angle CAO at the designated fixed position A being 56.31°. The angle O'BD of the line connecting the point $Dt_1$ to the designated fixed position B, being −90.00°, is between the angle O'BA at the designated fixed position B being −101.31° and the angle O'BC ad the designated fixed position B being −14.04°.

Tables 10802 list position data of the designated fixed positions A, B, and C, and the designated moving position D. A table 10803 list changes in the positional relationship between the designated fixed positions and the designated moving position. As listed, the angle DAO from the designated fixed position to the designated moving position D (fixed-to-moving-position angle), being 71.57°, is between the (fixed-to-fixed-position) angle BAO being 78.69° and the (fixed-to-fixed-position) angle CAO being 56.31°. The angle O'BD from the designated moving position D to the designated fixed position B (fixed-to-moving-position angle) being −90.00°, is between the (fixed-to-moving) angle O'BA being −101.31° and the (fixed-to-fixed) angle O'BC being −14.04°.

Figure 109:
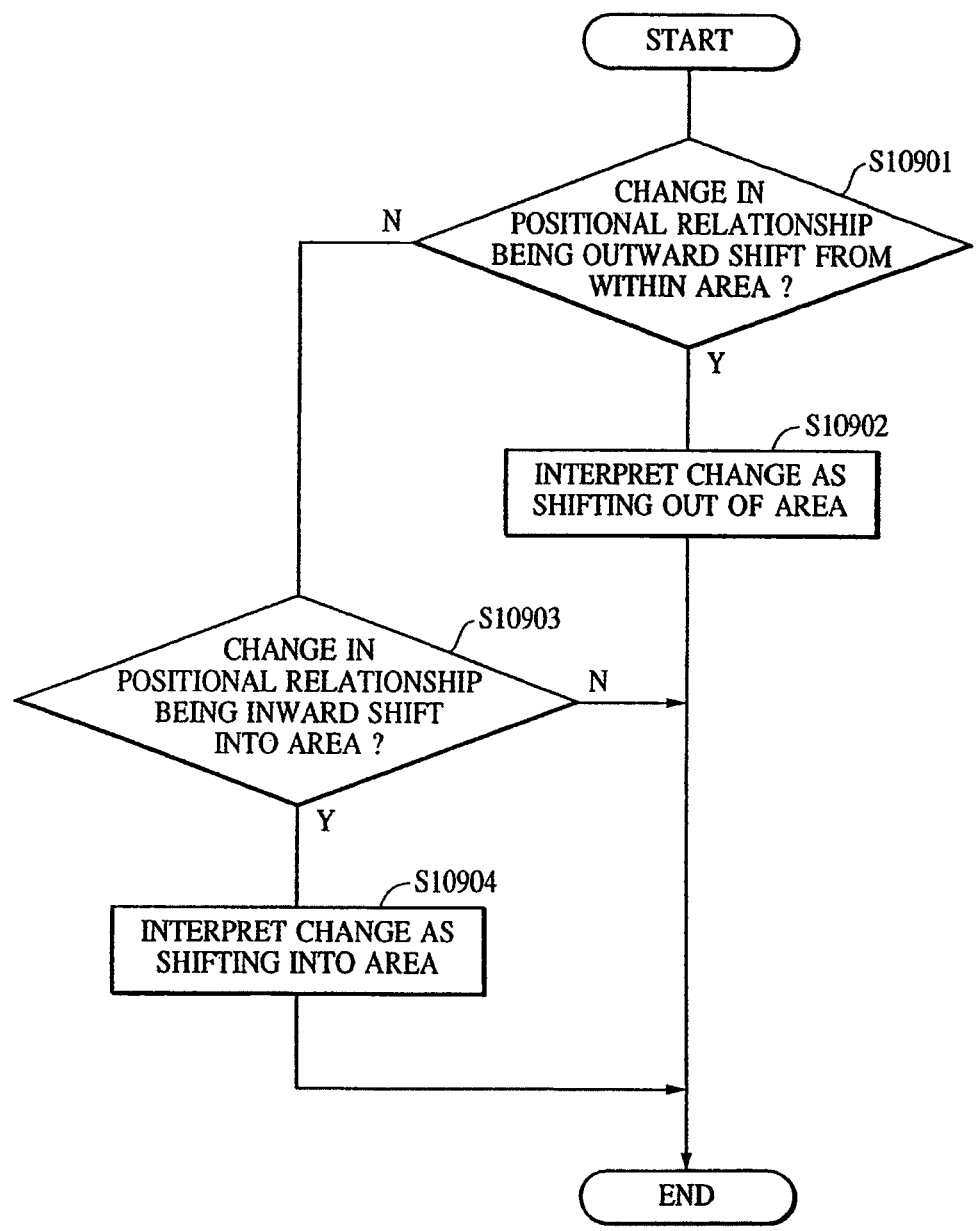
FIG. 109 is a flow diagram showing an algorithm for acquiring the positional relationship between the designated positions.

FIG. 109 is a flow diagram showing an algorithm for acquiring the positional relationship between the designated positions. When the change in the positional relationship is determined to be an outward shifting out from within the area in step S10901, the algorithm proceeds to step S10902. The input is thus interpreted as an outward shifting operation from within the area. When the change in the positional relationship is determined not to be an outward shifting operation out from within the area in step S10901, the algorithm proceeds to step S10903. When the change in the positional relationship is determined to be an inward shift operation into the area in the step S10903, the algorithm proceeds to step S10904. The input is thus interpreted as an inward shifting operation into the area.

Figure 110A:
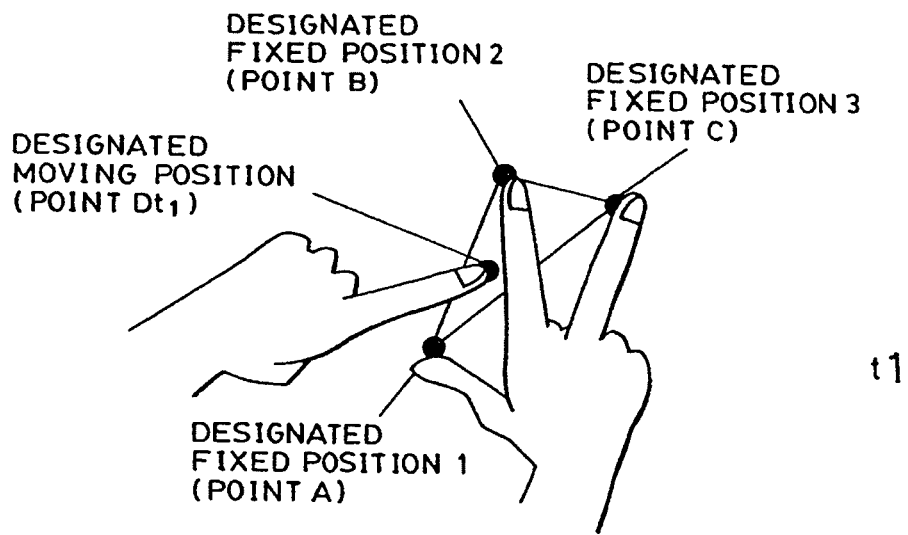
FIGS. 110A and 110B show an operational example which is interpreted as a shifting operation from within an area.
Figure 110B:
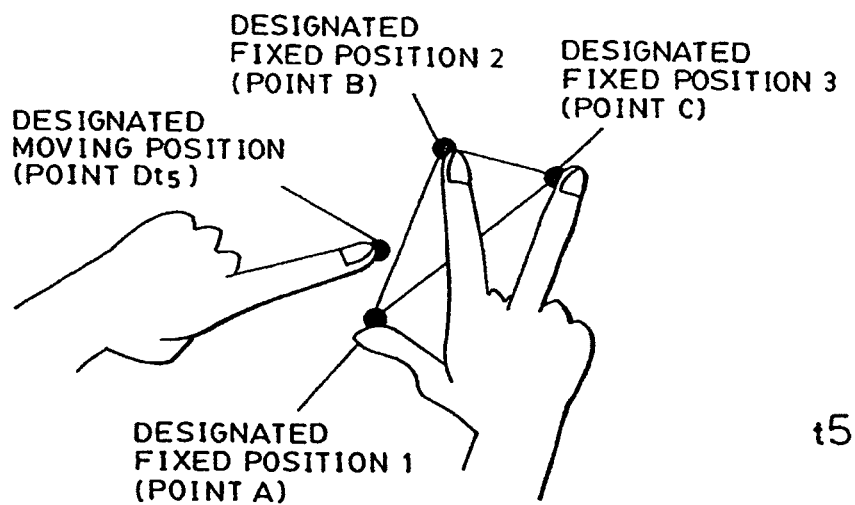

FIGS. 110A and 110B show an operational example which is interpreted as an outward shifting operation from within the area of the designated fixed positions. As shown, the moving position $Dt_1$ outwardly moves to $Dt_5$ out of the area enclosed by the designated fixed positions A, B, and C. In the positional relationship of the designated moving position to the plurality of designated fixed positions, the input is thus interpreted as an outward shifting operation out of the area of the designated fixed positions.

FIGS. 111A-111F show the corresponding data samples which are interpreted to mean the outward shifting operation from within the area in a positional relationship change determination process. In a graph 11101, there are shown a designated fixed position point A(3,1), a designated fixed position point B(4,6), a designated fixed position point C(6,5.5), and a designated moving position point $Dt_1$(4,4) at travel start time $t_1$. The angle DAO of the line connecting the point $Dt_1$ to the designated fixed position point A, being 71.57°, is between the angle BAO at the designated fixed position point A being 78.69° and the angle CAO at the designated position point A being 56.31°. The angle O'BD of the line connecting the point $Dt_1$ to the designated fixed position point B being −90.00° is between the angle O'BA at the designated fixed position B being −101.31° and the angle O'BC ad the designated fixed position B being −14.04°. At the travel end time $t_5$, the designated moving position point moves to $Dt_5(3,4)$. The angle DAO of the line connecting the point $Dt_5$ to the designated fixed position point A, being 90.00°, falls outside the range between the angle BAO at the designated fixed position point A being 78.69° and the angle CAO at the designated position point A being 56.31°. The angle O'BD of the line connecting the point $Dt_5$ to the designated fixed position point B being −116.57 falls outside the range between the angle O'BA at the designated fixed position B being −101.31° and the angle O'BC ad the designated fixed position B being −14.04°.

Tables 11102 list position data of the designated fixed position points A, B, and C, and the designated moving position point D from time $t_1$ to time $t_5$. A table 11103 lists the change in the positional relationship between the designated fixed positions and the designated moving position. As listed, both the angle DAO of the line connecting the point D to the designated fixed position point A, and the angle O'BD of the line connecting the point D to the designated fixed position point B fall within the respective ranges determined by the area of the designated fixed positions from time $t_1$ to time $t_3$, and depart from the respective ranges at time $t_4$.

Figure 112:
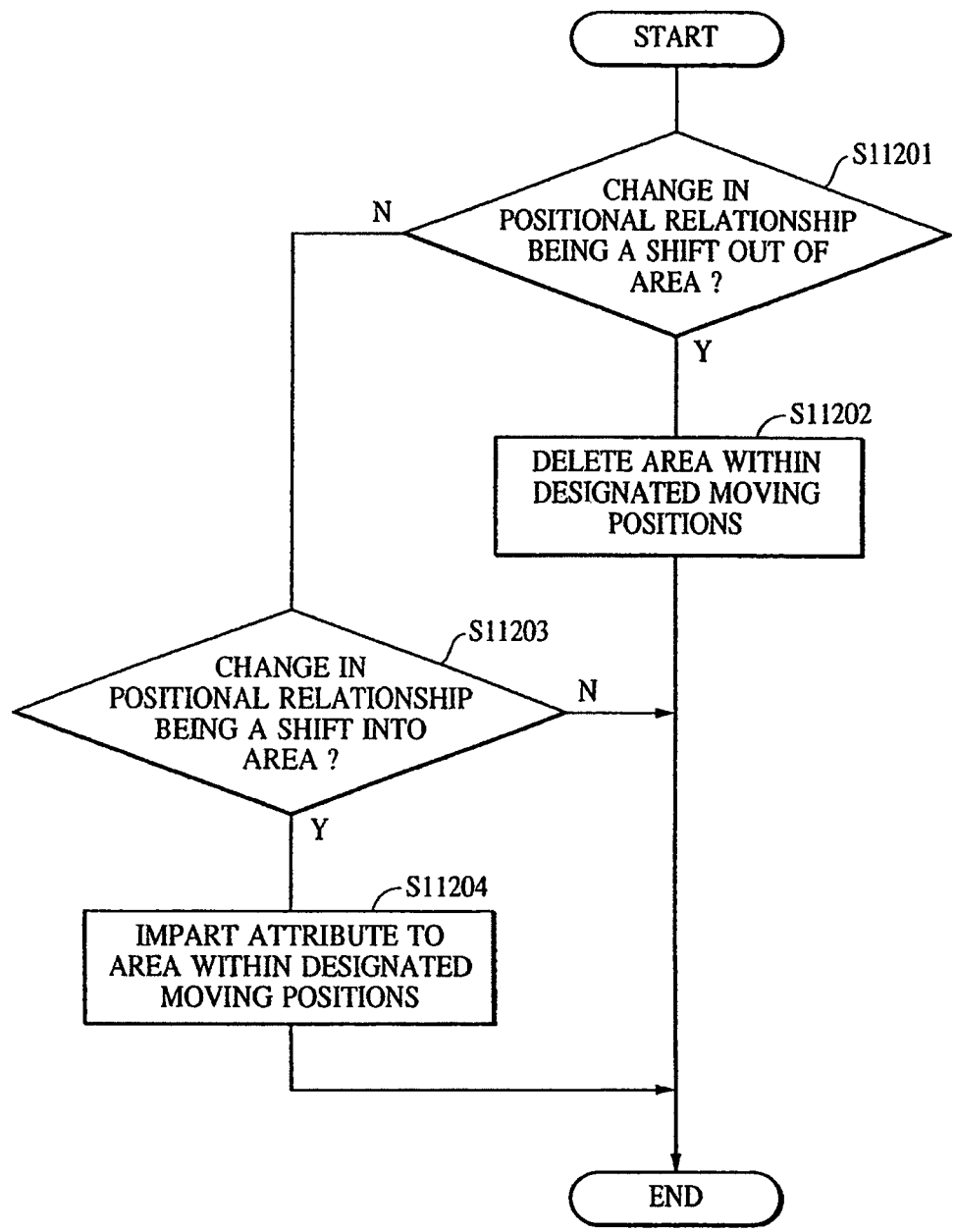
FIG. 112 is a flow diagram showing a designation interpretation process based on the positional relationship of a designated moving position to a plurality of designated fixed positions.

FIG. 112 is a flow diagram showing a designation interpretation process based on the positional relationship of a designated moving position to a plurality of designated fixed positions. When the positional relationship is determined to be an outward shifting operation from within the area in step S11201, the algorithm proceeds to step S11202. The input is then interpreted as a deleting operation for deleting the area of the designated fixed positions. When the positional relationship is determined not to be an outward shifting operation from within the area in step S11201, the algorithm proceeds to step S11203. When the positional relationship is determined to be an inward shifting operation into the area in step S11203, the algorithm proceeds to step S11204. The input is interpreted as an operation for imparting an attribute to the area of the designated fixed positions. The attribute imparting operation may include the coloring of the area of the designated fixed positions.

Figure 113A:
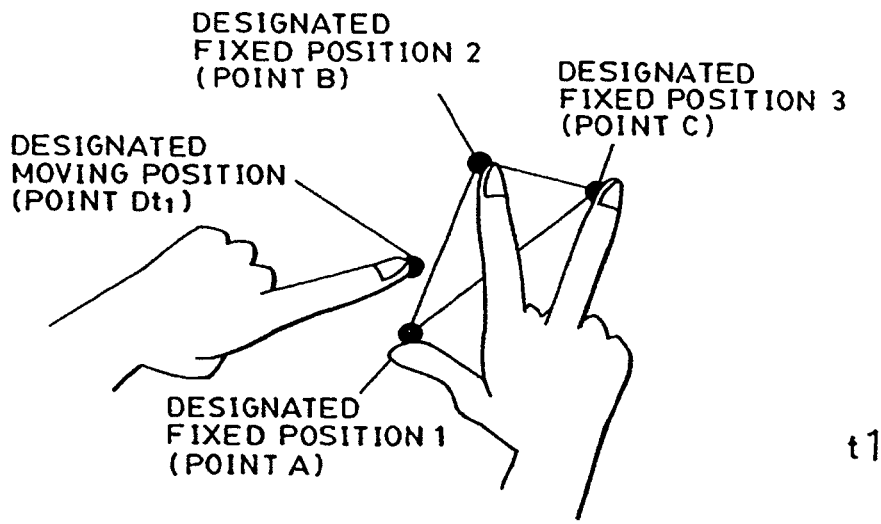
FIGS. 113A and 113B show an operational example that is interpreted to mean that an attribute is imparted to the area defined by the designated fixed positions.
Figure 113B:
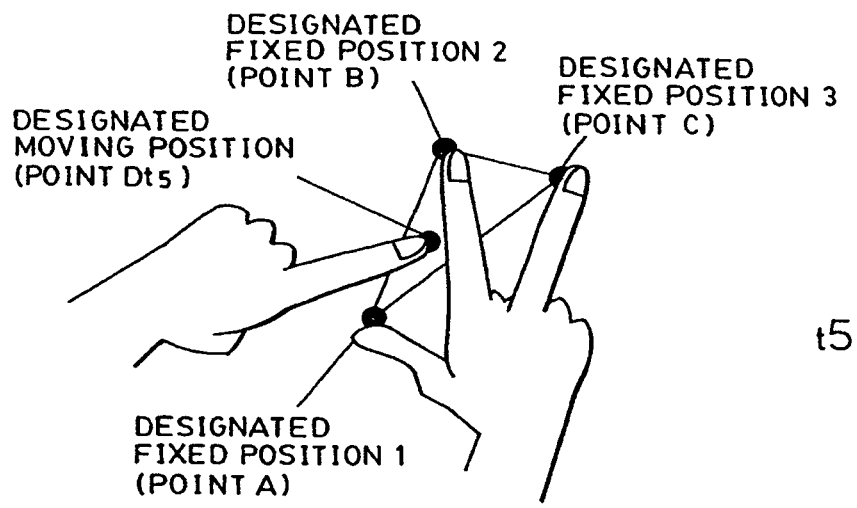

FIGS. 113A and 113B show an operational example that is interpreted to mean that an attribute is imparted to the area defined by the designated fixed positions. When a designated moving position point D is shifted from $Dt_1$ to $Dt_5$ into the area enclosed by designated fixed positions A, B, and C, an operation to perform is interpreted as a coloring operation for coloring the area of the designated fixed positions.

FIGS. 114A-114F show the corresponding data samples that are interpreted as a coloring operation, from among attribute imparting operations, to the area defined by the designated fixed positions, in a designated fixed-position based designation interpretation process. In a graph 11401, there are shown a designated fixed position point A(3,1), a designated fixed position point B(4,6), a designated fixed position point C(6,5.5), and a designated moving position point $Dt_1(3,4)$ at travel start time $t_1$. The angle DAO of the line connecting the point $Dt_1$ to the designated fixed position point A, being 90.00°, falls outside the range between the angle BAO at the designated fixed position point A being 78.69° and the angle CAO at the designated position point A being 56.31°. The angle O'BD of the line connecting the point $Dt_1$ to the designated fixed position point B being −116.57 falls outside the range between the angle O'BA at the designated fixed position B being −101.31° and the angle O'BC ad the designated fixed position B being −14.04°. At the travel end time $t_5$, the angle DAO of the line connecting the point $Dt_5$ to the designated fixed position point A, being 71.57°, is between the angle BAO at the designated fixed position point A being 78.69° and the angle CAO at the designated position point A being 59.04°. The angle O'BD of the line connecting the point $Dt_5$ to the designated fixed position point B being −90.00° is between the angle O'BA at the designated fixed position B being −101.31° and the angle O'BC ad the designated fixed position B being −14.04°.

Tables 11432 list position data of the designated fixed position points A, B, and C, and the designated moving position point D from time $t_1$ to time $t_5$. A table 11433 lists the change in the positional relationship between the designated fixed positions and the designated moving position. As listed, both the angle DAO of the line connecting the point D to the designated fixed position point A, and the angle O'BD of the line connecting the point D to the designated fixed position point B remains outside the respective ranges determined by the area of the designated fixed positions from time $t_1$ to time $t_3$, and enter the respective ranges at time $t_4$.

Fourteenth Embodiment

A fourteenth embodiment of the present invention is now discussed. The fourteenth embodiment accounts for a change in a number of a plurality of designated positions when an operation to perform is interpreted from a combination of travel paths of at least two designated positions.

Figure 115:
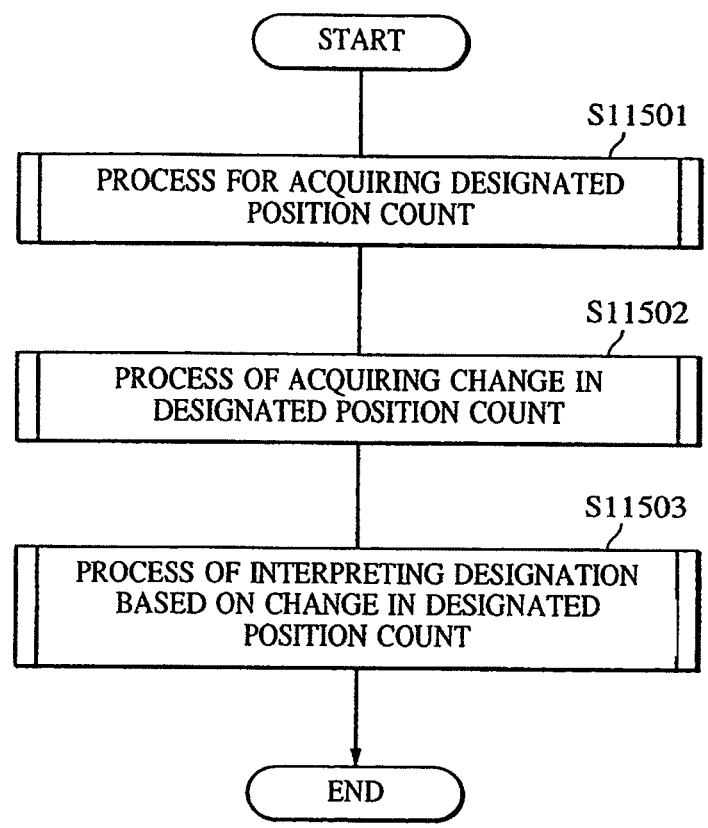
FIG. 115 is a flow diagram showing a designation interpretation process based on a change in the count of a plurality of designated positions.

FIG. 115 is a flow diagram showing a designation interpretation process based on a change in the count of a plurality of designated positions. In step S11501, a process is performed to acquire a designated position count. In step S11502, a process is performed to acquire a change in the designated position count. In step S11503, a designation interpretation process is performed to interpret the input based on the acquired designated position count.

Figure 116:
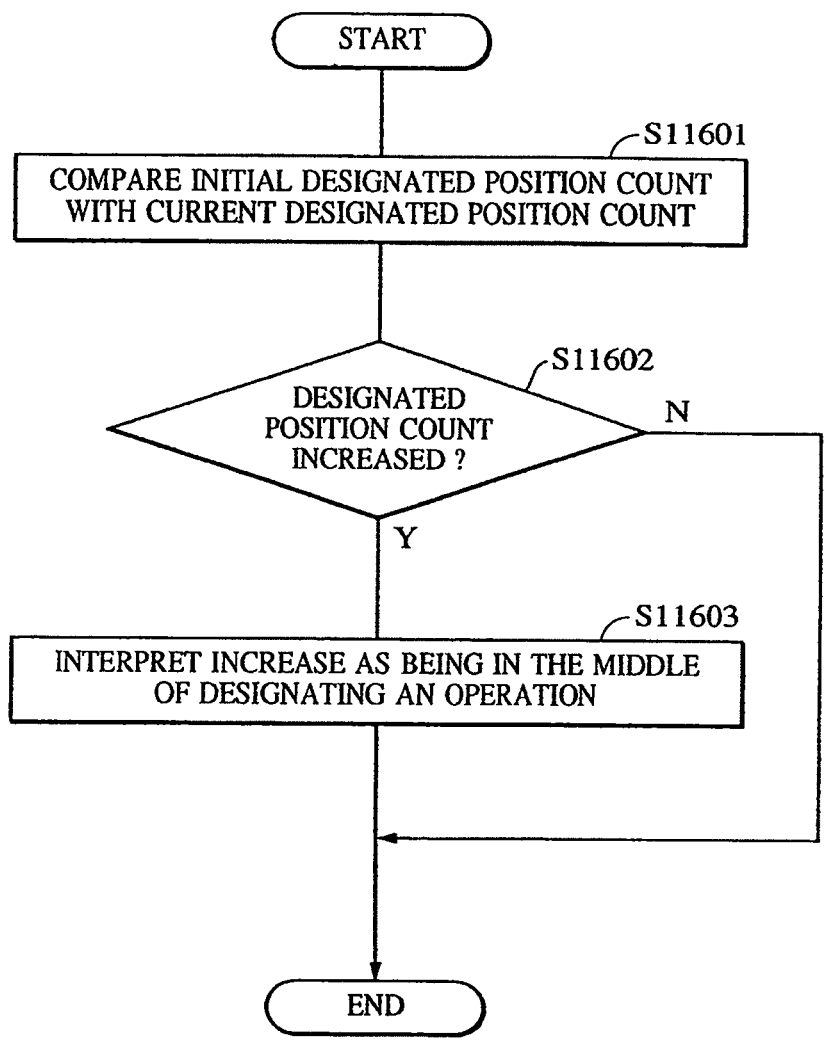
FIG. 116 is a flow diagram showing a designation interpretation process based on a change in the initial count of designated positions.

FIG. 116 is a flow diagram showing the designation interpretation process based on the change in the initial count of designated positions. In step S11601, a current designated position count is compared with an initial designated position count. When it is determined in step S11602 that the current designated position count is greater than the initial designated position count, the algorithm proceeds to step S11603. The input is interpreted as being in the middle of designating an object.

FIGS. 117A and 117B show an operational example that is interpreted to mean that the designation of an object to be processed is on its way through the designation interpretation process using the change in the designated position count. There are shown two designated position points $At_1$ and $Bt_1$ at time $t_1$ in FIG. 117A. There are shown three designated position points of $At_2$, $Bt_2$, and $Ct_2$ at time $t_2$ in FIG. 117B. The designated position count increases from two at time $t_1$ to three at time $t_2$.

FIGS. 118A-118F show the corresponding data samples that are interpreted to mean that the designation of the object to be processed is on its way. In graphs 11801, FIG. 118A shows the two designated positions of $At_1$ and $Bt_1$ occurring at time $t_1$ and FIG. 118B shows the three designated positions of $At_2$, $Bt_2$, and $Ct_2$ occurring at time $t_2$. Tables 11802 list position data of the designated position point A, the designated position point B, and the designated position point C from time $t_1$ to time $t_3$. A table 11803 lists the change in the designated position count. As listed, the designated position count is two at time $t_1$, resulting in a count change of zero. At time $t_2$, the designated position count is three, resulting a count change of one.

Figure 119:
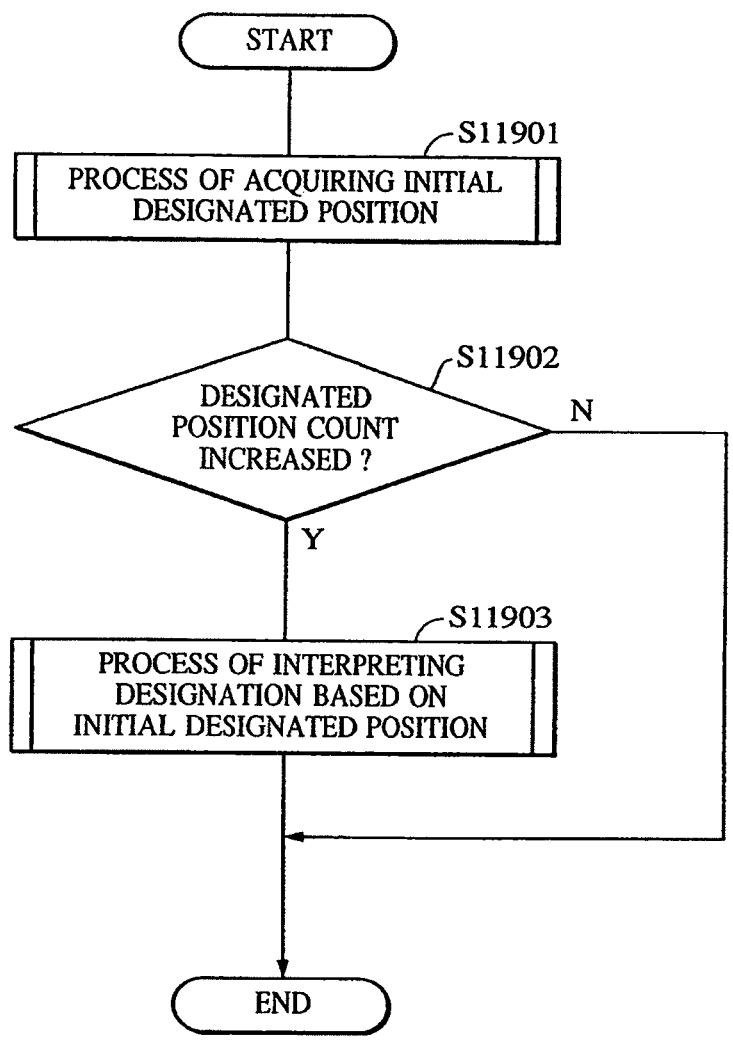
FIG. 119 is a flow diagram showing a designation interpretation process based on the change in the designated position count.

FIG. 119 is a flow diagram showing the designation interpretation process based on the change in the designated position count. In step S11901, a process is performed to acquire initial designated positions. When it is determined in step S11902 that the count of the acquired positions indicates any increase from the initial count of designated positions, the algorithm proceeds to step S11903. A designation interpretation process is performed to interpret the input based on the initial designated positions.

Figure 120:
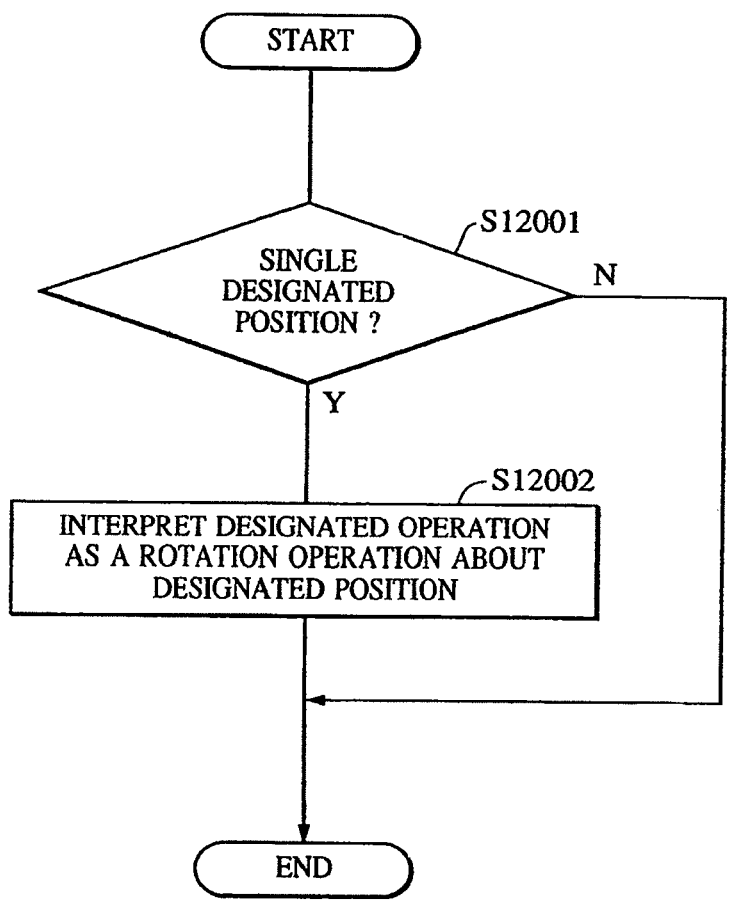

FIG. 120 is a flow diagram showing the designation interpretation process based the an initial designated position. When the designated position count is one, the algorithm proceeds to step S12002. An operation to perform is thus interpreted as a rotation operation about the acquired designated position.

Figure 121A:
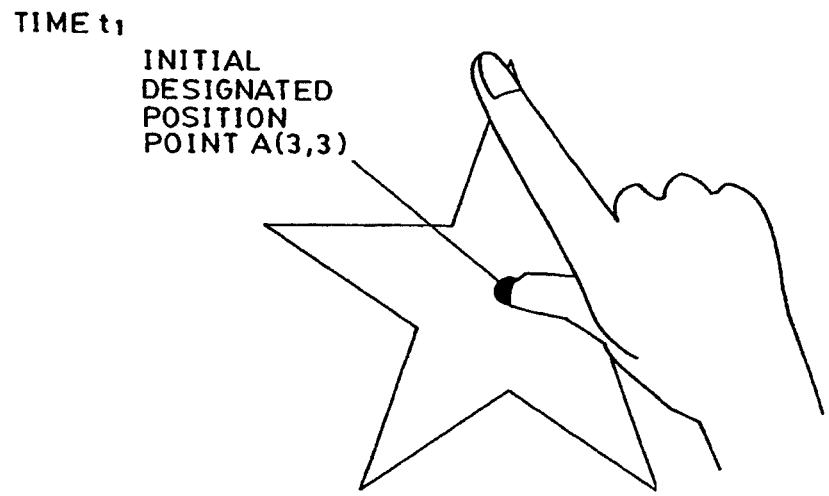
Figure 121B:
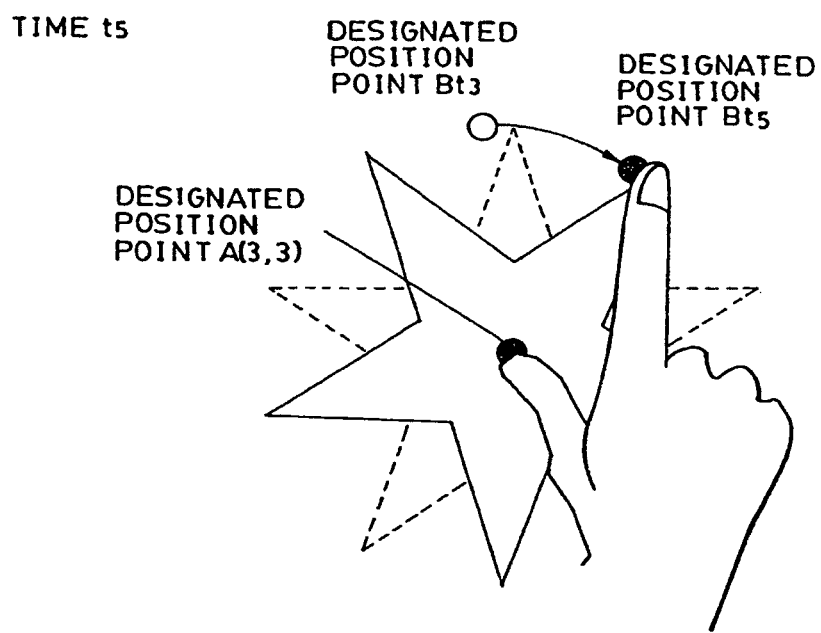
Figures 122A, 122B, 122C, 122D:
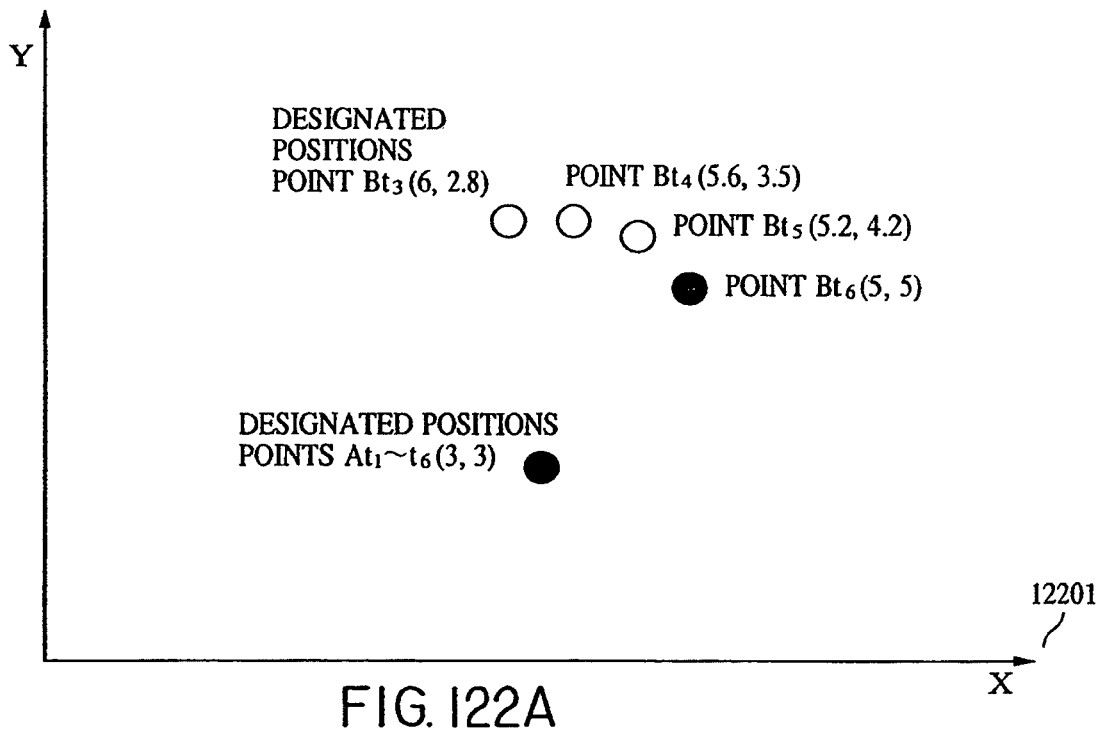

FIGS. 121A and 121B show an operational example that is interpreted as the rotation operation about the designated position. An initial designated position point A is present at time $t_1$. At time $t_5$, there are shown the designated position point A and a designated position point $Bt_5$, which has shifted from point $Bt_5$. This input is interpreted as a rotation operation about the designated position point A.

FIGS. 122A-122D show the corresponding data samples which is interpreted as the rotation operation about the designated position. In a graph 12201, the designated position point A continuously stays at the same coordinates (3,3) from time $t_1$ to time $t_6$. The designated position point B takes coordinates $Bt_3(6,2.8)$ at time $t_3$, coordinates $Bt_4(5.6,3.5)$ at time $t_4$, coordinates $Bt_5(5.2,4.2)$ at time $t_5$, and coordinates $Bt_6(5,5)$ at time $t_6$. Tables 12202 list position data of the designated position points A and B from time $t_1$ to time $t_6$. A table 12203 lists the change in the designated position count. As listed, the designated position count remains one from time $t_1$ to time $t_2$, resulting in a count change of zero. The designated position count increases to two at time t, resulting in a count change of one. The count continuously remains unchanged to time $t_6$.

Fifteenth Embodiment

A fifteenth embodiment of the present invention is now discussed. The fifteenth embodiment accounts for a change in a number of a plurality of final designated positions when an operation to perform is interpreted from a combination of travel paths of at least two designated positions.

Figure 123:
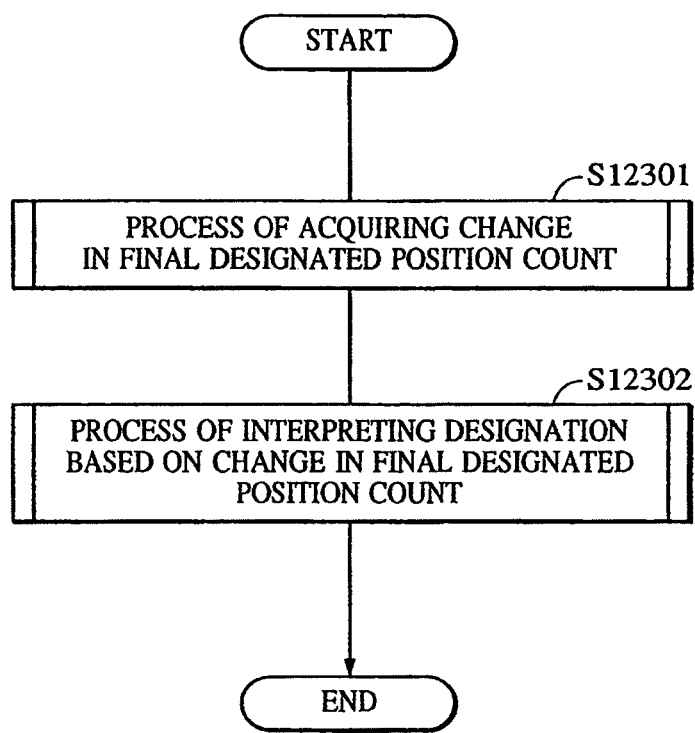

FIG. 123 is a flow diagram showing an algorithm that uses a change in the last count of designated positions. In step S12301, a process is performed to acquire a change in the final designated position count. In step 12302, a designation interpretation process is performed based on the change in the last designated position count.

Figure 124:
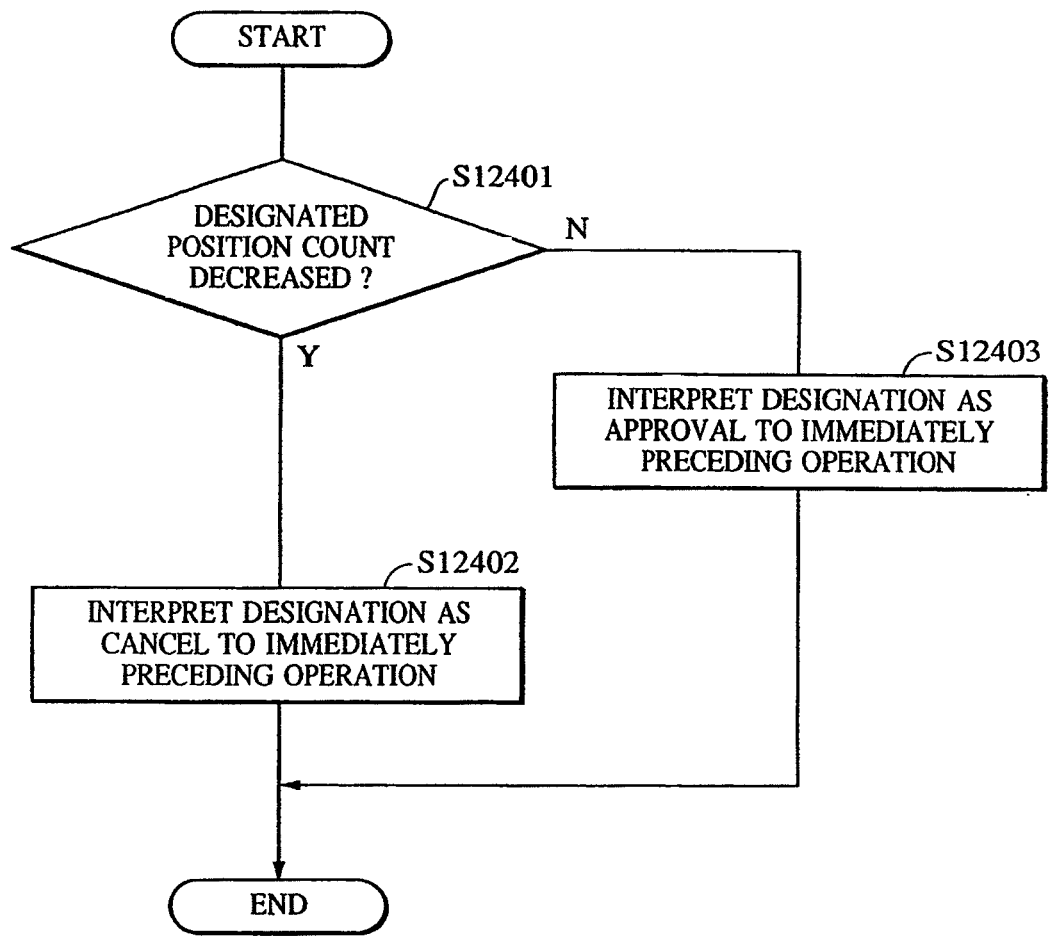

FIG. 124 is a flow diagram showing the designation interpretation process based on the change in the last count of the designated positions. When the designated position count indicates a decrease in step S12401, the algorithm proceeds to step S12402. The input is interpreted as a canceling operation to cancel the immediately preceding operation. When the designated position count indicates no decrease in step S12401, the algorithm proceeds to step S12403. The input is interpreted as a confirmation operation to confirm the immediately preceding operation.

FIGS. 125A and 125B show an operational example that is interpreted as a canceling operation to cancel an immediately preceding operation in the designation interpretation process. As shown, there are three initial points $At_1$, $Bt_1$, and $Ct_1$ at time $t_1$. At time $t_2$, there are two designated position points $At_2$ and $Bt_2$. The designated position count is decreased by one from time $t_1$.

FIGS. 126A-126F show the corresponding data samples that are interpreted as the canceling operation to cancel the immediately preceding operation. In a graph 12601, there are the three initial designated position points $At_1$, $Bt_1$, and $Ct_1$ at time $t_1$. At time $t_2$, there are the two designated position points $At_2$ and $Bt_2$. Tables 12602 list position data of the designated position points A, B, and C from time $t_1$ to time $t_2$. A table 12603 lists the change in the designated position count. As listed, the designated position count is three at time $t_1$, thereby resulting in a count change of zero. The designated position count is two at time $t_2$, thereby resulting in a count change of $-1$.

Sixteenth Embodiment

A sixteenth embodiment of the present invention is now discussed. The sixteenth embodiment accounts for a designated position count as designated information other than the designated path when an operation to perform is interpreted from a combination of travel paths of at least two designated positions.

Figure 127:
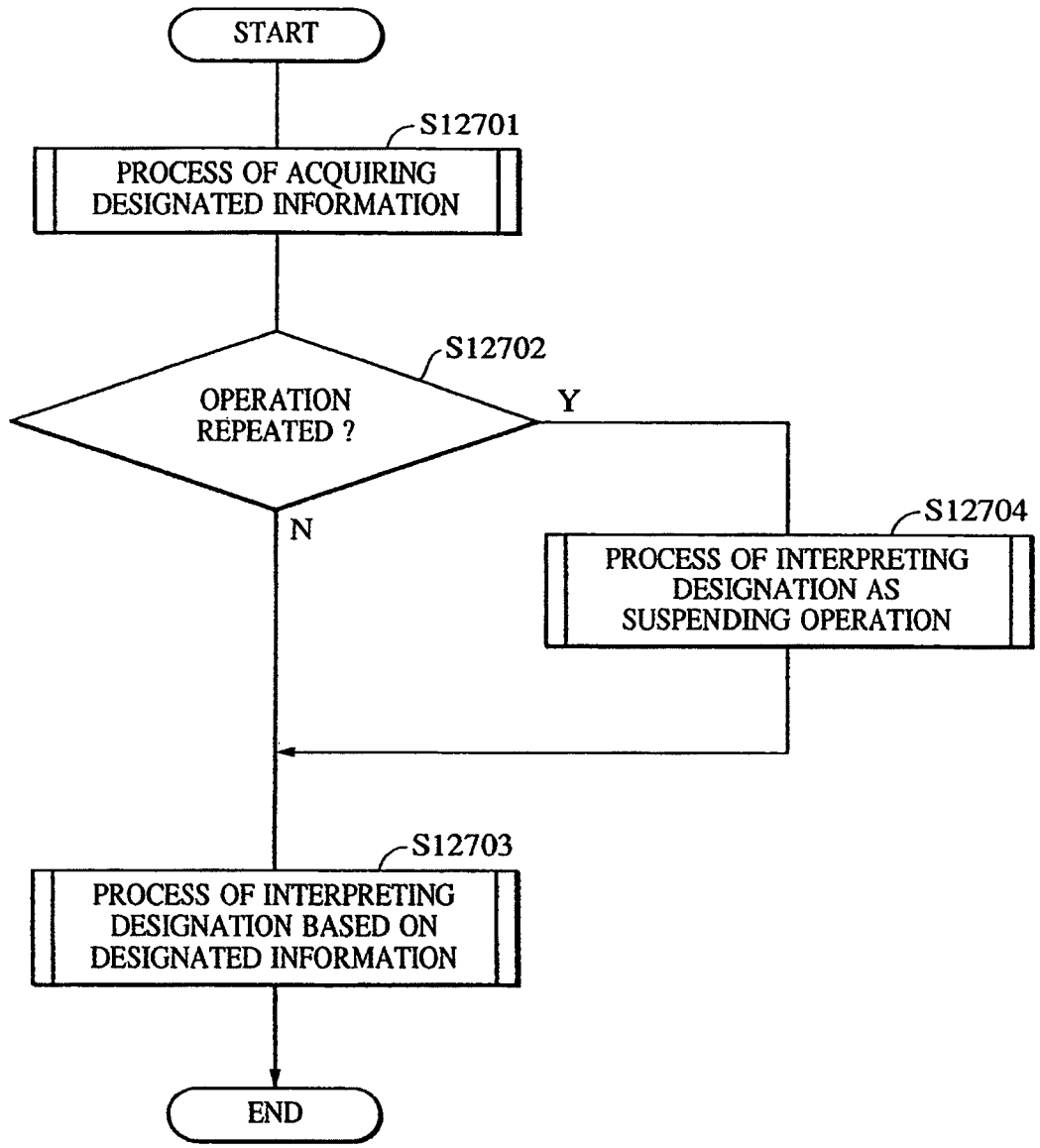

FIG. 127 is a flow diagram showing an algorithm that uses designated information other than a designated path. In step S12701, a process is performed to acquire designated information other than the designated path. The algorithm proceeds to step S12702. When it is determined in step S12702 that an operation is not repeated, the algorithm proceeds to step S12703. A designation interpretation process is performed to interpret the input based on the acquired designated information. When it is determined in the step S12702 that the operation is repeated, the algorithm proceeds to step S12704. The input is interpreted as a suspending operation to suspend the operation, and the process then proceeds to step S12703.

Figure 128:
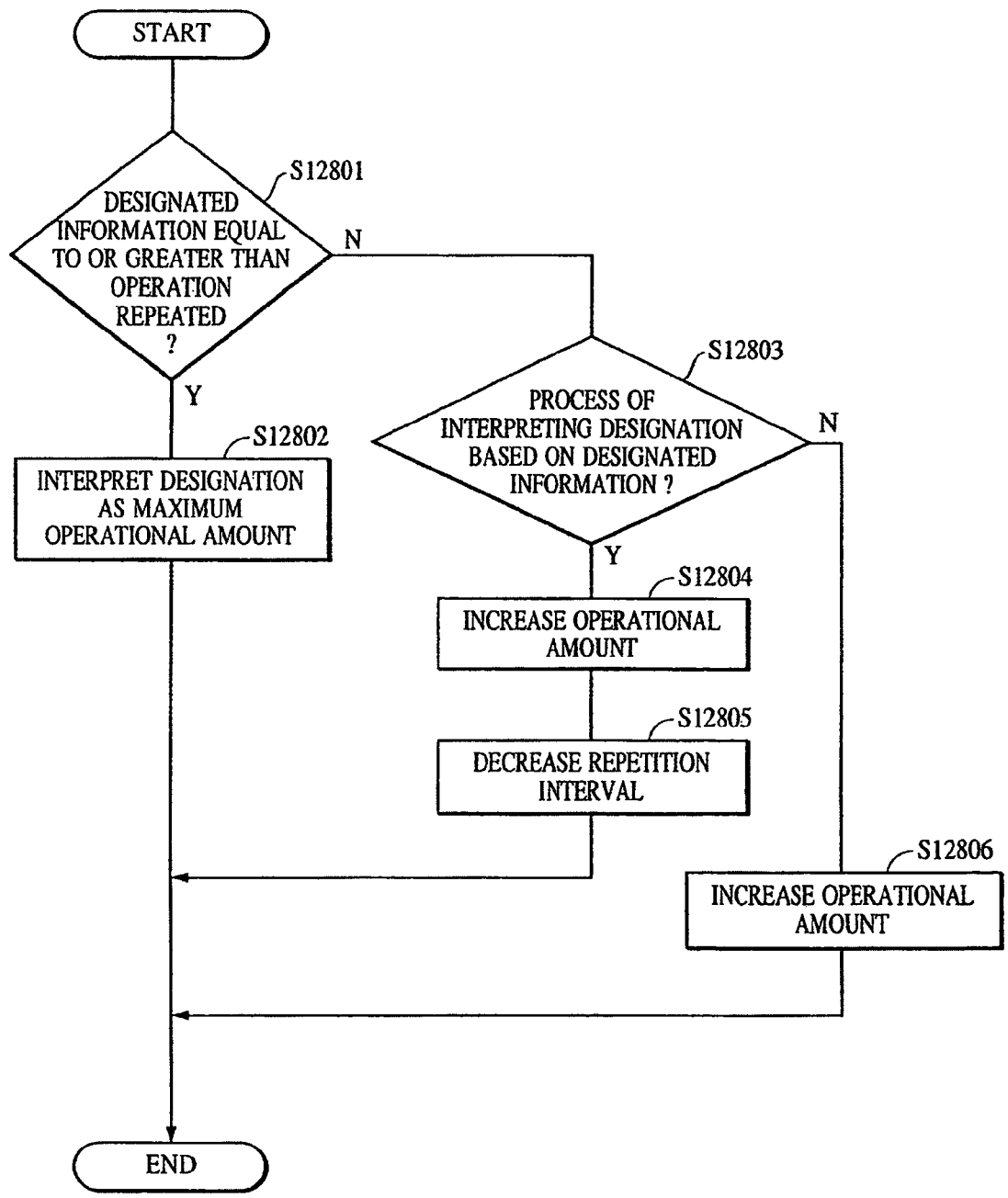

FIG. 128 is a flow diagram showing an algorithm that uses designated information other than a designated path. When the designated information is equal to or greater than the maximum criterion value, the algorithm proceeds to step S12802. The input is interpreted as a maximum operational amount. When the designated information is smaller than the maximum criterion value, the algorithm proceeds to step S12803. When the designated information is equal to or greater than a repetition criterion value, the algorithm proceeds to step S12804 to increase an operational amount. The algorithm proceeds to step S12805. The input is thus interpreted as an operation to narrow repetition intervals. When it is determined in the step S12803 that the designated information is smaller than the repetition criterion value, the algorithm proceeds to step S12806. The input is thus interpreted as an operation to increase the operational amount.

Figure 129:
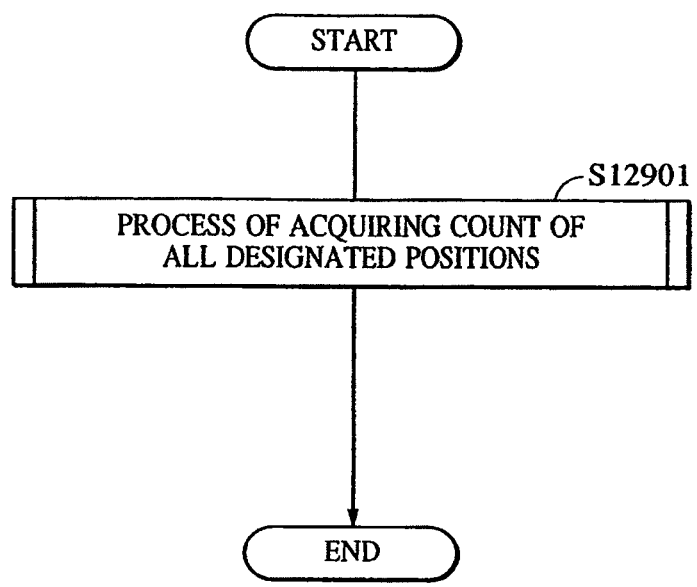

FIG. 129 is a flow diagram showing an algorithm that uses the count of all designated positions. In step S12901, a process is performed to acquire the count of all designated positions as the designated information other than the designated path.

Figure 130:
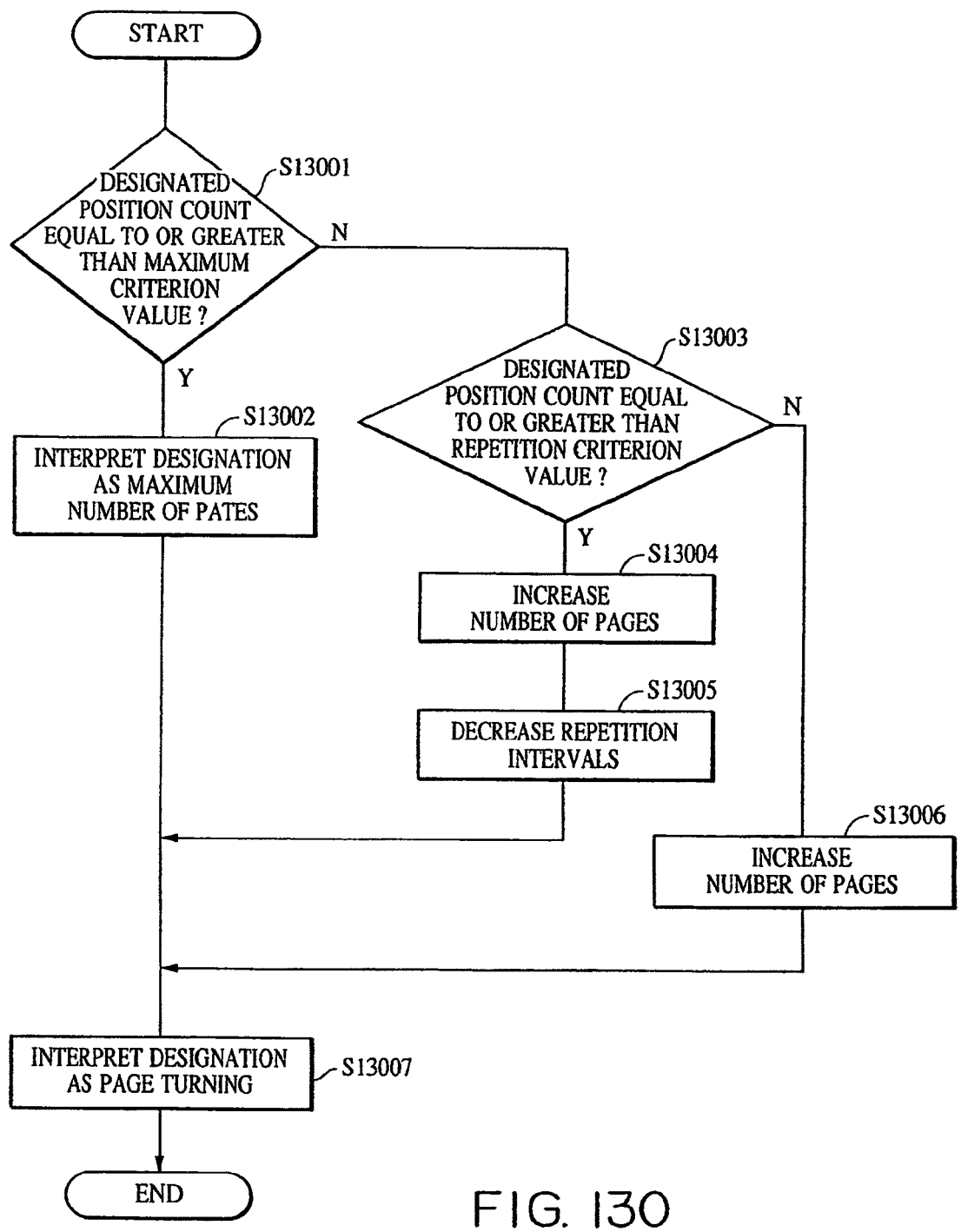

FIG. 130 is a flow diagram showing a designation interpretation process based on the designated position count as the designated information other than the designated path. When the designated position count is equal to or greater than the maximum criterion value, the algorithm proceeds to step S13002. The input is interpreted as one of the maximum number of screens, the maximum number of items, and the maximum magnification. When the designated position count is smaller than the maximum criterion count, the algorithm proceeds to step S13003. When the designated position count is equal to or greater than a repetition criterion value in the step S13003, the algorithm proceeds to step S13004. The input is interpreted as an operation to increase one of the number of pages, the number of screens, the number of items, and magnification. The algorithm proceeds to step S13005. The input is then interpreted as an operation to narrow repetition intervals. When it is determined in the step S13003 that the designated position number is smaller than the repetition criterion value, the algorithm proceeds to step S13006. The input is interpreted as an operation to increase one of the number of pages, the number of screens, the number of items, and magnification. The algorithm proceeds to step S13007 to interpret the input as one of a page-turning operation, a screen shifting operation, an item advancing operation, and an expansion/contraction operation.

Figure 131A:
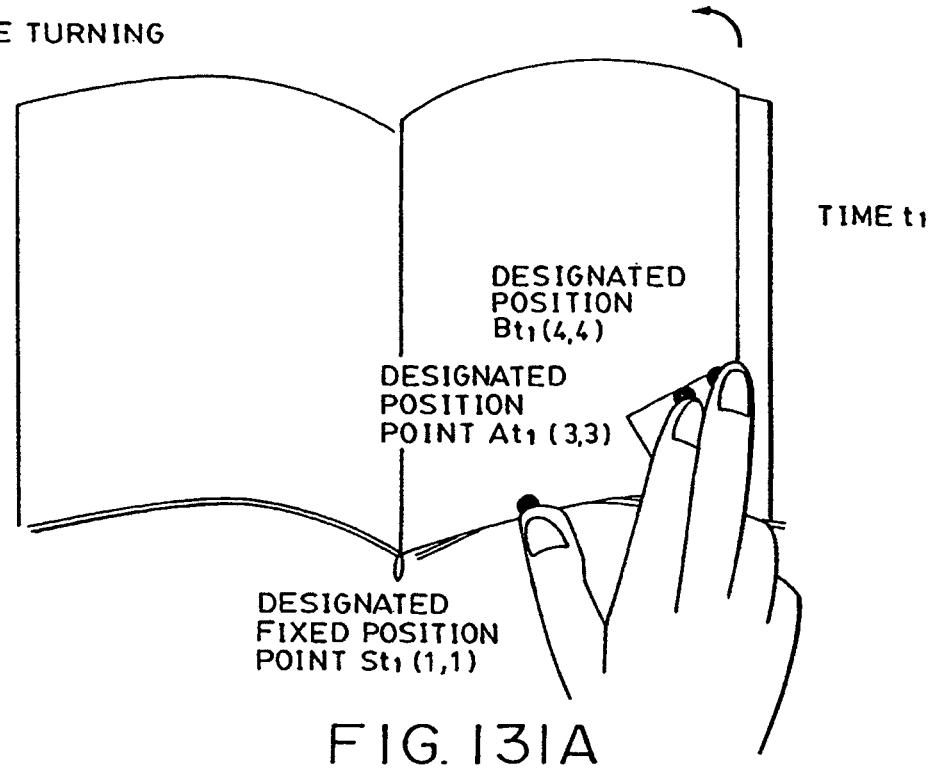
Figure 131B:
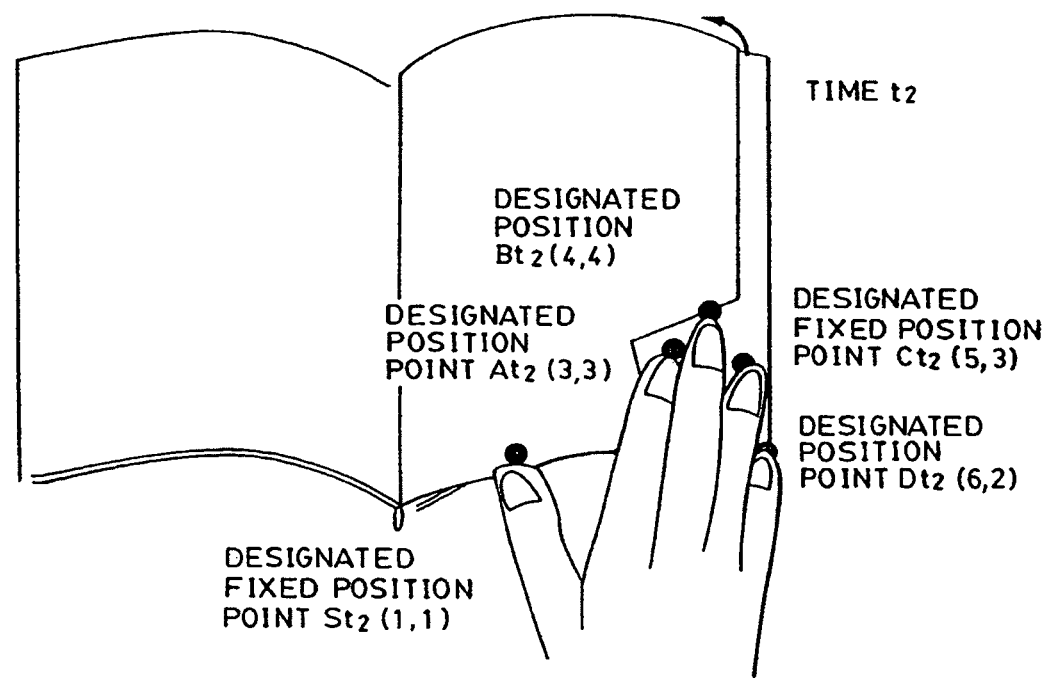
Figures 132A, 132B, 132C, 132D, 132E, 132F, 132G, 132H:
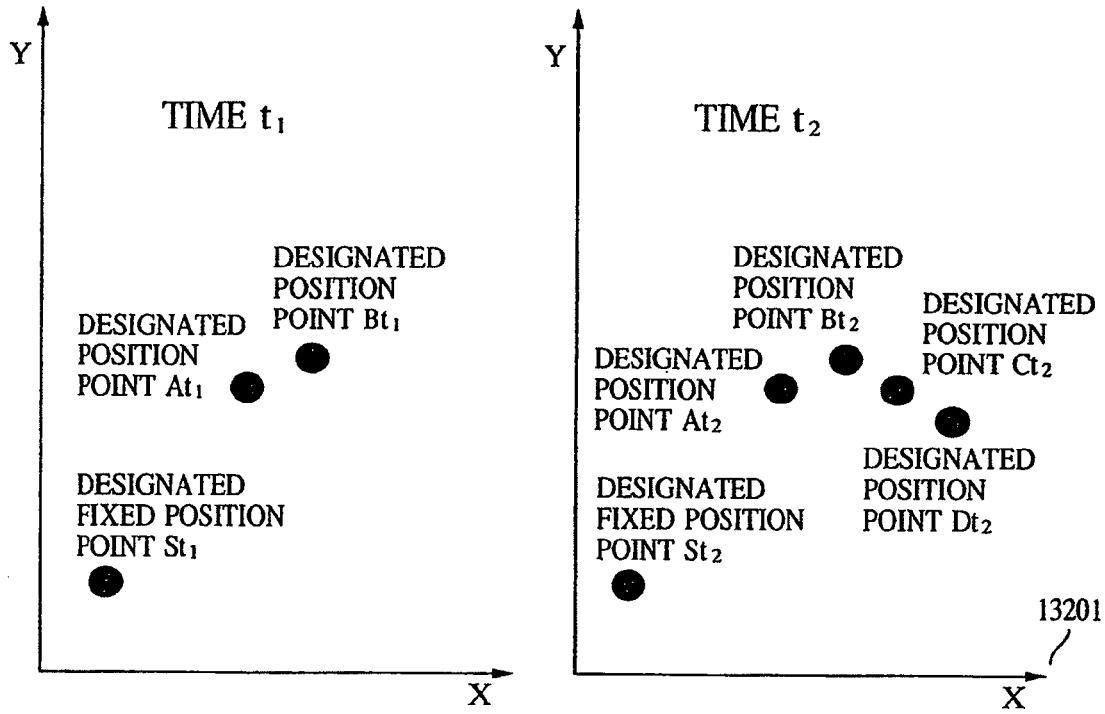

FIGS. 131A and 131B show an operational example that is interpreted as the page-turning operation. FIG. 131A shows two designated position points $At_1$ and $Bt_1$ appearing at time $t_1$. FIG. 131B shows a total of four designated position points $At_2$, $Bt_2$, $Ct_2$, and $Dt_2$ appearing at time $t_2$. Since the designated position count is increased to four at time $t_2$ from two at time $t_1$, the input is interpreted as an operation for increasing the number of pages in page turning.

FIGS. 132A-132H show the corresponding data samples that are interpreted as the page-turning operation. Graphs 13201 show two designated position points $At_1$ and $Bt_1$ appearing at time $t_1$ and a total of four designated position points $At_2$, $Bt_2$, $Ct_2$, and $Dt_2$ appearing at time $t_2$. Tables 13202 list position data of the designated positions A, B, C, and D from t, to $t_2$. A table 13203 lists the change in the designated position count. As listed, the increase in the designated position count is two at time $t_1$, resulting a total number of designated positions of three. At time $t_2$, the increase in the designated position count is two, resulting in a total number of five.

Seventeenth Embodiment

A seventeenth embodiment of the present invention is now discussed. The seventeenth embodiment accounts for the speed of travel of a designated position as the designated information other than the designated path when an operation to perform is interpreted from a combination of travel paths of at least two designated positions.

FIG. 133 is a flow diagram showing an algorithm for acquiring the speed of travel of the designated position as the designated position information other than the designated path. In step S13301, a process is performed to acquire the speed of travel of the designated position. In step S13302, a designation interpretation process is performed to interpret the input based on the travel speed of the designated position.

FIG. 134 is a flow diagram showing an algorithm for acquiring the speed of travel of the designated position. In step S13401, the distance of travel of the designated position from the immediately preceding point thereof is acquired. In step S13402, the speed of travel is calculated from the acquired travel distance and time needed for the travel.

FIG. 135 is a flow diagram showing the designation interpretation process based on the designated position travel speed as the designated information other than the designated path. When it is determined in step S13501 that the travel speed of the designated position is equal to or greater than the maximum criterion value, the algorithm proceeds to step S13502. The input is interpreted as one of the maximum number of pages, the maximum number of screens, the maximum number of items, and the maximum magnification. When it is determined in step S13501 that the travel speed of the designated position is smaller than the maximum criterion value, the algorithm proceeds to step S13503. When it is determined in step S13503 that the designated position travel speed is equal to or greater than the repetition criterion value, the algorithm proceeds to step S13504. The input is interpreted as an operation to increase one of the number of pages, the number of screens, the number of items, and magnification. The algorithm proceeds to step S13505 to interpret the input as an operation to narrow repetition intervals. When it is determined in the step S13503 that the designated position travel speed is smaller than the repetition criterion value, the algorithm proceeds to step S13506. The input is interpreted as an operation to increase one of the number of pages, the number of screens, the number of items, and magnification. The algorithm then proceeds to step S13507 to interpret the input as one of a page-turning operation, a screen shifting operation, an item advancing operation, and an expansion/contraction operation.

Figure 136A:
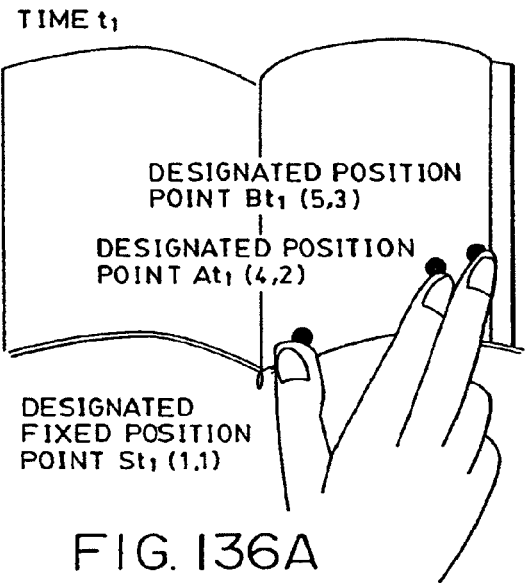
Figure 136B:
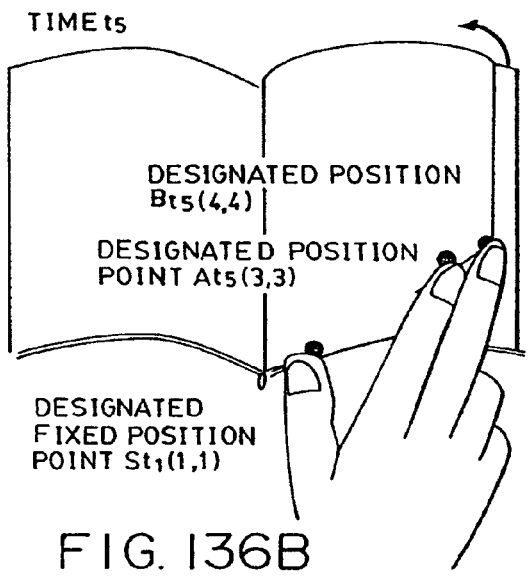
Figure 136C:
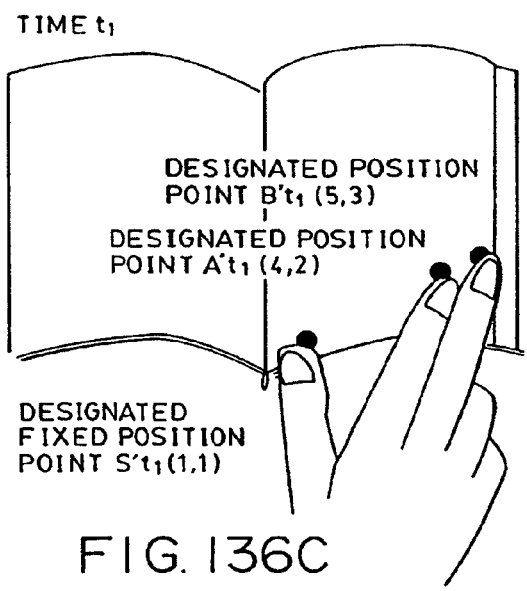
Figure 136D:
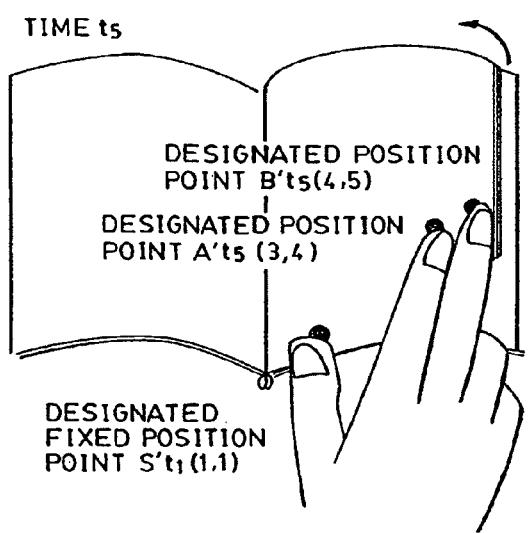
Figure 137A:
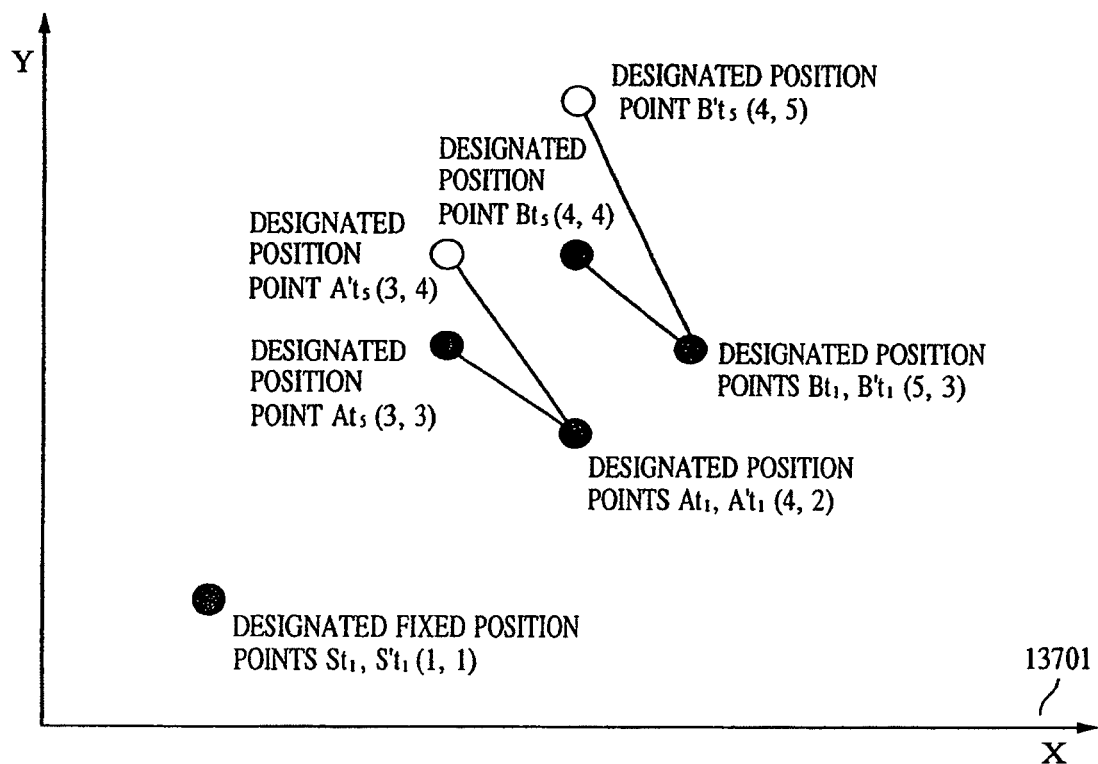

FIGS. 136A-136D show an operational example that is interpreted as a page turning using the designated position travel speed. Designated position points A and B respectively move from points $At_1$ and $Bt_1$ to $At_5$ and $Bt_5$ as shown in FIGS. 136A and 136B. Designated position points A' and B' respectively move from points $A't_1$ and $B't_1$ to $A't_s$ and $B't_5$ as shown in FIGS. 136C and 136D. The travel speed is considered to be higher in the first case shown in FIGS. 136A and 136B than in the second case shown in FIGS. 136C and 136D.

FIGS. 137A-137G show the corresponding data samples that are interpreted as the page turning using the designated position travel speed. In a graph 13701, at time $t_1$, the designated position points $At_1$ and $A't_1$ are at the same coordinates (4,2), and the designated position points $Bt_1$ and $B't_1$ are at the same coordinates (5,3). At time $t_5$, the designated positions A and B are respectively at coordinates $At_5$(3,3) and coordinates $A't_5$(3,4), and coordinates $Bt_5$(4,4), and coordinates $B't_5$(4,5).

Tables 13702 list position data of the designated positions A, B, A', and B' from $t_1$ to $t_5$. A table 13703 lists the travel speed of the designated positions. As listed, the travel speed of the designated position point A' being 0.559 and the travel speed of the designated position point B' being 0.559 are respectively greater than the travel speed of the designated position point A being 0.35 and the travel speed of the designated position point B being 0.283.

Eighteenth Embodiment

An eighteenth embodiment of the present invention is now discussed. The eighteenth embodiment accounts for a contact pressure of a designated position as the designated information other than the designated path when an operation to perform is interpreted from a combination of travel paths of at least two designated positions.

FIG. 138 is a flow diagram showing an algorithm that uses a contact pressure at a designated position as the designated information other than the designated path. In step S13801, a process is performed to acquire the contact pressure at the designated position. In step S13802, a designation interpretation process is performed to interpret the input based on the contact pressure at the designated position.

FIG. 139 is a flow diagram showing the designation interpretation process based on the designated position contact pressure. When it is determined in step S13901 that the contact pressure at the designated position is equal to or greater than the maximum criterion value, the algorithm proceeds to step S13902. The input is interpreted as one of the maximum number of screens, the maximum number of items, and the maximum magnification. When it is determined in the step S13901 that the contact pressure at the designated position is smaller than the maximum criterion value, the algorithm proceeds to step S13903. When it is determined in the step S13903 that the contact pressure at the designated position is equal to or greater than the repetition criterion value, the algorithm proceeds to step S13904. The input is interpreted as an operation to increase one of the number of screens, the number of items, and magnification. The algorithm then proceeds to step S13905 to narrow repetition intervals. When it is determined in the step S13903 that the contact pressure at the designated position is smaller than the repetition criterion value, the algorithm proceeds to step S13906. The input is interpreted as an operation to increase one of the number of screens, the number of items, and magnification. The algorithm proceeds to step S13907 to interpret the input as one of a screen shifting operation, an item advancing operation, and an expansion/contraction operation.

FIGS. 140A-140D show an operational example that is interpreted as a screen shifting operation in response to the designated position contact pressure. Designated position points $At_1(3,3)$ and $Bt_1(4,4)$ cause a high contact pressure than designated position points $Ct_1(3,3)$ and $Dt_1(4,4)$.

FIGS. 141A-141H show the corresponding data samples that are interpreted as the screen shifting operation in response to the designated position contract pressure. In graphs 14101, for a time elapse from time $t_1$ to time $t_5$, the designated position points A and B respectively move from $At_1(3,3)$ and $Bt_1(4,4)$ move to $At_5(3,1)$ and $Bt_5(4,2)$. Similarly, designated position points C and D respectively move from $Ct_1(3,3)$ and $Dt_1(4,4)$ to $Ct_5(3,1)$ and $Dt_5(4,2)$. Tables 14102 list position data of the designated position points A, B, C, and D from time $t_1$ to time $t_5$. A table 14103 lists the contact pressure at each designated position point. As listed, a change in the contact pressure of each of the designated position points C and D from time $t_1$ to time $t_5$ is greater than a change in the contact pressure of each of the designated position points A and B from time $t_1$ to time $t_5$.

Nineteenth Embodiment

A nineteenth embodiment of the present invention is now discussed. The nineteenth embodiment accounts for travel distances of a plurality of designated positions as the designated information other than the designated path when an operation to perform is interpreted from a combination of travel paths of at least two designated positions.

FIG. 142 is a flow diagram showing an algorithm that uses the distances of travel of a plurality of designated positions. In step S14201, a process is performed to acquire the distances of travel of the designated positions. In step S14202, a designation interpretation process is performed to interpret the input based on the distances of travel of the designated positions.

FIG. 143 is a flow diagram showing the designation interpretation process based on the distances of travel of the plurality of designated positions. In this algorithm, when it is determined in step S14301 that the travel distance is equal to or greater than the maximum criterion value, the algorithm proceeds to step S14302. The input is interpreted as one of the maximum number of pages, the maximum number of screens, the maximum number of items, and the maximum magnification. When it is determined in the step S14301 that the travel distance is smaller than the maximum criterion value, the algorithm proceeds to step S14303. When it is determined in step S14303 that the travel distance is equal to or greater than a repetition criterion value, the algorithm proceeds to step S14304. The input is interpreted as an operation to increase one of the number of pages, the number of screens, the number of items, and magnification. The algorithm then proceeds to step S14305 to interpret the input as an operation to narrow repetition intervals. When it is determined in the step S14303 that the travel distance is smaller than the repetition criterion value, the algorithm proceeds to step S14306. The input is interpreted as an operation to increase one of the number of pages, the number of screens, the number of items, and magnification. The algorithm then proceeds to step S14307 to interpret the input as one of a page shifting operation, a screen shifting operation, an item advancing operation, and an expansion/contraction operation.

Figure 144A:
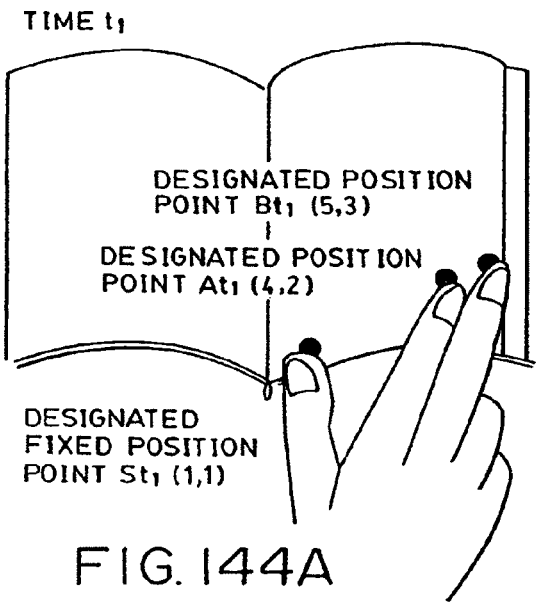
Figure 144B:
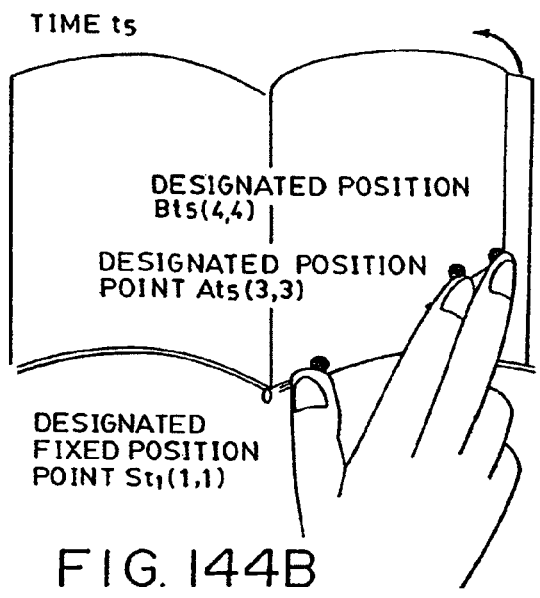
Figure 144C:
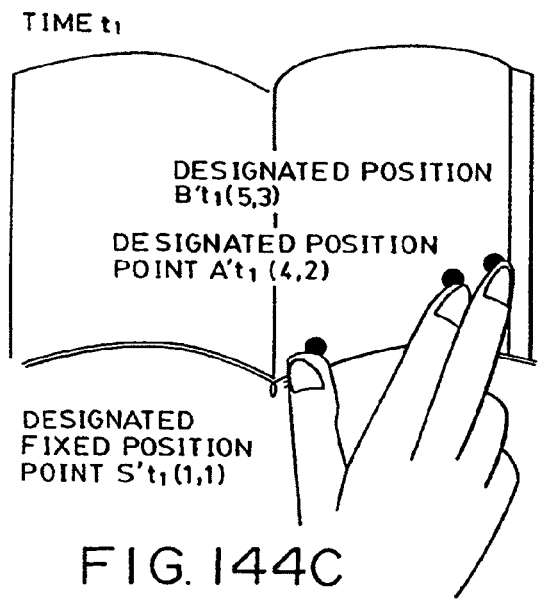
Figure 144D:
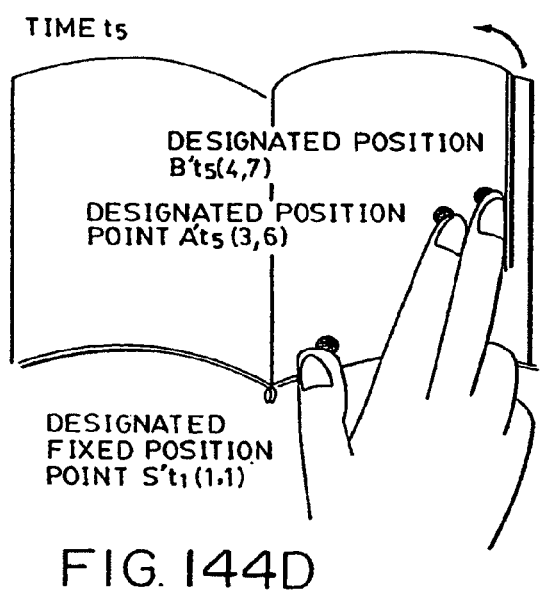
Figure 145A:
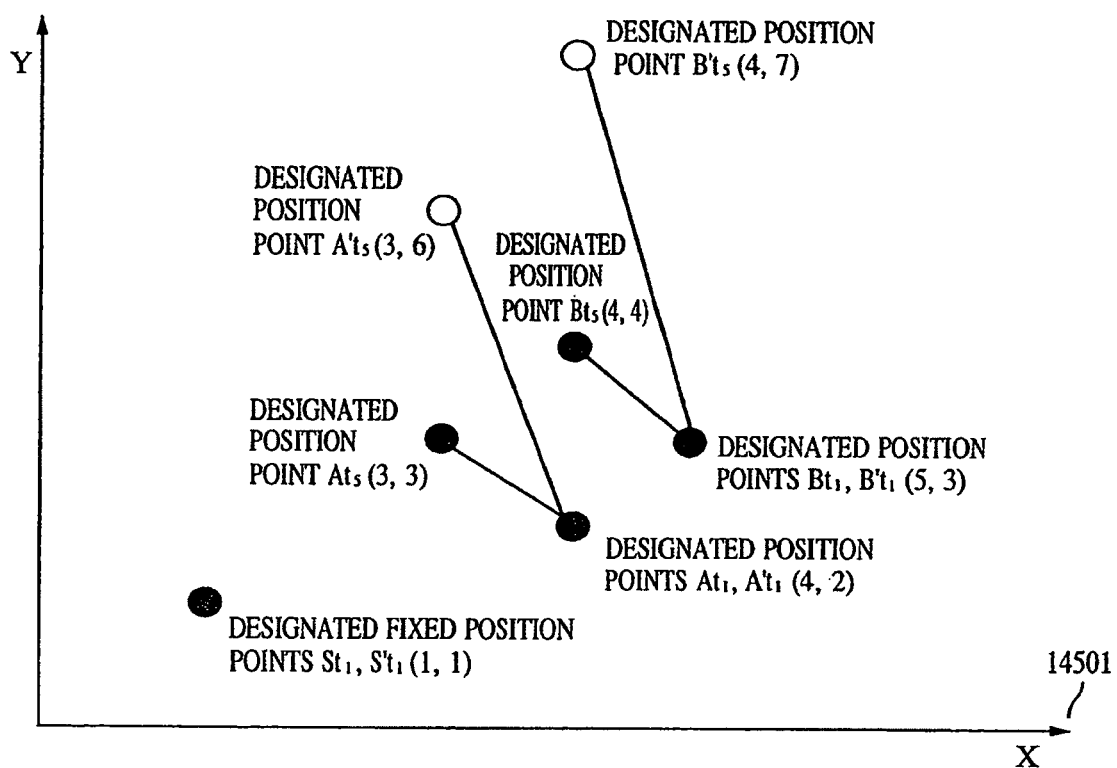

FIGS. 144A-144D show an operational example that is interpreted as a page-turning operation in response to the distances of travel of the plurality of designated positions. Designated position points A and B are respectively moved from coordinates $At_1(4,2)$ and coordinates $Bt_1(5,3)$ at time $t_1$ to coordinates $At_5(3,3)$ and coordinates $Bt_5(4,4)$ at time $t_5$ as shown in FIGS. 144A and 144B. Designated position points A' and B' are respectively moved from coordinates $A't_1(4,2)$ and coordinates $B't_1(5,3)$ at time $t_1$ to coordinates $A't_5(3,6)$ and coordinates $B't_5(4,7)$ at time $t_5$ as shown in FIGS. 144C and 144D.

FIGS. 145A-145G show the corresponding data samples that are interpreted as the page-turning operation in response to the distances of travel of the plurality of designated positions. In a graph 14501, at time $t_1$, the designated position points $At_1$ and $A't_1$ are at the same coordinates (4,2), and the designated position points $Bt_1$ and $B't_1$ are at the same coordinates (5,3). At time $t_5$, the designated positions A and B are respectively at coordinates $At_5(3,3)$ and coordinates $A't_5(3,6)$, and coordinates $Bt_5(4,4)$, and coordinates $B't_5(4,7)$. Tables 14502 list position data of the designated positions A, B, A', and B' from $t_1$ to $t_5$. A table 14503 lists the travel distance data of the designated positions. As listed, the travel distance of the designated position point A' being 4.123 and the travel speed of the designated position point B' being 4.123 are respectively greater than the travel speed of the designated position point A being 1.414 and the travel speed of the designated position point B being 1.131.

Twentieth Embodiment

A twentieth embodiment of the present invention is now discussed. The twentieth embodiment accounts for stationary times of a plurality of designated positions when an operation to perform is interpreted from a combination of travel paths of at least two designated positions.

FIG. 146 is a flow diagram showing an algorithm that uses the stationary times of the plurality of designated positions. In step S14601, a process is performed to acquire stationary time of a designated position. The algorithm proceeds to step S14602. When it is determined that the designated position remains stationary for a predetermined duration of time, the algorithm proceeds to step S14603. The input is interpreted as an operation for designating an area. The designated area is thus clearly distinguished from the remaining area of a display. When it is determined that the designated position is not stationary in the step S14602, the algorithm proceeds to step S14604. The input is then interpreted as an operation for the designated area.

FIGS. 147A and 147B show an operational example that is interpreted as an area designating operation. Designated position points A and B are placed at $At_1$ and $Bt_1$ on a line of characters at time $t_1$. When the designated position points remains at $At_5$ and $Bt_5$ on the same line of character at time $t_5$ as shown, the area between the designated position points A and B is interpreted as being designated.

FIGS. 148A-148D show the corresponding data samples that are interpreted as the area designating operation. In a graph 14801, the designated position point A continuously stays at coordinates A(3,3) from time $t_1$ to time $t_5$. Also, the designated position point B continuously stays at coordinates B(4,4) from time $t_1$ to time $t_5$. Tables 14802 list position data of the designated position points A and B from time $t_1$ to time $t_5$. A table 14803 lists the distances of travel of the designated position points A and B. As listed, the distance of travel of the designated position point A is zero at time $t_1$, and is continuously zero from time $t_2$ to time $t_5$. Also, the distance of travel of the designated position point B is continuously zero from time $t_1$ to time $t_5$. The designated position points A and B remain stationary from time $t_1$ to time $t_5$.

FIGS. 149A and 149B show an operational example that is interpreted as an expansion operation to be effected on a designated area. The designated position points A and B are placed at $At_5$ and $Bt_5$ on a line of characters at time $t_5$. The designated position points A and B are respectively moved to $At_6$ and $Bt_6$ at time $t_6$. This input is now interpreted as an operation to expand the designated area.

FIGS. 150A-150D show the corresponding data samples that are interpreted as the expansion operation to be effected on the designated area. In a graph 15001, the designated position points A and B respectively continuously stay at the same coordinates A(3,3) and B(4,4) from time $t_1$ to time $t_5$. The coordinates $A_t6(2,2.5)$ and $B_t6(4,4)$ taken by the designated position points A and B at time $t_6$ are spaced more apart from each other than the coordinates $At_5$ and $Bt_5$ are at time $t_5$. Tables 15002 list position data of the designated position points A and B from time $t_1$ to time $t_6$. A table 15003 lists the change in the distance of travel of each designated position point. As listed, the travel distances of the designated position points A and B are zero from time $t_1$ to time $t_5$. The magnification resulting from the distance change between the designated position points A and B is 100%. At time $t_6$, the travel distance of the point A is 1.118 and the travel distance of the point B is 2.236. The magnification resulting from the distance change between the point A and the point B increases to 285%.

The present invention may be implemented in a system constructed of a plurality of apparatuses (including a host computer, interface units, a display, etc.) or may be implemented in a standalone apparatus.

A program code of software for carrying out the functions of the embodiments is loaded in a computer in a system or apparatus connected to a variety of devices so that the devices perform the functions of the above embodiments. The variety of devices operate according to the program code stored in the computer (CPU or MPU) in the system or apparatus. Such embodiments fall within the scope of the present invention. The program code of software performs the functions of the embodiment. The program code itself, and means for feeding the program code to the computer, for example, a storage medium for storing the program code, fall within the scope of the present invention.

Available as storage media for feeding the program code are a floppy disk, a hard disk, an optical disk, a magneto-optical disk, a CD-ROM, a CD-R, a magnetic tape, a non-volatile memory card, ROM and the like.

By executing the program code read by the computer, the functions of the embodiments are performed. Furthermore, the functions of the above embodiments are performed in cooperation with the OS (operating system) running on the computer or another application software program according to the instruction of the program code. Such a program code falls within the scope of the present invention.

The program code from the storage medium is read into a memory incorporated in a feature expansion board in the computer or in a feature expansion unit connected to the computer. The CPU mounted on the feature expansion board or the feature expansion unit performs partly or entirely the actual process in response to the instruction from the program code. The functions of the above embodiment are executed through the process. Such a program code falls within the scope of the present invention.

To incorporate the present invention to the storage medium, the program code of the above-referenced flow diagrams may be stored in the storage medium.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus comprising:
   a display control unit configured to cause a touch screen display to display an image;
   a detection unit configured to detect a plurality of touched positions which are multi-touched in the image displayed on the touch screen display by the display control unit; and
   an interpreting unit configured to,
   in a case where it is detected that the plurality of touched positions detected by the detection unit remain stationary during a predetermined period, interpret a designation based on the touched positions as a first operation for determining a touched area enclosed by the plurality of touched positions within the image, and
   in a case where it is detected that the plurality of touched positions move, interpret the designation based on the touched positions as a second operation different from the first operation according to the movement of the plurality of touched positions.

2. The information processing apparatus according to claim 1, wherein the interpreting unit interprets, in a case where it is detected that the plurality of touched positions moves in directions such that the plurality of touched positions becomes further away from each other, the designation based on the touched positions as an expansion operation according to the movement of the plurality of touched positions.

3. The information processing apparatus according to claim 2, wherein magnification of the expansion operation corresponds to a ratio of change in a distance between the touched positions detected by the detection unit.

4. The information processing apparatus according to claim 3, wherein the interpreting unit interprets, in a case where it is detected that the plurality of touched positions, on an area within the image where a character string is displayed, remains stationary during the predetermined period, the designation based on the touched positions as the first operation for designating an area of characters included in the character string, the area being enclosed by the plurality of touched positions detected by the detection unit.

5. The information processing apparatus according to claim 4, wherein the display control unit causes the touch screen display to display, in a case where the interpreting unit interprets the designation based on the touched positions as the first operation for designating the area of the characters which is enclosed by the plurality of touched positions detected by the detection unit, the designated area of the characters in a manner that the characters are clearly distinguished from the remaining characters included in the character string.

6. The information processing apparatus according to claim 1, wherein the interpreting unit, in a case where it is detected that two touched positions detected by the detection unit remain stationary during the predetermined period, interprets a designation based on the two touched positions as the first operation for determining the designated area corresponding to an area between the two touched positions within the image, and in a case where it is detected that the two touched positions detected by the detection unit move, interprets the designation based on the two touched positions as the second operation different from the first operation according to the movement of two touched positions.

7. An operational method comprising:
displaying an image on a display screen;
detecting a plurality of touched positions which are multi-touched in the image displayed on the display screen;
interpreting, in a case where it is detected that the plurality of touched positions remain stationary during a predetermined period, a designation based on the touched positions as a first operation for determining a touched area enclosed by the plurality of touched positions within the image; and
interpreting, in a case where it is detected that the plurality of touched positions move, the designation based on the touched positions as a second operation different from the first operation according to the movement of the plurality of touched positions.

8. A non-transitory computer-readable storage medium storing a manipulation program for controlling to perform manipulation, the program comprising codes for causing the computer to perform the steps of:
displaying an image on a display screen;
detecting a plurality of touched positions which are touched in the image displayed on the display screen;
interpreting, in a case where it is detected that the plurality of touched positions remain stationary during a predetermined period, a designation based on the touched positions as a first operation for determining a touched area enclosed by the plurality of touched positions within the image; and
interpreting, in a case where it is detected that the plurality of touched positions move, the designation based on the touched positions as a second operation different from the first operation according to the movement of the plurality of touched positions.

* * * * *